(12) United States Patent
Soloff

(10) Patent No.: US 11,676,174 B2
(45) Date of Patent: *Jun. 13, 2023

(54) ADVERTISING FUTURES MARKETPLACE METHODS AND SYSTEMS

(71) Applicant: Snap Inc., Santa Monica, CA (US)

(72) Inventor: David Soloff, Berkeley, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,163

(22) Filed: Jan. 12, 2021

(65) Prior Publication Data
US 2021/0383429 A1    Dec. 9, 2021

Related U.S. Application Data

(60) Continuation of application No. 16/654,835, filed on Oct. 16, 2019, now Pat. No. 10,915,924, which is a
(Continued)

(51) Int. Cl.
*G06Q 30/02* (2023.01)
*G06Q 30/0251* (2023.01)
(Continued)

(52) U.S. Cl.
CPC ......... *G06Q 30/0251* (2013.01); *G06Q 30/02* (2013.01); *G06Q 30/0201* (2013.01); *G06Q 30/0283* (2013.01)

(58) Field of Classification Search
CPC ............... G06Q 30/02; G06Q 30/0251; G06Q 30/0201; G06Q 30/0283; G06Q 30/0254;
(Continued)

(56) References Cited

U.S. PATENT DOCUMENTS 7,013,285 B1   3/2006 Rebane
7,568,211 B2   7/2009 Mai et al.
(Continued)

FOREIGN PATENT DOCUMENTS

WO   WO 2001/090956 A1 * 11/2001 ............. A61K 39/02
WO   WO 2011/043957 A2 *  4/2011 ............. G06Q 30/00

OTHER PUBLICATIONS

Gharibshah, Zhabiz; Zhu, Xingquan, User Response Prediction in Online Advertising (English), Jan. 6, 2021 (Year: 2021).*
(Continued)

*Primary Examiner* — Marilyn G Macasiano
(74) *Attorney, Agent, or Firm* — Schwegman Lundberg & Woessner, P.A.

(57) ABSTRACT

Methods and systems provide information products relating to past, present and future advertising transactions (i.e., contracts to place advertisements in various media) to enable a marketplace in advertising products. Information regarding a plurality of advertising transactions are gathered. Data is analyzed to determine its attributes. Some attribute values are transformed and the attribute values are stored in a database. Attributes are organized or indexed according to a taxonomy of attributes to provide indexes to advertising transaction records. Indexes and benchmarks for various selected types of advertising transactions can be generated by selecting certain records from the database and aggregating the data or otherwise synthesizing information products, such as benchmarks and market entities for the selected types of advertising transactions. Information products may be published and syndicated as market indexes and benchmarks.

20 Claims, 143 Drawing Sheets

Related U.S. Application Data continuation of application No. 14/562,445, filed on Dec. 5, 2014, now Pat. No. 10,489,821, which is a continuation of application No. 13/452,492, filed on Apr. 20, 2012, now abandoned, which is a division of application No. 12/263,437, filed on Oct. 31, 2008, now abandoned.

(60) Provisional application No. 61/045,724, filed on Apr. 17, 2008, provisional application No. 60/985,118, filed on Nov. 2, 2007.

(51) Int. Cl.
*G06Q 30/0283* (2023.01)
*G06Q 30/0201* (2023.01)

(58) Field of Classification Search
CPC .............. G06Q 10/067; G06Q 30/0246; G06Q 30/0207
See application file for complete search history.

(56) References Cited

U.S. PATENT DOCUMENTS

| | | | |
|---|---|---|---|
| 7,734,632 B2 * | 6/2010 | Wang | G06Q 30/02 707/750 |
| 7,747,465 B2 | 6/2010 | Srinivasan et al. | |
| 7,761,346 B2 | 7/2010 | Cooper et al. | |
| 7,895,075 B2 | 2/2011 | Gettys et al. | |
| 7,895,620 B2 | 2/2011 | Haberman et al. | |
| 8,438,170 B2 * | 5/2013 | Koran | G06F 16/28 707/758 |
| 10,489,821 B2 | 11/2019 | Soloff | |
| 10,915,924 B1 | 2/2021 | Soloff | |
| 2002/0099600 A1 | 7/2002 | Merriman et al. | |
| 2005/0028188 A1 | 2/2005 | Latona et al. | |
| 2009/0119172 A1 | 5/2009 | Soloff | |
| 2012/0203625 A1 | 8/2012 | Soloff | |
| 2015/0095144 A1 | 4/2015 | Soloff | |

OTHER PUBLICATIONS

"U.S. Appl. No. 12/263,437, Non Final Office Action dated Oct. 28, 2011", 25 pgs.
"U.S. Appl. No. 12/263,437, Response filed Aug. 17, 2011 to Restriction Requirement dated Aug. 15, 2011", 8 pgs.
"U.S. Appl. No. 12/263,437, Restriction Requirement dated Aug. 15, 2011", 7 pgs.
"U.S. Appl. No. 13/452,492, Final Office Action dated Aug. 16, 2013", 17 pgs.
"U.S. Appl. No. 13/452,492, Non Final Office Action dated Jul. 7, 2014", 20 pgs.
"U.S. Appl. No. 13/452,492, Non Final Office Action dated Nov. 2, 2012", 13 pgs.
"U.S. Appl. No. 13/452,492, Response filed Jan. 22, 2014 to Final Office Action dated Aug. 16, 2013", 11 pgs.
"U.S. Appl. No. 13/452,492, Response filed Apr. 25, 2013 to Non Final Office Action dated Nov. 2, 2012", 10 pgs.
"U.S. Appl. No. 14/562,445, Examiner Interview Summary dated Jan. 8, 2019", 3 pgs.
"U.S. Appl. No. 14/562,445, Final Office Action dated May 18, 2018", 17 pgs.
"U.S. Appl. No. 14/562,445, Non Final Office Action dated Jun. 29, 2017", 16 pgs.
"U.S. Appl. No. 14/562,445, Non Final Office Action dated Oct. 3, 2016", 15 pgs.
"U.S. Appl. No. 14/562,445, Non Final Office Action dated Oct. 26, 2017", 2 pgs.
"U.S. Appl. No. 14/562,445, Non Final Office Action dated Nov. 1, 2018", 15 pgs.
"U.S. Appl. No. 14/562,445, Notice of Allowance dated Jul. 9, 2019", 8 pgs.
"U.S. Appl. No. 14/562,445, Notice of Non-Compliant Amendment dated Jan. 30, 2019", 1 pg.
"U.S. Appl. No. 14/562,445, Response filed Jan. 14, 2019 to Non Final Office Action dated Nov. 1, 2018", 10 pgs.
"U.S. Appl. No. 14/562,445, Response filed Jan. 26, 2018 to Non Final Office Action dated Jun. 29, 2017", 11 pgs.
"U.S. Appl. No. 14/562,445, Response filed Mar. 21, 2017 to Non Final Office Action dated Oct. 3, 2016", 9 pgs.
"U.S. Appl. No. 14/562,445, Response filed Aug. 20, 2018 to Final Office Action dated May 18, 2018", 17 pgs.
"U.S. Appl. No. 14/562,445, Response filed Mar. 27, 2019 to Notice of Non-Compliant Amendment dated Jan. 30, 2019", 8 pgs.
"U.S. Appl. No. 16/654,835, Notice of Allowance dated Oct. 5, 2020", 10 pgs.
"U.S. Appl. No. 16/654,835, Preliminary Amendment filed Jun. 4, 2020", 6 pgs.
Li, Yi-Jun, et al., "Exploitation vs. Exploration: Choosing Keywords for Search-Based Advertising Services", 17th International Conference on Management Science and Engineering, Melbourne, AU, (Nov. 24-26, 2010), 6 pgs.

* cited by examiner

ELECTRONIC BANNER COMPOSITE FUTURES

DATA RETRIEVED AT JAN 28 20:19:48 GMT • ALL QUOTES ARE IN GREENWICH MEAN TIME • DATA PROVIDED BY META *MARKETS*

| | CONTRACT | MONTH | LAST | CHG | OPEN | HIGH | LOW | VOLUME | OPENINT | EXCHANGE | DATE | TIME |
|---|---|---|---|---|---|---|---|---|---|---|---|---|
| 📈 📉 📊 | TIERONE CONTEXT LEVEL 300X250 RECTANGLE | MAR '08 | 502'2 | 4'0 | 196'6 | 503'6 | 490'0 | 73424 | 543764 | CBT | 01/28/08 | 19:22:11 |
| 📈 📉 📊 | TIERONE CONTEXT LEVEL 300X250 RECTANGLE | MAY '08 | 514'2 | 3'4 | 508'4 | 515'4 | 502'2 | 16751 | 202945 | CBT | 01/28/08 | 19:22:12 |
| 📈 📉 📊 | TIERONE CONTEXT LEVEL 300X250 RECTANGLE | JUL '08 | 522'6 | 3'6 | 318'0 | 524'6 | 511'0 | 17200 | 180687 | CBT | 01/28/08 | 19:22:12 |
| 📈 📉 📊 | TIERONE CONTEXT LEVEL 300X250 RECTANGLE | SEP '08 | 515'6 | 3'2 | 512'6 | 518'0 | 506'2 | 1091 | 41253 | CBT | 01/28/08 | 19:22:11 |
| 📈 📉 📊 | TIERONE CONTEXT LEVEL 300X250 RECTANGLE | DEC '08 | 510'4 | 0'6 | 509'2 | 513'2 | 501'6 | 17713 | 336140 | CBT | 01/28/08 | 19:22:11 |
| 📈 📉 📊 | TIERONE CONTEXT LEVEL 300X250 RECTANGLE | MAR '09 | 519'2 | 2'4 | 516'0 | 520'0 | 510'4 | 688 | 24656 | CBT | 01/28/08 | 19:22:12 |
| 📈 📉 📊 | TIERONE CONTEXT LEVEL 300X250 RECTANGLE | MAY '09 | 523'4 | 2'0 | 519'0 | 532'0 | 516'4 | 108 | 1834 | CBT | 01/28/08 | 19:22:11 |
| 📈 📉 📊 | TIERONE CONTEXT LEVEL 300X250 RECTANGLE | JUL '09 | 531'0 | 6'0 | 524'4 | 531'0 | 519'4 | 2985 | 7395 | CBT | 01/28/08 | 19:22:11 |
| 📈 📉 📊 | TIERONE CONTEXT LEVEL 300X250 RECTANGLE | DEC '09 | 490'2 | 0'2 | 488'6 | 495'4 | 483'4 | 1527 | 61761 | CBT | 01/28/08 | 19:22:11 |
| 📈 📉 📊 | TIERONE CONTEXT LEVEL 300X250 RECTANGLE | MAR '10 | 486'4 | -9'4 | 492'2 | 492'2 | 486'4 | 7 | 905 | CBT | 01/28/08 | 19:22:11 |
| 📈 📉 📊 | TIERONE CONTEXT LEVEL 300X250 RECTANGLE | JUL '10 | 501'0S | 1'0 | 501'0 | 510'0 | 500'0 | 0 | 478 | CBT | 01/28/08 | 19:22:12 |
| 📈 📉 📊 | TIERONE CONTEXT LEVEL 300X250 RECTANGLE | DEC '10 | 491'0 | 4'0 | 487'0 | 492'2 | 483'2 | 128 | 16491 | CBT | 01/28/08 | 19:22:11 |

📈 CHART 📉 OPTIONS 📊 QUOTES     SAVE QUOTE BOARD

TOP-50 KEYWORD COMPOSITE FUTURES

DATA RETRIEVED AT JAN 28 20:19:48 GMT • ALL QUOTES ARE IN GREENWICH MEAN TIME • DATA PROVIDED BY META *MARKETS*

| | CONTRACT | MONTH | LAST | CHG | OPEN | HIGH | LOW | VOLUME | OPENINT | EXCHANGE | DATE | TIME |
|---|---|---|---|---|---|---|---|---|---|---|---|---|
| 📈 📊 📉 | TIERONE TOP-50 KEYWORD WEEKLY_RUN | MAR '08 | 5022 | 4'0 | 1966 | 5036 | 4900 | 73424 | 543764 | CBT | 01/28/08 | 19:22:11 |
| 📈 📊 📉 | TIERONE TOP-50 KEYWORD WEEKLY_RUN | MAY '08 | 5142 | 3'4 | 5084 | 5154 | 5022 | 16751 | 202945 | CBT | 01/28/08 | 19:22:12 |
| 📈 📊 📉 | TIERONE TOP-50 KEYWORD WEEKLY_RUN | JUL '08 | 5226 | 3'6 | 3180 | 5246 | 5110 | 17200 | 180687 | CBT | 01/28/08 | 19:22:12 |
| 📈 📊 📉 | TIERONE TOP-50 KEYWORD WEEKLY_RUN | SEP '08 | 5156 | 3'2 | 5126 | 5180 | 5062 | 1091 | 41253 | CBT | 01/28/08 | 19:22:11 |
| 📈 📊 📉 | TIERONE TOP-50 KEYWORD WEEKLY_RUN | DEC '08 | 5104 | 0'6 | 5092 | 5132 | 5016 | 17713 | 336140 | CBT | 01/28/08 | 19:22:12 |
| 📈 📊 📉 | TIERONE TOP-50 KEYWORD WEEKLY_RUN | MAR '09 | 5192 | 2'4 | 5160 | 5200 | 5104 | 688 | 24656 | CBT | 01/28/08 | 19:22:12 |
| 📈 📊 📉 | TIERONE TOP-50 KEYWORD WEEKLY_RUN | MAY '09 | 5234 | 2'0 | 5190 | 5320 | 5164 | 108 | 1834 | CBT | 01/28/08 | 19:22:11 |
| 📈 📊 📉 | TIERONE TOP-50 KEYWORD WEEKLY_RUN | JUL '09 | 5310 | 6'0 | 5244 | 5310 | 5194 | 2985 | 7395 | CBT | 01/28/08 | 19:22:11 |
| 📈 📊 📉 | TIERONE TOP-50 KEYWORD WEEKLY_RUN | DEC '09 | 4902 | 0'2 | 4886 | 4954 | 4834 | 1527 | 61761 | CBT | 01/28/08 | 19:22:11 |
| 📈 📊 📉 | TIERONE TOP-50 KEYWORD WEEKLY_RUN | MAR '10 | 4864 | -9'4 | 4922 | 4922 | 4864 | 7 | 905 | CBT | 01/28/08 | 19:22:11 |
| 📈 📊 📉 | TIERONE TOP-50 KEYWORD WEEKLY_RUN | JUL '10 | 5010S | 1'0 | 5010 | 5100 | 5000 | 0 | 478 | CBT | 01/28/08 | 19:22:12 |
| 📈 📊 📉 | TIERONE TOP-50 KEYWORD WEEKLY_RUN | DEC '10 | 4910 | 4'0 | 4870 | 4922 | 4832 | 128 | 16491 | CBT | 01/28/08 | 19:22:11 |

📈 CHART 📊 OPTIONS 📉 QUOTES                                      SAVE QUOTE BOARD

MOBILE WAP BANNER COMPOSITE FUTURES

DATA RETRIEVED AT JAN 28 20:19:48 GMT • ALL QUOTES ARE IN GREENWICH MEAN TIME • DATA PROVIDED BY META *MARKETS*

| | CONTRACT | MONTH | LAST | CHG | OPEN | HIGH | LOW | VOLUME | OPENINT | EXCHANGE | DATE | TIME |
|---|---|---|---|---|---|---|---|---|---|---|---|---|
| 🗠 🗇 🗨 | NETWORK SERVED GEO LEVEL 112X20 WAP HTML DISPLAY | MAR '08 | 502'2 | 4'0 | 196'6 | 5036 | 490'0 | 73424 | 543764 | CBT | 01/28/08 | 19:22:11 |
| 🗠 🗇 🗨 | NETWORK SERVED GEO LEVEL 112X20 WAP HTML DISPLAY | MAY '08 | 514'2 | 3'4 | 508'4 | 5154 | 5022 | 16751 | 202945 | CBT | 01/28/08 | 19:22:12 |
| 🗠 🗇 🗨 | NETWORK SERVED GEO LEVEL 112X20 WAP HTML DISPLAY | JUL '08 | 522'6 | 3'6 | 318'0 | 5246 | 5110 | 17200 | 180687 | CBT | 01/28/08 | 19:22:12 |
| 🗠 🗇 🗨 | NETWORK SERVED GEO LEVEL 112X20 WAP HTML DISPLAY | SEP '08 | 515'6 | 3'2 | 512'6 | 5180 | 506'2 | 1091 | 41253 | CBT | 01/28/08 | 19:22:11 |
| 🗠 🗇 🗨 | NETWORK SERVED GEO LEVEL 112X20 WAP HTML DISPLAY | DEC '08 | 510'4 | 0'6 | 509'2 | 5132 | 5016 | 17713 | 336140 | CBT | 01/28/08 | 19:22:11 |
| 🗠 🗇 🗨 | NETWORK SERVED GEO LEVEL 112X20 WAP HTML DISPLAY | MAR '09 | 519'2 | 2'4 | 516'0 | 5200 | 5104 | 688 | 24656 | CBT | 01/28/08 | 19:22:12 |
| 🗠 🗇 🗨 | NETWORK SERVED GEO LEVEL 112X20 WAP HTML DISPLAY | MAY '09 | 523'4 | 2'0 | 519'0 | 5320 | 5164 | 108 | 1834 | CBT | 01/28/08 | 19:22:11 |
| 🗠 🗇 🗨 | NETWORK SERVED GEO LEVEL 112X20 WAP HTML DISPLAY | JUL '09 | 531'0 | 6'0 | 524'4 | 5310 | 5194 | 2985 | 7395 | CBT | 01/28/08 | 19:22:11 |
| 🗠 🗇 🗨 | NETWORK SERVED GEO LEVEL 112X20 WAP HTML DISPLAY | DEC '09 | 490'2 | 0'2 | 488'6 | 4954 | 4834 | 1527 | 61761 | CBT | 01/28/08 | 19:22:11 |
| 🗠 🗇 🗨 | NETWORK SERVED GEO LEVEL 112X20 WAP HTML DISPLAY | MAR '10 | 486'4 | -9'4 | 492'2 | 4922 | 4864 | 7 | 905 | CBT | 01/28/08 | 19:22:11 |

🗠 CHART 🗇 OPTIONS 🗨 QUOTES    SAVE QUOTE BOARD

FIG. 27

IN-GAME-AD (IGA) IMMERSIVE COMPOSITE FUTURES

DATA RETRIEVED AT JAN 28 20:19:48 GMT • ALL QUOTES ARE IN GREENWICH MEAN TIME • DATA PROVIDED BY META *MARKETS*

| | CONTRACT | MONTH | LAST | CHG | OPEN | HIGH | LOW | VOLUME | OPENINT | EXCHANGE | DATE | TIME |
|---|---|---|---|---|---|---|---|---|---|---|---|---|
| ⊠ ▣ ▣ | IN-GAME IMMERSIVE CPS (COST PER SESSION) | MAR '08 | 5022 | 40 | 1966 | 5036 | 4900 | 73424 | 543764 | CBT | 01/28/08 | 19:22:11 |
| ⊠ ▣ ▣ | IN-GAME IMMERSIVE CPS (COST PER SESSION) | MAY '08 | 5142 | 34 | 5084 | 5154 | 5022 | 16751 | 202945 | CBT | 01/28/08 | 19:22:12 |
| ⊠ ▣ ▣ | IN-GAME IMMERSIVE CPS (COST PER SESSION) | JUL '08 | 5226 | 36 | 3180 | 5246 | 5110 | 17200 | 180687 | CBT | 01/28/08 | 19:22:12 |
| ⊠ ▣ ▣ | IN-GAME IMMERSIVE CPS (COST PER SESSION) | SEP '08 | 5156 | 32 | 5126 | 5180 | 5062 | 1091 | 41253 | CBT | 01/28/08 | 19:22:11 |
| ⊠ ▣ ▣ | IN-GAME IMMERSIVE CPS (COST PER SESSION) | DEC '08 | 5104 | 06 | 5092 | 5132 | 5016 | 17713 | 336140 | CBT | 01/28/08 | 19:22:11 |
| ⊠ ▣ ▣ | IN-GAME IMMERSIVE CPS (COST PER SESSION) | MAR '09 | 5192 | 24 | 5160 | 5200 | 5104 | 688 | 24656 | CBT | 01/28/08 | 19:22:12 |
| ⊠ ▣ ▣ | IN-GAME IMMERSIVE CPS (COST PER SESSION) | MAY '09 | 5234 | 20 | 5190 | 5320 | 5164 | 108 | 1834 | CBT | 01/28/08 | 19:22:11 |
| ⊠ ▣ ▣ | IN-GAME IMMERSIVE CPS (COST PER SESSION) | JUL '09 | 5310 | 60 | 5244 | 5310 | 5194 | 2985 | 7395 | CBT | 01/28/08 | 19:22:11 |
| ⊠ ▣ ▣ | IN-GAME IMMERSIVE CPS (COST PER SESSION) | DEC '09 | 4902 | 02 | 4886 | 4954 | 4834 | 1527 | 61761 | CBT | 01/28/08 | 19:22:11 |
| ⊠ ▣ ▣ | IN-GAME IMMERSIVE CPS (COST PER SESSION) | MAR '10 | 4864 | -94 | 4922 | 4922 | 4864 | 7 | 905 | CBT | 01/28/08 | 19:22:11 |

▣ CHART ▣ OPTIONS ▣ QUOTES     SAVE QUOTE BOARD

IPTV/BROADBAND VIDEO COMPOSITE FUTURES

DATA RETRIEVED AT JAN 28 20:19:48 GMT • ALL QUOTES ARE IN GREENWICH MEAN TIME • DATA PROVIDED BY META *MARKETS*

| | CONTRACT | MONTH | LAST | CHG | OPEN | HIGH | LOW | VOLUME | OPENINT | EXCHANGE | DATE | TIME |
|---|---|---|---|---|---|---|---|---|---|---|---|---|
| ☆ ⓘ ⓠ | NATIONAL INLINE CONTEXT LEVEL 30-SECS | MAR '08 | 50'22 | 40 | 19'66 | 50'36 | 49'00 | 73424 | 543764 | CBT | 01/28/08 | 19:22:11 |
| ☆ ⓘ ⓠ | NATIONAL INLINE CONTEXT LEVEL 30-SECS | MAY '08 | 51'42 | 34 | 50'84 | 51'54 | 50'22 | 16751 | 202945 | CBT | 01/28/08 | 19:22:12 |
| ☆ ⓘ ⓠ | NATIONAL INLINE CONTEXT LEVEL 30-SECS | JUL '08 | 52'26 | 36 | 31'80 | 52'46 | 51'10 | 17200 | 180687 | CBT | 01/28/08 | 19:22:12 |
| ☆ ⓘ ⓠ | NATIONAL INLINE CONTEXT LEVEL 30-SECS | SEP '08 | 51'56 | 32 | 51'26 | 51'80 | 50'62 | 1091 | 41253 | CBT | 01/28/08 | 19:22:11 |
| ☆ ⓘ ⓠ | NATIONAL INLINE CONTEXT LEVEL 30-SECS | DEC '08 | 51'04 | 06 | 50'92 | 51'32 | 50'16 | 17713 | 336140 | CBT | 01/28/08 | 19:22:11 |
| ☆ ⓘ ⓠ | NATIONAL INLINE CONTEXT LEVEL 30-SECS | MAR '09 | 51'92 | 24 | 51'60 | 52'00 | 51'04 | 688 | 24656 | CBT | 01/28/08 | 19:22:12 |
| ☆ ⓘ ⓠ | NATIONAL INLINE CONTEXT LEVEL 30-SECS | MAY '09 | 52'34 | 20 | 51'90 | 53'20 | 51'64 | 108 | 1834 | CBT | 01/28/08 | 19:22:11 |
| ☆ ⓘ ⓠ | NATIONAL INLINE CONTEXT LEVEL 30-SECS | JUL '09 | 53'10 | 60 | 52'44 | 53'10 | 51'94 | 2985 | 7395 | CBT | 01/28/08 | 19:22:11 |
| ☆ ⓘ ⓠ | NATIONAL INLINE CONTEXT LEVEL 30-SECS | DEC '09 | 49'02 | 02 | 48'86 | 49'54 | 48'34 | 1527 | 61761 | CBT | 01/28/08 | 19:22:11 |
| ☆ ⓘ ⓠ | NATIONAL INLINE CONTEXT LEVEL 30-SECS | MAR '10 | 48'64 | -94 | 49'22 | 49'22 | 48'64 | 7 | 905 | CBT | 01/28/08 | 19:22:11 |

SAVE QUOTE BOARD

☆ CHART ⓘ OPTIONS ⓠ QUOTES

FIG. 29

MOBILE WAP BANNER CASH MARKET — 3000

DOWNLOAD: [CSV] [TAB] [XML]

TRANCHE [ ] PUBLISHER [ ] CHANNEL [ ]
PRODUCT [ ] DOMAIN [ ]

1-FEB-08 ▼

CLICK HEADING TO SORT. (SHOW ALL) ▼ [FILTER] [CLEAR]

| TRANCHE | PRODUCT | PUBLISHER | DOMAIN | CHANNEL | PLACEMENT | PRICING MODEL | IMPRESSIONS | REVENUE | METAMARKETS TRANSACTION STANDARD | CAMPAIGN START | HISTORY |
|---|---|---|---|---|---|---|---|---|---|---|---|
| NWKSRV | DBLTEXT | FIM | MOBILE.FOX | JUMPTAP | CONTEXT LEVEL | CPC | 20000 | 1500 | MO1342 | 3/15/2008 | ⌇ |

BROADBAND VIDEO CASH MARKET — 3000a

DOWNLOAD: [CSV] [TAB] [XML]

TRANCHE [ ] PUBLISHER [ ] CHANNEL [ ]
PRODUCT [ ] DOMAIN [ ]

5-FEB-08 ▼

ELECTRONIC DISPLAY CASH MARKET — 3000b

DOWNLOAD: [CSV] [TAB] [XML]

TRANCHE [ ] PUBLISHER [ ] CHANNEL [ ]
PRODUCT [ ] DOMAIN [ ]

1-FEB-08 ▼

CLICK HEADING TO SORT. (SHOW ALL) ▼ [FILTER] [CLEAR]

| TRANCHE | PRODUCT | PUBLISHER | DOMAIN | CHANNEL | PLACEMENT | PRICING MODEL | IMPRESSIONS | REVENUE | METAMARKETS TRANSACTION STANDARD | CAMPAIGN START | HISTORY |
|---|---|---|---|---|---|---|---|---|---|---|---|
| USERG NETWI TIER I | 728X90 | NBCUNIVERSAL | NBC | NBCDIRSALES | RUNOFSITE | CPM | 200000 | 2000 | EB16577 | 4/1/2008 | ⌇ |
| USERG NETWI TIER I | 300X250 | YAHOO | SPORTS.YAHOO | YHOODIRSALES | SPORTSRUNOFSITE | CPM | 350000 | 27000 | EB16578 | 5/15/2008 | ⌇ |
| USERG NETWI TIER I | 300X250 | DOW JONES | ONLINE.WSJ | DJIDISALES | HOME | CPM | 100000 | 2000 | EB16579 | 3/15/2008 | ⌇ |
| USERG NETWI TIER I | 180X150 | NEW YORK TIMES | ARTS.NYT | NYTDIRSALES | HOME | CPM | 100000 | 6500 | EB16580 | 4/1/2008 | ⌇ |
| EMBEI TIER I | 180X150 | VIACOM | MTV | VIACOMDIRSALES | RUNOFSITE | CPM | 150000 | 3000 | EB16581 | 2/15/2008 | ⌇ |
| EMBEI TIER II | 728X90 | GANNET | SPORTS.USATODAY | RIGHTMEDIAEX | SPORTS HOME | CPM | 125000 | 1200 | EB16582 | 3/1/2008 | ⌇ |
| DWNL TIER II | 300X250 | VIACOM | E.ONLINE | DCLKEX | RUNOFSITE | CPM | 400000 | 7000 | EB16583 | 2/15/2008 | ⌇ |
| DWNL TIER II | 300X250 | MSN | AUTOS.MSN | ADECN | RUNOFSITE | CPM | 450000 | 9000 | EB16584 | 2/1/2008 | ⌇ |
| DWNL TIER II | 728X90 | CLASSMATES | CLASSMATES.COM | BLUELITHIUM | RUNOFSITE | CPM | 150000 | 1500 | EB16585 | 2/1/2008 | ⌇ |
| USERG TIER III | 160X600 | TECHNORATI | TECHNORATI.COM | TRAFFIQ | RUNOFSITE | CPM | 800000 | 900 | EB16586 | 1/29/2008 | ⌇ |

FIG. 30

ADVERTISING FUTURES MARKETPLACE METHODS AND SYSTEMS

CROSS-REFERENCE TO RELATED APPLICATIONS

This application is a continuation of and claims priority to U.S. patent application Ser. No. 16/654,835, filed Oct. 16, 2019, which is a continuation of and claims priority to U.S. patent application Ser. No. 14/562,445, filed Dec. 5, 2014, which is a continuation and claims priority to U.S. patent application Ser. No. 13/452,492, filed Apr. 20, 2012, which is a divisional of and claims priority to U.S. patent application Ser. No. 12/263,437, filed Oct. 31, 2008, which claims the benefit of US Provisional Application Ser. No. 61/045,724, filed Apr. 17, 2008, and U.S. Provisional Application Ser. No. 60/985,118, filed Nov. 2, 2007, the contents of all of which are herein incorporated by reference.

FIELD OF THE INVENTION

The present invention relates generally to computer based tools for analyzing business transactions and more particularly to methods and systems for providing an advertising futures marketplace.

BACKGROUND

While advertising continues to have a place in a variety of markets, such as print, broadcast, and electronic, advertising spend may be trending toward a greater percent of future advertising dollars being spent in various electronic forms. Large companies have made public statements regarding requiring marketing partners to allocate specific, and growing, amounts of advertising budgets to on-line, electronic advertisements. As this trend continues, it is perceived that ad agency media buys are going away and that quantifiable data will form the basis for media buy decisions.

While traditionally financial or commodity market maturity has supported movement toward speed, efficiency, transparency and away from opacity, inefficiency, and wide value spreads, advertising market, such as the electronic advertising world has no such basis for risk mitigation or leveraged speculation.

SUMMARY

Various embodiments provide methods and systems for support an advertising transaction marketplace. Data from a plurality of advertising placement transactions may be captured and analyzed to extract values of standard advertising attributes that characterize the captured advertising transaction data. The attribute data may be extracted and organized according to a taxonomy of attributes with the values of the standard attributes stored in a database according to the taxonomy. Selected attributes of the advertising transactions may be aggregated to provide a common market index of advertising transactions. Stored advertising transaction records may be sampled based on the extracted attribute values and used to determine a benchmark based on the sampled set of advertising transactions.

In another embodiment, methods and systems capture advertising transaction data from a stream of advertising transaction records received from a source of advertising transaction data, determine values of standard attributes within extracted advertising transactions, organize the extracted advertising transactions into tiers according to a taxonomy of advertising transaction attributes, identify targeted advertising attribute values that represent a selected plurality of transactions, sample a set of advertising transactions based upon the identified attribute values, and synthesize an advertising reference entity based upon and representative of the sampled set of advertising transactions. The results may be used to define a synthesized advertising reference entity that can be published and syndicated.

In another embodiment, methods and systems capture advertising transaction data from a stream of advertising transaction records received from a source of advertising transaction data, determine values of standard attributes within extracted advertising transactions, sample a set of advertising transactions based upon the identified attribute values, determine an advertising product composite price based on the transaction sample set for sampled advertising products of the identified parameters conducted within the identified transaction timeframe, publish the advertising product composite price to a marketplace on a timely and consistent basis, syndicate the publication of the advertising product composite price, and establish the advertising product composite price as an advertising composite price benchmark for subsequent transactions.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

FIGS. 24-29 are example screenshots of a user interface presenting bid and ask prices for advertising transaction securities.

FIG. 30 shows three example displays of advertising market information presented in an embodiment.

DETAILED DESCRIPTION

Figure 1:
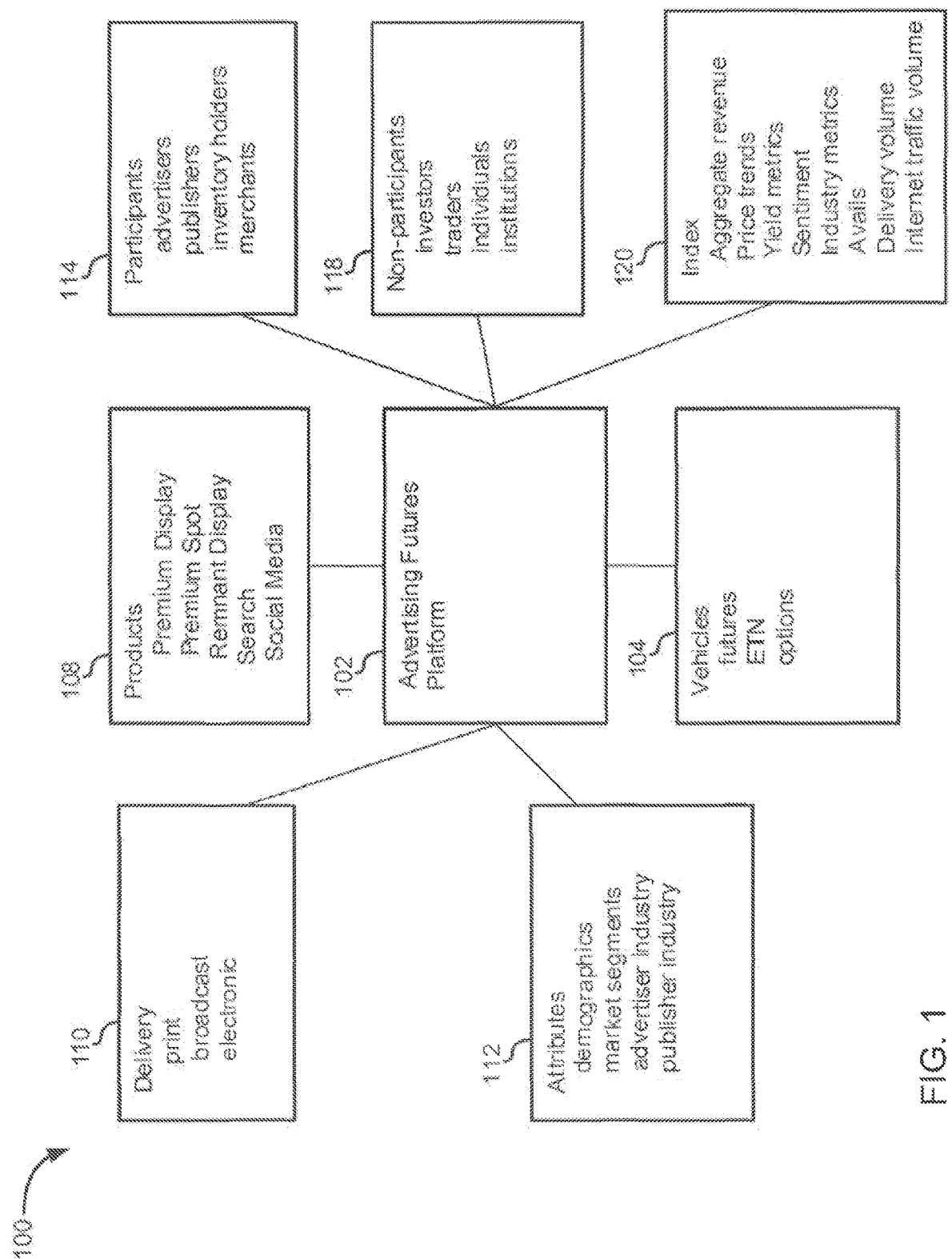
FIG. 1 is a diagram of example participants in an advertising futures market place according to the various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the terms "computer," "computing device" or "mobile device" refer to any one or all of personal computers, notebook computers, cellular telephones, personal data assistants (PDA's), palm-top computers, wireless electronic mail receivers and cellular telephone receivers (e.g., the Blackberry® and Treo® devices), multimedia Internet enabled cellular telephones (e.g., the iPhone®), and similar personal electronic devices which include a programmable processor, memory.

As used herein, the terms "advertising," "advertisement" and "ad" refer broadly to any form of product or service promotional message that is purchased by an advertiser. Beyond the traditional forms of billboard, print, radio and television advertisements the embodiments also encompass newer forms of advertising, such as Internet advertising, product placement (i.e., transactions to have products displayed in television programs and movies), and promotional ads or messages appearing in video games, as well as advertising products that may be developed in the future.

As used herein, an "advertising transaction" refers to any order, contract, purchase order or similar agreement by an advertiser to have an advertisement presented in any media.

To simplify the description of the various embodiments, the term "attribute" is used herein to refer to certain details or aspects within an advertising transaction that together characterize the nature of the advertisement (e.g., size, context, etc.), the nature of the transaction (e.g., cost, revenue model, time of placement, duration, sales channel, buy channel, etc.), the nature of the media in which the advertisement will appear (e.g., print, video, television, electronic display, etc.), the subject matter content of the media in which the advertisement will appear (e.g., sports, entertainment, etc.), and other aspects of the advertisement as described herein. As this brief list suggests, the term "attribute" is used to refer to a wide variety of features, specifications, aspects and transaction details. Several examples of different advertising transaction attributes are listed herein in order to illustrate the breadth of this term rather than to limit the embodiments to the specifically mentioned transaction details.

Also to simplify the description of the various embodiments, the term "attribute value" and "value" is used to refer to the textual, numeric, date or other parameter associated with a given attribute in a given advertising transaction. For example, an advertisement may be characterized by a revenue model attribute, and a value of the revenue model attribute may be "cost per click" or "cost per impression." As another example, an advertisement may be characterized by a media subject matter attribute, and the value of a media subject matter attribute may be "sports" or "entertainment." As another example, an advertisement may be characterized by a date attribute, the value of which may be the date in MM-DD-YYYY format. As explained herein, in some embodiments an attribute value may be transformed from one format/value, such as text, to another format/value, such as ordinal numbers, to facilitate the various processing methods. Thus, the term "value" should not be construed to be limited to numerical values, and instead should be construed to encompass any information that is associated with a particular attribute.

In this description, the terms "example" and "exemplary" are used herein to mean "serving as an example, instance, or illustration." Any implementation described herein as "exemplary" or as an "example" should not be construed as required, necessarily preferred or advantageous over other implementations.

The various embodiments provide information products relating to past, present and future advertising transactions (i.e., contracts to place advertisements in various media) sufficient to enable a marketplace in advertising products. Information regarding a plurality of advertising transactions are gathered. The data is processed and analyzed to determine its attributes. Some attribute values are transformed and the attribute values are stored in a database. Attributes are organized or indexed according to a taxonomy of attributes to provide indexes to advertising transaction records. Indexes and benchmarks for various selected types of advertising transactions can be generated by selecting certain records from the database and aggregating the data or otherwise synthesizing information products, such as benchmarks and market entities for the selected types of advertising transactions. Information products may be published and syndicated as market indexes and benchmarks. Such information products and the networks that enable capture, storage and processing of the information may support the generation and trading of advertising-related security instruments, such as futures contracts, tradable advertising securities and advertising-related asset backed securities.

While an advertising index may be an imperfect reflection of what a market is doing, and price trending may reflect that market participants are paying/bidding whatever their budgets will allow, dips in an advertising index may be due to channel competition and reduced ad spend, and thus may not be due to changes ad advertising 'value.' An advertising index may characterize the advertising market better than an industry association forecast in that the index is reflective of what real people are paying for advertising products. However, indexing payments alone may be far from reflective of true market forces; rather it may simply reflect an established structure of delivery and inventory. A futures market may reflect all information in an advertising marketplace. While advertising futures may start trading in parallel with index values, the futures market may maintain some relationship to the index and industry that the index seeks to capture. A futures market may also capture much more of opinion, fact, rumor, speculation, and the like in ways that may be similar to existing futures, securities, and options markets. An advertising futures market may serve to smooth and stabilize advertising by making possible more rational spot/cash pricing of advertising assets, for example. Combining this with transparent transaction printing (e.g. a composite 'tape' of all trades of similar or identical advertising assets) may form a basis for a rational and efficient advertising market.

Advertising futures, such as electronic advertising futures, may open advertising as a tradable, alternative asset class. Advertising futures may support opening various aspects of advertising, such as advertising inventory, (e.g. page or web browser banner ad space), delivery (broadcast, internet, print, and the like), services (promotions, markup, targeting, and the like), generation, associated products and services, branding, product placement, and the like.

Referring to FIG. 1 which illustrates a representation of an advertising futures marketplace, an advertising futures market platform 102 may be associated with advertising future vehicles 104, such as futures and exchange traded notes (ETN), advertising products 108, delivery mechanisms 110, advertising attributes 112, participants 114, non-participants 118, indexes 120, and the like.

An advertising futures market may enabled by establishing and providing information products and platforms to enable risk management and price hedging among advertising market principals, such as those with inventory or budgetary exposure to advertising assets. An advertising futures market and platform may facilitate establishing products and services to enable speculation in this asset class among non-principal participants, or non-participants. Advertising futures markets, methods, systems, and platforms may also facilitate establishing a price discovery and feedback mechanism that can incorporate various advertising information related data (pricing, demographics, spend, demand, and the like) into futures and perhaps spot price movements.

Advertising futures may be based on one or more indexes associated with advertising such as aggregate revenue, price trends (e.g. per unit quantity), yield metrics (e.g. realized vs. quoted revenue or utilization), advertiser and/or publisher sentiment, industry metrics (e.g. Revenue Per Available Impression), Avails (unfilled capacity across online advertising), delivery volume, other sentiment measures, Internet traffic volume, and the like.

Advertising futures markets may include macro futures that may be market and market sector focused. Macro futures may be derivatives of an index and, therefore, may include contracts that are priced based at least in part on an index value multiplied by factors such as a US dollar (USD) factor. Macro futures may facilitate participation by non-advertising industry professionals, such as individual investors, traders, and the like. Macro futures may constitute contracts for large classes of advertising assets. Macro futures products may be derivatives of deliverables. Settlement prices on macro contracts scheduled for delivery in the months to come can give investors and consumers a reading on how the market is anticipating movements in advertising prices and thus may give order and some rationality to spot advertising pricing.

An advertising futures marketplace may include micro futures markets that may be asset-focused. Micro futures may be established through bidding on assets individually. The assets and bidding may be based on a specific purpose/retail customer, market demographic and the like. Bidding may be granular and may be cash, future focused, swappable, and the like. A micro future market may benefit from a real-time exchange in which asset-focused futures may be purchased, sold, traded, exchanged, guarantee, offered, swapped, and the like. A micro futures market may also benefit secondary markets, such as spot markets for similar assets, trading a delivery date associated with a future for comparable products, and the like.

An advertising futures marketplace may be supported by a variety of trading and exchange platforms and associations such as an endorsement by the advertising industry, platform affiliation with CBE/CBOT/ICE/NYMEX/NYX, one or more advertising futures proprietary trading desks, a buy-side trading desk for advertising hedging, retail outlets for individual investors, and the like.

Advertising futures may be based on one or more indexes that may provide analysis, tracking, and fundamental measures of a wide variety of aspects of advertising. Any of these aspects of advertising may be individually represented by an index or may be aggregated into a combined index. Although various indexes may exist or be developed to support advertising industry indexing, an advertising futures market may or may not rely on any specific index for determining valuation, marketability, and the like. While indexes may provide a trackable measure of various aspects of the advertising industry, advertising futures pricing and valuation may be based on combinations of indexes, data that may be used to generate advertising indexes, third party data, advertising futures market historical data, and the like, as well as market demand. Some examples of indexes that may facilitate establishing an advertising futures market include indexes based on search, social media, demographics, and advertising product types.

Advertising futures markets may include markets associated with advertising spend migration. As advertising spending migrates from one vehicle, such as print, to another, such as electronic, future values in the respective vehicles may respond so that, for example, electronic futures increase in value and print futures decrease in value. Individuals, principals, participants, and others may benefit from market forces that drive this migration so that risks may be mitigated. In an example, a print advertising publisher with advertising 'space' may choose to purchase electronic advertising futures as a hedge against future reductions in print advertising revenue. In another example, an advertiser may purchase electronic advertising futures today as a hedge against future cost increases in electronic advertising placements.

Seasonal changes in advertising spending may also be leveraged in an advertising futures market. For example, an investor may purchase advertising futures or options for November advertising inventory in anticipation of their value increasing due to an increase in seasonal advertising associated with the holidays. Similarly particular market segments, such as advertisements targeted toward men to purchase gifts for women, may be traded on an advertising futures market. For the example of the advertising market segment targeting men purchasing gifts for women, the futures for such advertising in the weeks leading up to Valentines Day may be highly valued.

An advertising futures marketplace may be associated with analytic and trading products, such as screen based trading systems or an electronic communications network (ECN). An ECN may be configured to consolidate sell-side offers, buy-side analytics and algorithmic trading tools (e.g. ROI, relative strength, sector to sector spend optimization, and the like) to provide market participants and traders with the information necessary to enable a market in advertising futures.

Advertising futures may be derived for aggregate online advertising, for sector specific advertising such as electronic premium, tier 2 display ads, CPA, search, exchanged purchased electronic advertising, print, broadcast, Podcast, direct mail, streaming video, product placement, and the like.

An advertising futures market future price may be construed via an industry standard method such as a simple cash multiplier that results in a monetization of an index via a futures market.

Advertising futures may be available as structures such as futures, options, swaps, exchange-traded notes (ETNs), and the like. Exchange-traded notes may include an investment vehicle for direct institutional and retail investment in advertising assets, and may be based on market-recognized indexes of price and activity levels in the advertising industry. An ETN structure may take principal and invest it in Treasury Securities, not directly in the assets that the ETN structure tracks. However, a Note-issuing institution (e.g. Barclay's or Merrill Lynch) may guarantee the return to the investor of an amount equal to: Principal or Note Face Value*(1+((Index Value at Redemption Date-Index Value at Investment Date))/100). Similar ETN structures have been developed and successfully launched to open new and previously inaccessible asset classes to retail and institutional investors, and may provide a viable vehicle for advertising futures retail investing. Such a structure can be extended to track multiple indexes across the advertising universe, including print, broadcast, spend migration, yield metrics, price metrics and revenue.

The methods and systems of the various embodiments may include characterizing, summarizing and indexing advertising transactions according to a standard set of attributes of advertising transactions. A process of indexing may include determining values of standard attributes of a plurality of transactions for the placement of advertisements in media; selecting a subset of advertising transactions based on selected attribute values of a plurality of transactions for placement of advertisements; and providing an index based on the selected set of transactions whose attributes match the selected attribute values. The advertising medium may be of a variety of types including: electronic medium, internet-enabled online medium, electronic game, mobile, search, print, newspaper, magazine, broadcast, television, radio, satellite-based, outdoor advertising, and the like.

Standardized attributes characterizing advertising transactions may include a product attribute, a media platform attribute (e.g. an internet-enabled online display), a media channel attribute, an advertising tier attribute, a duration attribute, a time to launch attribute, a geographic attribute, a location attribute, a proximity attribute, a placement attribute, a dimension attribute, a size attribute, a relative placement attribute, a font attribute, font size attribute, an industry attribute, a channel attribute, a time period attribute, a seasonal attribute, a keyword attribute, a target customer attribute, a demographic attribute, a psychographic attribute, a medium attribute, an animation attribute, a motion attribute, an estimated viewer attribute, an estimated click through attribute, an estimated purchase attribute, an estimated listener attribute, and the like.

Standard attributes characterizing advertising transactions may further include a pricing model attribute which is the pricing model associated with the advertisement. Examples of pricing models include, for example, price per display, price per placement, price per view, price per click, cost per thousand impressions (CPM), cost per action (CPA), price per action and affiliate revenue.

Standard attributes characterizing advertising transactions may also include a media segmentation attribute, such as an up-front display segment, a premium display segment, an exchange-traded display segment, a targeted display segment, a remnant display segment, a social advertising display segment, a broadband video segment, an in-line advertising segment, an overlay segment, a border segment, a search segment, a keyword-indexed segment, and an in-gaming segment.

Standardized attributes characterizing advertising transactions may further include an advertising product, a media platform in which the advertisement appears (e.g., an internet-enabled online display), a media channel in which the advertisement appears, an advertising tier, a duration of the advertisement, a time to launch the advertisement, a geographic target of the advertisement, a location target of the advertisement, a proximity aspect of the advertisement (e.g., proximity to a particular subject matter, element of the publication or other advertisement), a placement of the advertisement, a dimension of the advertisement, a size of the advertisement, a relative placement of the advertisement, a font used in the advertisement, font size used in the advertisement, an industry addressed in the advertisement, a channel for the sale or purchase of the advertisement, a time period in which the advertisement may appear, a seasonal period in which the advertisement may appear, a keyword within the advertisement, a target customer to whom the advertisement is addressed, a demographic target of the advertisement, a psychographic target of the advertisement, a medium used in the advertisement, an animation used in the advertisement, a motion used in the advertisement, an estimated viewer level expected to view the advertisement, an estimated click-through value, an estimated purchase value, an estimated listener value, and the like.

A variety of benchmarks of advertising transactions may be generated including, for example, an index, an advertising sentiment benchmark, an activity level benchmark, a benchmark based on a survey of activity level, an advertising reference entity related to a type of market, and the like. The methods and systems of the various embodiments may generate an advertising market benchmark for use as a basis of a transaction by identifying attribute parameters of a plurality of advertising transactions, sampling a set of advertising transactions based on the identified parameters, and establishing a benchmark based on the transaction sample set. The systems of the various embodiments may include a user interface for generating and viewing benchmarks by taking an advertising market benchmark based on a set of advertising transactions having a standardized set of attributes: and providing a user interface whereby a party may view changes in the benchmark.

The methods and systems of the various embodiments may include syndication of advertising security and derivative transactions. Syndication may include tracking the attributes of a plurality of transactions for placement of advertisements in media; providing an advertising market benchmark based on a set of transactions having a standardized set of attributes; and syndicating the benchmark. Syndicating the index may include providing a data feed that may include a value for the index associated with a time period. The feed may be a live or real time data feed accessible by a network. The network may include a computer network, a telecommunications network, a local area network, a wireless network, the Internet and a mobile telecommunications network. Syndication may pertain to the index or to granular transactions across a multiplicity of attribute-centric transaction nodes, which could be aggregated along various axes to compose an index.

The methods and systems of the various embodiments may include syndication of all historic and current market data regarding advertising security and derivative transactions. This syndication may include tracking the attributes of a plurality of transactions for placement of advertisements in media; providing a real-time data stream of all advertising financial market instrument transactions having a standardized set of attributes to form a composite advertising benchmark tape indicator to the market of the current status of the advertising market financial instruments with particular attributes or combinations of attributes; and syndicating the real-time data stream. Syndicating may include providing historic advertising security and derivative transaction data having a standardized set of attributes. Syndicating may further include providing a set of data tools to analyze the historic data along multiple dimensions. Syndication may further include composing custom views, providing standard views, providing an index based on a set of transactions having a standardized set of attributes, and the like. In an example, all like transactions are synthesized into a single, composite transaction for purposes of accurately gauging market levels.

The syndication information may include a value of the index at a point in time, a rate of change of the index, an individual transaction vs. history of itself, an individual transaction vs. index composed of like transactions, and an individual transaction vs. composite of the market, of the media type, of the platform type, of the content type, of the demographic type, of the geographic type, of the psychographic type, and the like.

The syndication information may include a value of an index for a type of media including: internet-enabled online medium, electronic game, mobile, search, print, newspaper, magazine, broadcast, television, radio, satellite-based, outdoor advertising, and the like.

The syndication information may include a value of the index for a transaction having particular standardized attribute values. The standardized attributes used for syndication may be the same as those listed above and used for characterizing, summarizing and indexing a plurality of advertising transactions. Syndication information may further include volume information for advertising transactions.

Syndication may be based on a subscription. Syndication may provide information products and services to a terminal on a closed network. Syndication may be associated with a user interface, and the user interface may include analysis tools for analyzing the syndicated information.

The methods and systems may include determining and publishing a sentiment index by periodically posing a standard set of queries associated with attributes of advertising transactions to a plurality of parties to advertising transactions and aggregating the responses to generate an index of sentiment about the market for advertising transactions. The set of queries may relate to the price of advertising, a type of advertising medium, a preference among advertising media, effectiveness of advertising, perceived ad spend migration, perceived or derived value from ad spend, spend allocation forecasts, and the like.

The methods and systems of the various embodiments may include aggregation of various advertising transaction data. Aggregation may include transaction attribute aggregation, such as obtaining data for a plurality of advertising transactions for a type of media; and aggregating selected attributes of the advertising transactions to provide a common market index of advertising transactions. Methods of aggregation may include averaging prices of the advertising transactions for the medium for a selected time period (e.g. the present time period, a future time period, a custom-defined time period, and the like). Aggregating may be based on a standardized set of advertising transaction attributes. Aggregation may be accomplished over any one or combination of the standardized attributes listed above for characterizing, summarizing and indexing advertising transaction. Aggregation may include normalizing data, cleansing data prior to aggregation, preprocessing, de-duplicating, triangulating and archiving transaction data, segmenting data based on the type of media, segmenting data by time period and the like. Aggregation may be based on various pricing and revenue models, such as cost per click, cost per action, cost per impression, price per page, price per viewer, targeted segment, keyword, transaction date, content type, distribution platform, product dimension, product motion attribute, product standard advertising unit identifier, transaction lead/lag time, time to launch, and other revenue model related attributes.

The methods and systems of the various embodiments may provide an analytic workbench for analyzing data from advertising transactions. The workbench may include obtaining data for a plurality of advertising transactions for a type of media, aggregating data associated with selected attributes of the advertising transactions; and providing a set of tools whereby a user may perform analysis on the aggregated data. The workbench may include analytic tools such as tools that allow for calculation of an index for a subset of transactions along user-defined groups of attributes, analysis of the index based on information for canned and user-defined periods of time, analysis of subsets of transactions, analysis of transactions for specific types of media, historic archiving of select analytic views and the on-demand recall of such views, reproduction, transmission and publication of select analytic views, graphical representation of select analytic views, calculation of different statistics and technical analyses associated with the transactions (e.g. weighted average statistics, simple and exponential moving averages), transaction volume, convergence divergence, Bollinger bands, performance versus composite peer group, performance versus market in toto or by segment/platform, and the like.

The methods and systems of the various embodiments may include establishing a reference entity, such as by identifying attribute parameters of a plurality of advertising transactions; sampling a set of advertising transactions based on the identified parameters; and establishing a reference entity based on the transaction sample set. A reference entity may be established by aggregating transactions such as through bottom up aggregation. This may include extracting, transforming and loading a stream of advertising transaction records from a plurality of data sources; tiering the transaction records according to a taxonomy of advertising attribute values; identifying targeted attribute values that represent a selected plurality of advertising transactions: sampling a set of advertising transactions based on the identified parameters; and establishing a reference entity based on the transaction sample set. Data sources may include advertising servers, advertising billing transaction systems, advertising networks, advertising exchanges, publisher networks, media buyer networks, and the like. In an example of a reference entity for net revenue activity for all sample transactions, the reference entity value may be a composite revenue value for all sample transactions. Aggregating transactions may include extracting, transforming and loading a stream of advertising transaction records from a plurality of data sources; tiering the transaction records according to a taxonomy of advertising attribute values; identifying targeted attribute values that represent a selected plurality of advertising transactions; sampling a set of advertising transactions based on the identified values; and establishing and/or synthesizing a reference entity based on the transaction sample set.

Aggregating of advertising transaction data may be accomplished to define a reference entity for a variety of types of advertising transactions. For example, an advertising reference entity can be defined for electronic display advertising by selecting electronic display advertising transaction records or loading a stream of electronic display advertising transaction records from a plurality of data sources, and aggregating the records to synthesize an electronic display reference entity. Similarly, an advertising reference entity can be defined for mobile advertising by selecting mobile advertising transactions or loading a stream of mobile advertising transaction records from a plurality of data sources and aggregating the records to synthesize a mobile display reference entity. Similarly, an advertising reference entity can be defined for video advertising by selecting video advertising transaction records or loading a stream of video advertising transaction records from a plurality of data sources and aggregating the records to synthesize a video advertising reference entity. Similarly, an advertising reference entity can be defined for game advertising by selecting game advertising transactions or loading a stream of game advertising transaction records from a plurality of data sources and aggregating the records to synthesize a game advertising reference entity. Similarly, an advertising reference entity can be defined for search advertising by selecting search advertising transactions or loading a stream of search advertising transaction records from a plurality of data sources and aggregating the records to synthesize a search advertising reference entity. Similarly, an advertising reference entity can be defined for public display advertising by selecting public display advertising transactions or loading a stream of advertising transaction records from a plurality of data sources associated with public display advertising transactions and aggregating the records to synthesize a public display reference entity. Similarly, an advertising reference entity can be defined for outdoor advertising by selecting outdoor advertising transactions or loading a stream of advertising transaction records from a plurality of data sources associated with outdoor advertising transactions and aggregating the records to synthesize an outdoor display reference entity. Similarly, an advertising reference entity can be defined for offline advertising by selecting offline advertising transactions or loading a stream of advertising transaction records from a plurality of data sources associated with offline advertising and aggregating the records to synthesize an offline advertising reference entity. Similarly, an advertising reference entity can be defined for print advertising by selecting print advertising transactions or loading a stream of advertising transaction records from a plurality of data sources associated with print advertising transactions and aggregating the records to synthesize a print advertising reference entity. Similarly, an advertising reference entity can be defined for radio advertising by selecting radio advertising transactions or loading a stream of advertising transaction records from a plurality of data sources associated with radio advertising transactions and aggregating the records to synthesize a radio advertising reference entity. Similarly, an advertising reference entity can be defined for television advertising by selecting television advertising transactions or loading a stream of advertising transaction records from a plurality of data sources associated with television advertising transactions and aggregating the records to synthesize a television advertising reference entity. Similarly, an advertising reference entity can be defined for direct marketing advertising by selecting direct marketing advertising transactions or loading a stream of advertising transaction records from a plurality of data sources associated with direct marketing advertising transactions and aggregating the records to synthesize a direct marketing advertising reference entity. Similarly, an advertising reference entity can be defined for telemarketing advertising by selecting telemarketing advertising transactions or loading a stream of telemarketing transaction records from a plurality of data sources associated with telemarketing advertising transactions and aggregating the records to synthesize a telemarketing advertising reference entity. Similarly, an advertising reference entity can be defined for product placement by selecting product placement advertising transactions or loading a stream of advertising transaction records from a plurality of data sources associated with product placement advertising transactions and aggregating the records to synthesize a product placement reference entity.

The methods and systems of the various embodiments may include using data for a single advertising product-type as a reference entity by identifying attribute parameters of a selected type of advertising product: sampling the identified parameters for a set of advertising transactions for the type of advertising product over time, and establishing a benchmark entity based on the transaction sample set. The product may be a high-demand advertising product. The benchmark entity consists of a volume-weighted composite price for a series of transactions in the advertising product.

The methods and systems of the various embodiments may include surveying market participants to establish a sentiment benchmark, such as by surveying participants in advertising markets with a predefined set of questions intended to solicit information about forward-looking sentiment about the advertising markets; transforming the survey answers into a sentiment score; and indexing the score to establish a sentiment benchmark for at least one type of advertising. The survey data may be taxonomized based on attributes of advertising transactions. The advertising markets may include any one or more of the various types of advertising markets The surveyed participants may include advertisers, advertising brokers, publishers, and the like. The questions may relate to a type of information that may include expected spending by platform, expected spending by product, expected ROI by platform, expected ROI by product, expected allocation shift among products, expected overall spending levels, perceived value of products, perceived value of platforms, expected pricing, and the like.

The methods and systems of the various embodiments may include surveying market participants to establish an activity level benchmark, such as by surveying participants in advertising markets with a predefined set of questions intended to solicit information about activity levels in the advertising markets; transforming the survey answers into at least one activity level score; and indexing the score to establish an activity level benchmark for a type of advertising activity. The activity levels may be any one or more of: purchasing activity; selling activity; and viewing activity. The survey data may be organized according to the taxonomy described above based on attributes of the advertising transactions. The advertising markets may include any one or more of the various types of advertising markets. Survey participants may include advertisers, advertising brokers, publishers, and the like. The survey questions may relate to or include spending by product, spending by platform, viewing by product, viewing by platform, allocation among products, allocation across platforms, migration among products, migration among platforms, revenue by product, revenue by platform, and the like.

Results from the benchmarking process may an index, an advertising sentiment benchmark, an activity level benchmark, based on a survey of activity level, an advertising reference entity related to a type of market, and the like.

The methods and systems of the various embodiments may include providing a standardized advertising instrument, such as an advertising security. A process for creating a standardized advertising instrument may include taking an index based on a set of advertising transactions having a standardized and/or normalized set of attributes and creating at least one of an attribute standardization processing framework, a revenue rights assignment mechanism, and a securitization mechanism via cash multiplier or the like so that a party may enter into a transaction, the terms of which are based on the index.

An advertising security transaction may be a primary market security transaction based on the underlying market value of physical advertising assets. The transaction may be based on an index value derived from an aggregation of advertising transactions involving like attributes, such as media platform, channel, tier, product size, motion attribute, demography, content context, pyschography, geography, and the like, including various product taxonomies.

The methods and systems of the various embodiments may include creation of an advertising security whereby the instrument which is based on standardized attributes provides the ability for principal and non-principal parties to purchase or sell the revenue rights associated with underlying real physical advertising assets without taking possession or delivery of the physical assets themselves. In effect, pre-sale/pre-purchase of select advertising assets may be made available to all market participants, outside any traditional advertising industry mechanisms or calendars, enabling much more nuanced and liquid price discovery.

Such advertising securities or instruments can be based on the most popular/in-demand/liquid combination of standardized advertising attributes as delineated in the standardized taxonomy of advertising attributes, or on an OTC basis according to such attributes, or as market-makers or counterparties demand. Such advertising securities or instruments can be multi-use contracts enabling: insurance, total return style commodity investment; portfolio diversification, and the like. Advertising instruments may represent any one or combination of the variety of advertising medium types including: internet-enabled online medium, electronic game, mobile, search, print, newspaper, magazine, broadcast, television, radio, satellite-based, outdoor advertising, and the like.

The methods and systems of the various embodiments may include creation of a generic advertising market financial instrument that may involve taking an advertising market benchmark based on information about at least one of an activity and a sentiment in an advertising market; and providing an advertising market financial instrument whereby a party may enter into a transaction the terms of which are based on the advertising market benchmark. The benchmark may be an index, an advertising sentiment benchmark, an activity level benchmark, based on a survey of activity level, an advertising reference entity related to a type of market, and the like. The generic advertising market financial instrument may be a derivative financial instrument, an exchange traded note, an option, a futures contract, an exchanged traded fund, a principal-protected note, a securitization, a security, a single advertising product future, an advertising sentiment future, a basis for a swap, and the like. An advertising market associated with a generic advertising market financial instrument may include any one or more of the various types of advertising markets e. The generic advertising financial instrument may represent a variety of advertising medium types including: internet-enabled online medium, electronic game, mobile, search, print, newspaper, magazine, broadcast, television, radio, satellite-based, outdoor advertising, and the like. The generic advertising financial instrument may include any of the standardized attributes described herein.

The transaction based on a generic advertising market financial instrument may be a futures transaction, with the futures contracts derived from indexes based on individual or combined standardized advertising attributes. The indexes may represent an aggregation of a set of advertising transactions for a type of media. Futures contracts may be priced according to market BID and ASK entry. Futures contracts may be priced according to a market-making computer-generated optimal selling price based on existing market conditions. Futures contracts may be bespoke or over the counter (OTC) contracts and may not be listed on an exchange but rather entirely negotiated between party and counterparty.

The transaction based on a generic advertising market financial instrument may be an option on a listed futures contract that may have been otherwise derived and transacted. The transaction may also be a principal protected note whose return may be linked to an index value and whose principal may be protected for the note's duration. The transaction may also be an exchange traded fund whose value may be linked to an index value based on transaction values for advertising assets of specific and standardized attributes.

The methods and systems of the various embodiments may include creating a primary advertising market financial instrument by taking an advertising market benchmark based on information about at least one of an activity level and a sentiment relating to an advertising market; and providing a primary instrument whereby a party may enter into a transaction the terms of which are based on the advertising market benchmark. The primary instrument may enable a party to access a spot or cash market in advertising without taking possession or providing delivery of physical advertising assets. The primary instrument may also be an exchange traded fund, an exchange traded note, a principal-protected note, a securitization and the like. The benchmark may be an index, an advertising sentiment benchmark, an activity level benchmark, based on a survey of activity level, an advertising reference entity related to a type of market, and the like. The advertising financial instrument may be a derivative instrument, an exchange traded note, an option, a futures contract, an exchanged traded fund, a principal-protected note, a securitization, a security, a single advertising product future, an advertising sentiment future, a basis for a swap, and the like. An advertising market associated with a generic advertising market financial instrument may include any one or more of the various types of advertising markets.

The methods and systems of the various embodiments may include creating a derivative advertising market financial instrument by taking an advertising market benchmark based on information about at least one of an activity level and a sentiment relating to an advertising market; and providing a derivative instrument whereby a party may enter into a transaction the terms of which are based on the benchmark. The derivative instrument may be a standardized exchange-traded futures contract that enables parties to speculate on levels of an advertising benchmark at a future date. The derivative instrument may be an option on the benchmark or an option on a future based on the benchmark. The benchmark may be an index, an advertising sentiment benchmark, an activity level benchmark, based on a survey of activity level, an advertising reference entity related to a type of market, and the like. The derivative instrument may have terms that may include cash settlement, trading unit, settlement method, point size, strike date, strike price interval, limits, price banding, minimum fluctuation, trading hours, listed platforms, minimum block size, product calendar, issuance, mark-to-market policies, convergence with physical underlying entity, exchange rules, distribution, leverage on money, and the like. The exchange of the instrument may be made possible by the fielding of bids and asks for these instruments. The exchange platform may automatically list, sort, filter, match and confirm best bids and offers for standardized advertising instruments and derivatives therefrom. The platform may use proprietary listing and matching algorithms to match best bids and offers. An automated market making entity may generate optimal price for these bids and offers. The derivative advertising market financial instrument may include standardized attributes which may include any of the advertising attributes identified herein.

The instrument may be a derivative instrument, an exchange traded note, an option, a futures contract, an exchange traded fund, a principal-protected note, a securitization, a security, a single advertising product future, an advertising sentiment future, a basis for a swap, and the like. An advertising market associated with the derivative advertising market financial instrument may include any one or more of the various types of advertising markets.

The methods and systems of the various embodiments may include facilitating the exchange of advertising financial instruments. The exchange of advertising financial instruments may include taking an advertising market benchmark based on a set of advertising transactions having a standardized set of attributes; and facilitating the exchange of advertising market financial instruments whereby a party to an instrument may enter into a transaction the terms of which are based on the benchmark. A mechanism for facilitating the exchange of advertising assets may be an electronic communications network (ECN), open only to qualified members, providing secure data communications between qualified principal, non-principal and other market participants. The ECN may provide communications mechanisms between parties via secure instant messenger running on the trader desktop suite, secure web portal, secure electronic mail, and other secure communication means, such that parties to the exchange may simultaneously and in real time view securities and derivative price and volume information while communicating with an advertising trade counterparty, broker or market-maker. The ECN operator may be the sole owner and provider of price, volume and transaction data for physical and derivative advertising assets. The methods and systems of the various embodiments relating to exchange of instruments may further include providing a facility for clearing an exchange transaction, such as a central counterparty (CCP) mechanism whereby all contracts and trades are matched with the necessary financial counterparty.

[The methods and systems of the various embodiments relating to exchange of instruments may further include providing a facility for the optimized pricing of advertising financial instruments based on real-time and historic advertising market conditions. Such a facility may be a computer programmed with algorithmic software so that market conditions are monitored by the computer and used to adjust its pricing models and re-price bids and offers for advertising financial instruments to reflect market conditions.

The methods and systems of the various embodiments relating to exchange of instruments may further include providing a facility for settling exchange transactions such as an advertising instruments and securities registry whereby all data generated concerning trading parties, counterparties, instruments, transactions, expiration dates, revenue assignment rights, physical delivery obligations, and the like are recorded, archived, indexed, made searchable, sortable and syndicated. The methods and systems of the various embodiments relating to exchange of instruments may further include providing a facility for trade capture, whereby all data for all listed and OTC physical underlying and derivative advertising transactions are captured, archived and provisioned.

The systems of the various embodiments may include a user interface for facilitating instrument exchanges. The user interface may obtain or generate an advertising market benchmark based on a set of advertising transactions having a standardized set of attributes, and provide a user interface for exchanging advertising market financial instruments whereby a party to an advertising market financial instrument may enter into a transaction the terms of which are based on the benchmark.

The systems of the various embodiments may include a user interface for entering into standardized transactions by obtaining or generating an advertising market benchmark based on a set of advertising transactions having a standardized set of attributes, and providing a user interface entering into transactions whereby a party may enter into a transaction the terms of which are based on the benchmark. The user may enter a bid or an ask quantity for an instrument the pricing terms of which are based on the index.

The systems of the various embodiments may include a user interface for viewing benchmarks by obtaining or generating an advertising market benchmark based on a set of advertising transactions having a standardized set of attributes, and providing an information display by which a party may view changes in the benchmark.

The systems of the various embodiments may include a user interface for viewing bids/asks/transaction data for advertising securities that may be based on indexes whose values are derived from a standardized set of attributes obtained or generated by taking an advertising market benchmark based on a set of advertising transactions having a standardized set of attributes, and providing an information display by which a party may view bid and ask transactions for advertising financial market instruments. Alternatively, the user interface present an information display for viewing bids/asks/transaction data for derivative advertising securities based on indexes whose values are derived from a standardized set of attributes.

The systems of the various embodiments may include a user interface for viewing registry data for all standardized advertising and derivative transactions by obtaining or generating an advertising market benchmark based on a set of advertising transactions having a standardized set of attributes, and providing an information display by which a party may view registry data for advertising market financial instruments.

The methods and systems of the various embodiments may include syndication of advertising security and derivative transactions. Syndication may include tracking the attributes of a plurality of transactions for placement of advertisements in media; providing an advertising market benchmark based on a set of transactions having a standardized set of attributes; and syndicating the benchmark. Syndicating the index may include providing a data feed that may include a value for the index associated with a time period. The feed may be a live/real time data feed accessible by a network. The network may include a computer network, a telecommunications network, a local area network, a wireless network, the Internet and a mobile telecommunications network. Syndication may pertain to the index or to granular transactions across a multiplicity of attribute-centric transaction nodes, which could be aggregated along various axes to compose an index.

The methods and systems of the various embodiments may include syndication of historic and current market data regarding advertising security and derivative transactions. This syndication may include tracking the attributes of a plurality of transactions for placement of advertisements in media; providing a real-time data stream of all advertising financial market instrument transactions having a standardized set of attributes to form a composite advertising benchmark tape indicator to the market of the current status of the advertising market financial instruments with particular attributes or combinations of attributes; and syndicating the real-time data stream. Syndicating may comprise providing historic advertising security and derivative transaction data having a standardized set of attributes; Syndicating may further comprise providing a set of data tools to analyze the historic data along multiple dimensions. Syndication may further comprise composing custom views, providing standard views, providing an index based on a set of transactions having a standardized set of attributes, and the like. In an example all like transactions can be synthesized into a single, composite transaction for purposes of accurately gauging market levels.

The syndication information may be a value of the index at a point in time. The syndication information may be rate of change of the index, individual transaction vs. history of itself, individual transaction vs. index composed of like transactions, individual transaction vs. composite of the market, of the media, of the platform, of the content type, of the demographic, geographic, psychographic, and the like.

The syndication information may be a value of an index for a type of media including: internet-enabled online medium, electronic game, mobile, search, print, newspaper, magazine, broadcast, television, radio, satellite-based, outdoor advertising, and the like. The syndication information may be a value of the index for a transaction having particular standardized attributes, including any one or more of the standard attributes described herein.

Syndication may be based on a subscription. The syndication may include a terminal on a closed network. Syndication may be associated with a user interface that includes analysis tools for analyzing the syndicated information. Syndication information may include volume information for advertising transactions.

The methods and systems of the various embodiments may include creating macro advertising securities. Creation of macro advertising securities may include obtaining survey results on advertising spend and channel allocation for a type of media; multiplying the indexed value of responses by a consistent numerical value to obtain an index level; and multiplying the index by a cash multiplier to create a macro advertising security based on advertiser sentiment or ad spend migration or other macro level advertising industry trends and forecasts. The methods and systems of the various embodiments may include facilitating the trade and exchange of macro advertising securities. Macro securities may be associated with micro securities and derivatives described herein in that the method of derivation may be different but the securitization, market making, and trading may be on a single, shared platform.

The methods and systems of the various embodiments include facilitating an advertising super exchange including an interface for managing a unified advertising order book across a plurality of advertising networks.

The methods and systems of the various embodiments may also include creating a trading hub for standardized advertising securities and derivative instruments. Such a trading hub may list advertising attributes and the prices of the corresponding advertising assets transacted featuring these attributes. The trading hub may be uniquely positioned to demonstrate the prices achieved by advertising assets with certain attribute combinations.

The methods and systems of the various embodiments may include facilitating a meta ad exchange and managing multiple ad network relationships and/or pan-network ad exchange. This may include brokering bids and asks across multiple product categories as well as brokering within electronic advertising medium or other advertising media.

The methods and systems of the various embodiments may include creating an advertising bank to facilitate securitization. The creation of such an advertising bank may include obtaining information about advertising transactions across at least one advertising network; obtaining advertising rights to a plurality of advertising opportunities; and using the advertising rights to facilitate cash settlement of futures transactions for advertising transactions. Futures transactions may be based on an index and the index may be based on standard attributes of advertising transactions including those identified herein. The index may be based on a plurality of standard attributes of advertising transactions. The advertising bank may include obtaining information about advertising transactions across at least one advertising network; obtaining advertising rights to a plurality of advertising opportunities; and using the rights to hedge a position in a market for advertising transactions. The market may be a futures market based on an index of advertising transactions. The advertising bank may serve as a structural intermediary, offering a number of services and offsetting the market making function that would work as a natural complement to ad banking services. The advertising bank may offer an array of products and services including: short, middle and long term service packages provisioning/brokering sale and purchase of advertising assets on behalf of clients; long-term advertising index sales, enabling clients to lock in sale or purchase terms; 'underwriting' whereby the bank funds a client's advertising budget in part or in whole for a fee which may be a percentage of the overall ad spend amount; fixed price warranted delivery of advertising assets under ad hoc contract structures customized on behalf of clients; risk management services such as advertising price and volume risk management, creation of bespoke price hedging instruments (swaps, options, insurance, hedges), and the like. The advertising bank may offer the above services on the basis of a skilled analysis of market data and trends and a superior ability to use the new family of advertising securities and derivatives to make any hedge or insurance profitable as a result of trading acumen.

The methods and systems of the various embodiments may include a marketing and trading platform. Also, the methods and systems may include trade capture and syndication.

Figure 2A:
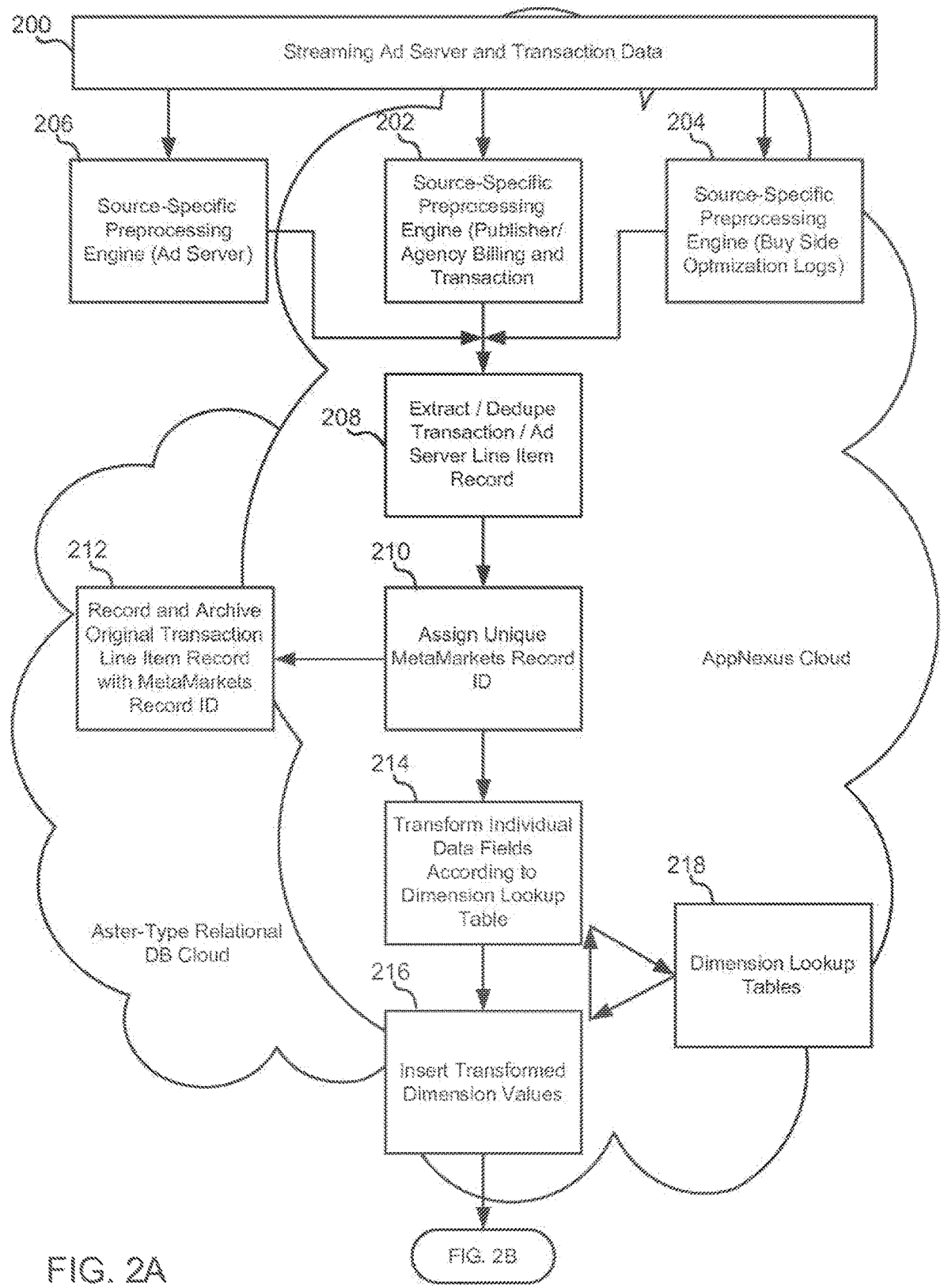
FIGS. 2A and 2B is a process flow diagram of an embodiment method for generating information products useful in establishing an advertising futures marketplace.
Figure 2B:
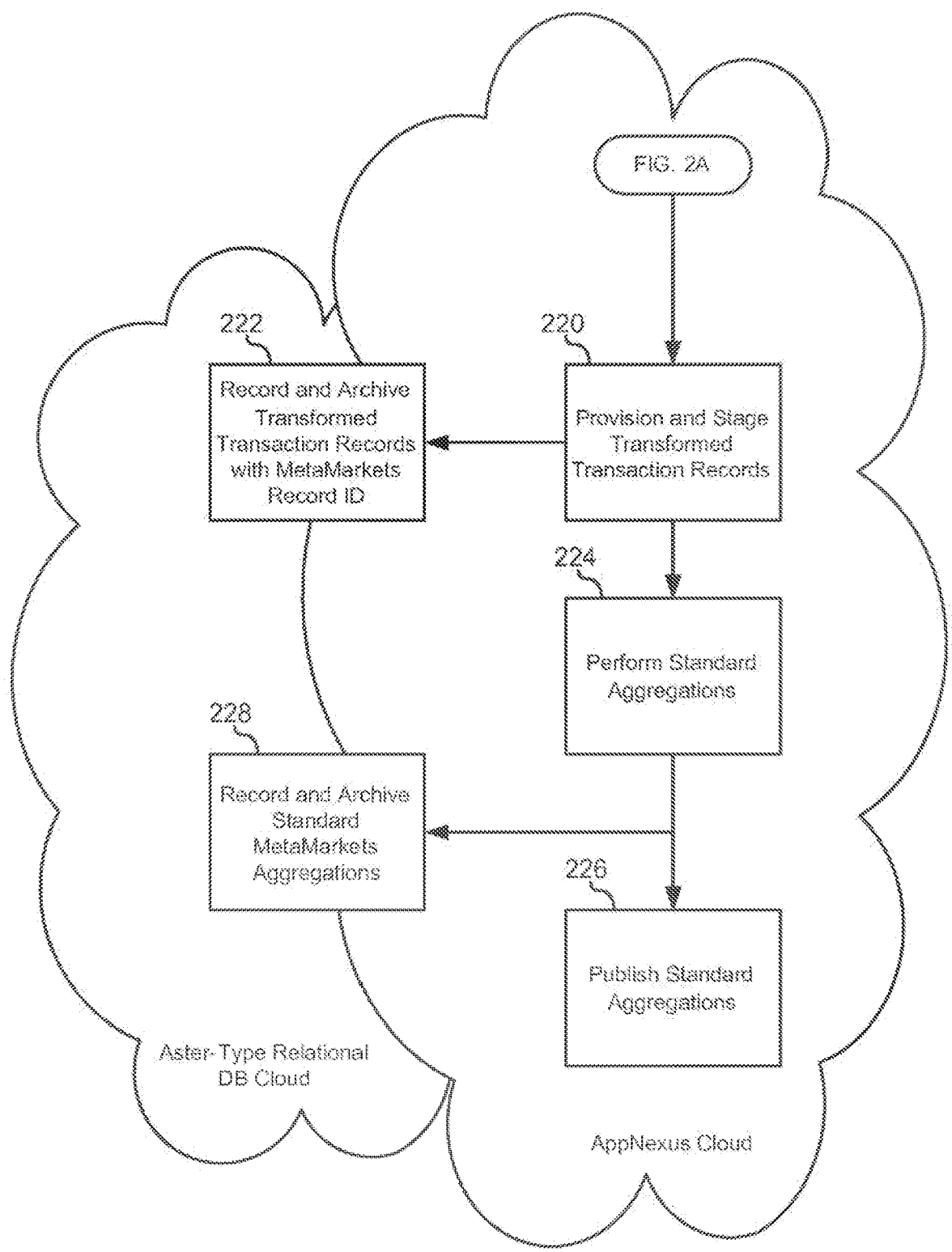

An overview of the system and methods of the various embodiments is illustrated in FIGS. 2A and 2B. Data on advertising transactions can be obtained from a variety of data sources, such as streaming advertising transaction data from an ad server or advertising data source, step 200. Raw advertising transaction data may be obtained from parties to advertising transactions as well as services which monitor and report on advertising transactions. The parties to advertising transactions from which raw data can be received may include one or more of: advertisers; publishers; media buyers; agents; networks; carriers; theaters and theater groups. Services that may provide raw advertising transaction data may include one or more of an advertising database service provider; an advertising exchange; and an advertising market. Advertising transaction raw data may be received and captured from a variety of transmission mechanisms including manual and automatic sources. Examples of advertising transaction data sources include any one or more of: a data feed; a data scrape; a data syndication; a data broadcast; a wireless transmission; a satellite transmission; a printed transmission; an internet-protocol transmission; an electronic mail transmission; an instant messenger transmission; a telephone transmission; a fax; a report; a direct sales force; a network agent; a reseller; a tiered reseller; a remnant exchange; a primary exchange; a market; a spot market; a publisher; an advertiser; a broker; an auction mechanism. One source for receiving digital feeds of raw advertising data is the DART® services offered by DoubleClick.com which is owned by Google Inc. Further information regarding the DART® services is available at www.doublectick-.com.

To capture advertising transaction data the sources of such raw data may be subscribed to or accessed, such as via a computer system accessing an appropriate Internet website and downloading the data, step 200. In a preferred embodiment the sources of raw advertising transaction data are selected so that the data is received from multiple sides or parties to an advertising transaction, including for example but not limited to the advertiser, publisher, ad network, exchange, media buyer, and advertising dashboard. In a preferred embodiment the advertising transaction data sources are tapped consistently with a target of rolling and refresh data daily and a minimum rate of weekly. In a preferred embodiment data source will be tapped and the data processed to provide end of day pricing, such as a calculation at 4:00 PM EST Monday through Friday, with intraday pricing with dynamic refresh provided at 12:30 PM EST Monday thru Friday.

Referring to FIG. 2A, streaming advertising transaction data may be received and processed by a variety of source-specific preprocessing engines 202, 204, 206. For example, a source-specific preprocessing engine within or coupled to a publisher or agency billing and transaction system 202 may receive and process advertising transaction data received from or stored within that system. As another example, a source-specific preprocessing engine within or coupled to a buy side optimization log system 204 may receive and process advertising transaction data received from buy side systems. As another example, a source-specific preprocessing engine within or coupled to an advertiser server 206 may receive and process advertising transaction data received from the ad server. The source-specific preprocessing engines 202, 204, 206 may be implemented in computer systems in a variety locations, including within the system that are sources of transaction data, in a cloud computing platform. Additionally or alternatively, a source-specific preprocessing engine 206 may be implemented in a stand alone computer configuration. The source-specific preprocessing engines 202, 204, 206 can perform preliminary processing of advertising transaction data such as to extract selected transactions, remove duplicate records, convert file formats, remove blank or incomplete records, etc. step 208. Preprocessing may also include formatting transactions for multiple advertisements into ad server line item records which are a single entries recording the transaction and delivery circumstances pertaining to single units of advertising. The overall database structure may be composed of multiple lines, with a single line typically dedicated to a single act of the ad server. Preprocessed advertising transaction records may then be assigned a unique record identifier (ID), step 210. The processed records may be recorded in a relational database to provide a record and archive of original transaction records, step 212.

Processed records may then be further processed to transform individual data fields to identify and apply attribute values, step 214. As described more fully below with reference to FIGS. 3A and 3B, the process of transforming data fields may be accomplished by applying identified attribute values to a series of look-up table processes, step 218. The attribute values obtained from such processing and table look-up steps may then be inserted into the advertising transaction record, step 216. Alternatively, the processed and transformed attribute values may be assembled into a data record for the advertising transaction.

Referring to FIG. 2B, the processing of advertising transaction records proceeds to provision and stage the transformed transaction records, step 220. In this context "provisioned" means that the raw transaction logs have been transformed to their new state and "staged" means that the transformed records are standing by, local to processing power, such that they may be recalled and composed in a reference entity or composite price calculation in an efficient manner. Such provisioned and staged records may be recorded in a relational database to provide a record and archive of processed transaction records, step 222. The provisioned and staged records may also be aggregated to generate a variety of information products such as benchmarks, indexes and reference entities, step 224. Such aggregated information products may be published to market participants in a variety of print, electronic and on-line publishing mechanisms, step 226. Also, aggregated information products may be recorded and archived in a relational database, step 228.

In a preferred embodiment advertising transaction data records are maintained in a relational database to provide a minimum of six months of retrospective data along with forward rolling transaction data for a minimum of six months into the future (i.e., contracts for future advertising placement). Also in a preferred embodiment the raw and transformed advertising transaction data set are archived and maintained in a searchable format for at least seven years from the data of benchmark pricing in anticipation of meeting stringent financial market regulatory requirements.

As advertising transaction records are received or captured from various data streams, the transactions can be parsed and analyzed to identify and extract characteristic information regarding the transaction that can be useful for supporting an advertising marketplace. Such characteristic information on advertising transactions are referred to herein as "attributes" and include such quantities as the advertising medium, the industry, and the size and placement of the advertisement. In the various embodiments, the attributes used to characterize, organize, correlate (e.g., organize into or according to tiers) and otherwise process advertising transaction data are selected from characteristics that are common to most advertising deals. By extracting the values or information associated with such attributes a large number of advertising transactions can be summarized into a compact data set. Such compact data sets, referred to sometimes herein as a "transformed transaction record," fully reflects the nature and value of the underlying advertising purchases and placements. Many of the attributes can be extracted directly from advertising transaction data streams. In addition to enabling advertising transactions to be summarized in a relational database, such attributes can be used to sort and/or correlate the data into a tiered structure that facilitates analyzing a database of advertising transaction data. Such a tiered structure of advertising attributes is referred to herein as a "taxonomy." The taxonomy provides a tool for relating together large numbers of advertising transactions that have some characteristic(s) in common to identify trends, generate benchmarks and indexes, and support a marketplace in advertising futures and securities.

The attributes that can be used to characterize and organize advertising transactions in the taxonomy may include the following: advertising medium; media platform; revenue model; media sales channel; advertising product category, advertising product type: advertising product dimension; advertising product placement; publisher tier; publisher classification; advertiser transaction tier; advertiser buy agent: advertiser industry; advertising product context overlap tier; advertising product behavioral targeting package; advertising product geographic targeting package; advertising product demographic targeting package; advertising product booking date; advertising product launch date; advertising product gross transaction size; advertising product transaction gross revenue; advertising product transaction net revenue; advertising product effective unit revenue; time to launch: geographic: location; proximity; time period; seasonal; keyword; target customer; estimated viewer; estimated click through; estimated purchase; estimated listener; duration; font; font size; animation; motion; relative placement attribute. Each of these attributes may be further broken out by values or further attributes, examples of which are described below.

The standard attributes of advertising transactions used in the taxonomy may also include an advertising medium attribute. The advertising medium attribute is the medium in which a particular advertisement appears or is delivered. A wide variety of advertising medium may be considered and included in the taxonomy. Examples of advertising media include: a digital media; an analog media; an internet-enabled media; a wireless media; a social media; a satellite-based media; a print media; a broadcast media; a networked media; a telephonic media; a telepathic media; a brainwave media; a recorded media; a live media; an electronic display media; an internet-enabled display media; an internet-enabled rich media display media; an internet-enabled text media; an internet-enabled video media; a social media; an internet-enabled social media; a mobile display media; a mobile text media; a mobile location based media; a mobile video media; an mobile social media; an internet-enabled search media; a mobile search media; a video search media; a video media; a broadband video media; an internet protocol enabled broadband video media; a closed circuit video media; a network served video media; a satellite-based video media; an electronic game media; an internet-enabled game media; a console game media; a downloadable game media; massively-multiplayer game media; a public display media; an outdoor advertising media; a radio media; an Internet Protocol radio media; a satellite-broadcast radio media; a newspaper media; a magazine media; a classified print media; a television media; a broadcast television media; a spot television media; a cable television media; a digitally recorded television media; a Internet Protocol Television (IPTV) broadcast media; a direct marketing media; a telemarketing media; and a product placement medium.

The standard attributes of advertising transactions used in the taxonomy may also include a media platform attribute. This attribute describes the platform that supports or presents the particular advertisement. Examples of media platform attributes include: an internet-enabled electronic display; an electronic display; an internet-enabled display; an internet-enabled rich media display; an internet-enabled text; an internet-enabled video; a social, an internet-enabled social; a mobile display; a mobile text; a mobile location-based; a mobile video; a mobile audio; a mobile social; an internet-enabled search; a mobile search; a video search; a text search; an image search; an audio search; a video; a broadband video; an Internet-Protocol enabled broadband video; a closed-circuit video; a network-served video; a satellite-based video; an electronic game; an internet-enabled game; a console game; a downloadable game; a massively-multiplayer game; a public display; an indoor electronic public display; an outdoor electronic public display; an in-vehicle network served public display; an in-building network served public display; an in-flight network served public display; an outdoor advertising; an outdoor advertising; an outdoor advertising; a radio; an Internet Protocol radio; a satellite-broadcast radio; a newspaper; a magazine; is a classified print; a television; a broadcast television; a spot television; a cable television; a digitally recorded television; an Internet Protocol Television (IPTV) broadcast; a direct marketing; a telemarketing; a media insert product placement; an in-stream product placement; and an on-product placement platform.

The standard attributes of advertising transactions used in the taxonomy may also include a revenue model attribute. The revenue model attribute defines the method or computation by which the advertising product is priced. Examples of revenue model attributes include: a unit-based revenue; and a point-based revenue model. The revenue model attribute may also may include the type of revenue per advertisement model involved in the transaction. Examples of types of revenue per advertisement attributes include: Cost Per Mille Impression; Cost Per Play Cost Per Spot; Cost Per Piece; Cost Per Unit Mailed; audience-based revenue; Cost Per Audience Member; Cost Per Gross Rating Point (GRP); performance-based revenue; Cost Per Click (CPC); Cost Per Action (CPA); auction-based revenue; keyword-bid revenue; session-bid revenue; job-bid revenue; time-based revenue; Cost Per Session (CPS); Cost Per Period; Cost Per Second; Cost Per Minute; Cost Per Hour; Cost Per Day Cost Per Week; Cost Per Month; size-based revenue; Cost Per Column Inch; Cost Per Square Foot; shared revenue; an affiliate revenue; and hybrid revenue. Revenue model attributes may be expressed (i.e., the value transformed into) in terms of correlated values, such as CPM advertising transactions being assigned a revenue model value of "1" while CPC advertising transactions being assigned a revenue model value of "2". Further examples of revenue model value assignments are listed below in Table 9.

Additionally, the revenue model attribute may include the revenue transaction size (i.e., the value of the advertising transaction). For example, the revenue transaction size attributes may include: dollar-based revenue; euro-based revenue; yen-based revenue; rupee-based revenue; renminbi-based revenue; yuan-based revenue model-based revenue; pound-based revenue-based revenue; real-based revenue; pound-based revenue-based revenue; franc-based revenue; ruble-based revenue; peso-based revenue; rupiah-based revenue; dinar-based revenue; shekel-based revenue; ringgit-based revenue; rand-based revenue; won-based revenue; shilling-based revenue; dirham-based revenue; gold-based revenue; platinum-based revenue; silver-based revenue; and palladium-based revenue.

The standard attributes of advertising transactions used in the taxonomy may also include a media sales channel attribute. Advertisements may be sold through a wide variety of sales channels. The media sales channel attribute defines the channel by which the advertising product is sold. Examples of media sales channel attributes include: a direct sales force; an electronic display publisher direct sales force; a mobile publisher direct sales force; a mobile carrier direct sales force; a social publisher direct sales force; a search publisher direct sales force; a video publisher direct sales force; a game publisher direct sales force; a game producer direct sales force; a public display publisher direct sales force; an outdoor publisher direct sales force; a print publisher direct sales force; a radio publisher direct sales force; a television publisher direct sales force; a direct marketing publisher direct sales force; a telemarketing publisher direct sales force; a product placement publisher direct sales force; a contracted network agent; a contracted electronic display network agent; a contracted mobile network agent; a contracted social network agent; a contracted search network agent; a contracted video network agent; a contracted game network agent; a contracted public display network agent; a contracted outdoor network agent; a contracted print network agent; a contracted radio network agent; a contracted television network agent; a contracted direct marketing network agent; a contracted telemarketing network agent; a contracted product placement network agent; a tiered advertising reseller; a tiered electronic advertising reseller; a tiered mobile advertising reseller; a tiered social advertising reseller; a tiered search advertising reseller; a tiered game advertising reseller; a tiered public display advertising reseller; a tiered outdoor advertising reseller; a tiered print advertising reseller; a tiered radio advertising reseller; a tiered television advertising reseller; a tiered direct marketing advertising reseller; tiered telemarketing advertising reseller; a tiered product placement advertising reseller; a remnant market; an electronic display remnant market; a mobile publisher remnant market; a mobile carrier remnant market; a social remnant market; a search remnant market; a video remnant market; a game publisher remnant market; a game producer remnant market; a public display remnant market; an outdoor remnant market; a print remnant market; a radio remnant market; a television remnant market; a direct marketing remnant market; a telemarketing remnant market; a product placement remnant market; an electronic market; an electronic display market; an electronic mobile publisher market; an electronic mobile carrier market; an electronic social market; an electronic search market; an electronic video market; an electronic game publisher market; an electronic game producer publisher; an electronic public display market; an electronic outdoor market; an electronic print market; an electronic radio market; an electronic television market; an electronic direct marketing market; an electronic telemarketing market; an electronic product placement market; a exchange market; a exchange electronic display market; a exchange mobile publisher market; a exchange mobile carrier market; a exchange social market; a exchange search market; a exchange video market; a exchange game publisher market; a exchange game producer publisher; a exchange public display market; a exchange outdoor market; a exchange print market; a exchange radio market; a exchange television market; a exchange direct marketing market; a exchange telemarketing market; a exchange product placement market; a spot market; a spot electronic display market; a spot mobile publisher market, a spot mobile carrier market; a spot social market; a spot search market; a spot video market; a spot game publisher market; a spot game producer publisher; a spot public display market; a spot outdoor market; a spot print market; a spot radio market; a spot television market; a spot direct marketing market; a spot telemarketing market; a spot product placement market; an auction; an auction electronic display market; an auction mobile publisher market; an auction mobile carrier market; an auction social market; an auction search market; an auction video market; an auction game publisher market; an auction game producer publisher; an auction public display market; an auction outdoor market; an auction print market; an auction radio market; an auction television market; an auction direct marketing market; an auction telemarketing market; an auction product placement market; a brokered market; a brokered electronic display market; a brokered mobile publisher market; a brokered mobile carrier market; a brokered social market; a brokered search market; a brokered video market; a brokered game publisher market; a brokered game producer publisher; a brokered public display market; a brokered outdoor market; a brokered print market; a brokered radio market; a brokered television market; a brokered direct marketing market; a brokered telemarketing market; a brokered product placement market channel. The sales channel attribute identified in an advertising transaction record may be transformed into a tier number for ranking and organizing according to the taxonomy. For example, an advertising transaction sold by a direct sales force may be assigned the sales channel attribute value "1" while an advertising transaction sold by a contracted network agent may be assigned the sales channel attribute value "2."

The standard attributes of advertising transactions used in the taxonomy may also include an advertising product category attribute. This attribute defines how the advertising product is delivered, such as within the page content, above/below the page content or over the page content (e.g., via a pop-up or pop-under mechanism). This attribute may categorize the advertising product in a variety of ways. Examples of advertising product categories include: in-page electronic display product; between-page electronic display product; over-page electronic display product; streaming electronic video product; streaming broadband video product; streaming satellite video product; location-triggered mobile product; mobile downloadable executable product; immersive game product; around-game product; in-game product category; projected; terminal-based; vehicle-based; national broadcast product; regional broadcast product; local broadcast product; cable broadcast product; digital video recorded broadcast product; mailed insert; print product; printed promotion; interactive voice response (IVR) product; on-product. The product category attribute identified in an advertising transaction record may be transformed into a tier number for ranking and organizing according to the taxonomy. For example, an in-page advertisement may be assigned the product category attribute value "1" while an off-page advertisement may be assigned the product category attribute value "2."

The standard attributes of advertising transactions used in the taxonomy may also include an advertising product type attribute. Advertising product types describe the format, form factor and/or applicable media of the advertisement. Examples of advertising product types include: HTML rectangle; HTML banner; HTML skyscraper; HTML button; HTML slide; HTML pop-up; HTML pop-under; rich media rectangle; rich media banner; rich media skyscraper; rich media button; rich media slide; rich media pop-up; rich media pop-under; video rectangle; video banner; video skyscraper; video button; video slide; video pop-up; video pop-under; search keyword; search key image; search key audio clip; search key video clip; mobile graphical display (WAP/HTML) banner; mobile text; mobile video; multimedia message service (MMS); short messaging service (SMS); in-stream; pre-stream; post-stream; overlay; stand-alone video player; immersive; console; downloadable; advergame; around-game; game-skinning; dynamic in-game type; static in-game; game-skinning; inter-level game; post-game; pre-game; in-game product placement; game sponsorship; 10-second spot; 30-second spot; 45-second spot; 60-second spot; Double Page; Full Page; Half Page Horizontal; Half Page Vertical; Quarter Page; Display Bannered; Full Centerspread; Mini Centerspread; ⅗ Page Vertical; ½ Page Horizontal; 9/20 page; ⅖ Page Vertical; 3/10 Page Vertical; 3/10 Page Horizontal; ⅕ page vertical; ⅕ page horizontal; 3/20 page; 1/10 page vertical; 1/10 page horizontal; 1/20 page; two-page; single page; ⅔ page vertical; ⅓ page vertical; ½ page horizontal; ½ page vertical; ⅓ page square; ½ page horizontal; ⅙ page horizontal; ⅙ page square; ¼ page; ⅛ page; public billboard; public sandwichboard; public placard; vehicle-borne; mailed insert page; product package; printed decal; product wrapper; and tattoo type products. The product type attribute identified in an advertising transaction record may be transformed into a tier number for ranking and organizing according to the taxonomy. For example, a rectangle (HTML/Rich Media) Internet advertisement may be assigned the product type attribute value "1" while a banner (HTML/Rich Media) Internet advertisement may be assigned the product type attribute value "2."

The standard attributes of advertising transactions used in the taxonomy may also include an advertising product dimension attribute. The advertising product dimension attribute defines the Interactive Measurement Unit (IMU), standardized pixel dimension, inch, square footage or other size measurement of the advertising product. The advertising product dimension attribute may also reflect the play duration and/or the run duration of the advertisement. Examples of dimensional attributes that may be implemented in the taxonomy include: a year; a month; a week; a day, a hour; a minute; a second; an Interactive Measurement Unit (IMU); a level; a screen; a column; a pixel; a page; a word; a mile; a kilometer; an acre; a field; a yard; a foot; a meter; a square mile; a square kilometer; a square yard; a square foot; a square meter; a square inch; a square centimeter; a square millimeter; a cubic mile; a cubic kilometer; a cubic yard; a cubic foot; a cubic meter; a cubic inch; a cubic centimeter; a cubic millimeter; a byte; a decibel; a click; a refresh; a load; a command; an execute dimension. The product dimension attribute identified in an advertising transaction record may be transformed into a tier number for ranking and organizing according to the taxonomy. For example, a leaderboard (Universal Ad Package) advertisement may be assigned the product dimension attribute value "1" while a wide skyscraper (UAP) advertisement may be assigned the product dimension attribute value "2."

The standard attributes of advertising transactions used in the taxonomy may also include an advertising product placement attribute. The advertising product placement attribute determines the level of the site hierarchy to which the advertising product is slotted to be delivered. Examples of advertising product placement attributes that may be used in the taxonomy include: network; run-of-network; site; run-of-site; page group; page; run-of-page; page area; front page; back page; internal page; op-ed page; editorial page; scattered; publisher's-choice; margin; quadrant; segment; above-the-fold; below-the-fold; mid-show; pre-show; post-show; pre-roll; post-roll; standalone; pre-game; post-game; inter-game level; overlay level; floating; sponsorship; share-of-voice; proportional; allocation; blocking; context; genre; broadcast; carrier; geographic; handset; time of day; day of week; week of month; week of year; and month of year placement. The product placement attribute identified in an advertising transaction record may be transformed into a tier number for ranking and organizing according to the taxonomy. For example, an advertisement slotted to be delivered at the network level may be assigned the product placement attribute value "1" while an advertisement slotted to be delivered at the page level of a site may be assigned the product placement attribute value "2." In this context, the level of site hierarchy indicates how far down (in "page level") or how high up ("run of network") that an advertising product will be placed. High in the hierarchy is less specific and typically less expensive advertising since the computer servers can find a vacant slot and fill it with available advertising inventory.

The standard attributes of advertising transactions used in the taxonomy may also include a publisher tier attribute. Examples of publisher tier attributes that may be used in the taxonomy include: circulation; unique visitors; visitors; logins; viewers; users; players; audience; consumption; pricing leverage; pricing premium; buyers; subscribers; subscriber tenure; audience tenure; audience engagement; audience loyalty; reach; signal strength; network breadth; membership; and affiliate.

The standard attributes of advertising transactions used in the taxonomy may also include domain traffic attribute, particularly for Internet advertising transactions. The domain traffic attributes indicates via third-party traffic and audience measurement mechanisms (e.g., Quantcast.com and The Nielsen Company) the scale and prominence of the domain name (i.e., Internet URL) to which the advertising product is slotted to be served via measurement of monthly unique visitors to that domain name. Once a particular transaction has been transformed and tiered via domain traffic and subject matter classifications, the precise reference domain may not be recorded in the data warehouse. Instead a reference or tier number may be assigned to the transaction as the sole mechanism by which the transaction may be traced back to its source domain. For example, an advertising transaction for an ad appearing in a website with a domain monthly unique visitor volume (i.e., number of hits on the domain name) of >20 million unique visitors per month (mm) may be assigned the attribute value "1" while an advertising transaction for an ad appearing in a website with a domain monthly unique visitor value of 10 million to 20 million unique visitors per month (10 mm-20 mm) may be assigned the sales channel attribute value "2." An extension of this method can be made to print media based on circulation data, to broadcast media based on average viewership, and to radio media based on average number of listeners.

The standard attributes of advertising transactions used in the taxonomy may also include a publisher classification attribute (also referred to herein as the "publisher domain classification" in which reference "domain" refers to the subject matter addressed by the publisher rather than a URL). The publisher classification attribute indicates the subject matter of the content of the media or publication targeted for the advertising product delivery. For example, the publisher classification attribute may be a content type classification, examples of which include: News and Information; Financial; Entertainment; Sports; Computers & Technology; Social Media; and Other. Other examples of publisher classification attributes include: industry type; format; media; subscription model; sector; subject matter; technology standards; industry standard; business model; geographic; economic; and transmission standards. The publisher classification attribute identified in an advertising transaction record may be transformed into a tier number for ranking and organizing according to the taxonomy. For example, an advertisement that will appear in a news and information content medium may be assigned the publisher classification attribute value "1" while an advertisement appearing in a financial content medium may be assigned the publisher classification attribute value "2."

The standard attributes of advertising transactions used in the taxonomy may also include an advertiser transaction tier attribute. The advertiser transaction tier attribute indicates the size of the advertiser account measured in terms of a gross bookings relationship between advertiser and publisher (e.g., advertiser gross bookings as a percentage of total bookings for a given delivery date.) Examples of advertiser tiers include: gross bookings; percentage share; share of voice; relative strength; relative bookings; duration of tenure; contract; premium; discount; exclusive; and non-exclusive. The advertiser transaction tier attribute identified in an advertising transaction record may be transformed into a tier number for ranking and organizing according to the taxonomy. For example, an advertising transaction in which the advertiser's transaction share exceeds ten percent may be assigned the advertiser transaction tier attribute value "1" while an advertising transaction in which the advertiser's transaction share is between five and ten percent may be assigned the advertiser transaction tier attribute value "2."

The standard attributes of advertising transactions used in the taxonomy may also include an advertiser buy agent attribute. The advertiser buy agent attribute indicates the purchasing channel for the advertising product. Examples of advertiser buy agent attributes include: an advertiser marketing department; an authorized proxy; an advertiser buy desk; an agency buy desk; an automated offer matching function; an automated remnant fill channel; an automatic network; an electronic communications network; a wireless agent; a prescreened filter agent. The advertiser buy agent attribute identified in an advertising transaction record may be transformed into a tier number for ranking and organizing according to the taxonomy. For example, an advertising transaction purchased through an advertiser buy desk may be assigned the advertiser buy agent attribute value "1" while an advertising transaction purchased through an agency buy desk may be assigned the advertiser buy agent attribute value "2."

The standard attributes of advertising transactions used in the taxonomy may also include an advertiser industry attribute. The advertiser industry attribute indicates the industry addressed by the advertising product. Examples of advertiser industry attributes include: automotive; consumer products; financial services; media and entertainment; telecommunications; computers and technology; travel; and other industries. The sales channel attribute identified in an advertising transaction record may be transformed into a tier number for ranking and organizing according to the taxonomy. For example, an advertising transaction for an advertisement addressing the automotive industry may be assigned the advertiser industry attribute value "1" while an advertising transaction for an advertisement addressing the consumer industry may be assigned the advertiser industry attribute value "2."

The standard attributes of advertising transactions used in the taxonomy may also include an advertising product context overlap tier attribute. The product context overlap attribute reflects a relative measure of the degree to which an advertisement in a particular media may have cross over application to other industries. For example, an advertisement placed in a medium addressed to the auto industry (e.g., an advertisement placement in Automotive News magazine or website) has a high correlation in terms of subject matter and targeted audience to the financial and sports industry tiers, and thus may be rated with an overlap tier of "1" For those industries In this example, if an advertiser is aiming to reach consumers interested in financial or sports matters, many of those targeted consumers may also be reached by advertising in auto industry media. In contrast, there is low context overlap between the auto industry and the entertainment and the computers & technology industries, so an ad placed in an auto industry medium will reach relatively few consumers who are interested in or read/watch entertainment or computers & technology related media. For example, magazines dedicated to cars and the automotive industry typically include advertisements related to financial services, while magazines dedicated to business and financial news typically include advertisements related to automobiles. This is because advertisers know that the readership of automotive magazines include target audiences of financial service advertisers, and the readership of business magazines include target audiences of automotive advertisers. The context overlap are defined for the purposes of the various embodiments to reflect the degree to which different advertising media and targeted audiences provide relevance to or presentation to other industry or consumer target groups.

The degree to which there is overlap may be classified into tiers, such as "tier one," "tier two," and "tier three" to reflect relative context overlap, with tier one corresponding to industry/interest groups with a high degree of context overlap and tier three corresponding to industry/interest groups with a low degree of context overlap.

Examples of "High Context Overlap" or "tier one;" product context overlap include: an Automotive advertiser industry contextualized with Finance publisher content; an Automotive advertiser industry contextualized with a Sports publisher; a Consumer advertiser industry contextualized with Entertainment publisher content; a Consumer advertiser industry contextualized with Social Media publisher content; a Financial advertiser industry contextualized with News and Information publisher content; a Financial advertiser industry contextualized with Financial publisher content; a Financial advertiser industry contextualized with Computers and Technology publisher content; a Media and Entertainment advertiser industry contextualized with Entertainment publisher content; a Media and Entertainment advertiser industry contextualized with Social Media publisher content; a Telecommunications advertiser industry contextualized with Financial publisher content; a Telecommunications advertiser industry contextualized with a Computers and Technology publisher content; a Computers and Technology advertiser industry contextualized with Financial publisher content; a Computers and Technology advertiser industry contextualized with Computers and Technology publisher content; a Travel advertiser industry contextualized with News and Information publisher content; and a Travel advertiser industry contextualized with Financial publisher.

Examples of Moderate Context Overlap, which may be designated as "Tier Two" within the taxonomy, include: an Automotive advertiser industry contextualized with News and Information publisher content; an Automotive advertiser industry contextualized with Social Media publisher content; a Consumer advertiser industry contextualized with News and Information publisher content; a Consumer advertiser industry contextualized with Sports publisher content; a Consumer advertiser industry contextualized with Computers and Technology publisher content; a Financial advertiser industry contextualized with Sports publisher content; an Media and Entertainment advertiser industry contextualized with News and Information publisher; a Media and Entertainment advertiser industry contextualized with Sports publisher content; a Media and Entertainment advertiser industry contextualized with Computers and Technology publisher content; a Telecom advertiser industry contextualized with News and Information publisher content; a Telecom advertiser industry contextualized with Social Media publisher content; a Computers and Technology advertiser industry contextualized with News and Information publisher content; a Computers and Technology advertiser industry contextualized with an Entertainment publisher content; a Computers and Technology advertiser industry contextualized with Sports publisher content; a Computers and Technology advertiser industry contextualized with Social Media publisher content.

Examples of Low Context Overlap, which may be designated as "tier three" include: an Automotive advertiser industry contextualized with Entertainment publisher content; an Automotive advertiser industry contextualized with Computers and Technology publisher content; a Consumer advertiser industry contextualized with Financial publisher content; a Financial advertiser industry contextualized with Entertainment publisher content; a Financial advertiser industry contextualized with Social Media publisher content; a Media and Entertainment advertiser industry contextualized with Financial publisher content; a Telecom advertiser industry contextualized with Entertainment publisher content; a Telecom advertiser industry contextualized with Sports publisher content; a Travel advertiser industry contextualized with Entertainment publisher content; a Travel advertiser industry contextualized with Sports publisher content; a Travel advertiser industry contextualized with Computers and Technology publisher content; and a Travel advertiser industry contextualized with Social Media publisher content.

Advertising transactions which have very little or Zero Context Overlap, meaning that the advertisement category has very little relationship to or target audience overlap with a content classification, may be categorized as "tier four."

The standard attributes of advertising transactions used in the taxonomy may also include an advertising product behavioral targeting package attribute. This attribute reflects the degree to which the advertising product is packaged or presented so as to target consumers exhibiting particular behaviors, such as clicking on a particular Internet advertisement or purchasing a particular product. This attribute can be useful for tracking advertising transactions that are targeted to particular consumer purchasing patterns or media access patterns. Examples of advertising product behavioral targeting package attributes include: previous site visit targeting; previous viewer targeting; previous visitor targeting; previous reader targeting; previous listener targeting; previous traveler targeting; previous dialer targeting; previous purchaser targeting; previous diner targeting; previous searcher targeting; previous respondent targeting; previous non-respondent targeting; keyword targeting; cookie targeting; device targeting; network targeting; connection speed targeting; satellite dish targeting; screen targeting; runtime duration targeting; on-time duration targeting; off-time duration targeting; referent site targeting; referent search targeting; referent viewing targeting; referent visit targeting; referent click targeting; referent action targeting; referent purchase targeting; referent call targeting; referent trip targeting; referent location targeting; late payment targeting; re-payment targeting; non-payment targeting; pre-payment targeting; under-payment targeting; cancellation targeting; renewal targeting; expression of interest targeting; filing of paperwork targeting; raising of flag targeting; self-reported targeting; user-reported targeting; system-reported targeting; retarget targeting; multi-attribute targeting; voting record targeting; and tax filing status targeting. The product behavioral targeting package attribute identified in an advertising transaction record may be transformed into a tier number for ranking and organizing according to the taxonomy. For example, an advertising transaction that includes no behavior targeting may be assigned the product behavioral targeting package attribute value "0" while an advertising transaction that includes a previous site visit product behavioral targeting package may be assigned the product behavioral targeting package attribute value "1."

The standard attributes of advertising transactions used in the taxonomy may also include an advertising product geographic targeting package attribute. This attribute reflects the particular geographic region to which an advertisement is targeted or delivered. For example, an ad in a local newspaper will target the city of its circulation while an ad in a nationwide publication will target the entire United States (assuming the ad is not limited to magazines distributed in particular regions). The Direct Marketing Association (DMA) trade group has defined world wide standardized regions that may be used to define the geographic attribute. In the art of advertising the term DMA is often referred to as shorthand for the standardized zones themselves. Examples of advertising product geographic targeting package attribute values include: DMA (Direct Marketing Associate region) targeting; state targeting; province targeting; canton targeting; municipality targeting; county targeting; city targeting; township targeting; town targeting; postal code or 'zip code' targeting; street targeting; street number targeting; street corner targeting; roadway targeting; highway targeting; expressway targeting; edifice targeting; GPS coordinate targeting; longitude/latitude coordinate targeting; time zone coordinate targeting; sea targeting; airport targeting; and building floor targeting. The geographic targeting attribute identified in an advertising transaction record may be transformed into a tier number for ranking and organizing according to the taxonomy. For example, an advertising transaction that includes no geographic targeting may be assigned the geographic targeting attribute value "0" while an advertising transaction that includes country level geographic targeting may be assigned the geographic targeting attribute value "1."

The standard attributes of advertising transactions used in the taxonomy may also include an advertising product demographic targeting package attribute. This attribute reflects the degree to which an advertisement is presented or packaged so as to reach or be directed to a particular demographic segment. Examples of advertising product demographic targeting packages include: age range targeting; exact numerical age targeting; gender targeting; income targeting; hybrid gender and age targeting; hybrid gender and income targeting; hybrid age and income targeting; hybrid gender, age and income targeting. Demographic targeting attributes may also address combinations of age, gender and income. The demographic targeting attribute identified in an advertising transaction record may be transformed into a tier number for ranking and organizing according to the taxonomy. For example, an advertising transaction sold with no demographic targeting may be assigned the demographic targeting attribute value "0" while an advertising transaction sold with demographic targeting aimed at men ages 18-35 with annual incomes of less than $25,000 may be assigned the demographic targeting attribute value "1." Further examples of demographic targeting attribute values are provided in Table 4 below.

The standard attributes of advertising transactions used in the taxonomy may also include an advertising product booking date attribute. The advertising product booking date attribute indicates the date upon which the advertising transaction is booked in the seller's or seller's agent's booking system and entered into the publisher's order management queue. Examples of advertising product booking date attribute values include: a day booking date; a week booking date; a month booking date; a year booking date; an hour booking date; a minute booking date; a second booking date. The booking date attribute identified in an advertising transaction record may be transformed into and recorded in a standardized date format.

The standard attributes of advertising transactions used in the taxonomy may also include an advertising product launch date attribute. This attribute indicates the date upon which the advertising product commences delivery. Depending on lead time, this date may be up to a year after the booking date, or may be identical with booking date. Examples of advertising product launch date attribute values include: a day launch date; a week launch date; a month launch date; a year launch date; an hour launch date; a minute launch date; a second launch date. The launch date attribute identified in an advertising transaction record may be transformed into and recorded in a standardized date format.

The standard attributes of advertising transactions used in the taxonomy may also include an advertising product gross transaction size attribute. This attribute indicates the gross impression volumes purchased for a specific advertising transaction for a specific campaign launch. Examples of gross transaction size values include: a dollar quantity; a euro quantity; a yen quantity; a rupee quantity; a renminbi quantity; a yuan quantity; a pound quantity; a real quantity; a pound quantity; a franc quantity; a ruble quantity; a peso quantity; a rupiah quantity; a dinar quantity; a shekel quantity; a ringgit quantity; a rand quantity; a won quantity; a shilling quantity; a dirham quantity; a gold quantity; a platinum quantity; a silver quantity; a palladium quantity; a point; a unit attribute; a minute quantity; a day quantity; an hour quantity; a week quantity; a month quantity; an impression quantity; a brainwave imprint quantity; a brainwave scan quantity; a play quantity; a spot quantity; a click quantity; a action quantity; a view quantity; a stream quantity; a listen quantity; a recording quantity; a download quantity; a piece quantity; a copy quantity; an issue quantity; an audience member quantity; a gross rating point quantity; a location quantity; a sign quantity; a session quantity; a unit quantity; a game quantity; a keyword quantity; a bid quantity; an inch quantity; a foot quantity; a meter quantity; a yard quantity; a square inch quantity; a square foot quantity; a square meter quantity; a square yard quantity size. The gross transaction size attribute identified in an advertising transaction record may be transformed into a tier number for ranking and organizing according to the taxonomy. This tiering may be accomplished dynamically by the system based on the transaction set under consideration. For example, a system computer may analyze a set of transactions and rank them from largest to smallest on the basis of specified attributes such as dollar amount, minutes purchased, clicks purchased, etc.

The standard attributes of advertising transactions used in the taxonomy may also include an advertising product transaction gross revenue attribute. This attribute reflects the gross revenue of the advertisement involved in the advertising transaction. Examples of the units in which gross revenue attribute values may be expressed include: dollar; euro; yen; rupee; renminbi; yuan; pound; real; pound; franc; ruble; peso; rupiah; dinar; shekel; ringgit; rand; won; shilling; dirham; gold; platinum; silver; palladium; point; and unit.

The standard attributes of advertising transactions used in the taxonomy may also include an advertising product transaction net revenue attribute. This attribute reflects the net revenue of the advertisement involved in the advertising transaction. Examples of the units in which net revenue attribute values may be expressed include: dollar; euro; yen; rupee; renminbi; yuan; pound; real; pound; franc; ruble; peso; rupiah; dinar; shekel; ringgit; rand; won; shilling; dirham; gold; platinum; silver; palladium; point; and unit.

The standard attributes of advertising transactions used in the taxonomy may also include an advertising product effective unit revenue attribute. This attribute reflects the effective unit revenue of the advertisement involved in the advertising transaction. Examples of the units in which effective unit revenue attribute values may be expressed include: dollar; euro; yen; rupee; renminbi; yuan; pound; real; pound; franc; ruble; peso; rupiah; dinar; shekel; ringgit; rand; won; shilling; dirham; gold; platinum; silver; palladium; point; and unit.

The standard attributes of advertising transactions used in the taxonomy may further include any one or all of the following: a time-to-launch attribute; a geographic attribute; a location attribute; a proximity attribute; a time period attribute; a seasonal attribute; a keyword attribute; a target customer attribute; an estimated viewer attribute; an estimated click-through attribute; an estimated purchase attribute; an estimated listener attribute; a duration attribute; a font attribute; a font size attribute; an animation attribute; a motion attribute; and a relative placement attribute.

Each advertising transaction received by a computerized advertising futures market system can be parsed and analyzed to recognize the values or parameters associated with a taxonomy based upon some or all of the foregoing attributes. In such a system, a processor can be configured with software to look for the attributes specified in the taxonomy, extract the value of any recognized attributes, in some cases transform the attribute value into another value or tier specified in the taxonomy, and record the extracted and/or transformed attribute values in a transaction record. By automatically capturing advertising transactions from a data stream of advertising transaction summaries and generating a database of transaction records, the system can generate a historical and current database that can be mined and exploited for a variety of advertising related applications including the embodiments described below.

The foregoing attributes may be organized or grouped for analysis and display according to a structured organization, i.e., the taxonomy. This taxonomy can be general in structure so as to accommodate any type of advertising transaction and any investigation of particular types of advertising markets, products and characteristics. At a top level, the taxonomy may be organized by advertising market and media (or platform), as well as other top level attribute categories. Then within each attribute category further subcategories of attributes may be organized to further characterize a particular advertising transaction. As an example, a taxonomy may include Advertising Medium as a high level attribute, which may include print, radio, television, electronic media, etc. If electronic media is selected within this top level taxonomy, the taxonomy may include the attribute categories and organization shown in example Table 1 below.

TABLE 1

Electronic Display Advertising Taxonomy Structure

1. Product Data
   a. Product Revenue Model (e.g., CPA, CPM)
   b. Sales Channel (e.g., Direct Sales Force, Network, Agency, Exchange)
   c. Product Category (e.g., Electronic Display: In-Page, Off-Page)
   d. Product Type (e.g., Rectangle, Banner, HTML, Rich Media, Video)
   e. Product Dimension (e.g., IMU dimensions for Electronic Display)
   f. Product Placement Level (e.g., Network, Site, Page, Location)
2. Publisher Data
   a. Publisher Domain Traffic Tier (e.g., Unique Visitor Count Tier)
   b. Publisher Domain Classification (e.g., Subject Matter Classification)
3. Advertiser Information
   a. Advertiser Transaction Tier (e.g., Unique Visitor Count Tier)
   b. Advertiser Buyer Channel
   c. Advertiser Industry
4. Targeting Transformation
   a. Context Overlap Tier
   b. Behavioral Targeting Package
   c. Geographic Targeting Package
   d. Demographic Targeting Segment
5. Flight Transformation
   a. Booking Date
   b. Launch Data
   c. Gross Transaction Size
6. Revenue Transformation
   a. Transaction Gross Revenue
   b. Transaction Net Revenue
   c. Effective cost per mille impressions or Effective cost per action (e.g., Net Revenue/Total Impressions of Total Action)

Raw advertising transaction data that is captured from various sources is parsed and analyzed to identify whether the taxonomy attributes are present in each transaction, and if so, the individual elements are extracted and/or transformed into values to enable each transaction line to be ranked within the tiered structure of the taxonomy across the entire attribute range. As a result the advertising transactions can be categorized or clustered according to selected attributes for purposes of benchmarking and indexing. Advertising transaction records can be transformed in a table look-up process utilizing transformation tables with corresponding table values (i.e., the values obtained from the look-up process) being included in the transformed advertising transaction record. The resulting transformed data records then can be stored in a relational database accessible for data pulls and subsequent aggregation, such as to generate a reference entity, index or benchmark.

Figure 3A:
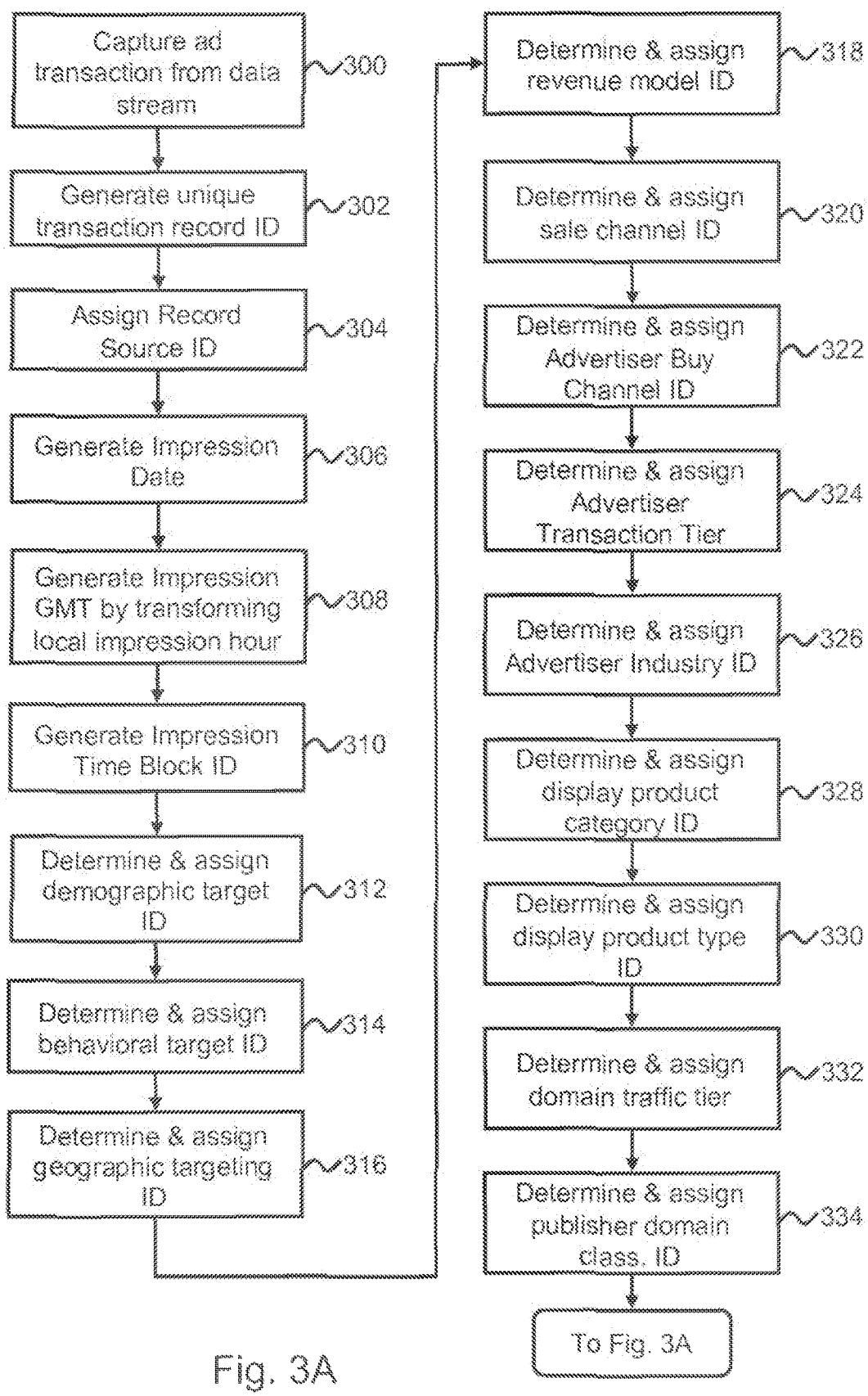
FIGS. 3A and 3B is a process flow diagram of an embodiment method for processing advertising transactions to identify and process advertising attributes.
Figure 3B:
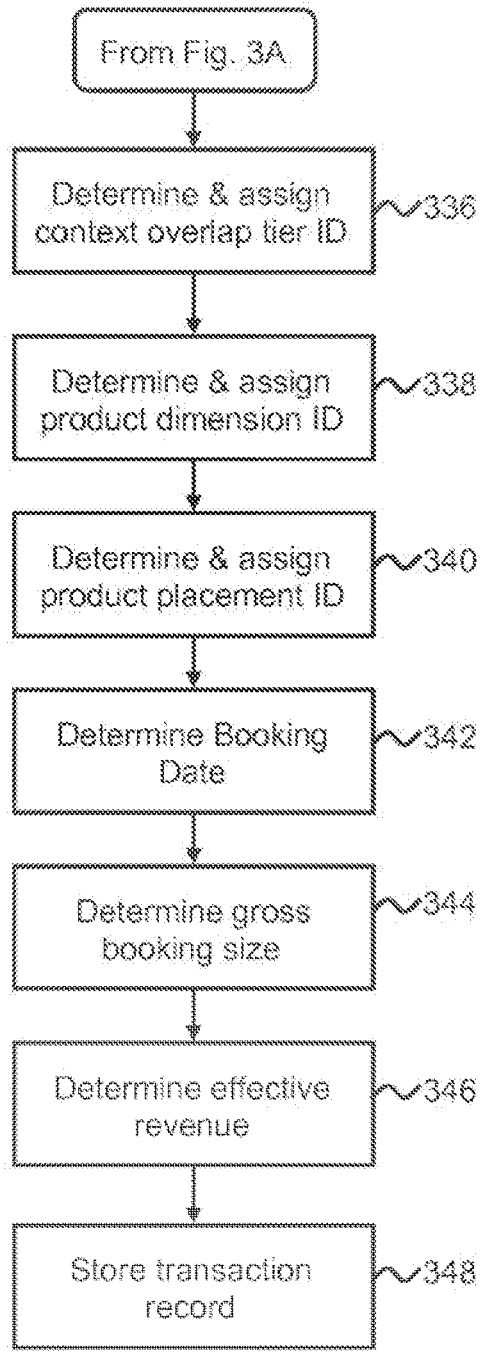

The capture, extraction, transformation and recordation of advertising transactions may be understood by reference to an example that is illustrated in FIGS. 3A, 3B and described below. A computer system can capture an advertising transaction from a data stream, step 300. The captured advertising transaction record can then be processed to identify and assign attribute values and prepare a transaction data record for storage. The computer system may assign a unique transaction ID to the transaction record, step 302. The source of the advertising transaction data may also be recorded, step 304. In an embodiment, the data source may be identified by an ID value rather than a name. For example, the source of the data may be used in a table look-up process to obtain a record source ID from a data table such as the example illustrated in Table 2. In this example, if the advertising transaction record was received from an ad server log, the source ID "2" would be stored in the corresponding field in the transaction record.

TABLE 2

| Record Source | Rec. Source | Rec. Source ID |
|---|---|---|
| Accounting/Billing System | ACCOUNTING | 1 |
| Ad Server Log | SERVER_LOG | 7 |
| Buyside/Sellside Dashboard | DASHBOARD | 3 |
| Reporting DB | REPORTS_DB | 4 |

The impression date for the transaction may also be recorded, step 306. This may be accomplished by transforming the native impression date (i.e., the date that the purchased advertisement is to make an impression on consumers) for the transaction into a standard format, such as MM_DD_YYYY. Similarly, the impression time associated with the advertising transaction may be transformed into a standard time format, such as Greenwich Mean Time (GMT), step 308. The time block (e.g., morning, day or night) of the purchased may also be determined and recorded, step 310. In an embodiment, this may be accomplished by using the impression time as a look-up quantity in a table look-up process to obtain an impression time block ID using a data table such as the example illustrated in Table 3.

TABLE 3

| Impression Local Hour | Impression Time Block | IMP_BLOCK_ID |
|---|---|---|
| 6:00:00 AM to 7:59:00 AM | Morning Block | 2 |
| 8:00:00 AM to 10:59:00 PM | Prime Block | 1 |
| 11:00:00 PM to 6:00:00 AM | Night Block | 3 |

The advertising transaction is parsed and analyzed to identify any demographic targeting specified in the transaction, with the identified attribute values (if any) used to determine a demographic targeting attribute ID, step 312. In an embodiment, the demographic targeting attribute ID may be determined by using the demographic targeting information in the advertising transaction as look-up quantities in a table look-up process to obtain an ID using a data table such as the example illustrated in Table 4. For example, if the purchased advertisement is targeted at women age 35-45 with an annual income greater than $75,000, the table look-up process using Table 4 would determine that the demographic target attribute ID should be "2."

TABLE 4

| | Demographic Target ID | | | | |
|---|---|---|---|---|---|
| | None Specified | <$25k | $25-50k | $50-75k | $75+k |
| None Specified | 0 | 0 | 0 | 0 | 0 |
| M 18-35 | 0 | 1 | 1 | 1 | 1 |
| F 18-35 | 0 | 1 | 1 | 1 | 1 |
| M 35-45 | 0 | 2 | 2 | 2 | 2 |
| F 35-45 | 0 | 2 | 2 | 2 | 2 |
| M 45-55 | 0 | 3 | 3 | 3 | 3 |
| F 45-55 | 0 | 3 | 3 | 3 | 3 |

The advertising transaction may be further analyzed to identify behavioral targeting attributes, with the identified attribute values (if any) used to determine behavioral target attribute ID, step 314. In an embodiment, the demographic targeting attribute ID may be determined by using the demographic targeting information in the advertising transaction as look-up quantities in a table look-up process to obtain an ID using a data table such as the example illustrated in Table 5. For example, if the purchased advertisement includes a keyword targeted package, the table look-up process using Table 5 would determine that the behavioral attribute ID would be "2."

TABLE 5

| Behavioral Targeting Package | Behavioral Package ID |
|---|---|
| NONE | 0 |
| PREVIOUS SITE VISIT | 1 |
| KEYWORD | 2 |
| REFERENT SITE | 3 |
| RETARGET | 4 |
| MULTI | 5 |

The advertising transaction may be further analyzed to identify geographic targeting attributes, with the identified attribute values (if any) used to determine geographic target attribute ID, step 316. In an embodiment, the demographic targeting attribute ID may be determined by using the geographic targeting information in the advertising transaction as look-up quantities in a table look-up process to obtain an ID using a data table such as the example illustrated in Table 6. For example, if the purchased advertisement is targeted at a particular U.S. state, the table look-up process using Table 6 would determine that the geographic attribute ID would be "3."

TABLE 6

| Geographic Targeting Package | GEO-PACKAGE_ID |
|---|---|
| NONE | 0 |
| COUNTRY | 1 |
| DMA | 2 |
| STATE | 3 |
| CITY | 4 |

The advertising transaction may be further analyzed to determine the revenue model of the transaction, with the identified revenue used to determine behavioral target attribute ID, step 318. In an embodiment, the revenue model attribute ID may be determined by using the revenue model information in the advertising transaction as a look-up quantity in a table look-up process to obtain an ID using a data table such as the example illustrated in Table 7. For example, if the purchased advertisement is purchased on the basis of a cast-per-click on the advertisement, the table look-up process using Table 7 would determine that the revenue model ID would be "2."

TABLE 7

| Revenue Model Name | REV/METRIC | REV. MODEL ID |
|---|---|---|
| Cost Per Mille Impressions | CPM | 1 |
| Cost Per 'Click' | CPC | 2 |
| Cost Per 'Action' (as defined by transacting parties | CPA | 3 |
| Cost Per (Unique) Session | CPS | 4 |

The advertising transaction may be further analyzed to identify sales channel information, with the identified information used to determine a sale channel attribute ID, step

320. In an embodiment, the sale channel attribute ID may be determined by using the sale channel information in the advertising transaction as look-up quantities in a table look-up process to obtain an ID using a data table such as the example illustrated in Table 8. For example, if the purchased advertisement was sold by a contracted network agent, the table look-up process using Table 8 would determine that the sale channel attribute ID would be "2."

TABLE 8

| Sales Channel Name | Sales Channel ID |
|---|---|
| Direct Sales Force | 1 |
| Contracted Network Agent | 2 |
| Tier II Reseller | 3 |
| Remnant | 4 |

The advertising transaction may be further analyzed to identify buy channel information, with the identified information used to determine a buy channel attribute ID, step 322. In an embodiment, the buy channel attribute ID may be determined by using the buy channel information in the advertising transaction as look-up quantities in a table look-up process to obtain an ID using a data table such as the example illustrated in Table 9. For example, if the purchased advertisement was purchased through an agency buy desk, the table look-up process using Table 9 would determine that the buy channel attribute ID would be "2."

TABLE 9

| Buy Channel | Buy Channel ID |
|---|---|
| Advertiser Buy Desk | 1 |
| Agency Buy Desk | 2 |
| Automated Remnant Fill | 3 |

The advertising transaction may be further analyzed to identify information related to the size of the advertiser account with the publisher, with the identified information used to determine an advertiser transaction share attribute ID, step 324. This information may also be determined by querying the advertising transaction database to determine the size of the advertiser's account with the gross bookings of the publisher. In an embodiment, the advertiser transaction share attribute ID may be determined by using the advertiser's share of the publisher's bookings as look-up quantities in a table look-up process to obtain an ID using a data table such as the example illustrated in Table 10. For example, if the advertiser's account represents less than one percent of the publisher's total bookings, the table look-up process using Table 10 would determine that the advertiser transaction share attribute ID would be "4."

TABLE 10

| Advertiser Transaction Share | Advertiser Transaction Tier |
|---|---|
| >10% | 1 |
| >5 < 10% | 2 |
| >1 < 5% | 3 |
| <1% | 4 |

The advertising transaction may be further analyzed to identify the advertiser's industry, with the identified information used to determine an advertiser industry attribute ID, step 326. If the advertiser's industry is not identified within the advertising transaction, the advertiser's company name may be used in a table look-up to identify that company's industry segment. In an embodiment, the advertiser industry attribute ID may be determined by using the advertiser industry information as a look-up quantity in a table look-up process to obtain an ID using a data table such as the example illustrated in Table 11. For example, if the advertiser is in the telecom industry, the table look-up process using Table 11 would determine that the advertiser industry attribute ID would be "5."

TABLE 11

| Advertiser Industry | Advertiser Industry ID |
|---|---|
| Auto | 1 |
| Consumer | 2 |
| Financial | 3 |
| Media and Entertainment | 4 |
| Telecom | 5 |
| Computers and Technology | 6 |
| Travel | 7 |
| Other | 8 |

The advertising transaction may be further analyzed to determine the advertising product category information, with the identified information used to determine a display product category attribute ID, step 328. In an embodiment, the product category attribute ID may be determined by using the advertisement information in the advertising transaction as a look-up quantity in a table look-up process to obtain an ID using a data table such as the example illustrated in Table 12. For example, if the purchased advertisement is for an off-page ad, the table look-up process using Table 12 would determine that the display product category attribute ID would be "2."

TABLE 12

| Product Category Name | Product Category ID |
|---|---|
| In-Page | 1 |
| Off-Page | 2 |

The advertising transaction may be further analyzed to determine advertising product type information, with the identified information used to determine a product type attribute ID, step 330. In an embodiment, the product type attribute ID may be determined by using the product type information in the advertising transaction as a look-up quantity in a table look-up process to obtain an ID using a data table such as the example illustrated in Table 13. For example, if the purchased advertisement is for a banner ad presented in an Internet webpage, the table look-up process using Table 13 would determine that the product type attribute ID would be "2."

TABLE 13

| Product Type Name | Product Type ID |
|---|---|
| Rectangle (HTML/Rich Media) | 1 |
| Banner (HTML/Rich Media) | 2 |
| Skyscraper (HTML/Rich Media) | 3 |

TABLE 13-continued

| Product Type Name | Product Type ID |
| --- | --- |
| Button (HTML/Rich Media) | 4 |
| In-Stream Video (Video) | 5 |
| Slide (HTML/Rich Media/Video) | 6 |
| Pop-Up (HTML/Rich Media/Video) | 7 |
| Pop-Under (HTML/Rich Media) | 8 |

The advertising transaction may be further analyzed to identify the domain name of an Internet site in which the purchased advertisement is slotted to appear (if applicable), and then using Internet audience measuring services (such as Quantcast or Nielsen), the traffic to that domain name can be determined and used to define the domain attribute ID, step 332. In an embodiment, the sale channel attribute ID may be determined by using the number of hits on the domain name as a look-up quantity in a table look-up process to obtain an ID using a data table such as the example illustrated in Table 15. For example, if the purchased advertisement will appear in a website with a domain monthly unique visitor value of 3 million unique visitors per month (which falls within the category 1.5 mm-5 mm), the table look-up process using Table 15 would determine that the sale channel attribute ID would be "4."

TABLE 15

| Domain Monthly Unique Visitors | Gross Eligible US Domains | Domain Tier ID |
| --- | --- | --- |
| +20 mm | 30 | 1 |
| 10 mm-20 mm | 60 | 2 |
| 5 mm-10 mm | 160 | 3 |
| 1.5 mm-5 mm | 1100 | 4 |

The advertising transaction may be further analyzed to identify the publisher's subject matter information, with the identified information used to determine a publisher domain classification attribute ID, step 334. If the publisher's subject matter is not included in the capture advertising transaction, the publisher's name may be used in a table look-up process to determine the subject matter covered by that publisher. In an embodiment, the publisher domain classification attribute ID may be determined by using the publisher's subject matter information as look-up a quantity in a table look-up process to obtain an ID using a data table such as the example illustrated in Table 16. For example, if the purchased advertisement will appear in a sports subject matter medium, the table look-up process using Table 16 would determine that the sale channel attribute ID would be "4."

TABLE 16

| Domain Subject Matter | Domain Subject ID |
| --- | --- |
| News and Information | 1 |
| Financial | 2 |
| Entertainment | 3 |
| Sports | 4 |
| Computers & Technology | 5 |
| Social Media | 6 |
| Other | 7 |

Using the determined advertiser's industry determined in step 326 and the publisher's domain subject matter determined in step 334, the system can assigned an attribute value to the context overlap tier, step 336. As described above, this attribute reflects a relative measure of the degree to which an advertisement in the publisher's domain may have crossover application to other industries. In an embodiment, the context overlap tier attribute can be determined using the advertiser's industry and the publisher's domain subject matter as look-up quantities in a table look-up process to obtain an ID using a data table such as the example illustrated in Table 17. For example, if the advertisement is purchased by an automotive company and will appear in a sports subject matter medium, the table look-up process using Table 17 would determine that the sale channel attribute ID would be "1."

TABLE 17

| | | Publisher Domain Subject Matter | | | | | |
| --- | --- | --- | --- | --- | --- | --- | --- |
| | VALUE ID TIER | News and Information | Financial | Entertainment | Sports | Computers & Tech. | Social Media |
| Advertising industry | Auto | 2 | 1 | 3 | 1 | 3 | 2 |
| | Consumer | 2 | 3 | 1 | 2 | 2 | 1 |
| | Financial | 1 | 1 | 3 | 2 | 1 | 3 |
| | Media and Entertainment | 2 | 3 | 1 | 2 | 2 | 1 |
| | Telecom | 2 | 1 | 3 | 3 | 1 | 2 |
| | Computers & Technology | 2 | 1 | 2 | 2 | 1 | 2 |
| | Travel | 1 | 1 | 3 | 3 | 3 | 3 |

The advertising transaction may be further analyzed to determine the advertisement product dimension information, with the identified information used to determine a product dimension attribute ID, step 338. In an embodiment, the product dimension attribute ID may be determined by using the product dimension information in the advertising transaction as a look-up quantity in a table look-up process to obtain an ID using a data table such as the example illustrated in Table 18. For example, if the purchased advertisement is for a full banner ad measuring 468×60 pixels, the table look-up process using Table 18 would determine that the product type attribute ID would be "5."

TABLE 18

| Product Name | Dimension | Product Dimension ID |
| --- | --- | --- |
| Leaderboard (Universal Ad Package) | 728 × 90 IMU | 1 |
| Wide Skyscraper (UAP) | 160 × 600 | 2 |
| Medium Rectangle (UAP) | 300 × 250 | 3 |
| Rectangle (UAP) | 180 × 150 | 4 |
| Full Banner | 468 × 60 | 5 |
| Half Banner | 234 × 60 | 6 |
| Vertical Banner | 120 × 240 | 7 |
| Skyscraper | 120 × 600 | 8 |
| Half Page | 300 × 600 | 9 |
| Large Rectangle | 336 × 280 | 10 |
| Vertical Rectangle | 240 × 400 | 11 |
| Square Button | 125 × 125 | 12 |
| Button 1 | 120 × 90 | 13 |
| Button 2 | 120 × 60 | 14 |
| Micro Bar | 88 × 31 | 15 |
| Large Video Rectangle | 480 × 270 | 16 |
| Medium Video Rectangle | 320 × 180 | 17 |
| Small Video Rectangle | 240 × 135 | 18 |

The advertising transaction may be further analyzed to determine advertisement placement information, with the identified information used to determine a product placement attribute ID, step 340. In an embodiment, the product placement attribute ID may be determined by using the product placement information in the advertising transaction as a look-up quantity in a table look-up process to obtain an ID using a data table such as the example illustrated in Table 19. For example, if the purchased advertisement is for placement of an ad on any page within an Internet website, the table look-up process using Table 19 would determine that the product type attribute ID would be "2."

TABLE 19

| Product Placement | Placement Level ID |
| --- | --- |
| NETWORK | 1 |
| SITE | 2 |
| PAGE GROUP | 3 |
| PAGE | 4 |

The advertising transaction may be further analyzed to determine the advertisement booking date information, and the identified booking date may be transformed into a consistent date format, step 342. The advertising transaction may be further analyzed to determine the ad revenue values, and generate a booking size attribute value by transforming revenue values summed across a single transaction, step 344. In an embodiment, the booking size attribute value may be the dollar (or other currency) value itself. Similarly, the advertising transaction may be further analyzed to determine the ad revenue values, and for all transactions of a shared transaction ID an effective revenue attribute value can be calculated according to the calculation method indicated by the transaction's revenue model (see step 318), step 346. All transactions of a single transaction ID may be summed and then divided by the number of transaction ID's attached to a single transaction to generate the effective revenue attribute value.

Once all of the values for the attributes used in the taxonomy have been extracted from the advertising transaction, the attribute values can be stored in a relational database as a transaction record indexed to the transaction record ID, step 348.

By capturing advertising transactions from data streams, summarizing and organizing the information according to a taxonomy as described above, and storing the advertising transaction records in a relational database, many useful data products and market measures can be generated. The following embodiments illustrate some applications and uses of such an advertising transaction database and the information products that can be generated.

Figure 4:
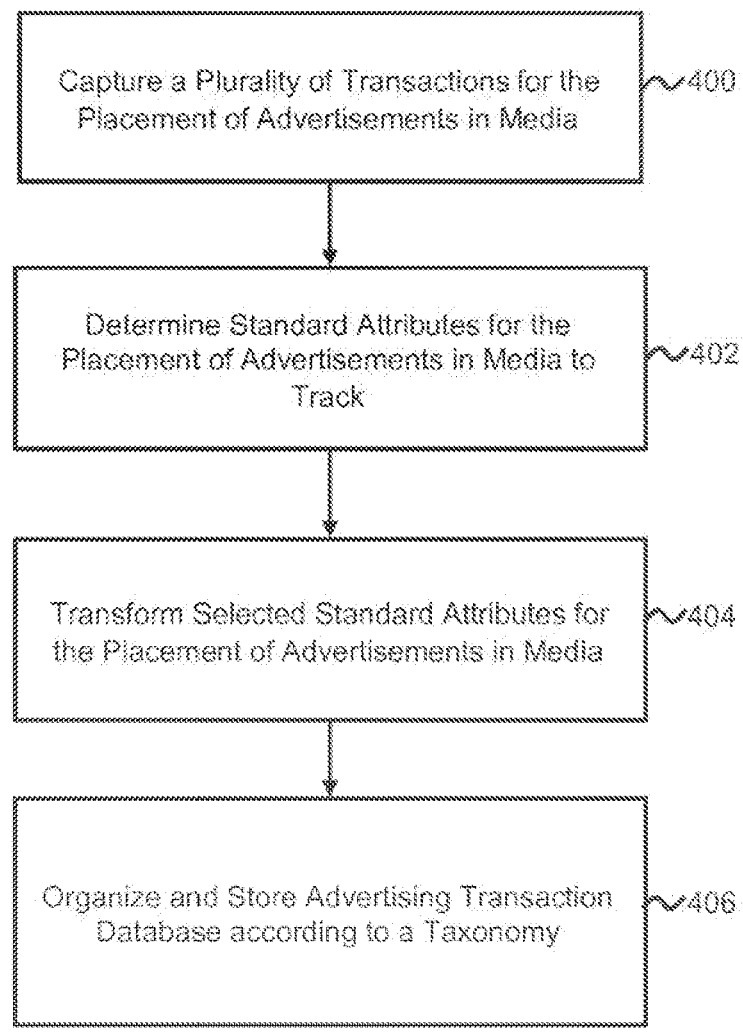
FIG. 4 is a process flow diagram of a method for organizing and storing advertising transaction data according to a taxonomy.

FIG. 4 is a process flow diagram of an embodiment method for aggregating and recording advertising transactions according to standardized attributes of such transactions. In this method, a plurality of advertising transaction for the placement of ads in media are captured, step 400. As discussed above, the advertising transactions may be automatically captured from a variety of advertising transaction data. Captured advertising transaction data are processed to determine the attribute values contained within the transaction data, step 402. As discussed above, the advertising transaction data may be parsed to recognize data corresponding to a standard set of attributes. The identified attribute information may be transformed into attribute values that can be stored in an advertising transaction record within a database, step 404. The advertising transaction attribute values may then be organized and stored within an advertising transaction database according to a taxonomy, step 406. The result of this process will be a database that contains advertising market information that can be utilized for a variety of purposes as described more fully herein. As discussed above, the advertising transaction attributes that are identified within transaction data may include the advertising medium, the media platform, a revenue model, a media sales channel, an advertising product category, an advertising product type, an advertising product dimension, an advertising product placement, a publisher tier, its publisher classification, an advertiser transaction tier, an advertiser buy agent, an advertiser industry, an advertising product context overlap tier, an advertising product behavioral targeting package, an advertising product geographic targeting package, an advertising product demographic targeting package, an advertising product booking date, an advertising product launch date, an advertising product gross transaction size, an advertising product transaction with gross revenue, an advertising product transaction net revenue, an effective unit revenue, a time to launch, a geographic attribute, a location attribute, a proximity attribute, a time attribute, a seasonal attribute, a keyword attribute, a target customer act attribute, an estimated viewer attribute, an estimated click-through attribute, an estimated purchase attribute, an estimated listener attribute, a duration attribute, a font attribute, a font size attribute, an animation attribute, a motion attribute, and a relative placement attribute. Examples of various attribute values are described above in the discussion of the attribute taxonomy.

Figure 5:
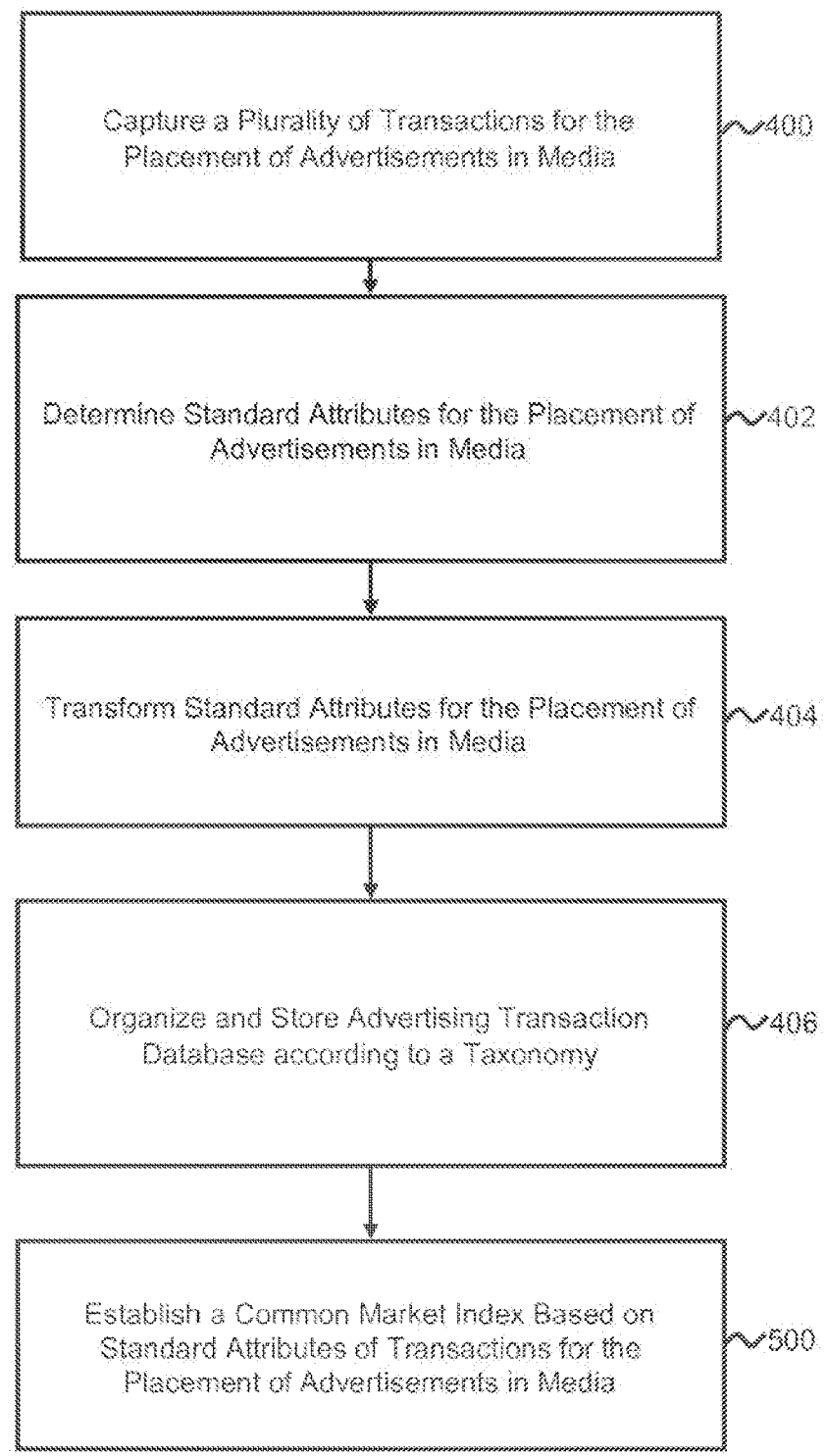
FIG. 5 is a process flow diagram of a method for establishing a common market index for advertising transactions.

FIG. 5 illustrates a method that makes use of the attribute taxonomy and advertising transaction data analysis described above to provide a common market index for aggregating and characterizing advertising transactions. As discussed above, a plurality of advertising transactions may be captured from a data stream of transaction data, step 400, and the captured advertising transaction data processed to determine the attribute values contained within the transaction data, step 402. The identified attribute information may be transformed into attribute values that can be stored in an advertising transaction record within a database, step 404. The advertising transaction attribute values may then be organized and stored within an advertising transaction database according to a taxonomy, step 406. By using this database, a common market index can be developed by aggregating selected attributes of the stored advertising transaction records, step 500. By aggregating advertising transactions according to particular attributes, market indexes can be established for various types of advertising associated with those attributes. For example, market indexes may be generated for advertising transactions for advertisements placed in electronic media, published media, radio media, television media, as well as any other media addressed in the attribute taxonomy discussed above. As another example, market indexes may be generated for advertising transactions sold through the various types of media sales channels. Thus, by storing advertising transaction records that include attribute values according to taxonomy, a wide variety of different market indexes can be generated from a historical database of such transactions.

A variety of different methods can be used for aggregating advertising transactions. For example, the aggregation may include averaging prices of the advertising transactions for a selected attribute for a selected time period. Such averaging may be accomplished over a variety of time periods, including: present time; future time; custom-defined time; point in time; a reference period; a benchmark period; a fiscal market duration; a calendar year; a fiscal year; a calendar quarter; a fiscal quarter; a month; a week; a day; a composite time period; a rolling time period; and a fixed time period. The process of aggregating advertising transactions may also include volume-weighted averaging of advertising prices; booking-time-weighted averaging of prices; flight-time-weighted averaging of prices; calculating the rolling average prices of advertising; calculating the moving average prices of advertising; dynamically averaging prices of advertising; establishing the main point of advertising prices; and establishing the medium point of advertising prices, with all of these aggregation methods being performed for selected attributes over a selected time period. Additionally, the aggregation process may include assigning the transaction data to a taxonomy according to standardized advertising transaction attributes such as those described above.

The processes of establishing common market indexes can be automated with raw data being automatically obtained from a variety of parties via a variety of transmission mechanisms. For example, raw advertising transaction data may be obtained from an advertiser party, a publisher, a media buyer, an agent, a network, a carrier, a theater, a database, an exchange or a market. The raw data may be received via a variety of mechanisms, including for example a data feed, a data scrape, a data syndication system, a data broadcast, a wireless data transmission, a satellite data transmission, a printed data transmission that is manually or automatically scanned into the system, an Internet-protocol transmission, an electronic mail transmission, an instant message or transmission, a telephone transmission, and a facsimile transmission, as well as a variety of other manual and semiautomatic mechanisms.

Advertising transaction records may be pre-processed before the aggregation processing. For example, the advertising transaction records may be normalized, cleansed and scanned to identify and remove duplicate records (de-duplicate). Additionally, advertising transaction records may be verified and the data triangulated. Also, the source data for advertising transaction records may be archived.

Advertising transaction indexes established according to the method illustrated in FIG. 5 may be useful for estimating the cost of future advertising transactions, pricing advertising, budgeting for advertising, building a risk market for advertising; creating an information market for advertising economic indicators; incorporating indexes in a media order; buying, planning and optimization systems; and establishing both primary and derivative marketplaces for advertising transactions.

Figure 6:
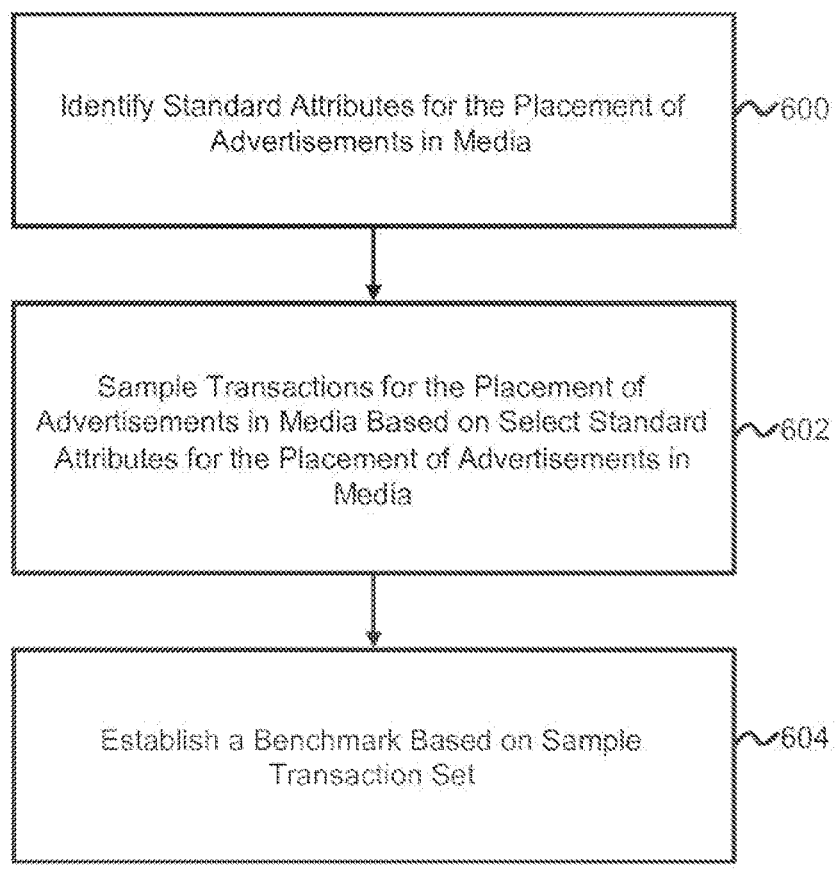
FIG. 6 is a process flow diagram of a method for establishing a benchmark based on a sample set of advertising transactions.

FIG. 6 illustrates an example method for establishing an advertising market benchmark for use as a basis for advertising transactions. As described above with reference to FIGS. 2-5, a plurality of advertising transactions are captured and their attribute values identified and stored in a database, step 600. This database can be indexed and organized according to an attribute taxonomy to enable selected data records to be sampled and analyzed. To create a benchmark for advertising transactions matching particular attribute values, a subset of advertising transaction records are selected within the database for sampling based on those attribute values, step 602. The sampled advertising transaction records are then compiled in order to establish a benchmark based on the sampled set of transactions, step 604. Benchmark values can be determined for any subset of attribute values to provide a wide range of measures for an advertising marketplace. For example, a benchmark may be established for television advertising in the evening time block for sports related programming placement one month in advance of the present day by selecting advertising transactions with attribute values corresponding to those parameters. By searching the database of advertising transactions using those attribute values as record selection keys, many or all of the recorded transactions corresponding to just such advertising purchases can be accessed and used to generate the benchmark. A variety of mathematical methods may be used to establish the benchmark based on the data set, including for example averaging all the records to determine the mean value or selecting the median value. Other methods include weighting all transactions in the selected group by revenue such that the benchmark reflects true economic value generated by particular attribute combinations.

Figure 7:
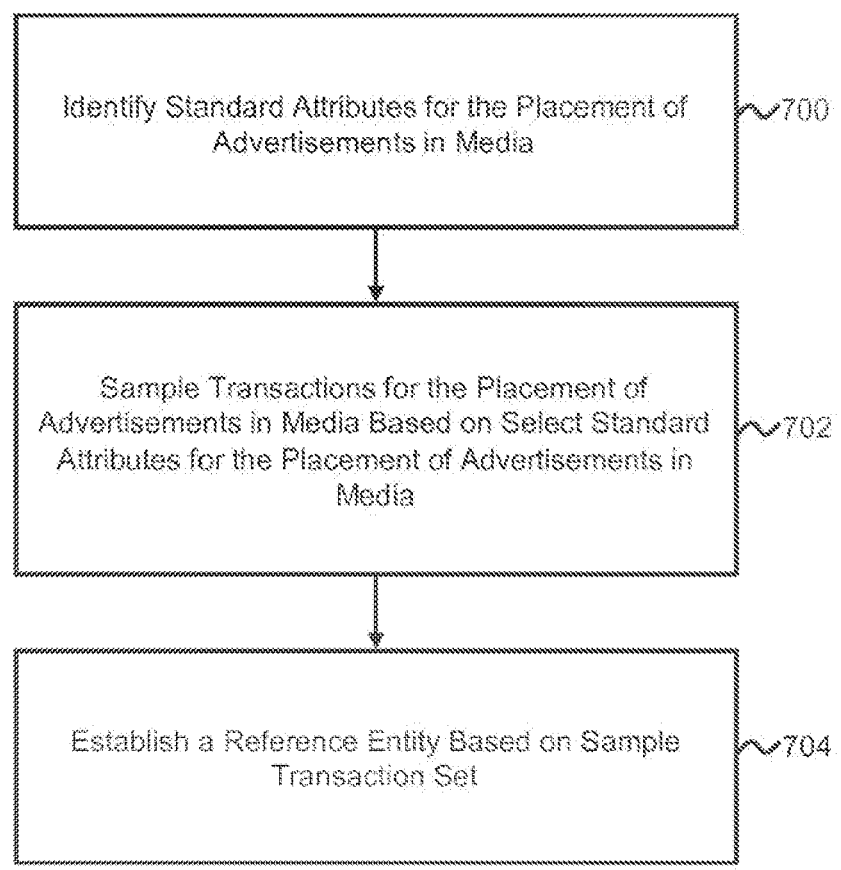
FIG. 7 is up process flow diagram of a method for establishing a reference entity based on a sample set of advertising transactions.

FIG. 7 illustrates steps of a method for establishing an advertising reference entity using a top-down process. As described above with reference to FIGS. 2-5, a plurality of advertising transactions are captured and their attribute values identified and stored in a database, step 700. This database can be indexed and organized according to an attribute taxonomy to enable selected data records to be sampled and analyzed. To create a reference entity for advertising transactions matching particular attribute values, a subset of advertising transaction records are selected within the database for sampling based on those attribute values, step 702. The sampled advertising transaction records are then compiled in order to establish an advertising reference entity based on the sampled set of transactions, step 704. The transactions that compose the reference entity can then be averaged, revenue-weighted, or otherwise defined according to the mean or median value in the series. The mathematical output of this operation can then serve as a proxy for the 'value' of the reference entity, and thus may be understood or interpreted to be what a sample advertising transaction may be reasonably expected to economically generate in the marketplace.

Figure 8:
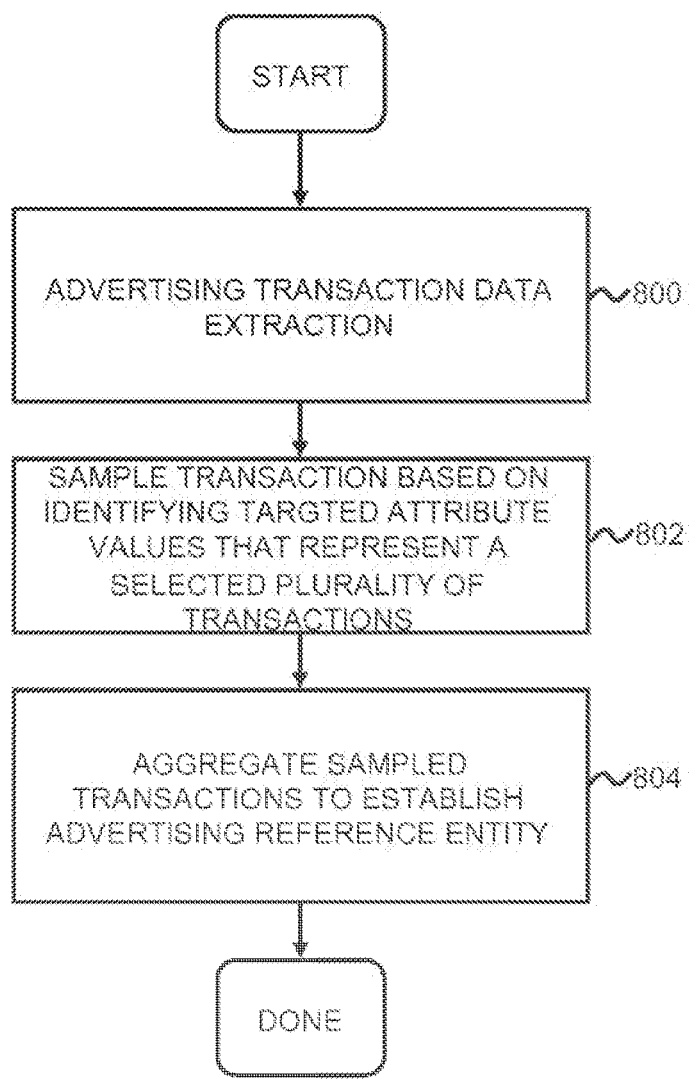
FIG. 8 is a process flow diagram for a method of aggregating sampled advertising transactions to establish an advertising reference entity.

FIG. 8 illustrates steps of a method for establishing an advertising reference entity by aggregating selected classes or types of advertising transactions. As described above with reference to FIGS. 2-5, a plurality of advertising transactions are captured from any of a variety of data sources and data transmission mechanisms, the transaction attribute values are identified, certain transaction values are transformed to attribute tier values, and the resulting advertising transaction records are stored in a database, step 800. As part of this process, the transaction records and the database can be indexed and organized according to an attribute taxonomy to enable selected data records to be sampled and analyzed. To establish an advertising reference entity for selected classes or types of advertising transactions matching particular attribute values, a subset of advertising transaction records are selected within the database for sampling based on those attribute values, step 802. For example, attribute values may be selected to extract a subset of advertising transaction records related to electronic display advertising, mobile advertising, search advertising, video advertising, game advertising, public display advertising, outdoor advertising, print advertising, radio advertising, television advertising, direct marketing advertising, telemarketing advertising, product placement as described more fully below with reference to FIGS. 31 through 134. The sampled advertising transaction records are then aggregated to establish an advertising reference entity value, step 804. The transactions that compose the reference entity can then be averaged, revenue-weighted, or otherwise defined according to the mean or median value in the series. The mathematical output of this operation can then serve as a proxy for the 'value' of the reference entity, and thus may be understood or interpreted to be what a sample advertising transaction may be reasonably expected to economically generate in the marketplace. In the instance of a 'bottom-up' reference entity calculation, the specific attributes targeted for selection and inclusion in the reference entity are defined by the attributes of the broad set of transactions initially under consideration, rather than being pre-determined or blindly defined in advance of considering the transaction set. In this way, the bottoms-up calculation methodology reflects the very attribute profile of the entire eligible transaction set, rather than having artificial constraints imposed upon it.

Figure 9:
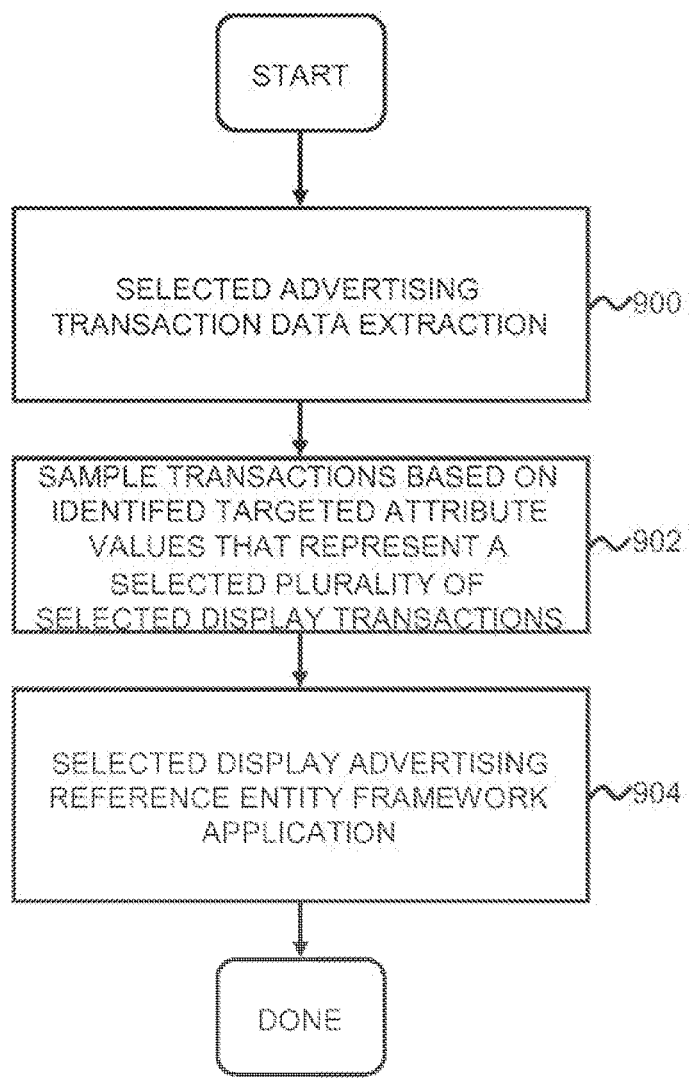
FIGS. 9-17 are process flow diagrams of methods for establishing an advertising benchmark, reference entity and composite price syndication for a selected type of advertising product or marketplace.

A reference entity may be established for the selected advertising market using method steps such as those illustrated in FIG. 9. As described above with reference to FIGS. 2-5, a plurality of advertising transactions are captured from any of a variety of data sources and data transmission mechanisms, the transaction attribute values are identified, certain transaction values are transformed to attribute tier values, and resulting advertising transaction records are stored in a database, step 900. As part of this process, the transaction records and the database can be indexed and organized according to an attribute taxonomy to enable selected data records to be sampled and analyzed. To establish an advertising reference entity for the selected market segment advertising transactions whose attributes match the selected attribute values, a subset of advertising transaction records are selected within the database for sampling based on those attribute values, step 902. The identified targeted attribute values may include single attributes or combinations of attributes associated with electronic display advertising transactions. The sampled advertising transaction records are then aggregated to establish an advertising reference entity value, step 804.

Figure 10:
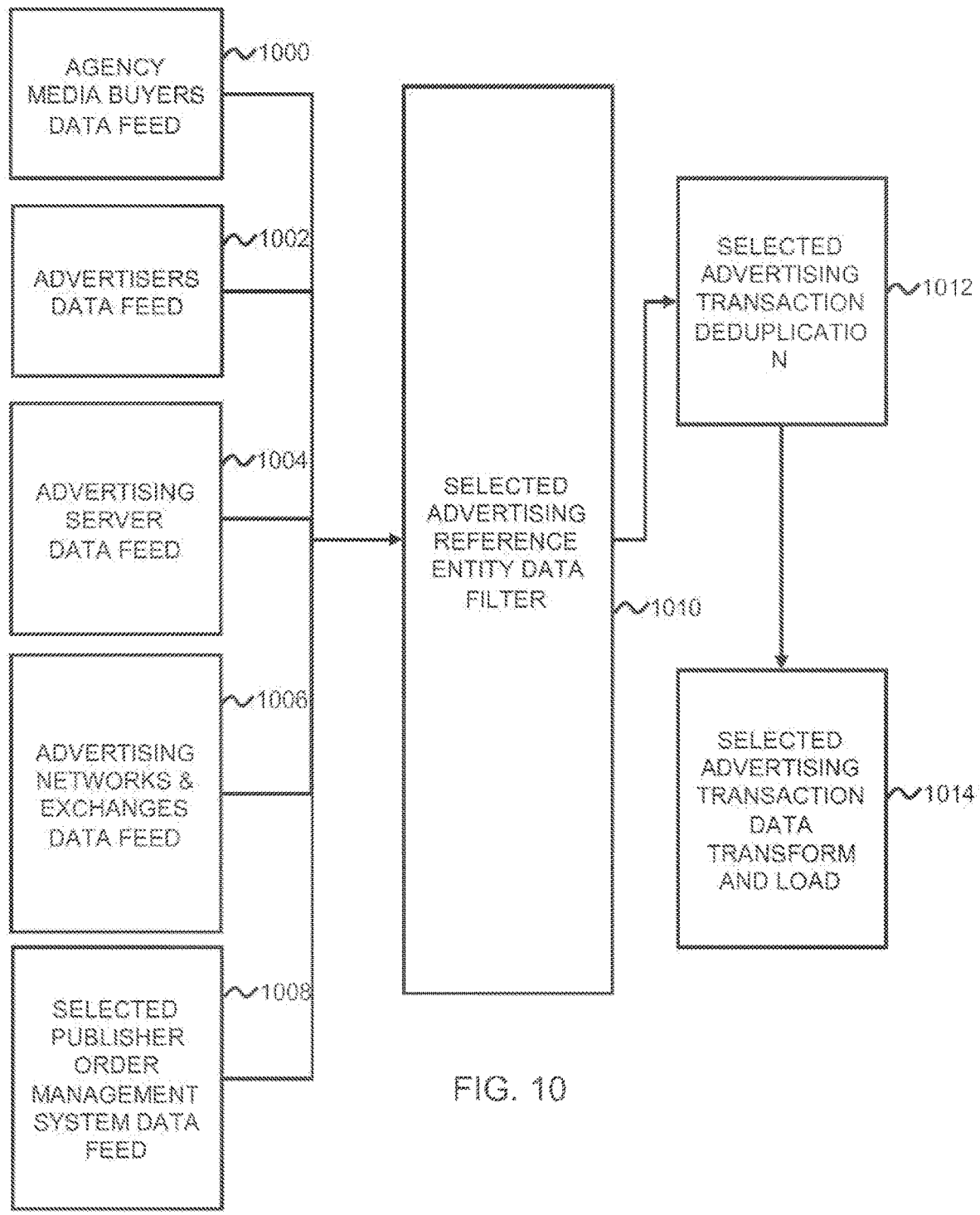
Figure 11:
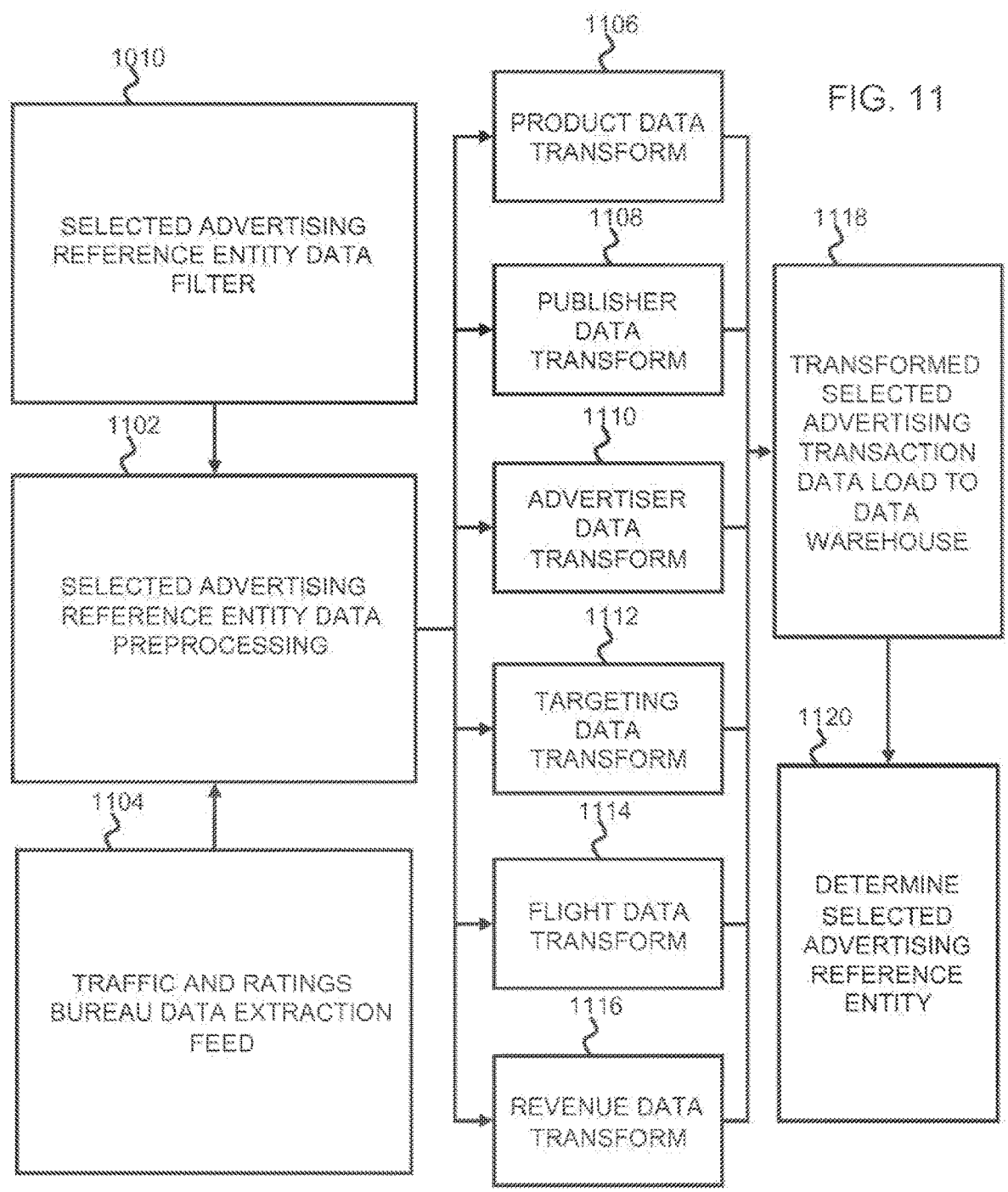

In this application of the various embodiments, advertising transaction records may be selected from an advertising transaction database by specifying a particular attribute value (e.g., "electronic display" or a corresponding attribute ID value) as the selection value for the advertising medium attribute. Alternatively, the advertising transactions that are captured in step 900 may be limited to transactions purchasing advertising in the selected market, as illustrated in FIG. 10. For example, the data sources used to collect advertising transactions may be limited to selected agency media buyer data feeds 1000, advertiser data feeds 1002, advertising server data feeds 1004, advertising networks and exchanges data feeds 1006, and publisher order management system data feeds 1008. Additionally, the advertising transaction data feeds may be filtered by a selected advertising reference entity data filter, step 1010. As mentioned above, the selected advertising transaction data received from the various data feeds may be preprocessed to remove duplicate transaction records, step 1012. The preprocessed advertising transaction data may then be processed to transform attribute information into attribute tier values with the resulting data records stored in a database, step 1014.

FIG. 1l illustrates in more detail steps involved in organizing advertising transaction records according to a taxonomy of selected advertising attributes. Advertising transaction data selected via a selected advertising reference entity data filter, step 1010, may be preprocessed as described above, step 1102. Information related to market and media popularity or viewing may be obtained from ratings bureau databases (e.g., Quantcast.com and Nielsen), websites and other such data feeds, step 1104. This data may be combined to transform the information from advertising transactions into attribute values and attribute tier values as described above with reference to FIGS. 3A, 3B. For example, a product data may be transformed into a product attribute tier value, step 1106, publisher data information may be transformed into publisher tier attribute values, step 1108, advertiser information may be transformed into advertiser tier attribute values, step 1110, targeting package information may be transformed into one or more targeting attribute tier values, step 1112, flight information may be transformed into advertising product flight attribute values, and revenue information may be transformed into one or more revenue attribute tier values, step 1116. The transformed selected advertising transaction attribute values may then be stored in a relational database or data warehouse, step 1118. The stored data may then be used to determine the selected advertising reference entity value, step 1120.

Figure 12:
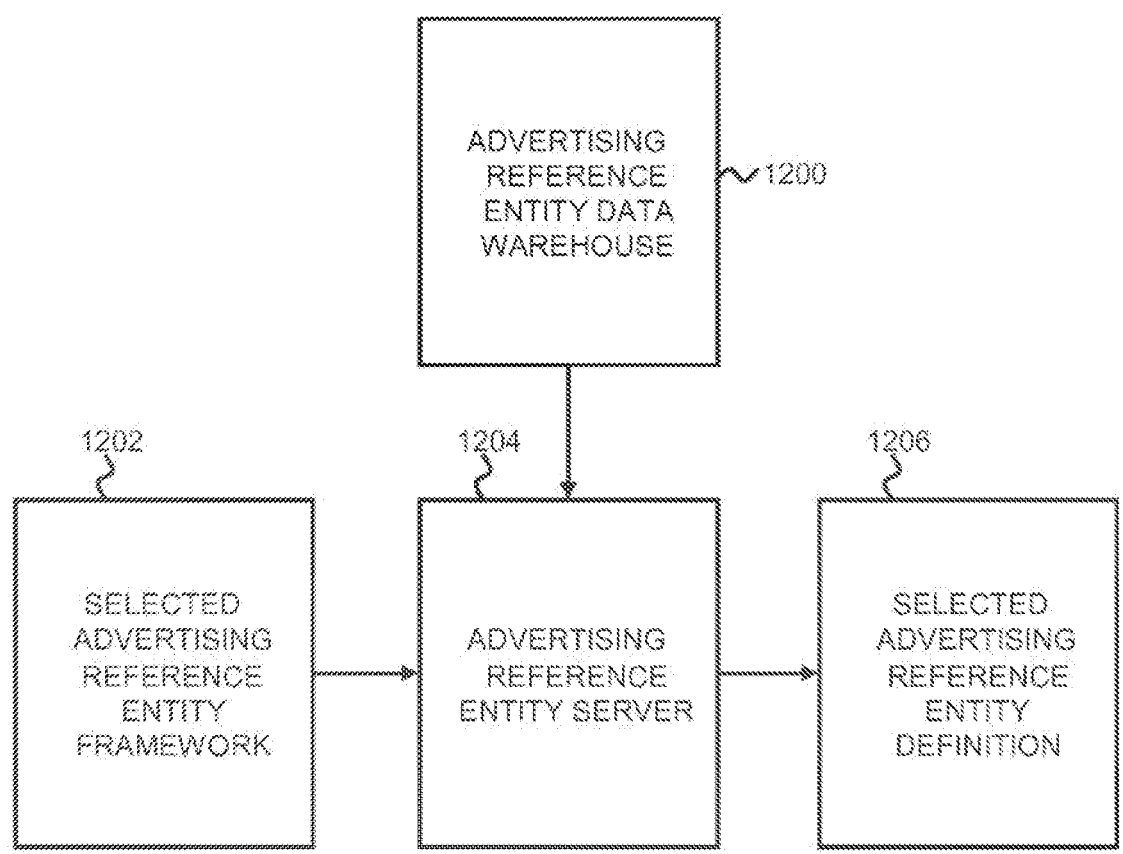

In an embodiment illustrated in FIG. 12, a selected advertising reference entity framework 1202 may be applied as an automated filter to the eligible pool of archived selected advertising transactions stored in a relational database or data warehouse 1200. In this process, an advertising reference entity server 1204 may use the selected advertising reference entity framework 1202 as a filter or search framework for drawing archived selected advertising transactions from the data warehouse 1200. The advertising reference entity server 1204 may then use the sampled transaction data to synthesize a selected advertising reference entity 1206. The process of synthesizing the reference entity may involve calculating the indexed reference entity value of the transaction sampled on the basis of the defined attribute values contained in the reference entity framework 1202. For example, the indexed value may include a gross transaction size, a gross revenue index, a net revenue index, and an effective unit revenue index.

Figure 13:
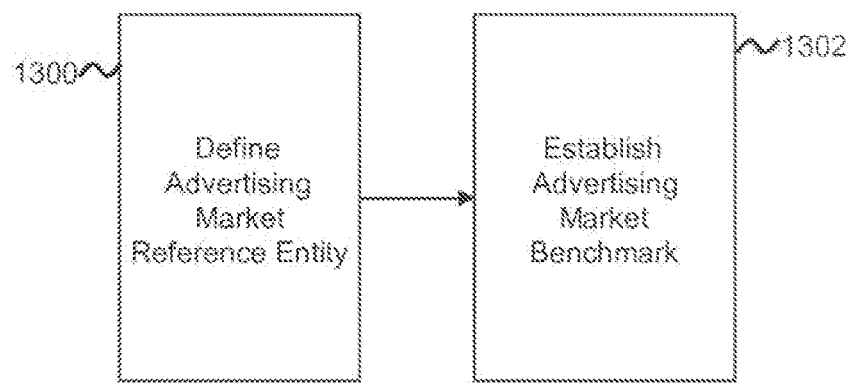

FIG. 13 illustrates a method that may be employed to use an advertising reference entity as an advertising market benchmark. In this method, the value of an advertising reference entity is defined, step 1300, such as by using the methods described above with reference to FIG. 7-11 for defining a market reference entity. The selected market reference entity may then be used to establish a selected advertising market benchmark, step 1302. This process may involve publishing the value of the advertising reference entity to the marketplace on a timely and consistent basis over time. The publication of the value of the advertising reference entity may be syndicated. The advertising reference entity may then be established as an advertising market benchmark for subsequent transactions, operations and the like. The process of defining the advertising reference entity may include extracting, transforming and loading a stream of advertising transaction data records into a relational database from a plurality of data sources. The extracted advertising transaction records may include organizing the records according to attribute tiers defined in a taxonomy of advertising attribute values. The process may also involve identifying targeted attribute values that represent a selected plurality of advertising transactions, and sampling a set of advertising transactions based upon the defined attribute values. Publication of the advertising reference entity may be accomplished at the time the value is calculated using a variety of publication mechanisms. Similarly, the syndication of advertising reference entities may be accomplished using a variety of communication mechanisms. Examples of such publication and syndication communication mechanisms include electronic, wireless, broadcast, print, television, radio, Internet, file transfer, and similar automated and electronic communication mechanisms. The advertising reference entity may also be published and syndicated via closed, open and public networks, as well as via communication among different members of an advertising marketplace. The advertising reference entity may also be archived at the moment of calculation using any known data archiving mechanisms and storage devices.

Figure 14:
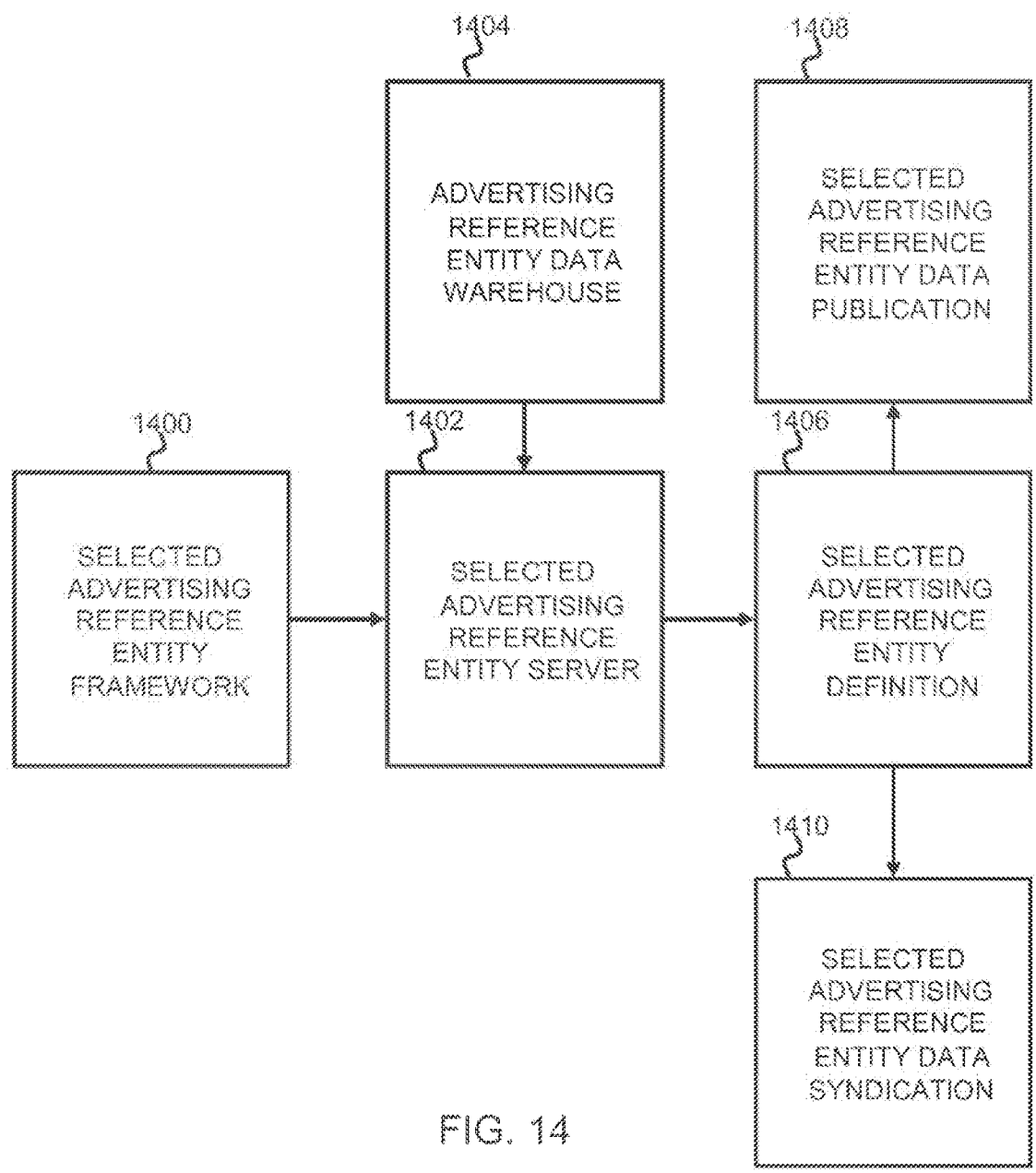

FIG. 14 illustrates a method in which a selected advertising reference entity is used as an electronic display advertising market benchmark. In this embodiment, a selected advertising reference entity framework 1400 is used by an advertising reference entity server 1402 to selectively sample selected advertising transaction records stored within a relational database or data warehouse 1404. The advertising reference entity server 1402 uses the sampled transaction data to define the selected advertising reference entity 1406. This reference entity is then published as a selected advertising reference entity data publication 1408. The reference entity definition may also be used to generate a selected advertising reference entity data syndication 1410. In this embodiment, the value of the selected advertising reference entity may be calculated following a consistently defined and executed advertising reference entity definition process with the results published and syndicated as described above with reference to FIG. 13.

Figure 15:
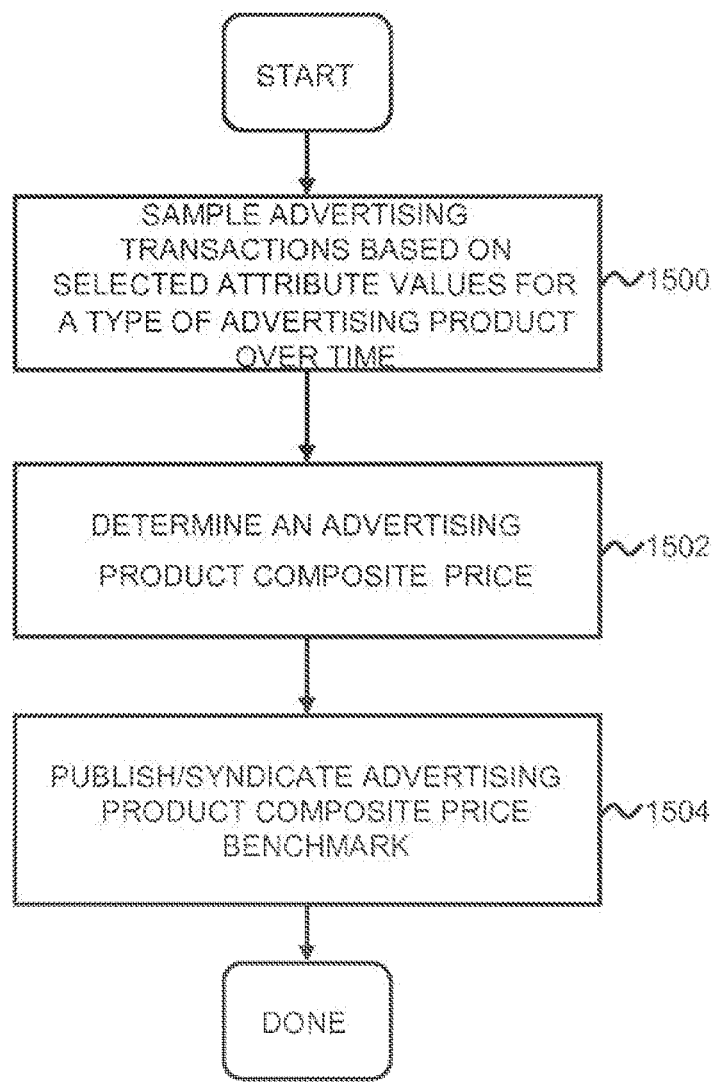

FIG. 15 illustrates a method for using a single advertising product composite price as an advertising product composite price benchmark. In this process, attribute values which define a particular type of advertising product are used to sample an advertising transaction relational database or data warehouse to extract advertising transaction records associated with a selected type of advertising product over a period of time, step 1500. Using the extracted advertising transaction records, an advertising composite price is determined, step 1502. This establishes an advertising product composite price within the identified sample transaction time frame. The advertising product composite price may then be published to the marketplace on a timely and consistent basis with the publication syndicated, thereby establishing the advertising product composite price as an advertising composite price benchmark for subsequent transactions and operations, step 1504. For example, advertising transaction records may be selected for particular advertising products such as electronic display, mobile advertising, search advertising, video advertising, game advertising, public display, outdoor advertising, print, radio and television advertising, direct marketing, telemarketing, and product placement advertising products (see further discussion below with reference to FIGS. 31-134). As another example, the advertising product may be selected based upon demand, such as a high-demand advertising product. Such high demand advertising products may be defined by volume, impressions, broadcast time, on air time, place, turns, displays, actions, clicks, purchases, views, dollars, and other units of measure.

Figure 16:
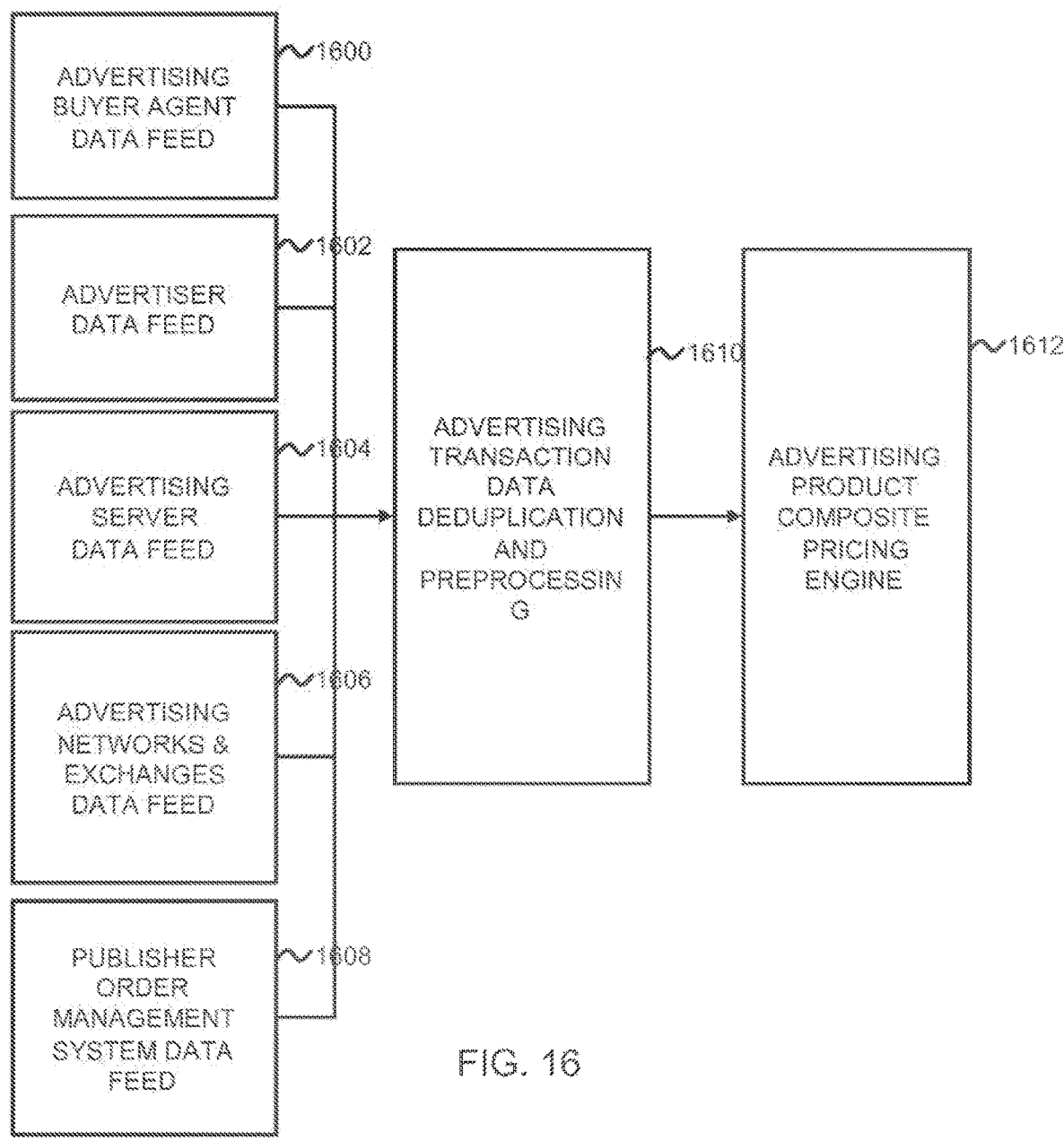

FIG. 16 illustrates a system network for identifying attribute values and sampling advertising transactions whose attribute values meet the identified values to define a set of advertising transactions to be extracted, transformed and loaded into a select advertising product composite price. Raw advertising transaction data may be obtained from a variety of sources including, for example, advertising buyer agent data feeds 1600, advertiser data feeds 1602, at the pricing server data feeds 1604, advertising networks and exchange data feeds 1606, and publisher order management system data feeds 1608. The raw advertising transaction data may be pre-processed to remove duplicates and otherwise transform attribute values into attribute tier values, step 1610, with the resulting data provided to an advertising product composite pricing engine 1612. The advertising product composite price engine may calculate a volume-weighted composite price for sampled advertising products of the identified attribute values conducted within an identify transaction time frame.

Figure 17:
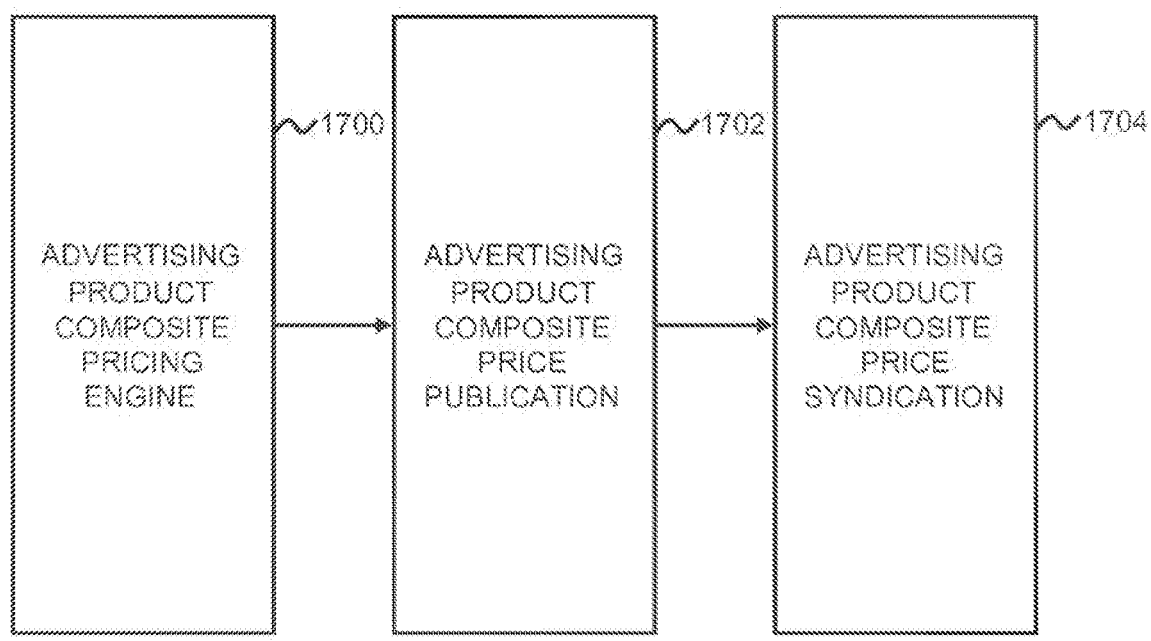

As illustrated in FIG. 17, the output from the advertising product composite pricing engine, step 1700, may be published as an advertising product composite price publication, step 1702, and syndicated as an advertising product composite price indication, step 1704. The publication and syndication of the advertising product composite price may be accomplished on the composite price as calculated via a variety of publication and communication mechanisms. Examples of such publication and communication mechanisms include, for example, electronic, wireless, broadcast, print, television, radio, Internet, as file transfer, and other electronic communication means. The advertising product composite price may also be published and syndicated via closed, open and public networks, as well as communications among market participants. Additionally, the advertising product composite price may be archived using any known archival methods and storage devices.

Figure 18:
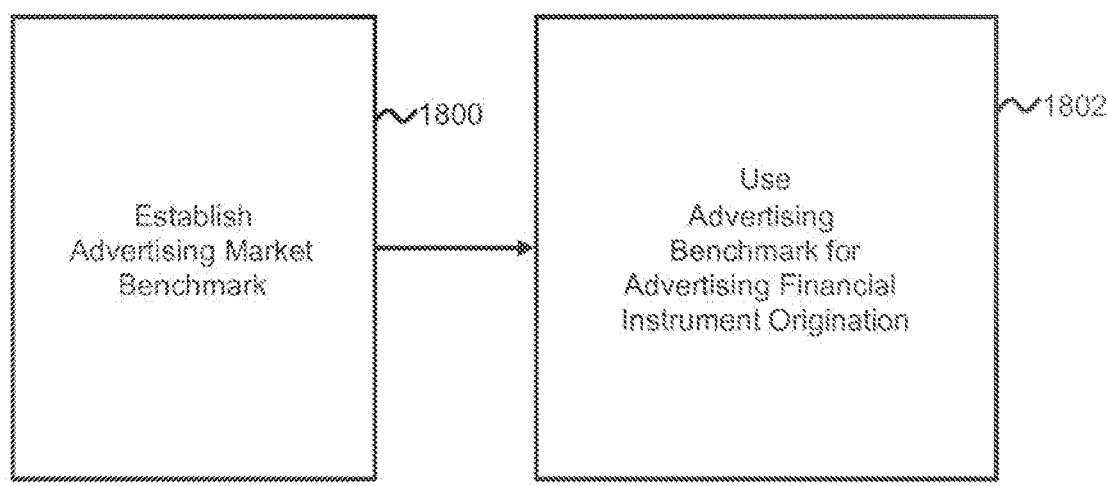
FIG. 18 is a process flow diagram of a method for originating a financial instrument from an advertising benchmark.

FIG. 18 illustrates a generalized method that may be used to originate a financial instrument from an advertising benchmark. An advertising benchmark is generated based on information regarding at least one advertising market or advertising product transaction category utilizing various methods described above, step 1800. This advertising benchmark is then used to originate an advertising financial instrument, step 1802, whereby a party may enter into an advertising transaction the terms of which are based on the advertising benchmark. The benchmark used for originating an advertising financial instrument may be an advertising reference entity as described above. For example, the reference entity may be any of electronic display, mobile advertising, search advertising, video advertising, game advertising, public display advertising, outdoor advertising, print advertising, radio advertising, television advertising, direct marketing, telemarketing and product placement advertising market reference entities. The benchmark also may be the advertising product composite price for any of the various advertising markets. The benchmark may also be an index, such as an advertising sentiment index, an advertising activity index, an advertising price index, an advertising spend migration index, a relative strength index, a moving average index, and a rolling index. The advertising market index may be an index for any one or combination of the various advertising markets or advertising products. The advertising financial instrument may be any of a derivative financial instrument, a primary market financial instrument, an exchange traded note, an option, a futures contract, a reference entity futures contract, an option on a futures contract, a composite price futures contract, a forward, a principal protected note, securitization, a security, a single advertising product future, an advertising sentiment future, an advertising index future, an advertising activity future, a basis for a swap, a collateralized obligation, a structured entity, a primary market instrument, a security market instrument, a bespoke instrument, an over-the-counter instrument, an exchange-listed instrument, a liquid instrument, an illiquid instrument, a cash-settlement instrument, a physical-settlement instrument, a regulated instrument, a mark-to-market instrument, and a standardized contract. The instruments and standardized contracts may include terms such as trading unit, settlement method, point sites, strike date, strike price, interval, limits, price banding, minimum fluctuation, trading hours, listed platforms, minimum block size, product calendar, issuance, market-to-market policies, convergence with physical underlying entity, exchange rules, distribution and leverage on money.

Figure 19:
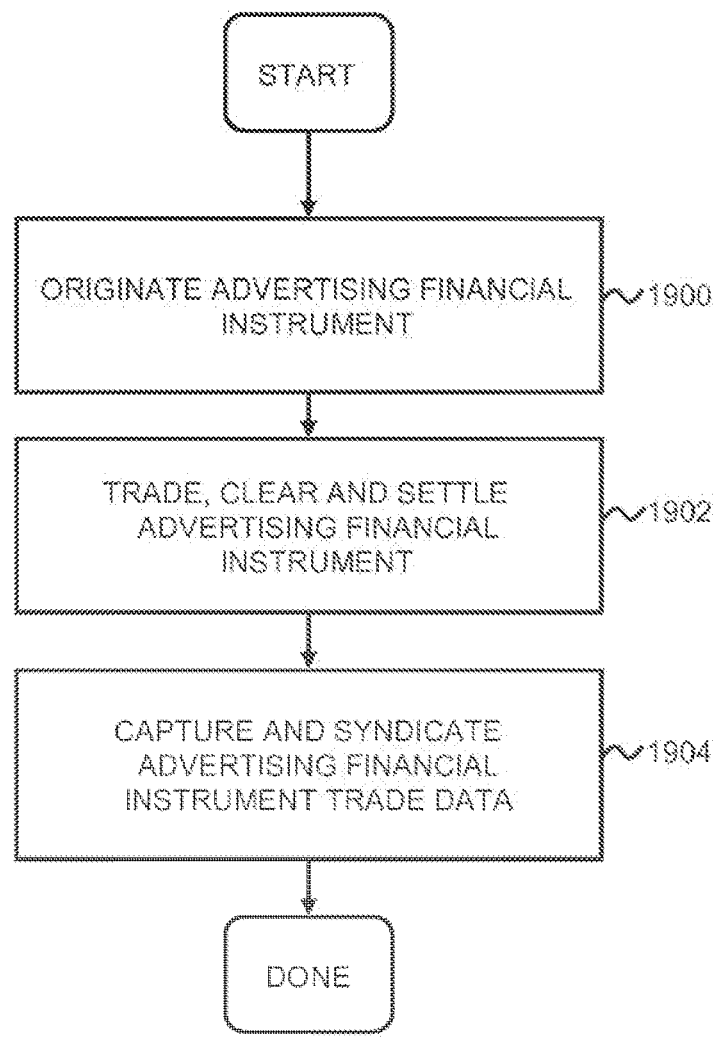
FIG. 19 is a process flow diagram of a method for the origination, trading and capture of advertising financial instruments.

FIG. 19 illustrates a method for the origination, trading and capture of advertising financial instruments. An advertising financial instrument is originated, step 1900, such as according to the method described above with reference to FIG. 18. As described above, this process may involve taking an advertising benchmark based upon information about at least one of an advertising market or advertising product transaction activity, and providing an advertising financial instrument whereby a party may enter into a transaction terms of which are based on the advertising benchmark. Mechanisms are provided for facilitating the exchange of advertising market financial instruments whereby a party to an instrument may enter into a transaction, including trading, clearing and settling advertising financial instruments, step 1902. In order to provide information to market participants, trades of advertising financial instruments are captured and syndicated as advertising financial instrument trade data, step 1904. Such trade data may be published and syndicated to support the advertising instrument market.

Figure 20:
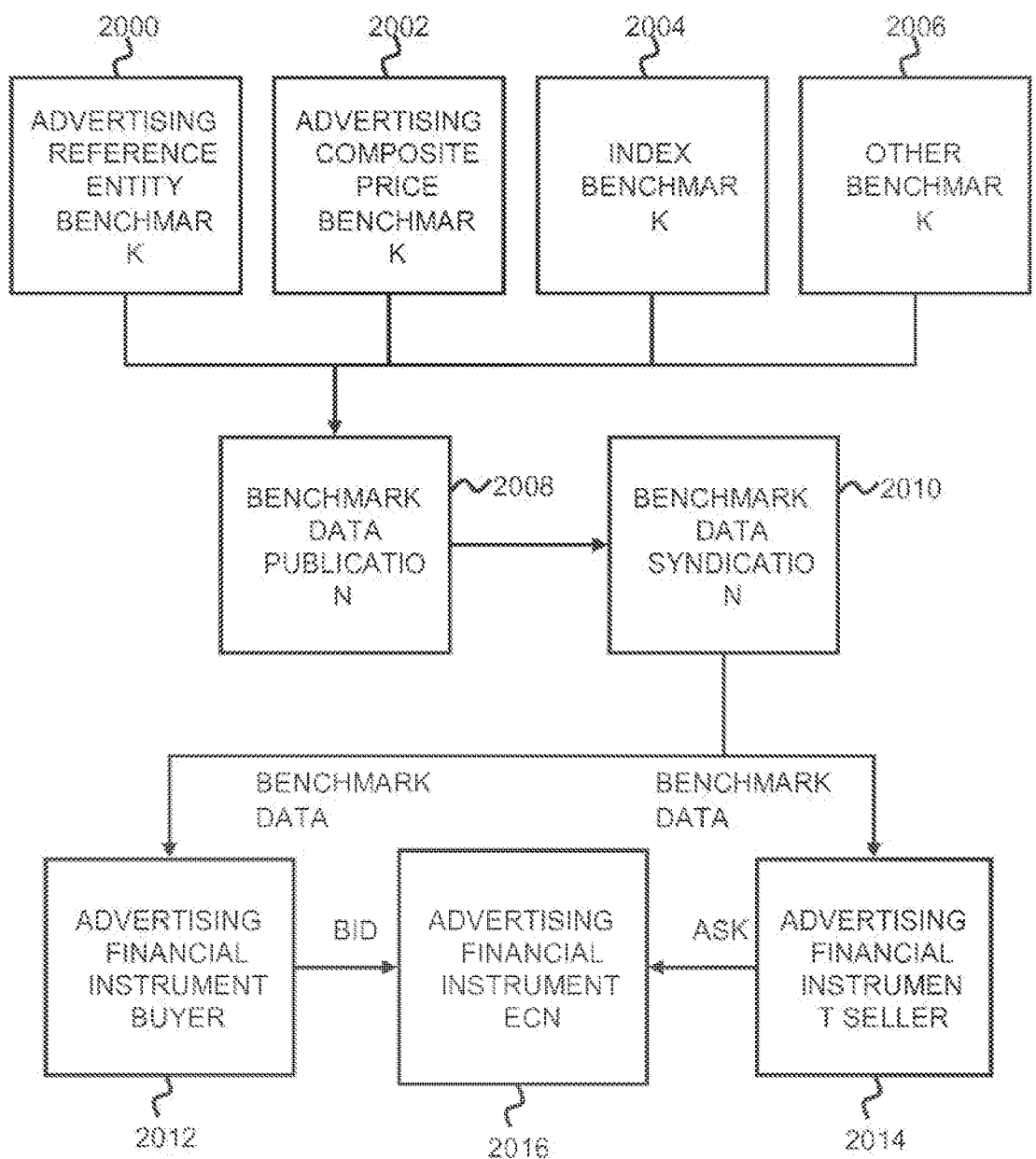
FIG. 20 is a process flow diagram of a method for generating and trading financial instruments.

FIG. 20 illustrates a process for generating and trading financial instruments. Origination of the advertising financial instrument is made possible by providing advertising benchmarks 2000-2006. Advertising benchmarks may include advertising reference entity benchmarks 2000, advertising composite price benchmarks 2002, index benchmarks 2004, and other benchmarks 2006. Such benchmarks may be generated using the methods described above with reference to FIGS. 6 and 15. Such benchmarks may be published 2008 and syndicated 2010 to provide market participants with easy access to the benchmark information. Participants may include advertising financial instrument buyers 2012 and advertising financial instrument sellers 2014. If both participants in a bid and ask auction have access to the same benchmark data then an orderly marketplace can be afforded by matching bid and ask prices, such as in an advertising financial instrument electronic communications network (ECN) 2016.

Figure 21:
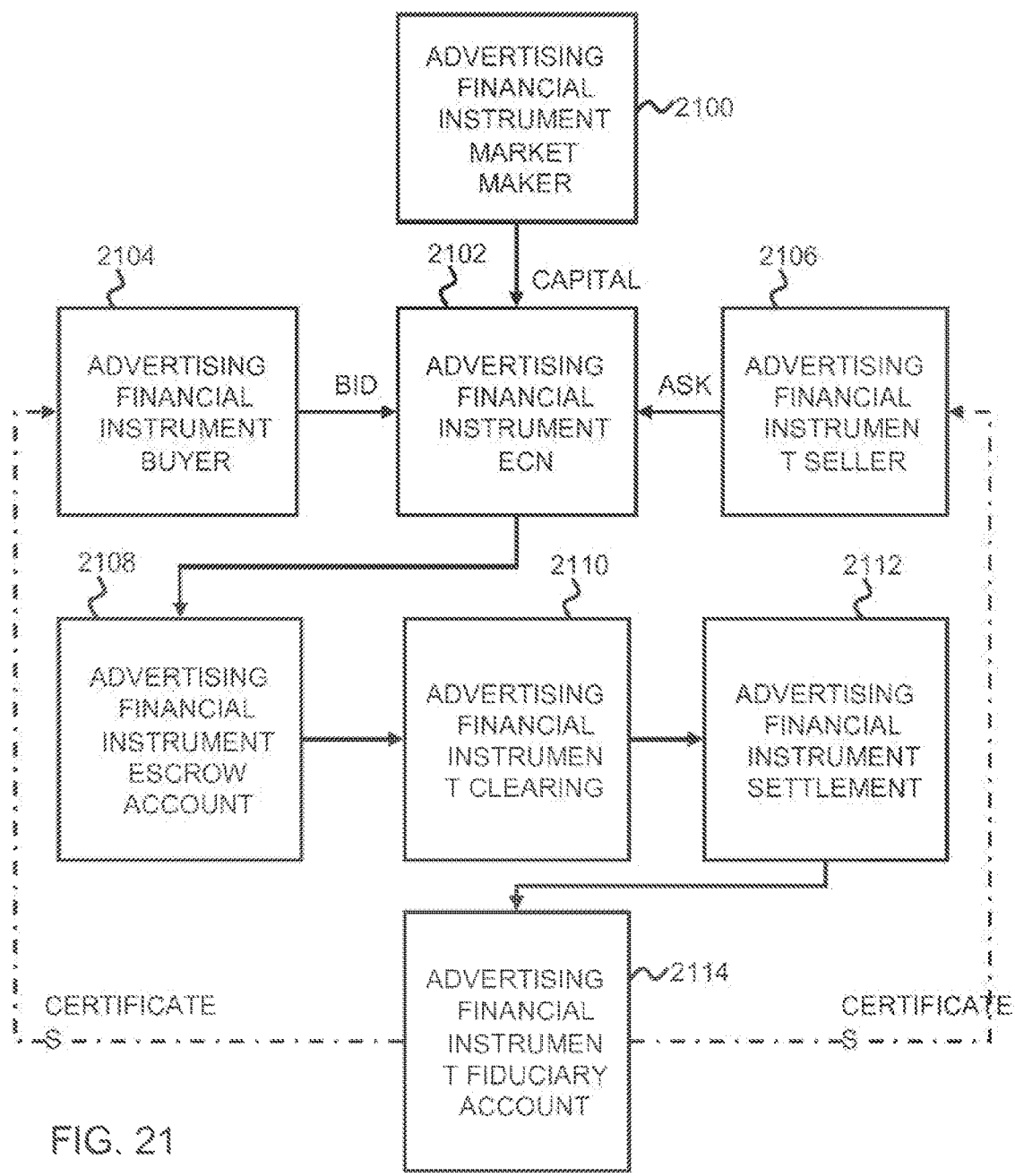
FIG. 21 illustrates components and interrelationships of an advertising financial instrument market built around an advertising financial instrument electronic communications network.

FIG. 21 illustrates the components and interrelationships of an advertising financial instrument market built around an advertising financial instrument electronic communications network (ECN) 2102. Such an exchange platform may automatically list, sort, filter, batch and confirm best bids and offers for standardized advertising financial instruments and derivative instruments. The platform may use automatic listing and matching algorithms to match best bids and offers, route instruments, account for transfers of funds, clear and settle instruments and perform other processes required in an orderly marketplace. The electronic communications network may include an advertising financial instrument market maker 2100 which may provide capital to facilitate an advertising financial instrument transaction between a buyer 2104 and the seller 2106. When the financial instrument is bought and sold, the buyer's funds or promissory note and the financial instrument may be recorded or otherwise maintained in an advertising financial instrument escrow account 2108 until the financial instrument transaction is cleared, step 2110, and the transaction settled, step 2112. A cleared transaction may be processed and stored in an advertising financial instrument fiduciary account 2114 which may transmit certificates associated with the transaction to the buyer 2104 and seller 2106.

The electronic communications network may be open to qualified members of the market and includes secure data communications between qualified principal, non-principal and other market participants. The electronic communications network may enable the market parties to exchange and view advertising financial instrument price and volume information in real-time while communicating with an advertising trade counterparty, broker or market maker 2100. For example, the electronic communication network may include secure instant messaging services on a trader desktop suite, a secure web portal, and secure electronic mail. The financial instrument electronic communication network and related systems may be the sole capture agent, archiving mechanism and publisher of price, volume and transaction data for physical and derivative advertising financial instruments. The financial instrument electronic communication network may be a platform for clearing an advertising financial instrument transaction between buyers and sellers, and serve as an advertising financial instrument Central Counterparty (CCP) for clearing advertising financial instrument trades and related obligations. The financial instrument electronic communication network may be a facility for settling advertising financial instrument exchange transactions, and may be the exclusive advertising financial instruments registry, handling certification and validation of advertising financial instrument trades and accounts, expiration dates, revenue assignment rights, account and margin balances. The advertising financial instrument electronic communication network and related systems may serve as the capture and data provisioning platform for all exchange traded and over-the-counter advertising financial instrument transactions and trades. Functions performed by the advertising financial instrument electronic communication network may include recording, archiving, indexing, making searchable, sorting and syndicating all data generated, including trading parties, counterparties, instruments, transactions, expiration dates, revenue assignment rights, physical delivery obligations, and the like.

Figure 22:
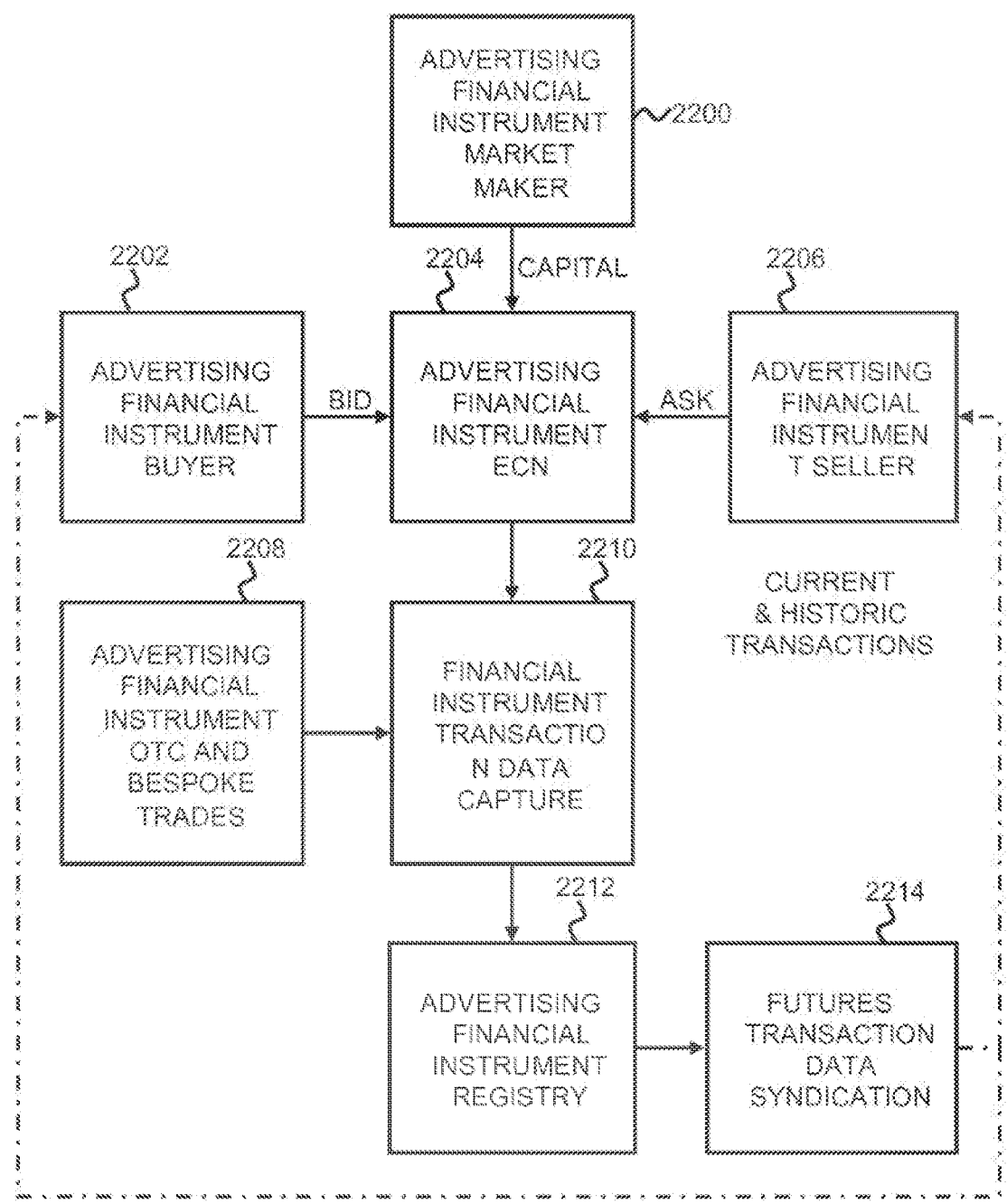
FIG. 22 illustrates market participants, components and process flow for syndication of the historic and current market data regarding advertising financial instruments.

FIG. 22 illustrates market participants, components and process flow for syndication of the historic and current market data regarding advertising financial instruments and advertising financial instrument transactions. Similar to the market structure described above with reference to FIG. 21, a market maker 2200 may provide capital to facilitate advertising financial instrument transactions between a buyer 2202 and a seller 2206 in the advertising financial instrument electronic communication network 2204. The electronic communication network may capture financial instrument transaction data, step 2210 including information provided for over-the-counter and bespoke trades of advertising financial instruments 2208. Captured financial instrument transaction data may be stored in an advertising financial instrument registry 2212 which can then be syndicated to support a futures market. Information regarding futures transaction data may be provided by syndication to buyers 2202 and sellers 2206. The advertising financial instrument electronic communication network can serve to track the attributes of a plurality of advertising transactions and provide a real-time data stream of all advertising financial market instrument transactions having a standard set of attribute values to form a composite advertising financial instrument "tape" indicator. The composite advertising financial instrument tape indicator may reflect or indicate the current status of the advertising market financial instruments with particular attributes or combinations of attributes. This real-time data stream can be syndicated. In addition to the foregoing steps, methods for syndicating financial instrument transaction market data may include providing historic advertising financial instrument transaction data according to a standard set of attributes, providing a set of data tools to analyze the historical data along multiple dimensions, composing standard and custom views of the advertising financial instrument transactions, and providing an index based on a set of advertising financial instrument transactions matching a set of attribute values. The tape indicator may synthesize all similar advertising transactions into a single, composite transaction for purposes of accurately gauging market levels. The syndication of advertising financial instrument transaction data may include: a transaction record detail at a point of time, a composite transaction record detail over a period of time; a value of the transaction at a point of time; a rate of change of the value of the transaction; a relative strength of the transaction to its historic averages; an individual transaction benchmarked to an index composed of like transaction; an individual transaction benchmarked to a composite market index; an individual transaction benchmarked to a composite media index; an individual transaction benchmarked to a composite platform index; an individual transaction benchmarked to a composite context index; an individual transaction benchmarked to a composite demographic targeting package; an individual transaction benchmarked to a composite geographic targeting package; and an individual transaction benchmarked to a composite psychographic targeting package index. Such an advertising financial instrument transaction data syndication may be based on a subscription and/or provided to a terminal on a closed network. If the syndication is via a terminal on a closed network, the syndication service or vehicle may also include a user interface along with user interface analysis tools for analyzing the syndicated and related underlying physical advertising market and historical transaction data and information.

Figure 23:
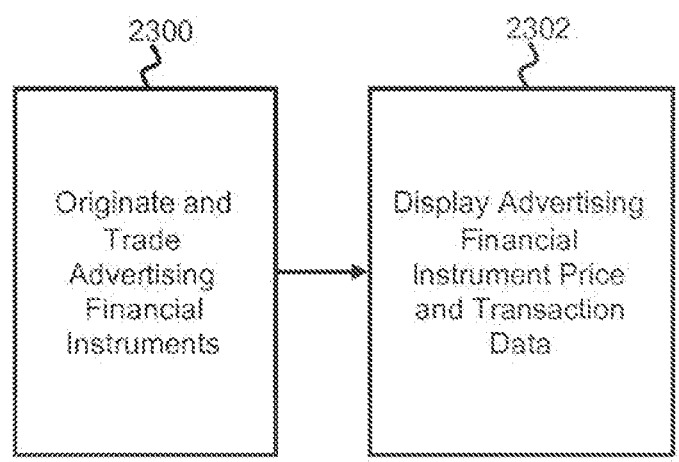
FIG. 23 is a process flow diagram of a method for generating a user interface for viewing bid and asking prices and transaction data for advertising financial instruments.
Figure 24:
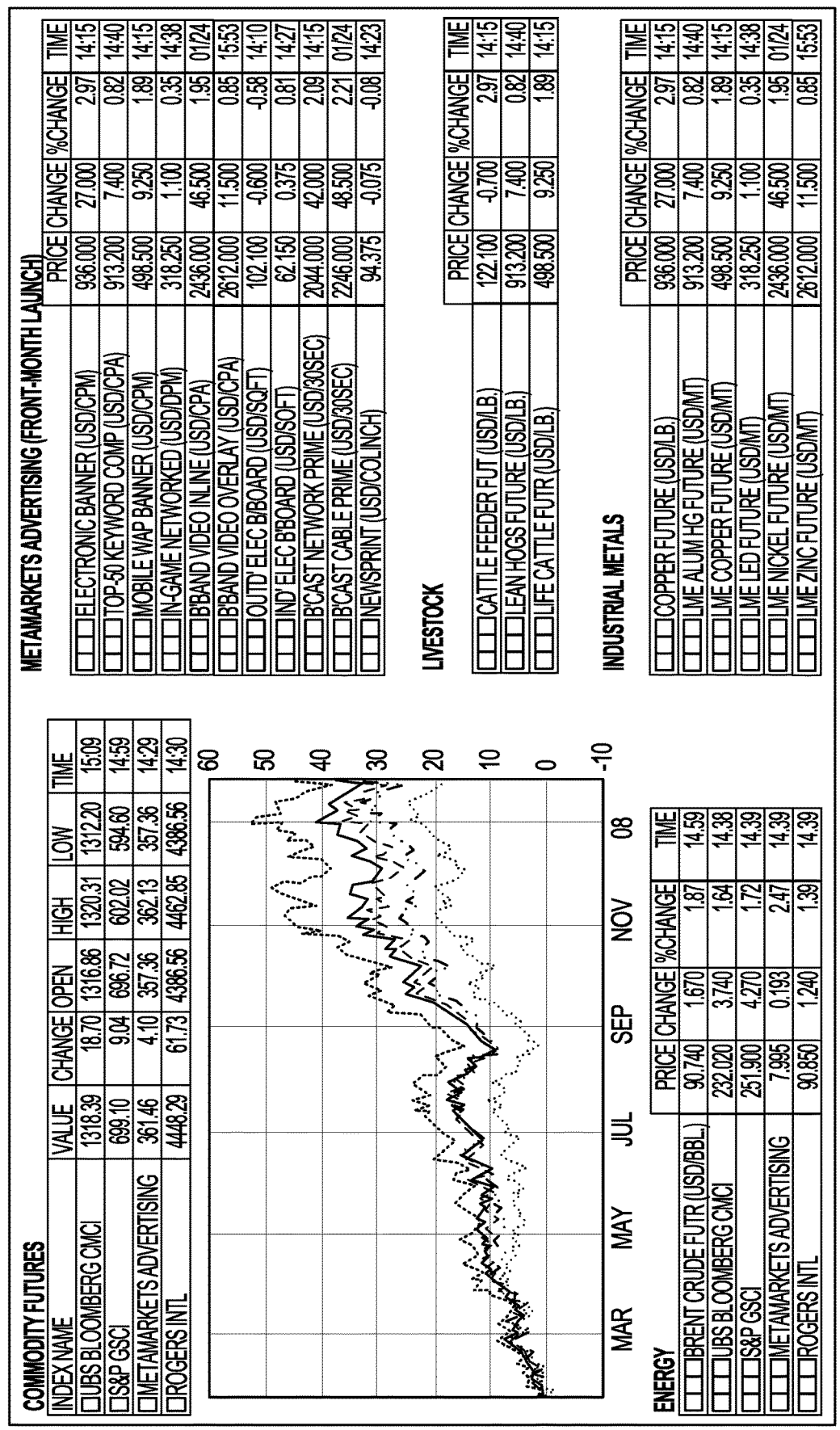

FIG. 23 illustrates a method that may be used for providing a user interface for viewing bid and ask prices and transaction data for advertising financial instruments. The processes described above with reference to FIG. 18-22 may be used to originate and trade advertising financial instruments, step 2300. The prices and related transaction data of advertising financial instrument trades and transactions may then be displayed on the user interface, step 2302, to enable a party to view bid and ask transactions for advertising financial market instruments. Example screenshots of such a user interface are presented in FIGS. 24-29. This user interface may also enable users to exchange advertising transaction financial instruments or otherwise enter into transactions regarding advertising market financial instruments with the terms of the transactions based upon a benchmark identified in the user interface display.

By generating a number of benchmark values for the various advertising products, advertising media and revenue models (among other attributes), useful market reference information can be generated. Such market information may be presented in an electronic display to provide a user interface to enable market participants to view underlying advertising reference entity composition and pricing information. An example of such displays is provided in FIG. 30. For example, a display 3000 may be provided for viewing the advertising transactions that underpin a particular benchmark, such as a benchmark for mobile WAP banner ads. Displays 3002 and 2004 illustrate user interfaces for viewing the advertising transactions under pinning benchmarks for a broadband video cash market and an electronic display cash market, respectively.

The general embodiments described above, and particularly the general embodiments described above with reference FIGS. 8-17, may be used to generate reference entities, benchmarks, market indexes and other information products useful to selected advertising transaction markets. For example, as discussed below with reference to FIGS. 31-134, selected reference entities, benchmarks, indexes and market information products may be generated for electronic display, mobile advertising, search advertising, video advertising, game advertising, public display advertising, outdoor advertising, print, radio and television advertising, direct marketing, telemarketing, and product placement advertising products.

Figure 31:
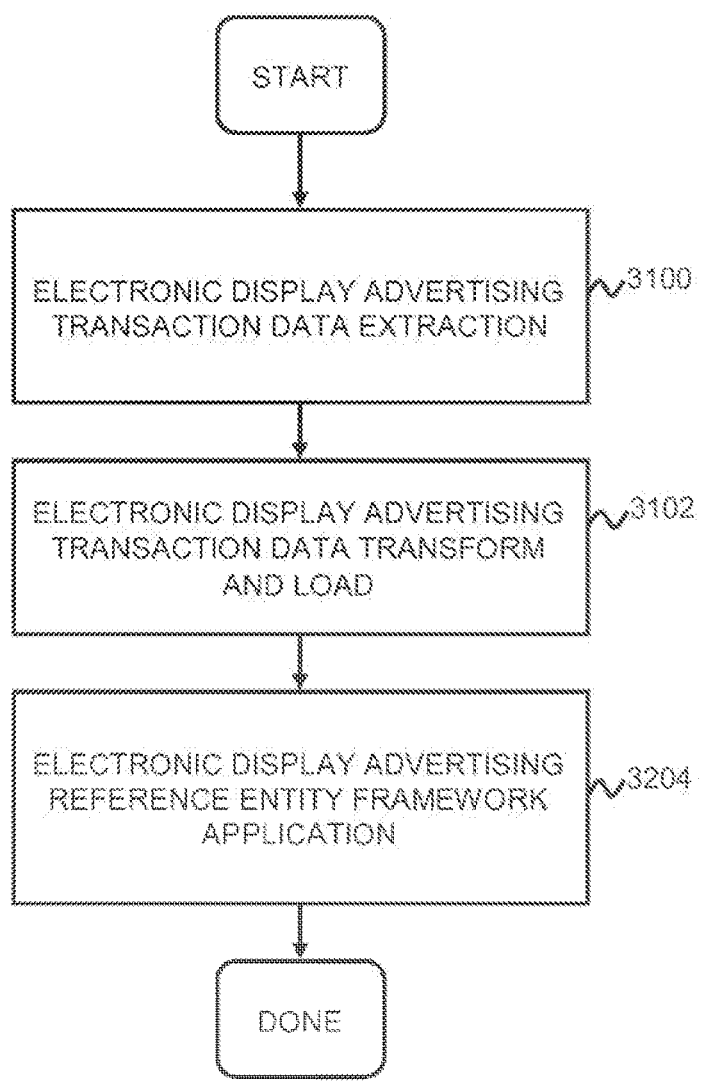
FIGS. 31-38 are process flow diagrams of methods for establishing a electronic display advertising benchmark, reference entity and composite price syndication.

FIG. 31 illustrates steps of a method for establishing an electronic display advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 3100. As part of this process, the transaction records and the database can be indexed and organized according to an attribute taxonomy to enable selected data records to be sampled and analyzed. To establish an advertising reference entity for advertising transactions matching the electronic display attribute value, a subset of advertising transaction records are selected within the database for processing, step 3102. The identified targeted attribute values may include single attributes or combinations of attributes associated with electronic display advertising transactions. The sampled advertising transaction records are then aggregated to establish an electronic display advertising reference entity value, step 3104.

Figure 32:
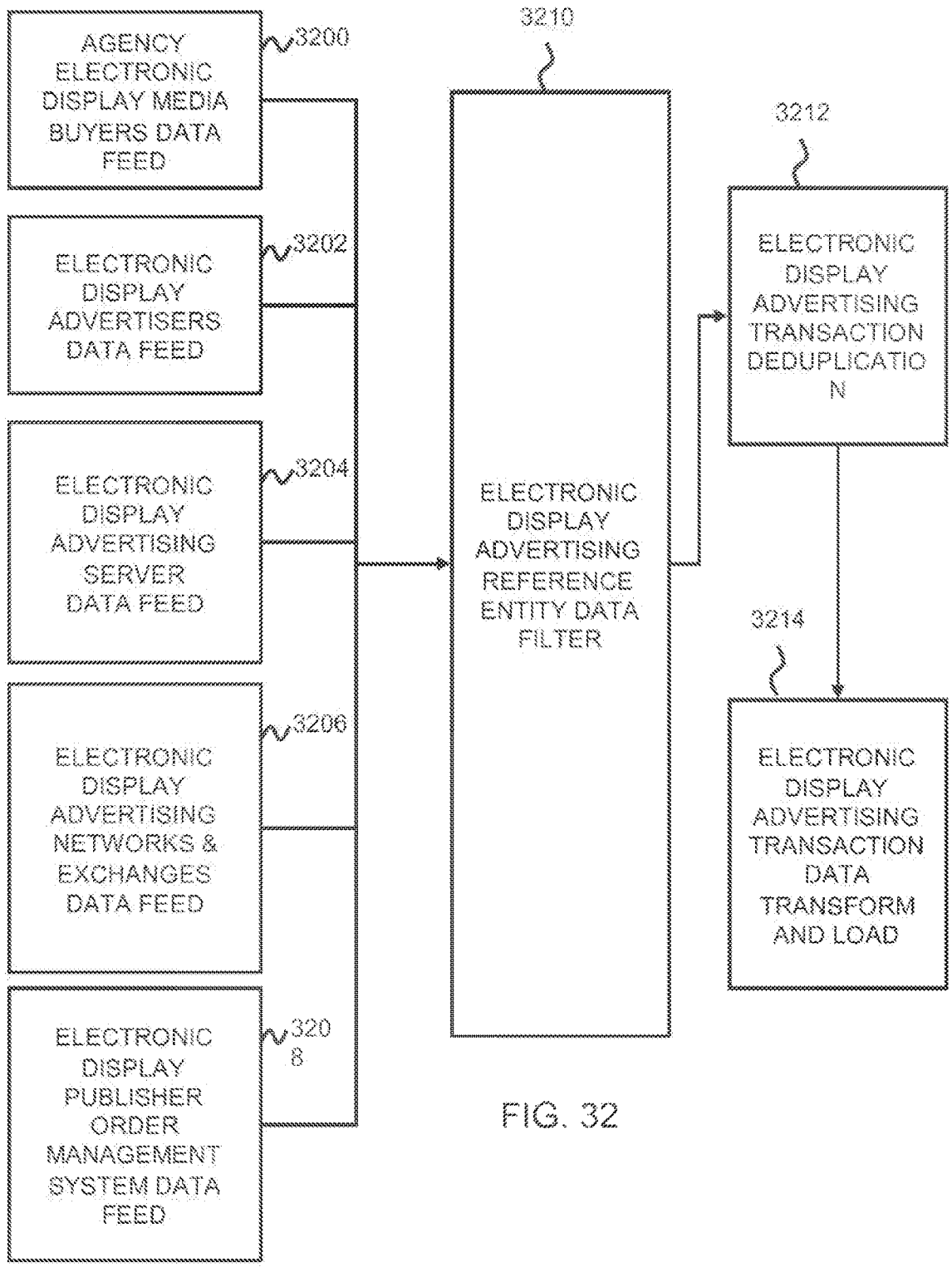

In this embodiment, advertising transaction records may be selected for an advertising transaction database by specifying "electronic display" (or a corresponding attribute ID value) as the selection value for the advertising medium attribute. Alternatively, the advertising transactions that are captured in step 3100 may be limited to transactions purchasing advertising in electronic media, such as Internet advertising, as illustrated in FIG. 32. For example, the data sources used to collect advertising transactions may be limited to agency electronics delayed media buyers data feeds 3200, electronic display advertisers data feeds 3202, electronic display advertising server data feeds 3204, electronic display advertising networks and exchanges data feeds 3206, and electronic display publisher order management system data feeds 3208. Additionally, the advertising transaction data feeds may be filtered by an electronic display advertising reference entity data filter, step 3210. As mentioned above, the electronic display advertising transaction data received from the various data feeds may be preprocessed to remove duplicate transaction records, step 3212. The preprocessed electronic display advertising transaction data may then be processed to transform attribute information into attribute tier values and data records stored in a database, step 3214.

Figure 33:
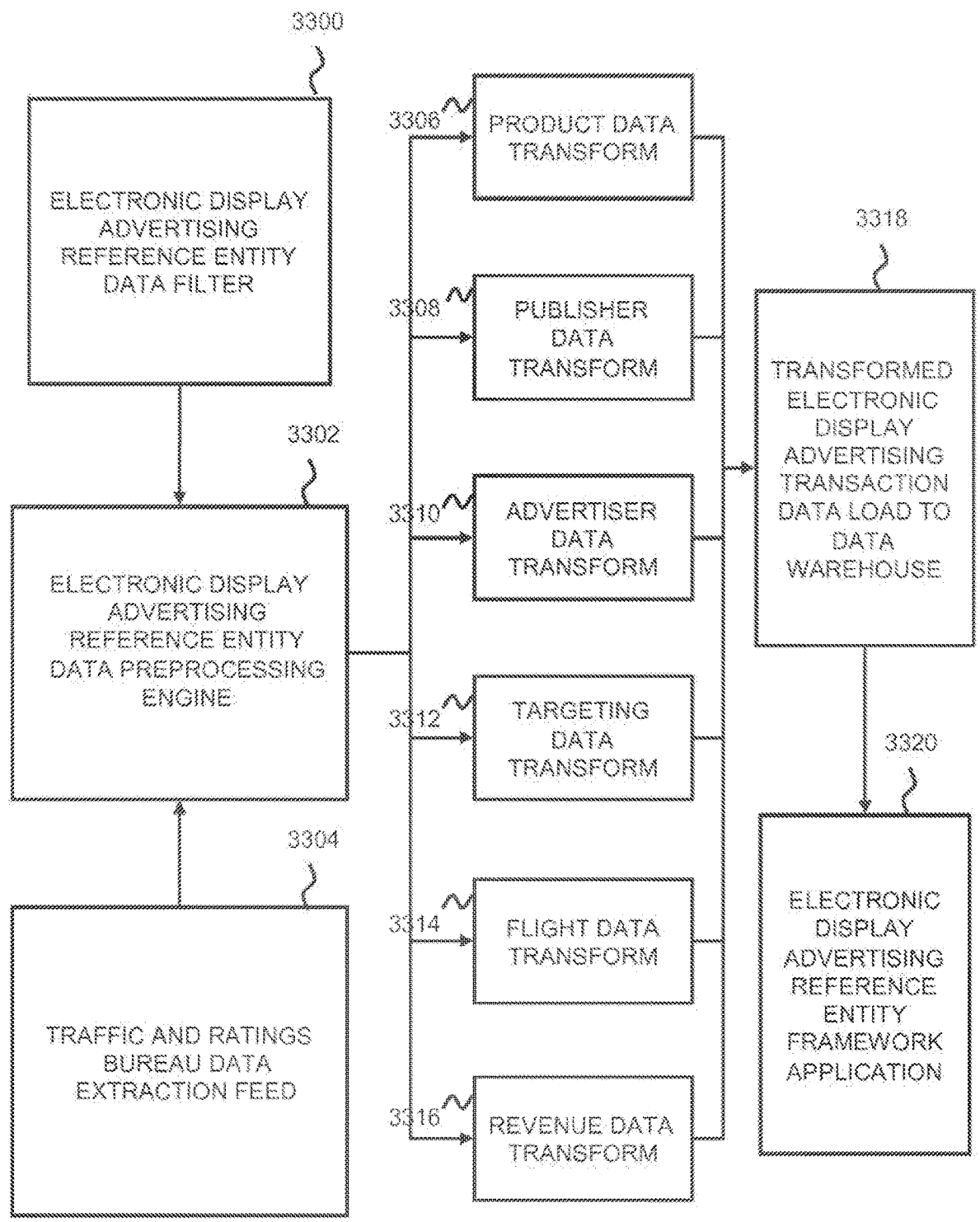

FIG. 33 illustrates in more detail steps involved in organizing electronic display advertising transaction records according to a taxonomy of electronic display advertising attributes. Advertising transaction data selected via an electronic display advertising reference entity data filter, step 3310, may be preprocessed as described above, step 3302. Information regarding Internet traffic to domain names listed in electronic display advertising transactions may be obtained from ratings bureau databases (e.g., Quantcast.com and Nielsen), websites and other such data feeds, step 3304. This data may be combined to transform the information from advertising transactions into attribute values and attribute tier values as described above with reference to FIG. 3A, 3B. For example, a product data may be transformed into a product attribute tier value, step 3306, publisher data information may be transformed into publisher tier attribute values, step 3308, advertiser information may be transformed into advertiser tier attribute values, step 3310, targeting package information may be transformed into one or more targeting attribute tier values, step 3312, flight information may be transformed into advertising product flight attribute values, and revenue information may be transformed into one or more revenue attribute tier values, step 3316. The transformed electronic display advertising transaction attribute values may then be stored in a database or data warehouse, step 3318. The data stored in a database may then be used to determine the electronic display advertising reference entity value, step 3320.

Figure 34:
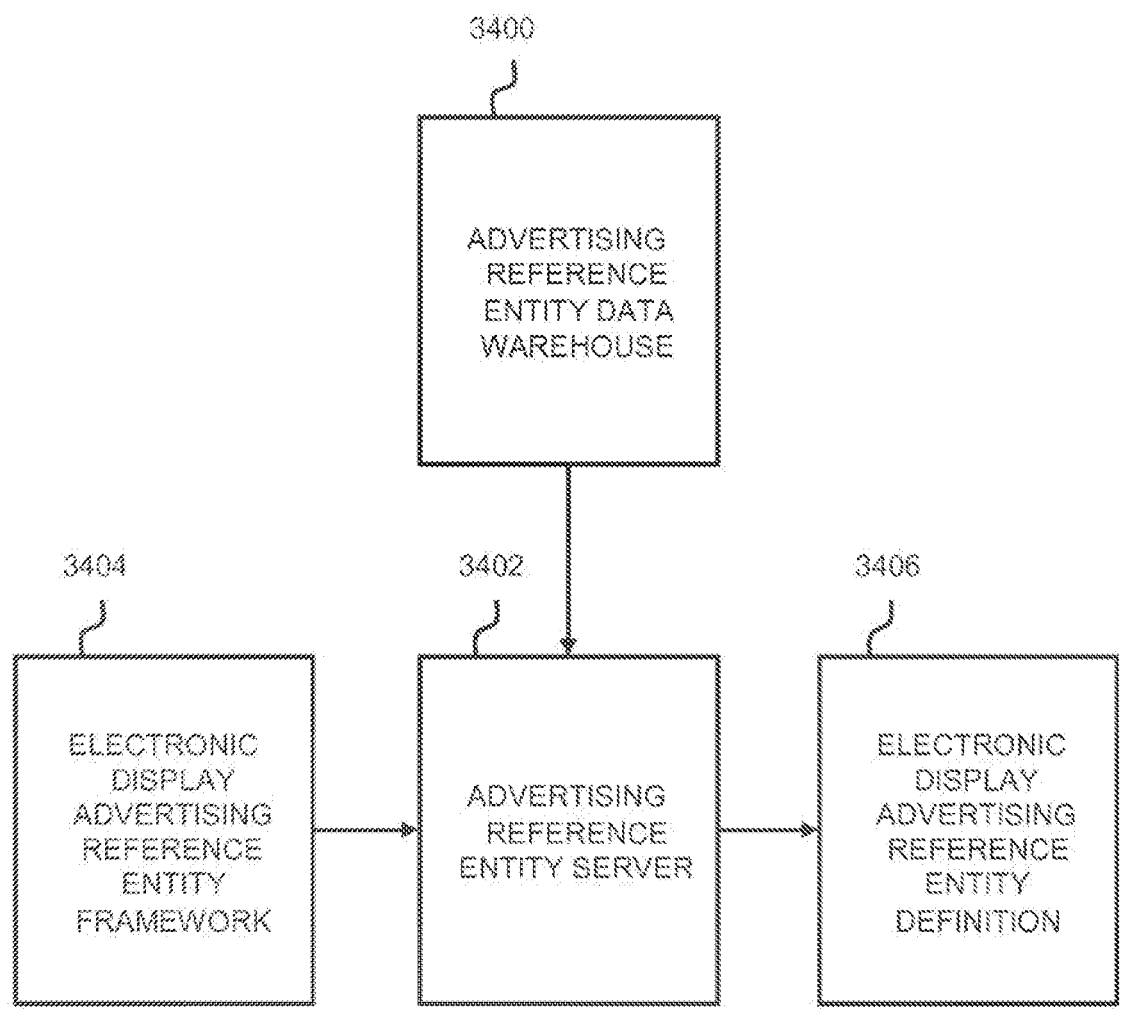

In an embodiment illustrated in FIG. 34, an electronic display advertising reference entity framework 3402 may be applied as an automated filter to the eligible pool of archived electronic display advertising transactions stored in a data warehouse 3400. In this process, an advertising reference entity server 3404 may use the electronic display advertising reference entity framework 3402 as a filter or search framework for drawing archived electronic display advertising transactions from the data warehouse 3400. The advertising reference entity server 3404 may then use the sampled transaction data in order to synthesize an electronic display advertising reference entity 3406. The process of synthesizing the electronic display reference entity may involve calculating the indexed reference entity value of the transactions sampled on the basis of the defined attribute values contained in the electronic display reference entity framework 3402. For example, the indexed value may include a gross transaction size, a gross revenue index, a net revenue index, and an effective unit revenue index.

Figure 35:
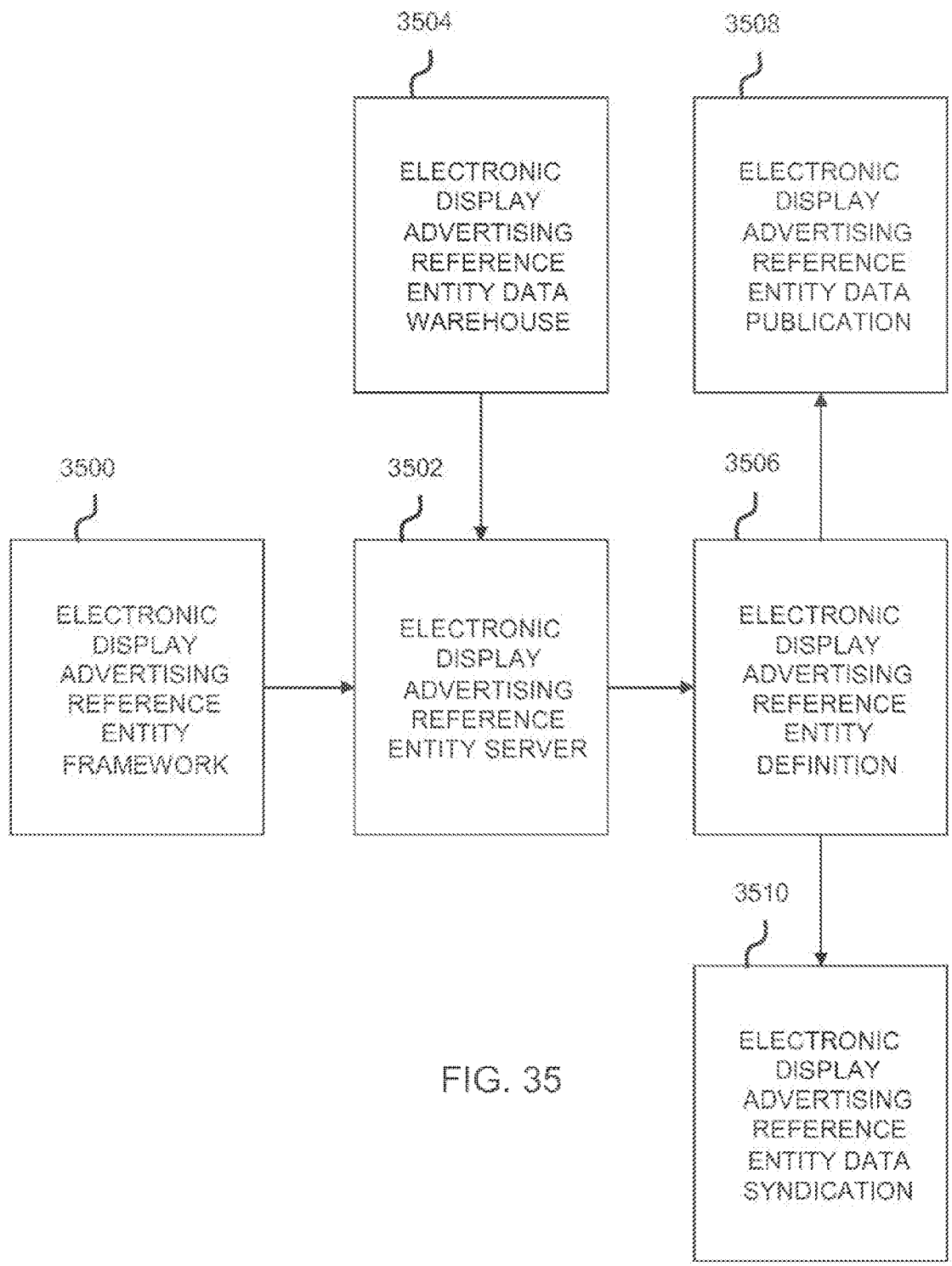

FIG. 35 illustrates a method in which an electronic display advertising reference entity is used as an electronic display advertising market benchmark. In this embodiment, an electronic display advertising reference entity framework 3500 is used by an electronic display advertising reference entity server 3502 to selectively sample electronic advertising transaction records stored within a data warehouse 3504. The electronic display advertising reference entity server 3502 uses the sampled transaction data to define an electronic display advertising reference entity 3506. This reference entity is then published as an electronic display advertising reference entity data publication 3508. The reference entity definition may also be used to generate an electronic display advertising reference entity data syndication 3510. In this embodiment, the value of the electronic display advertising reference entity may be defined following a consistently defined and executed advertising reference entity definition process with the results published and syndicated.

Figure 36:
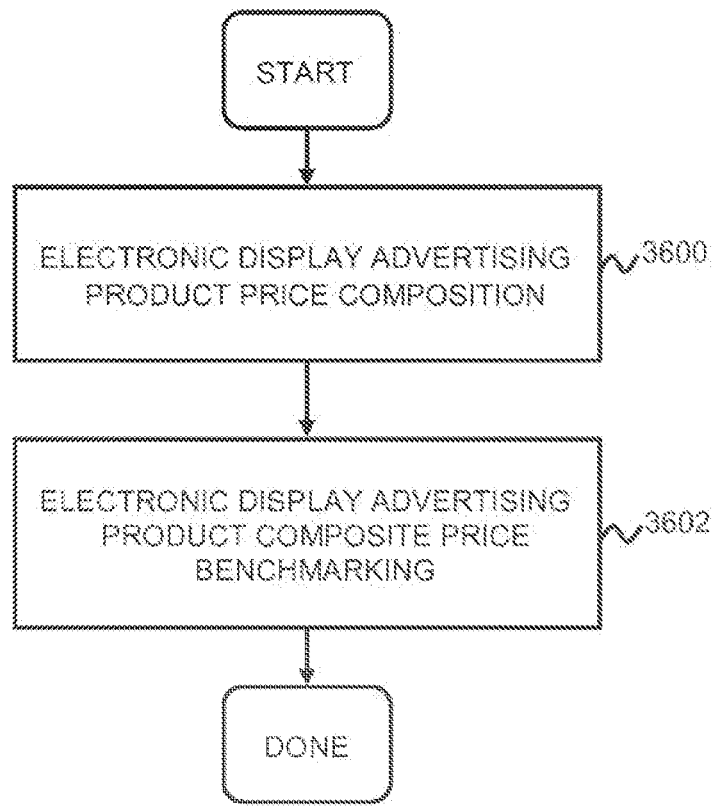

FIG. 36 illustrates a method for using a single electronic display advertising product composite price as an electronic display advertising product composite price benchmark. In this process, electronic display attribute values which define a particular type of electronic display advertising product are used to sample an advertising transaction data warehouse to extract advertising transaction records associated with a type of advertising product over a period of time, with that data used to determine an advertising composite price, step 3600. This establishes an electronic display advertising product composite price within the identified sample transaction time frame. The electronic display advertising product composite price may then be published to the marketplace on a timely and consistent basis with the publication syndicated, thereby establishing the electronic display advertising product composite price as an electronic display advertising composite price benchmark for subsequent transactions and operations, step 3602.

Figure 37:
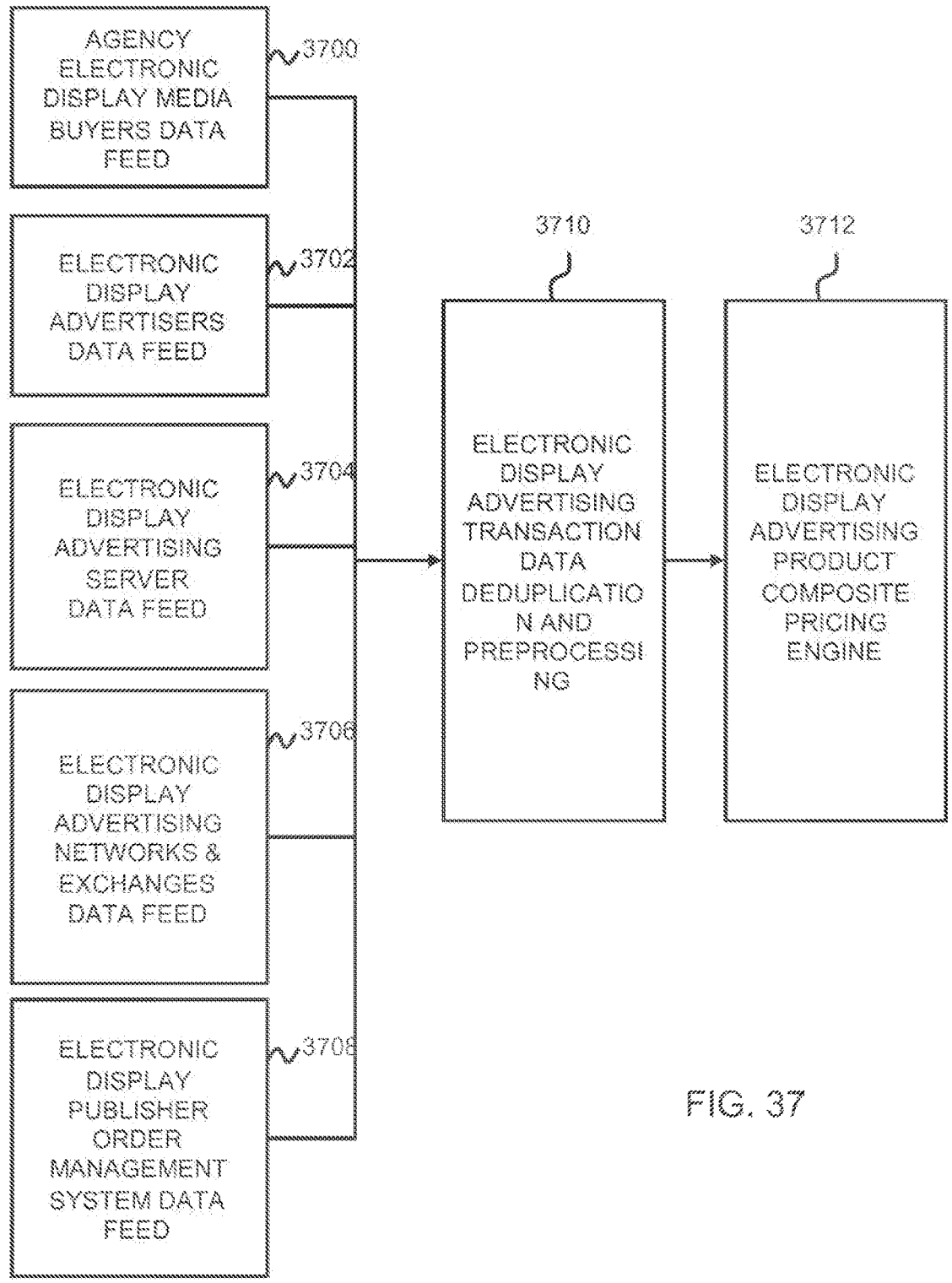

FIG. 37 illustrates a system network for identifying a set of electronic display advertising transactions to be extracted, transformed and used to define an electronic display advertising product composite price. Raw electronic display advertising transaction data may be obtained from a variety of sources including, for example, agency electronic display advertising buyer data feeds 3700, electronic display advertiser data feeds 3702, electronic display advertising server data feeds 3704, electronic display advertising networks and exchange data feeds 3706, and electronic display publisher order management system data feeds 3708. The raw electronic display advertising transaction data may be preprocessed to remove duplicates and otherwise transform attribute values into attribute tier values, step 3710, with the resulting data provided to an electronic display advertising product composite pricing engine 3712. The electronic display advertising product composite price engine may include a volume-weighted composite price for sampled electronic display advertising products of the identified attribute values conducted within an identify transaction time frame.

Figure 38:
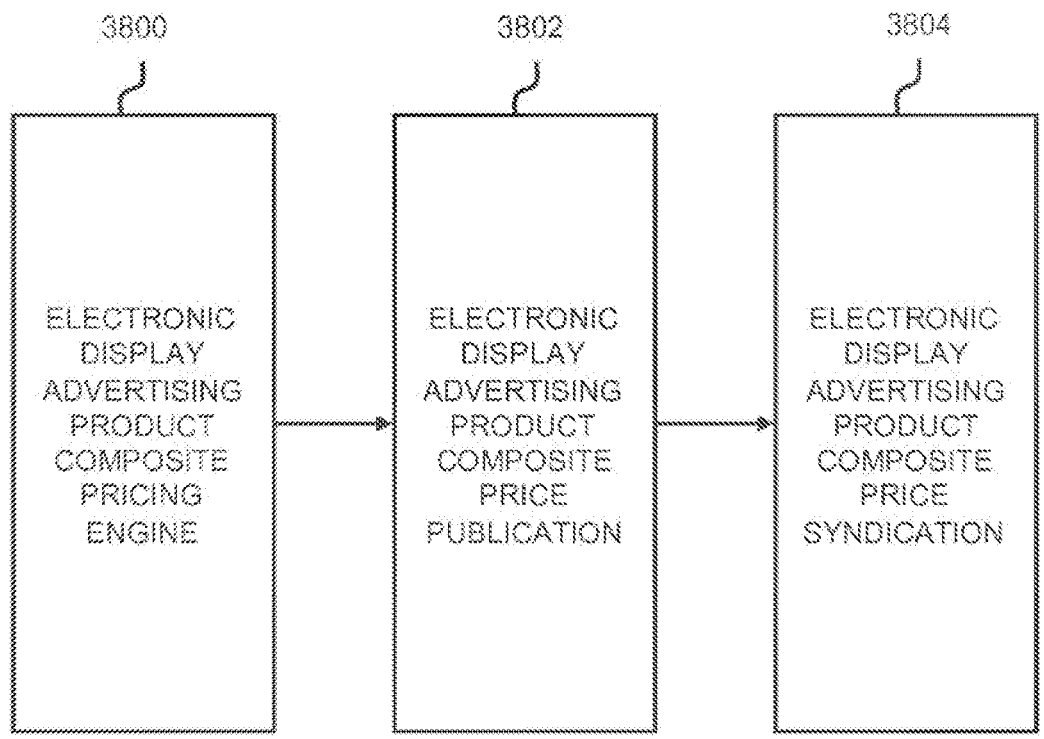

As illustrated in FIG. 38, the output from the electronic display advertising product composite pricing engine, step 3800, may be published as an electronic display advertising product composite price publication, step 3802, and syndicated as an electronic display advertising product composite price syndication, step 3804. The publication and syndication of the electronic display advertising product composite price may be accomplished via a variety of publication and communication mechanisms. The electronic display advertising product composite price may also be published in syndicated via closed, open and public networks as well as communications among market participants. Additionally, the electronic display advertising product composite price may be archived using any known archival methods and storage devices.

Figure 39:
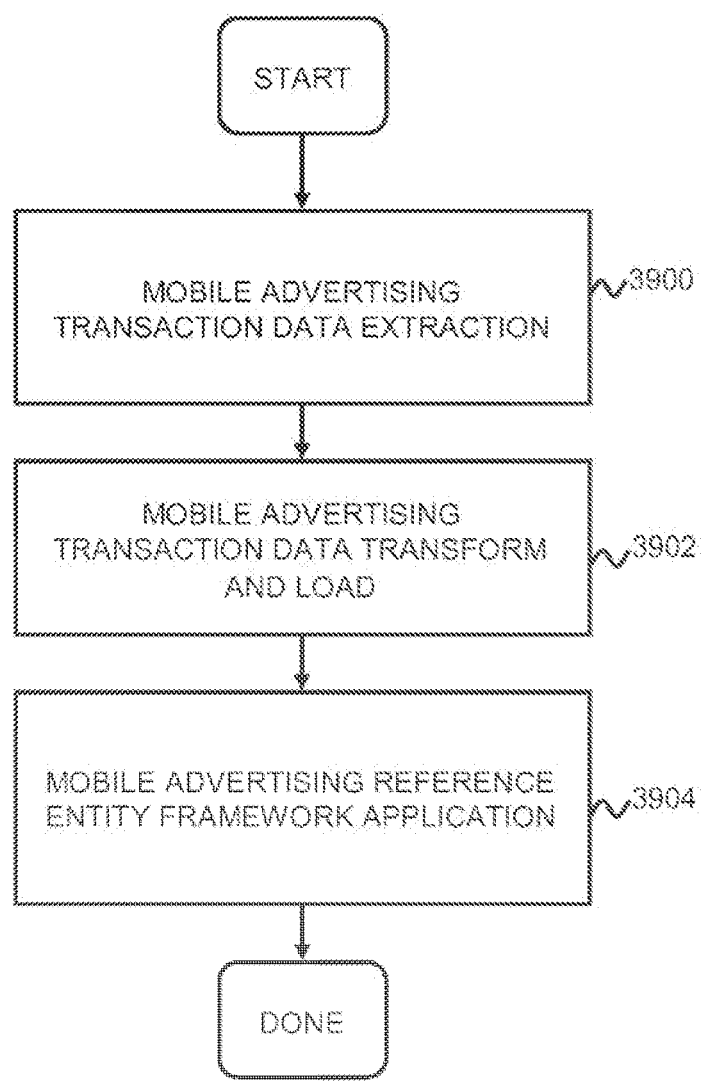
FIGS. 39-46 are process flow diagrams of methods for establishing a mobile advertising benchmark, reference entity and composite price syndication.

FIG. 39 illustrates steps of a method for establishing a mobile advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 3900. As part of this process, the transaction records and the database can be indexed and organized according to an attribute taxonomy to enable selected data records to be sampled and analyzed. To establish an advertising reference entity for advertising transactions matching the mobile attribute value, a subset of advertising transaction records are selected within the database for processing, step 3902. The identified targeted attribute values may include single attributes or combinations of attributes associated with mobile advertising transactions. The sampled advertising transaction records are then aggregated to establish a mobile advertising reference entity value, step 3904.

Figure 40:
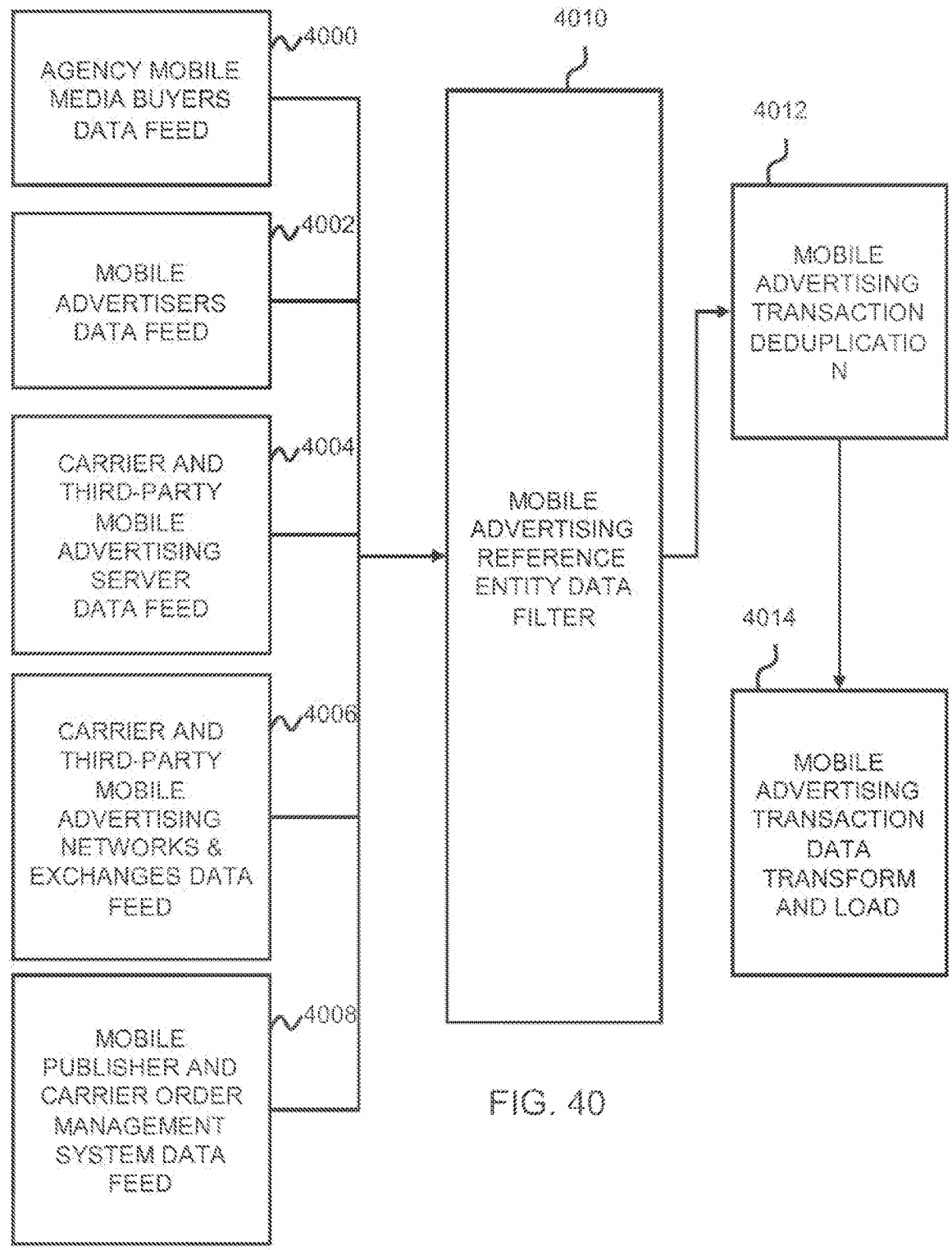

In this embodiment, advertising transaction records may be selected for an advertising transaction database by specifying "mobile" (or a corresponding attribute ID value) as the selection value for the advertising medium attribute. Alternatively, the advertising transactions that are captured in step 3900 may be limited to transactions purchasing advertising in mobile media, as illustrated in FIG. 40. For example, the data sources used to collect advertising transactions may be limited to agency electronics delayed media buyers data feeds 4000, mobile advertisers data feeds 4002, mobile advertising server data feeds 4004, mobile advertising networks and exchanges data feeds 4006, and mobile publisher order management system data feeds 4008. Additionally, the advertising transaction data feeds may be filtered by a mobile advertising reference entity data filter, step 4010. As mentioned above, the mobile advertising transaction data received from the various data feeds may be preprocessed to remove duplicate transaction records, step 4012. The preprocessed mobile advertising transaction data may then be processed to transform attribute information into attribute tier values and data records stored in a database, step 4014.

In selecting mobile advertising transactions, advertising transaction records may be selected based upon an advertising media platform having a mobile advertising value. Examples of mobile advertising attribute values include a digital medium, an analog medium, an internet-enabled medium, a wireless medium, a social medium, a satellite-based medium, a print medium, a broadcast medium, a networked medium, a telephonic medium, a telepathic medium, a brainwave medium, a recorded medium, a live medium, an electronic display medium, an internet-enabled display medium, an internet-enabled rich media display medium, an internet-enabled text medium, an internet-enabled video medium, a social medium, an internet-enabled social medium, a mobile display medium, a mobile text medium, a mobile location based medium, a mobile video medium, a mobile social medium, an internet-enabled search medium, a mobile search medium, a video search medium, a video medium, a broadband video medium, an internet protocol enabled broadband video medium, a closed circuit video medium, a network served video medium, a satellite-based video medium, an electronic game medium, an internet-enabled game medium, a console game medium, a downloadable game medium, a massively-multiplayer game medium, a public display medium, an outdoor advertising medium, a radio medium, an Internet Protocol radio medium, a satellite-broadcast radio medium, a television medium, broadcast television medium, a spot television medium, a cable television medium, a digitally recorded television medium, and an Internet Protocol Television (IPTV) broadcast medium.

Figure 41:
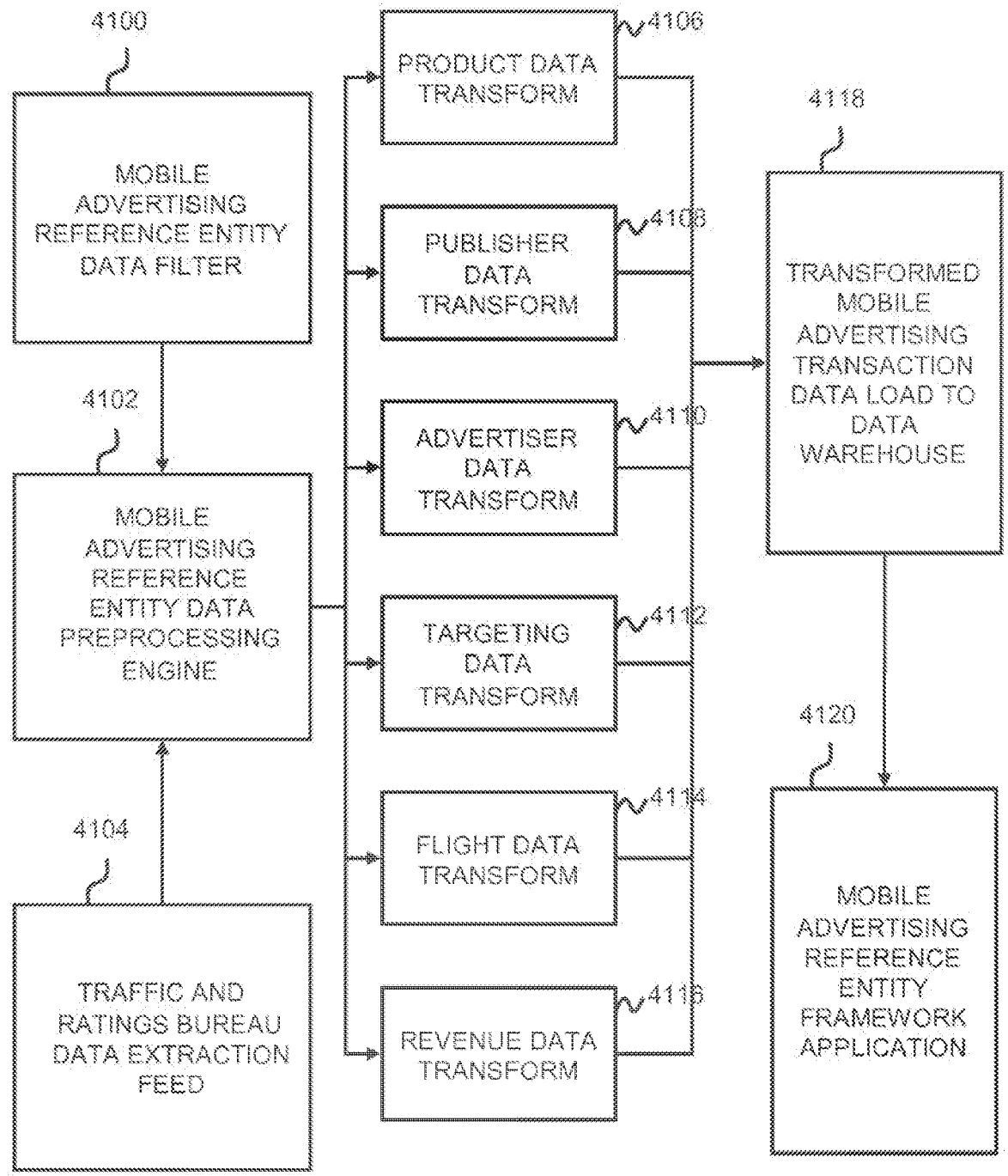

FIG. 41 illustrates in more detail steps involved in organizing mobile advertising transaction records according to a taxonomy of mobile advertising attributes. Advertising transaction data selected via a mobile advertising reference entity data filter, step 4110, may be preprocessed as described above, step 4102. Information regarding viewings of mobile advertising transactions may be obtained from ratings bureau databases (e.g., Quantcast.com and Nielsen), websites and other such data feeds, step 4104. This data may be combined to transform the information from advertising transactions into attribute values and attribute tier values as described above with reference to FIG. 3A, 3B. For example, a product data may be transformed into a product attribute tier value, step 4106, publisher data information may be transformed into publisher tier attribute values, step 4108, advertiser information may be transformed into advertiser tier attribute values, step 4110, targeting package information may be transformed into one or more targeting attribute tier values, step 4112, flight information may be transformed into advertising product flight attribute values, and revenue information may be transformed into one or more revenue attribute tier values, step 4116. The transformed mobile advertising transaction attribute values may then be stored in a database or data warehouse, step 4118. The data stored in a database may then be used to determine the mobile advertising reference entity value, step 4120.

Figure 42:
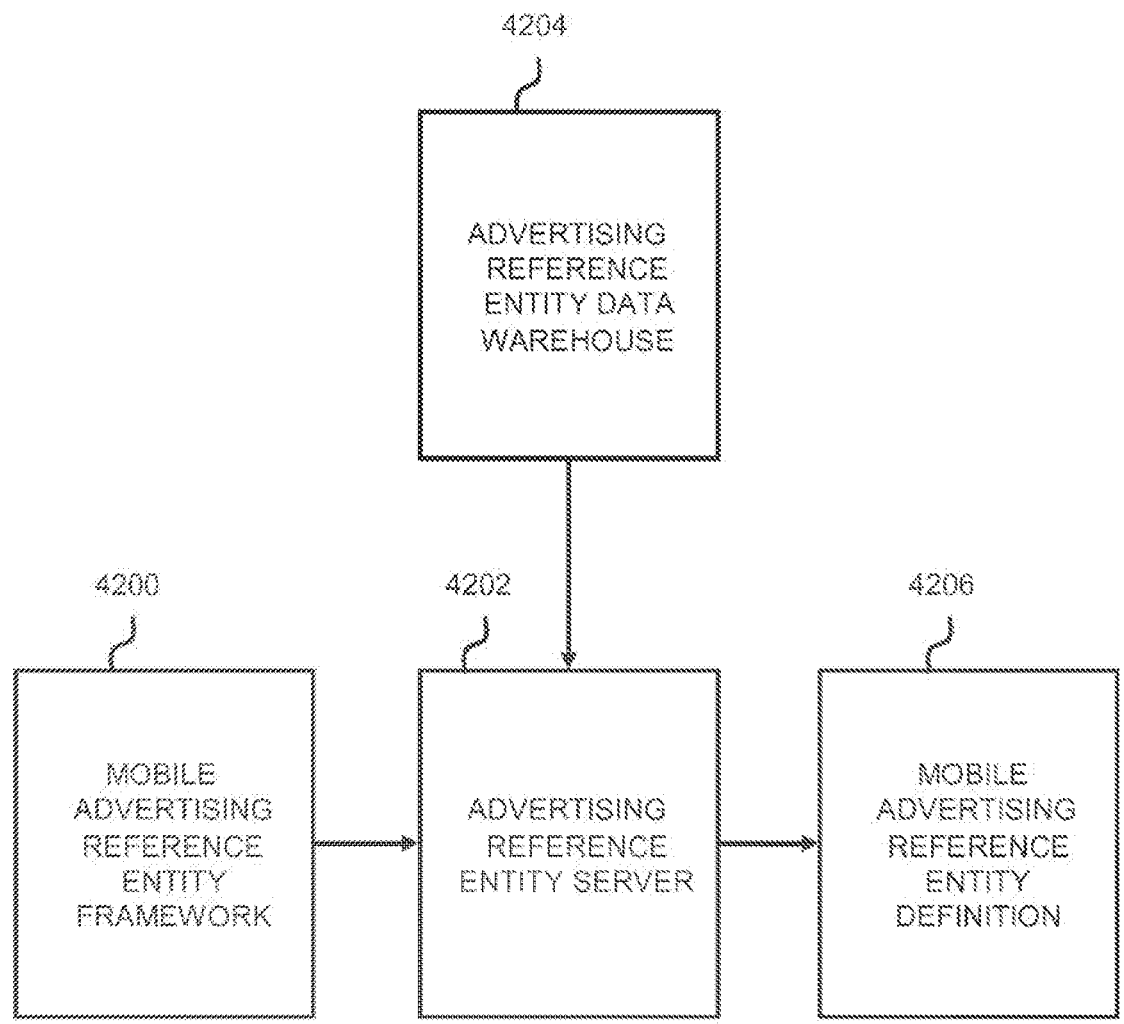

In an embodiment illustrated in FIG. 42, a mobile advertising reference entity framework 4202 may be applied as an automated filter to the eligible pool of archived mobile advertising transactions stored in a data warehouse 4200. In this process, an advertising reference entity server 4204 may use the mobile advertising reference entity framework 4202 as a filter or search framework for drawing archived mobile advertising transactions from the data warehouse 4200. The advertising reference entity server 4204 may then use the sampled transaction data in order to synthesize a mobile advertising reference entity 4206. The process of synthesizing the mobile reference entity may involve calculating the indexed reference entity value of the transactions sampled on the basis of the defined attribute values contained in the mobile reference entity framework 4202. For example, the indexed value may include a gross transaction size, a gross revenue index, a net revenue index, and an effective unit revenue index.

Figure 43:
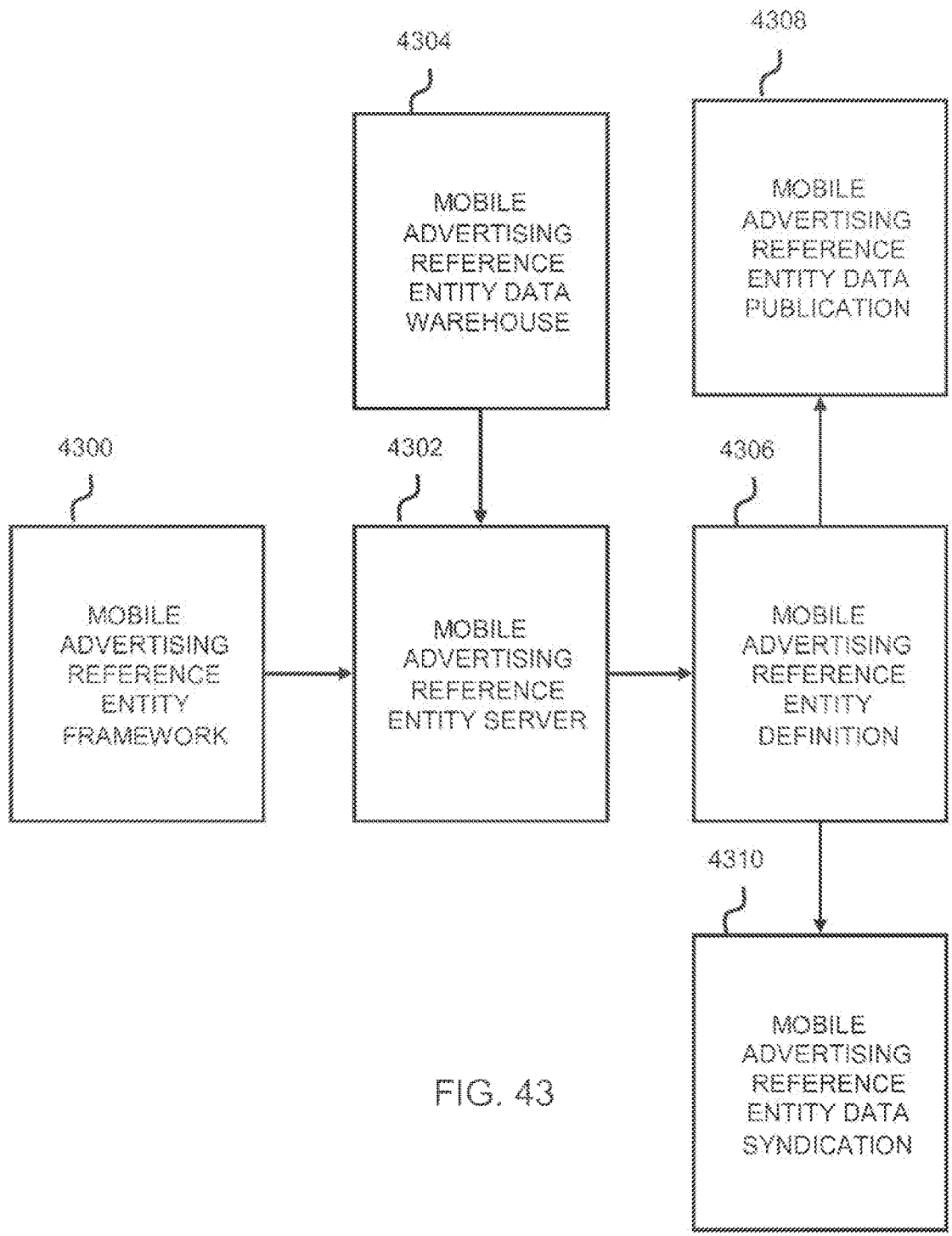

FIG. 43 illustrates a method in which a mobile advertising reference entity is used as a mobile advertising market benchmark. In this embodiment, a mobile advertising reference entity framework 4300 is used by a mobile advertising reference entity server 4302 to selectively sample electronic advertising transaction records stored within a data warehouse 4304. The mobile advertising reference entity server 4302 uses the sampled transaction data to define a mobile advertising reference entity 4306. This reference entity is then published as a mobile advertising reference entity data publication 4308. The reference entity definition may also be used to generate a mobile advertising reference entity data syndication 4310. In this embodiment, the value of the mobile advertising reference entity may be defined following a consistently defined and executed advertising reference entity definition process with the results published and syndicated.

Figure 44:
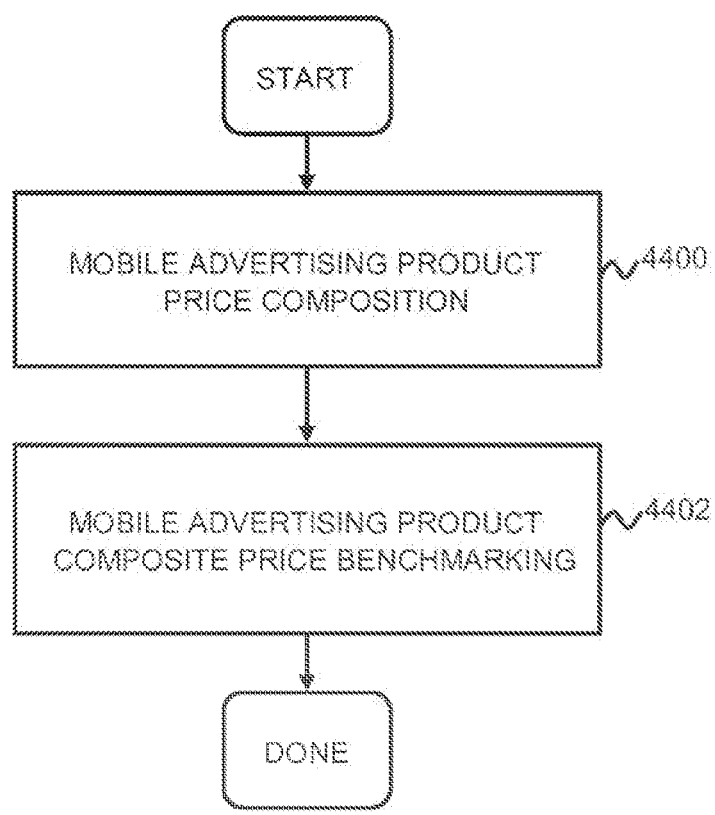

FIG. 44 illustrates a method for using a single mobile advertising product composite price as a mobile advertising product composite price benchmark. In this process, mobile attribute values which define a particular type of mobile advertising product are used to sample an advertising transaction data warehouse to extract advertising transaction records associated with a type of advertising product over a period of time, with that data used to determine an advertising composite price, step 4400. This establishes a mobile advertising product composite price within the identified sample transaction time frame. The mobile advertising product composite price may then be published to the marketplace on a timely and consistent basis with the publication syndicated, thereby establishing the mobile advertising product composite price as a mobile advertising composite price benchmark for subsequent transactions and operations, step 4402.

Figure 45:
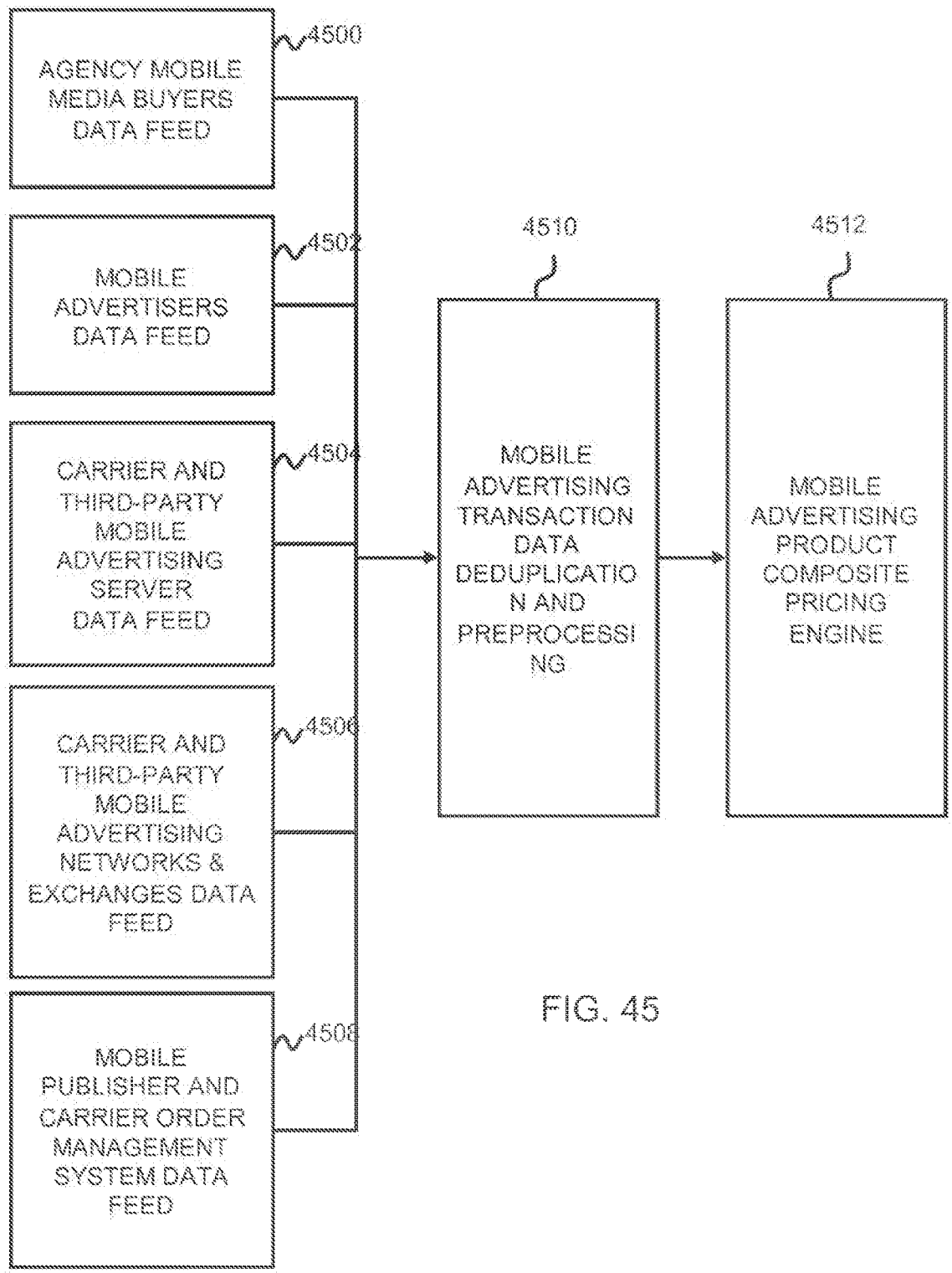

FIG. 45 illustrates a system network for identifying a set of mobile advertising transactions to be extracted, transformed and used to define a mobile advertising product composite price. Raw mobile advertising transaction data may be obtained from a variety of sources including, for example, agency mobile advertising buyer data feeds 4500, mobile advertiser data feeds 4502, mobile advertising server data feeds 4504, mobile advertising networks and exchange data feeds 4506, and mobile publisher order management system data feeds 4508. The raw mobile advertising transaction data may be pre-processed to remove duplicates and otherwise transform attribute values into attribute tier values, step 4510, with the resulting data provided to a mobile advertising product composite pricing engine 4512. The mobile advertising product composite price engine may include a volume-weighted composite price for sampled mobile advertising products of the identified attribute values conducted within an identify transaction time frame.

Figure 46:
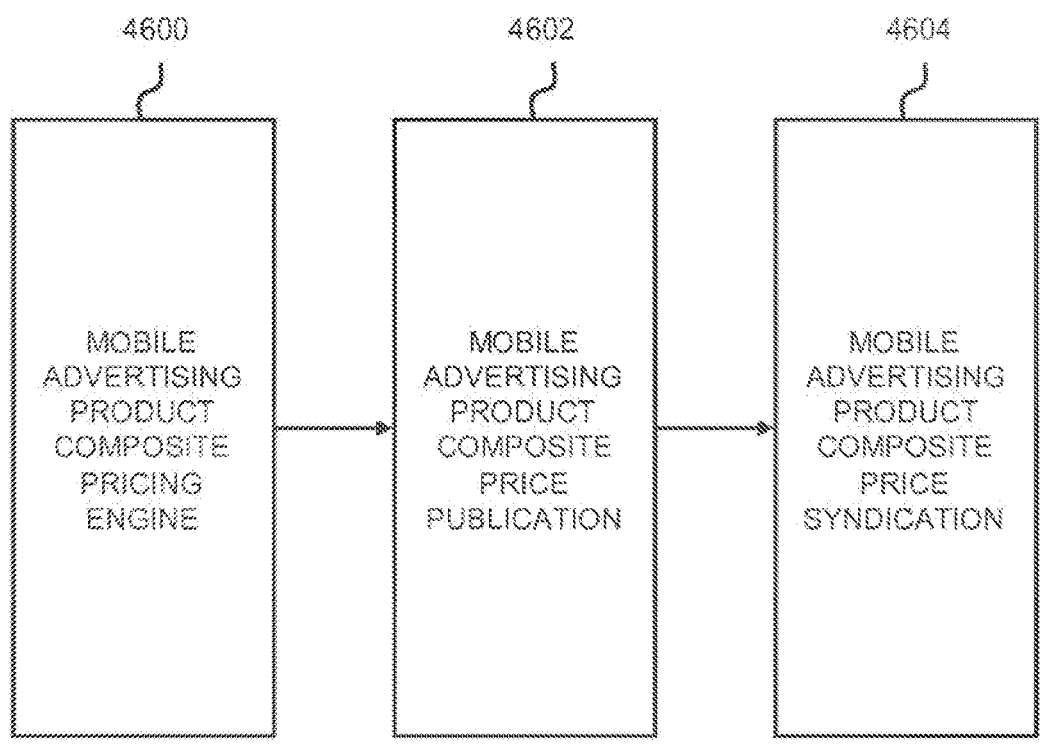

As illustrated in FIG. 46, the output from the mobile advertising product composite pricing engine, step 4600, may be published as a mobile advertising product composite price publication, step 4602, and syndicated as a mobile advertising product composite price syndication, step 4604. The publication and syndication of the mobile advertising product composite price may be accomplished via a variety of publication and communication mechanisms. The mobile advertising product composite price may also be published in syndicated via closed, open and public networks as well as communications among market participants. Additionally, the mobile advertising product composite price may be archived using any known archival methods and storage devices.

Figure 47:
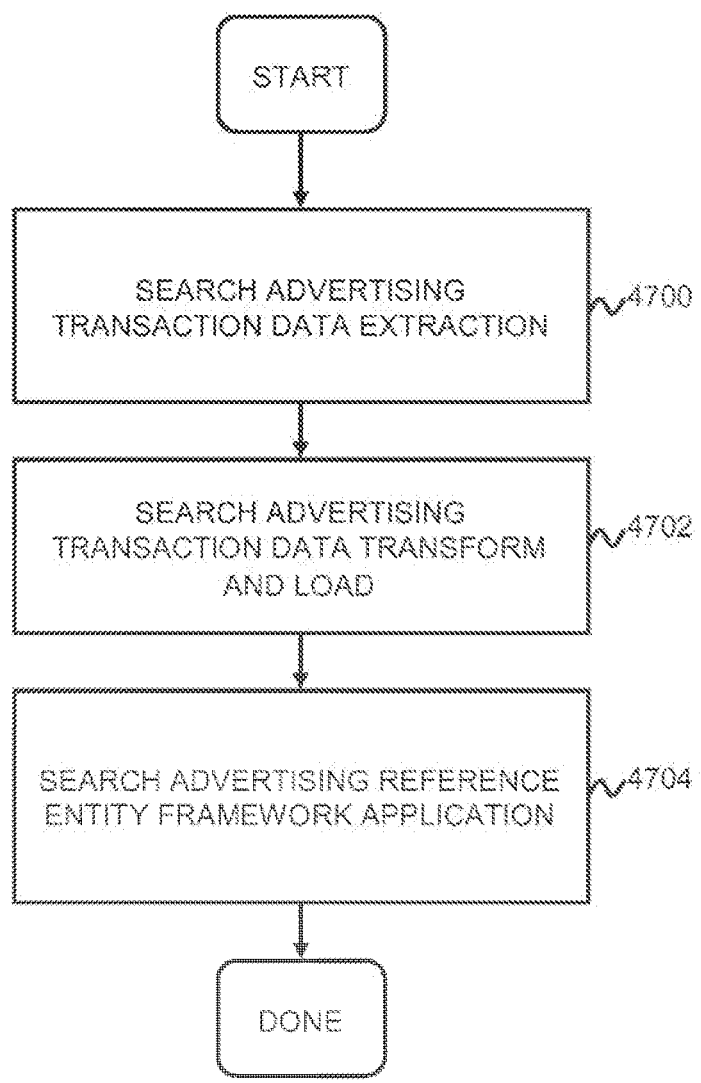
FIGS. 47-54 are process flow diagrams of methods for establishing a search advertising benchmark, reference entity and composite price syndication.

FIG. 47 illustrates steps of a method for establishing a search advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 4700. As part of this process, the transaction records and the database can be indexed and organized according to an attribute taxonomy to enable selected data records to be sampled and analyzed. To establish an advertising reference entity for advertising transactions matching the search attribute value, a subset of advertising transaction records are selected within the database for processing, step 4702. The identified targeted attribute values may include single attributes or combinations of attributes associated with search advertising transactions. The sampled advertising transaction records are then aggregated to establish a search advertising reference entity value, step 4704.

Figure 48:
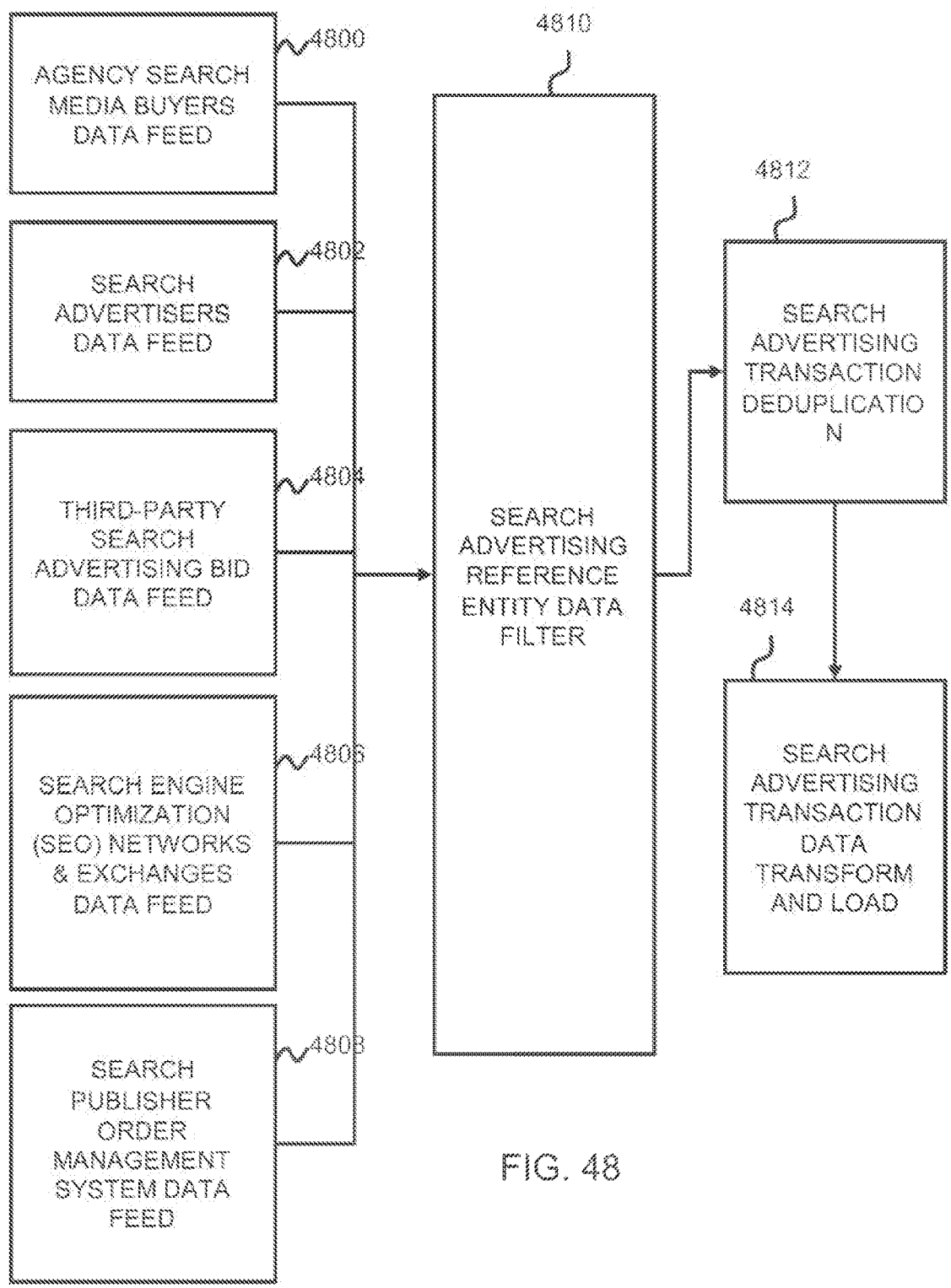

In this embodiment, advertising transaction records may be selected for an advertising transaction database by specifying "search" (or a corresponding attribute ID value) as the selection value for the advertising medium attribute. Alternatively, the advertising transactions that are captured in step 4700 may be limited to transactions purchasing advertising in search engines, such as Internet advertising, as illustrated in FIG. 48. For example, the data sources used to collect advertising transactions may be limited to agency electronics delayed media buyers data feeds 4800, search advertisers data feeds 4802, search advertising server data feeds 4804, search advertising networks and exchanges data feeds 4806, and search publisher order management system data feeds 4808. Additionally, the advertising transaction data feeds may be filtered by a search advertising reference entity data filter, step 4810. As mentioned above, the search advertising transaction data received from the various data feeds may be preprocessed to remove duplicate transaction records, step 4812. The preprocessed search advertising transaction data may then be processed to transform attribute information into attribute tier values and data records stored in a database, step 4814.

In selecting search advertising transactions, advertising transaction records may be selected based upon an advertising media platform having a search advertising value. Examples of search advertising attribute values include a keyword search platform, a location-based search platform, a mobile search platform, a video search platform, a text search platform, an image search platform, an audio search platform, a broadband video search platform, an Internet-Protocol enabled search platform, an analog search platform, a game search platform, a mobile in-vehicle network served search platform, a mobile in-elevator network served search platform, a mobile in-flight network served search platform, a radio search platform, a mobile satellite-broadcast radio platform, a mobile television platform, a mobile broadcast television platform, a mobile spot television platform, a mobile cable television platform, a mobile digitally recorded television platform, a mobile Internet Protocol Television (IPTV) broadcast platform, a mobile direct marketing platform, a mobile media insert product placement platform, a graphical search platform, a social search platform, a semantic search platform, a textual search platform, a contextual search platform, a predictive search platform, an algorithmic search platform, a Boolean search platform, a syndicated search platform, a network search platform, a branded search platform, a white label search platform, an institutional search platform, a private search platform, an educational search platform, a corporate search platform, a governmental search platform, a geographic search platform, a database search platform, a downloadable search platform, an executable search platform, a print search platform.

Figure 49:
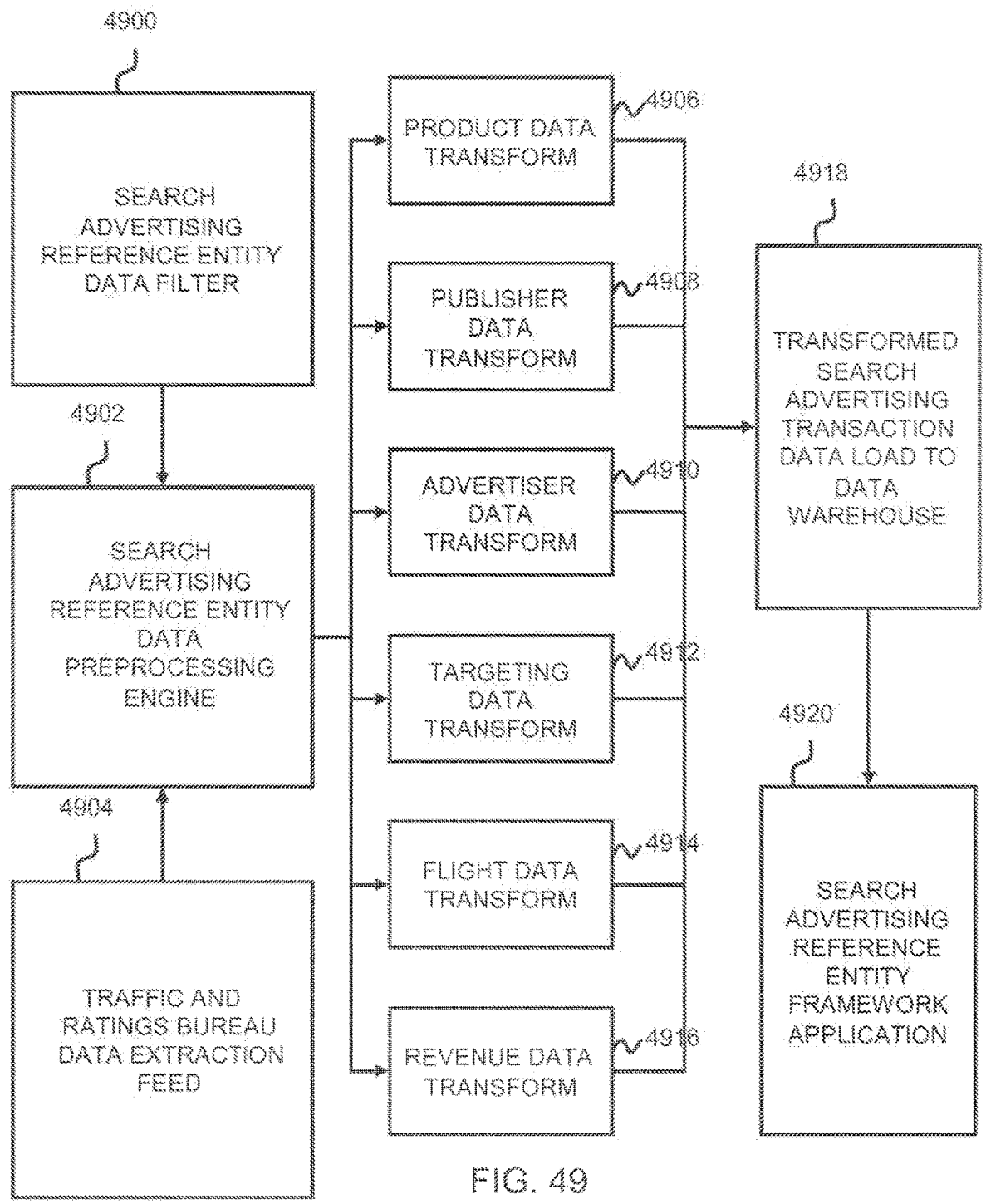

FIG. 49 illustrates in more detail steps involved in organizing search advertising transaction records according to a taxonomy of search advertising attributes. Advertising transaction data selected via a search advertising reference entity data filter, step 4910, may be preprocessed as described above, step 4902. Information regarding traffic to search engines listed in search advertising transactions may be obtained from ratings bureau databases (e.g., Quantcast.com and Nielsen), websites and other such data feeds, step 4904. This data may be combined to transform the information from advertising transactions into attribute values and attribute tier values as described above with reference to FIG. 3A, 3B. For example, a product data may be transformed into a product attribute tier value, step 4906, publisher data information may be transformed into publisher tier attribute values, step 4908, advertiser information may be transformed into advertiser tier attribute values, step 4910, targeting package information may be transformed into one or more targeting attribute tier values, step 4912, flight information may be transformed into advertising product flight attribute values, and revenue information may be transformed into one or more revenue attribute tier values, step 4916. The transformed search advertising transaction attribute values may then be stored in a database or data warehouse, step 4918. The data stored in a database may then be used to determine the search advertising reference entity value, step 4920.

Figure 50:
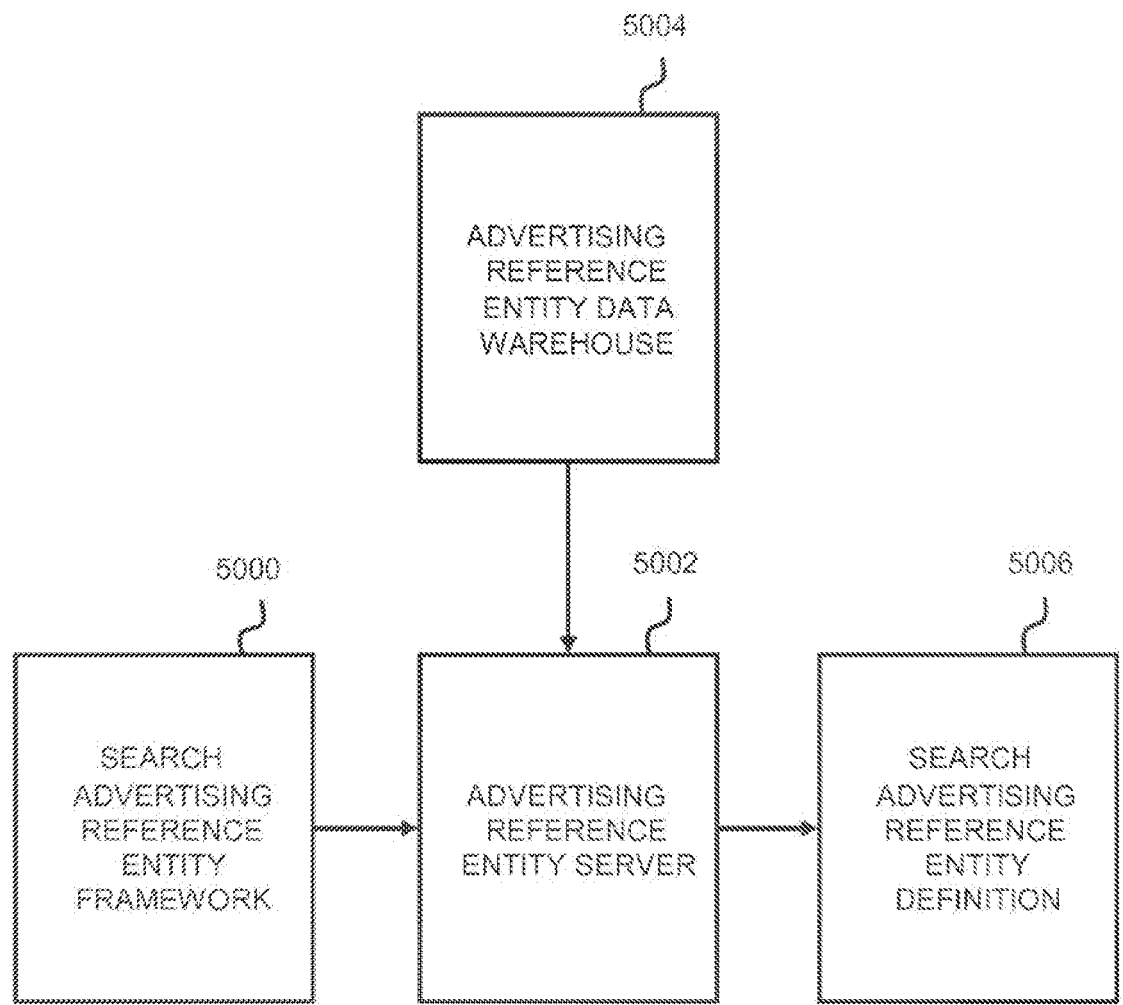

In an embodiment illustrated in FIG. 50, a search advertising reference entity framework 5002 may be applied as an automated filter to the eligible pool of archived search advertising transactions stored in a data warehouse 5000. In this process, an advertising reference entity server 5004 may use the search advertising reference entity framework 5002 as a filter or search framework for drawing archived search advertising transactions from the data warehouse 5000. The advertising reference entity server 5004 may then use the sampled transaction data in order to synthesize a search advertising reference entity 5006. The process of synthesizing the search reference entity may involve calculating the indexed reference entity value of the transactions sampled on the basis of the defined attribute values contained in the search reference entity framework 5002. For example, the indexed value may include a gross transaction size, a gross revenue index, a net revenue index, and an effective unit revenue index.

Figure 51:
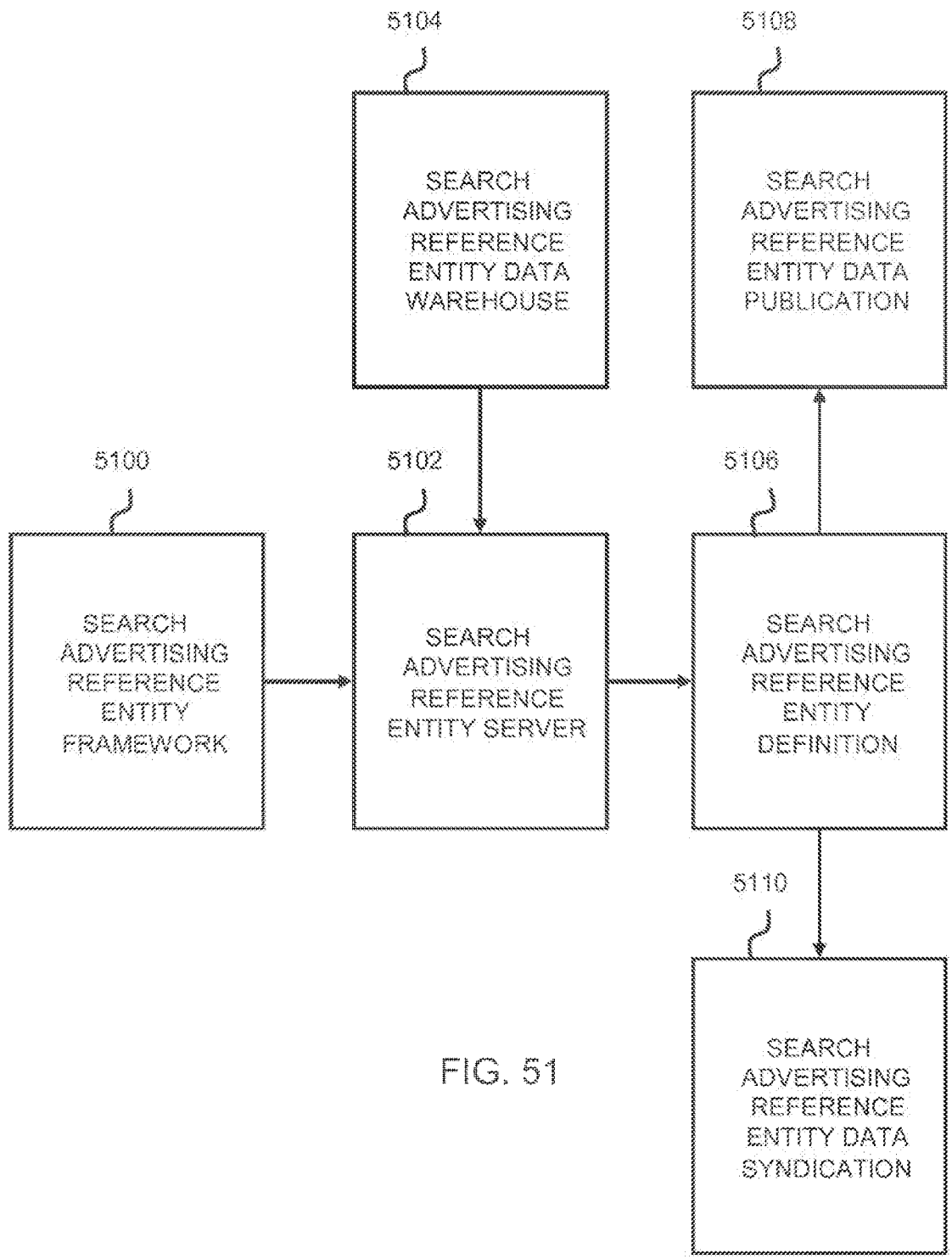

FIG. 51 illustrates a method in which a search advertising reference entity is used as a search advertising market benchmark. In this embodiment, a search advertising reference entity framework 5100 is used by a search advertising reference entity server 5102 to selectively sample electronic advertising transaction records stored within a data warehouse 5104. The search advertising reference entity server 5102 uses the sampled transaction data to define a search advertising reference entity 5106. This reference entity is then published as a search advertising reference entity data publication 5108. The reference entity definition may also be used to generate a search advertising reference entity data syndication 5110. In this embodiment, the value of the search advertising reference entity may be defined following a consistently defined and executed advertising reference entity definition process with the results published and syndicated.

Figure 52:
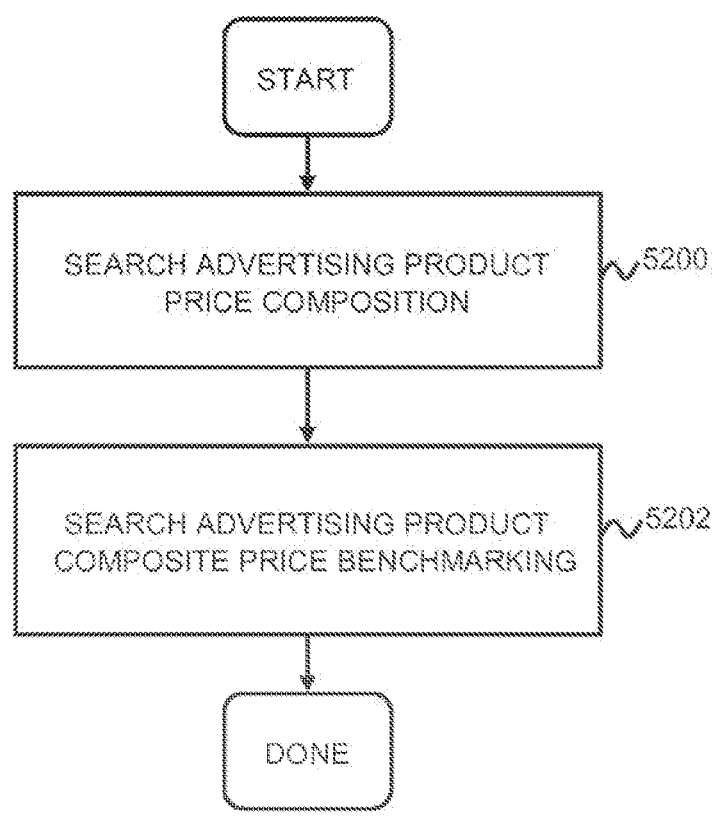

FIG. 52 illustrates a method for using a single search advertising product composite price as a search advertising product composite price benchmark. In this process, search attribute values which define a particular type of search advertising product are used to sample an advertising transaction data warehouse to extract advertising transaction records associated with a type of advertising product over a period of time, with that data used to determine an advertising composite price, step 5200. This establishes a search advertising product composite price within the identified sample transaction time frame. The search advertising product composite price may then be published to the marketplace on a timely and consistent basis with the publication syndicated, thereby establishing the search advertising product composite price as a search advertising composite price benchmark for subsequent transactions and operations, step 5202.

Figure 53:
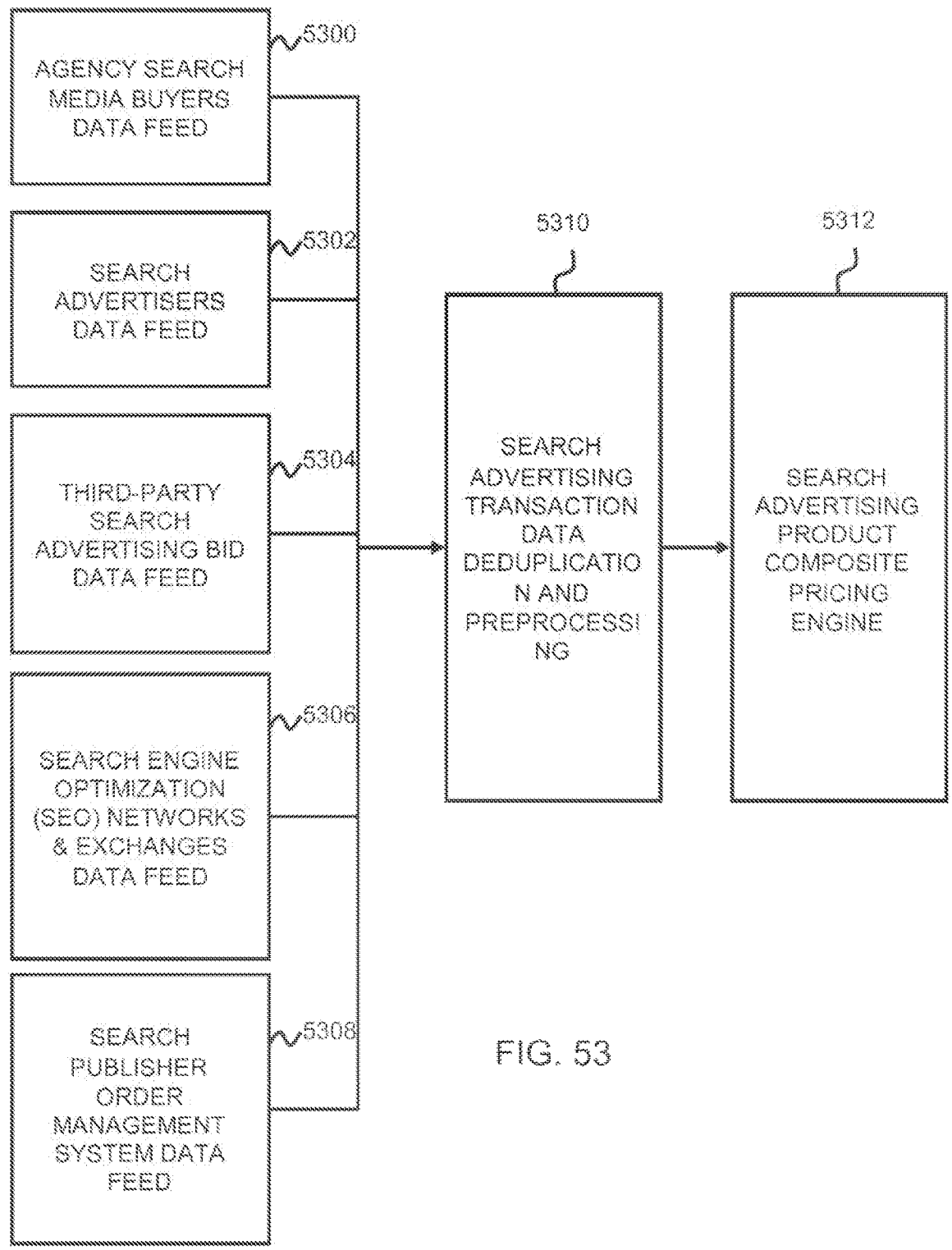

FIG. 53 illustrates a system network for identifying a set of search advertising transactions to be extracted, transformed and used to define a search advertising product composite price. Raw search advertising transaction data may be obtained from a variety of sources including, for example, agency search advertising buyer data feeds 5300, search advertiser data feeds 5302, search advertising server data feeds 5304, search advertising networks and exchange data feeds 5306, and search publisher order management system data feeds 5308. The raw search advertising transaction data may be pre-processed to remove duplicates and otherwise transform attribute values into attribute tier values, step 5310, with the resulting data provided to a search advertising product composite pricing engine 5312. The search advertising product composite price engine may include a volume-weighted composite price for sampled search advertising products of the identified attribute values conducted within an identify transaction time frame.

Figure 54:
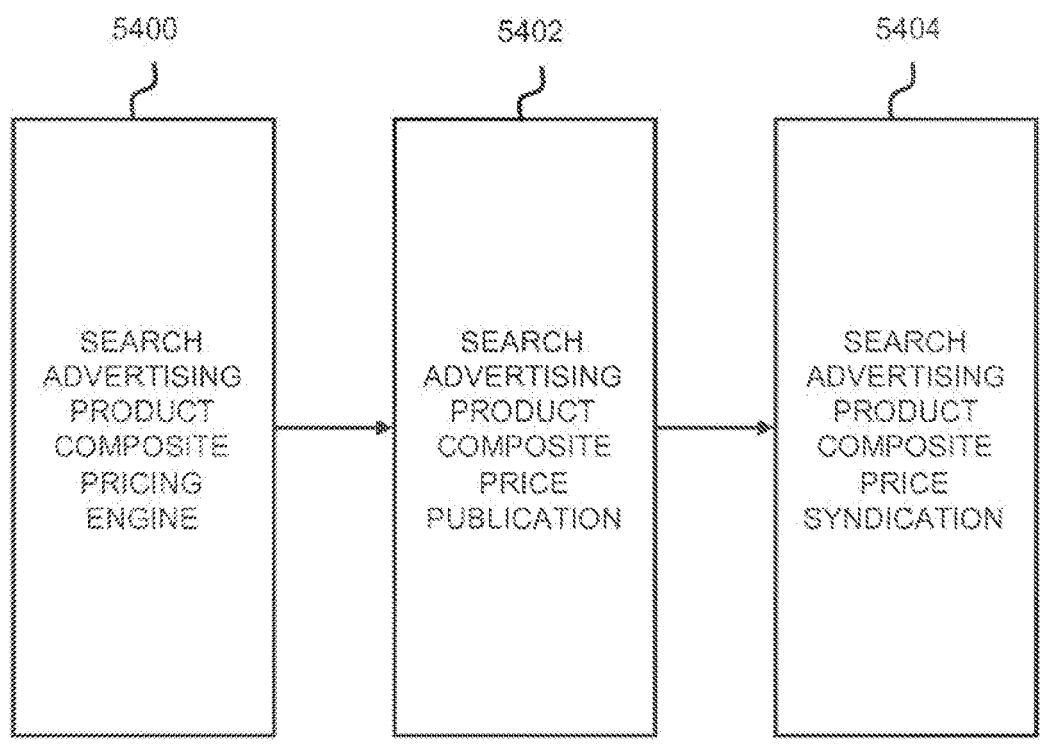

As illustrated in FIG. 54, the output from the search advertising product composite pricing engine, step 5400, may be published as a search advertising product composite price publication, step 5402, and syndicated as a search advertising product composite price syndication, step 5404. The publication and syndication of the search advertising product composite price may be accomplished via a variety of publication and communication mechanisms. The search advertising product composite price may also be published in syndicated via closed, open and public networks as well as communications among market participants. Additionally, the search advertising product composite price may be archived using any known archival methods and storage devices.

Figure 55:
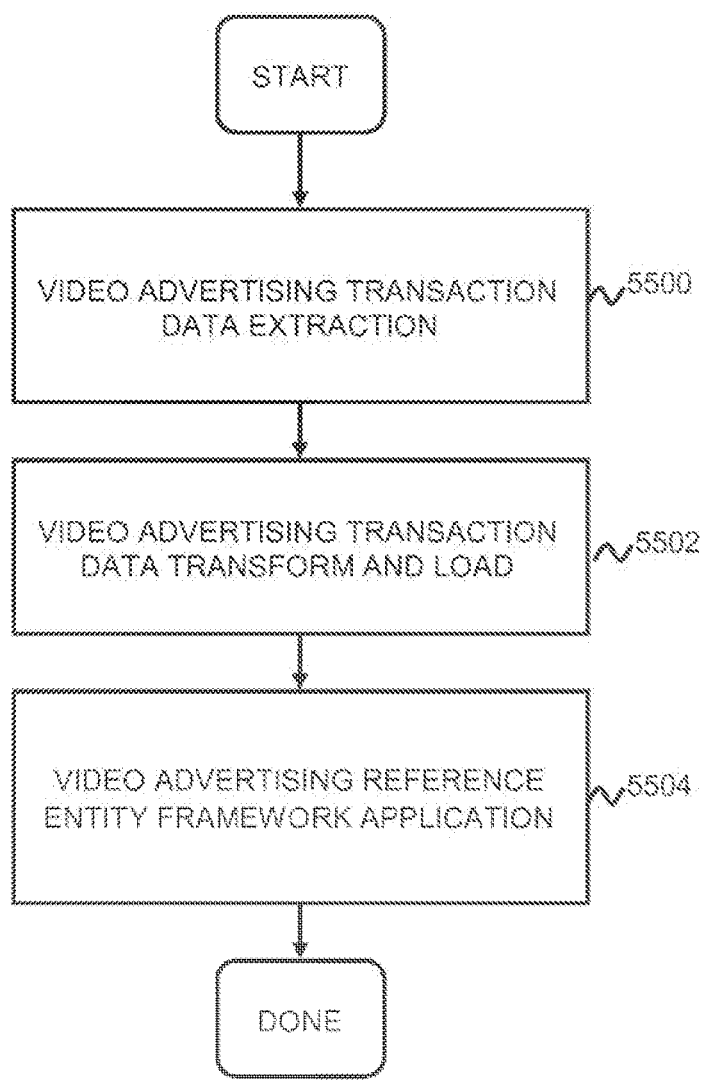
FIGS. 55-62 are process flow diagrams of methods for establishing a video advertising benchmark, reference entity and composite price syndication.

FIG. 55 illustrates steps of a method for establishing a video advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 5500. As part of this process, the transaction records and the database can be indexed and organized according to an attribute taxonomy to enable selected data records to be sampled and analyzed. To establish an advertising reference entity for advertising transactions matching the video attribute value, a subset of advertising transaction records are selected within the database for processing, step 5502. The identified targeted attribute values may include single attributes or combinations of attributes associated with video advertising transactions. The sampled advertising transaction records are then aggregated to establish a video advertising reference entity value, step 5504.

Figure 56:
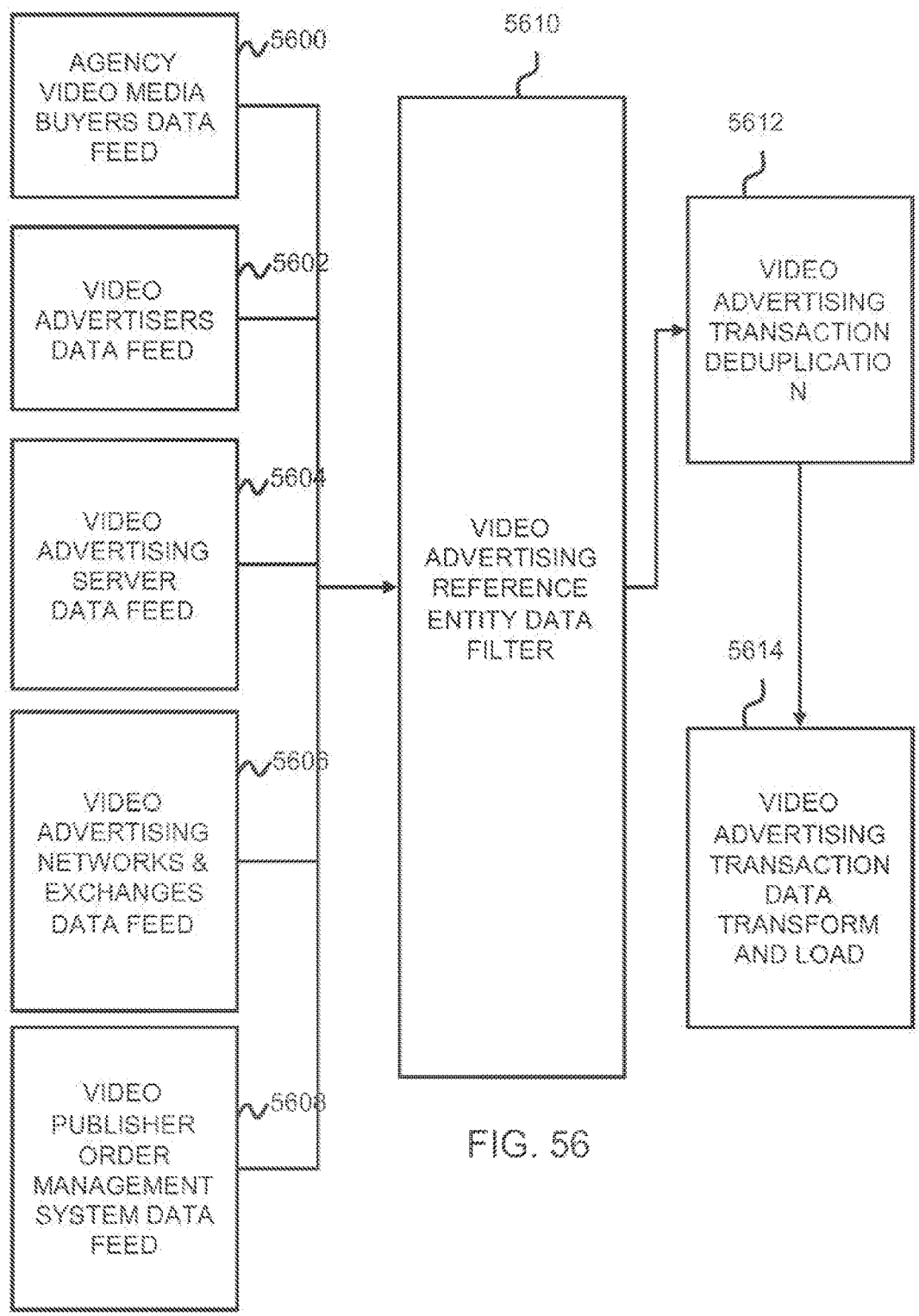

In this embodiment, advertising transaction records may be selected for an advertising transaction database by specifying "electronic display" (or a corresponding attribute ID value) as the selection value for the advertising medium attribute. Alternatively, the advertising transactions that are captured in step 5500 may be limited to transactions purchasing advertising in video media, as illustrated in FIG. 56. For example, the data sources used to collect advertising transactions may be limited to agency electronics delayed media buyers data feeds 5600, video advertisers data feeds 5602, video advertising server data feeds 5604, video advertising networks and exchanges data feeds 5606, and video publisher order management system data feeds 5608. Additionally, the advertising transaction data feeds may be filtered by a video advertising reference entity data filter, step 5610. As mentioned above, the video advertising transaction data received from the various data feeds may be preprocessed to remove duplicate transaction records, step 5612. The preprocessed video advertising transaction data may then be processed to transform attribute information into attribute tier values and data records stored in a database, step 5614.

In selecting video advertising transactions, advertising transaction records may be selected based upon an advertising media platform having a video advertising value. Examples of video advertising attribute values include a digital medium, an analog medium, an internet-enabled medium, a wireless medium, a social medium, a satellite-based medium, a print medium, a broadcast medium, a networked medium, a telephonic medium, a telepathic medium, a brainwave medium, a recorded medium, a live medium, an electronic display medium, an internet-enabled display medium, an internet-enabled rich media display medium, an internet-enabled text medium, an internet-enabled video medium, a social medium, an internet-enabled social medium, a mobile display medium, a mobile text medium, a mobile location based medium, a mobile video medium, a mobile social medium, an internet-enabled search medium, a mobile search medium, a video search medium, a video medium, a broadband video medium, an internet protocol enabled broadband video medium, a closed circuit video medium, a network served video medium, a satellite-based video medium, an electronic game medium, an internet-enabled game medium, a console game medium, a downloadable game medium, a massively-multiplayer game medium, a public display medium, an outdoor advertising medium, a radio medium, an Internet Protocol radio medium, a satellite-broadcast radio medium, a television medium, broadcast television medium, a spot television medium, a cable television medium, a digitally recorded television medium, an Internet Protocol Television (IPTV) broadcast medium, a cable television medium, a studio produced medium, a syndicated medium, a broadcast television medium, a filmed medium, a digitally recorded filmed medium.

Figure 57:
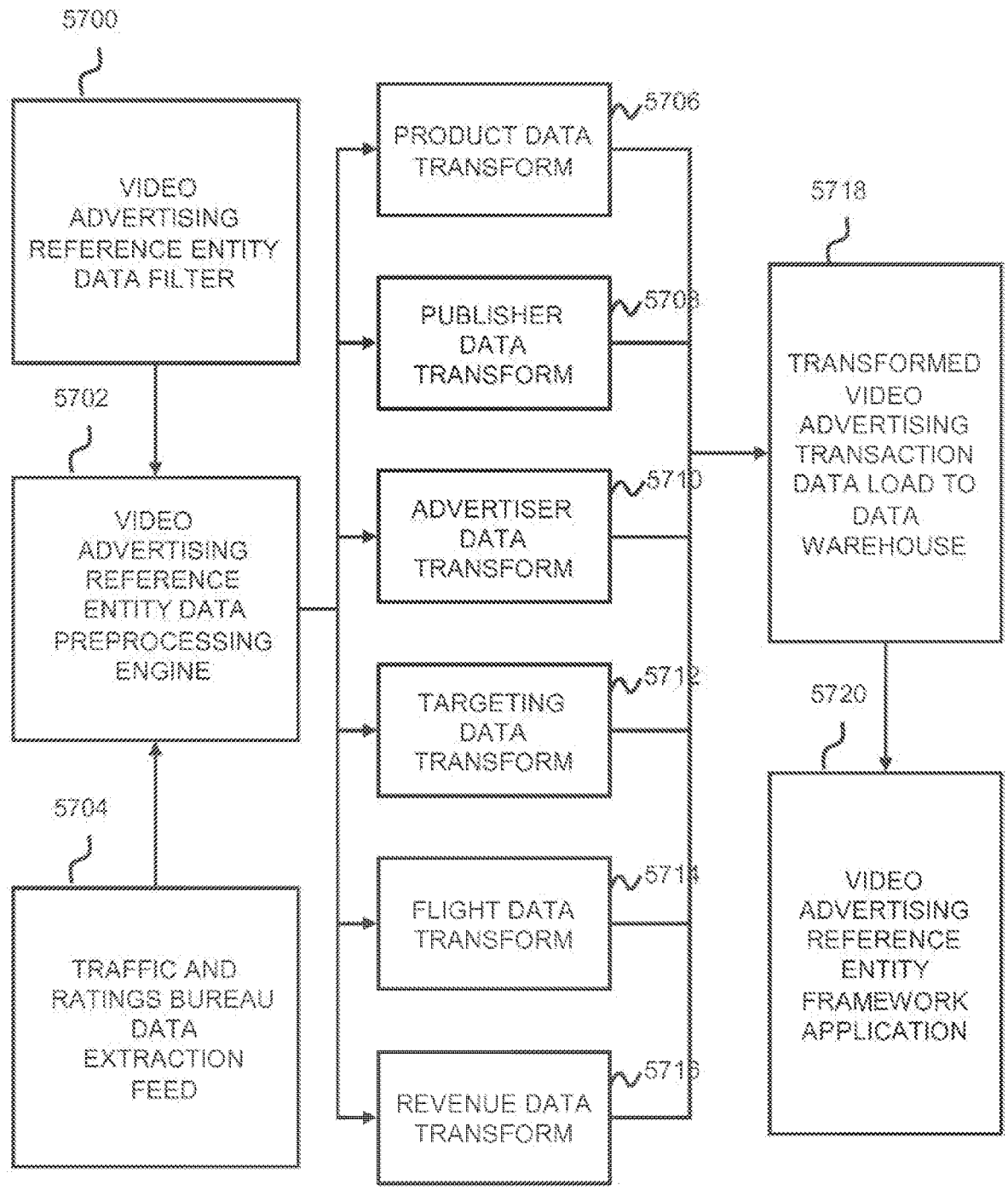

FIG. 57 illustrates in more detail steps involved in organizing video advertising transaction records according to a taxonomy of video advertising attributes. Advertising transaction data selected via a video advertising reference entity data filter, step 5710, may be preprocessed as described above, step 5702. Information regarding consumer viewing of the video listed in video advertising transactions may be obtained from ratings bureau databases (e.g., Quantcast.com and Nielsen), websites and other such data feeds, step 5704. This data may be combined to transform the information from advertising transactions into attribute values and attribute tier values as described above with reference to FIG. 3A, 3B. For example, a product data may be transformed into a product attribute tier value, step 5706, publisher data information may be transformed into publisher tier attribute values, step 5708, advertiser information may be transformed into advertiser tier attribute values, step 5710, targeting package information may be transformed into one or more targeting attribute tier values, step 5712, flight information may be transformed into advertising product flight attribute values, and revenue information may be transformed into one or more revenue attribute tier values, step 5716. The transformed video advertising transaction attribute values may then be stored in a database or data warehouse, step 5718. The data stored in a database may then be used to determine the video advertising reference entity value, step 5720.

Figure 58:
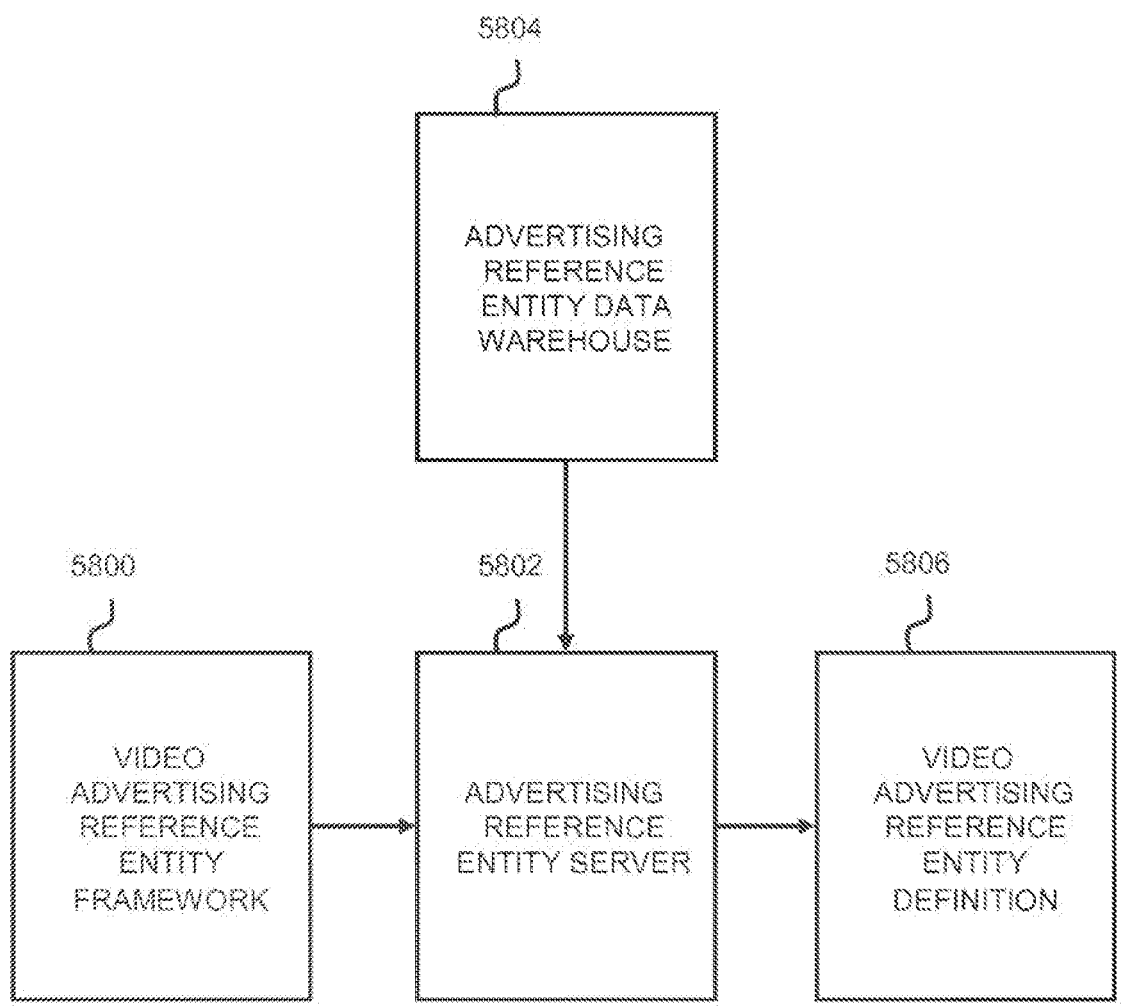

In an embodiment illustrated in FIG. 58, a video advertising reference entity framework 5802 may be applied as an automated filter to the eligible pool of archived video advertising transactions stored in a data warehouse 5800. In this process, an advertising reference entity server 5804 may use the video advertising reference entity framework 5802 as a filter or search framework for drawing archived video advertising transactions from the data warehouse 5800. The advertising reference entity server 5804 may then use the sampled transaction data in order to synthesize a video advertising reference entity 5806. The process of synthesizing the video reference entity may involve calculating the indexed reference entity value of the transactions sampled on the basis of the defined attribute values contained in the video reference entity framework 5802. For example, the indexed value may include a gross transaction size, a gross revenue index, a net revenue index, and an effective unit revenue index.

Figure 59:
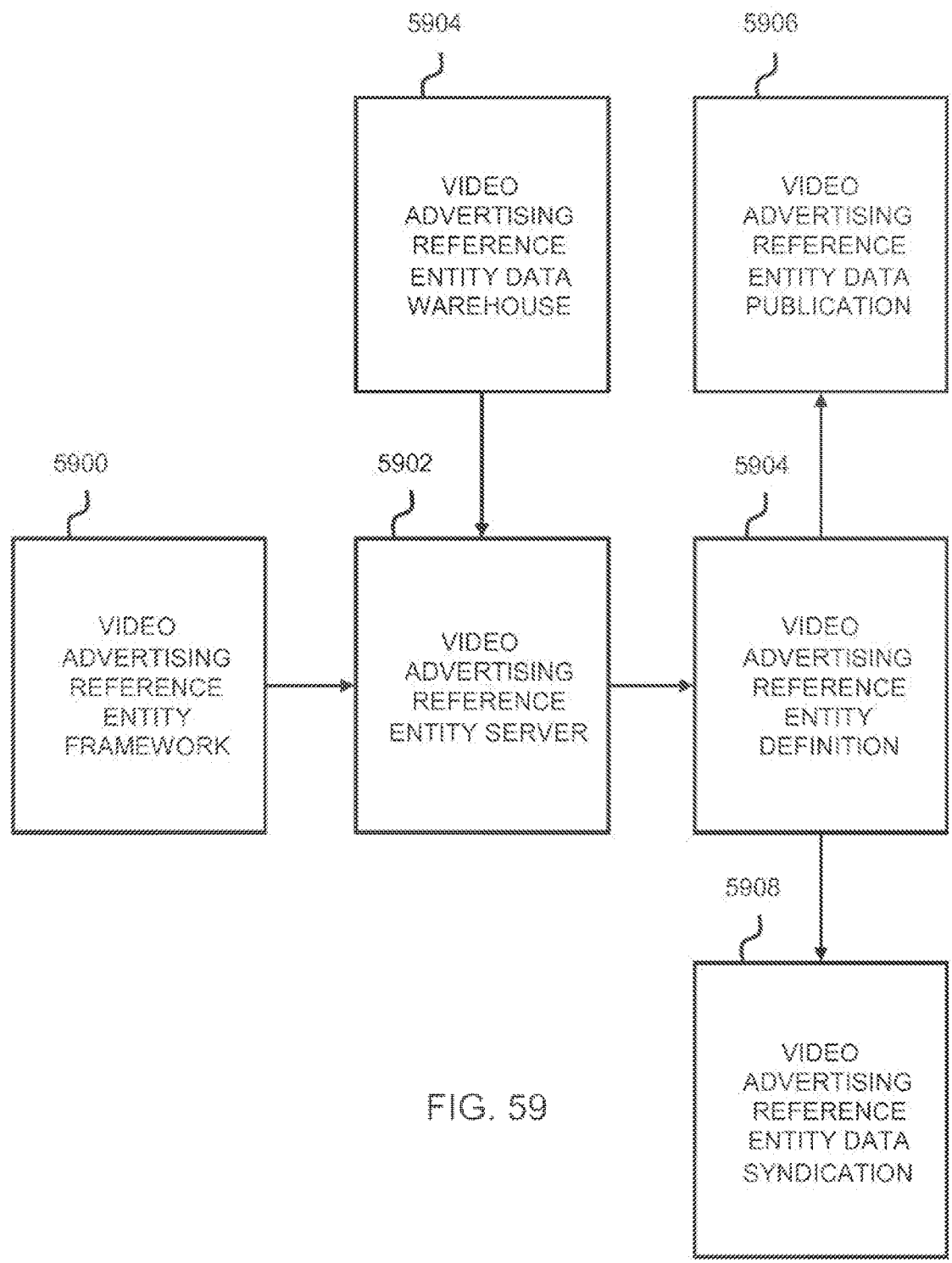

FIG. 59 illustrates a method in which a video advertising reference entity is used as a video advertising market benchmark. In this embodiment, a video advertising reference entity framework 5900 is used by a video advertising reference entity server 5902 to selectively sample electronic advertising transaction records stored within a data warehouse 5904. The video advertising reference entity server 5902 uses the sampled transaction data to define a video advertising reference entity 5906. This reference entity is then published as a video advertising reference entity data publication 5908. The reference entity definition may also be used to generate a video advertising reference entity data syndication 5910. In this embodiment, the value of the video advertising reference entity may be defined following a consistently defined and executed advertising reference entity definition process with the results published and syndicated.

Figure 60:
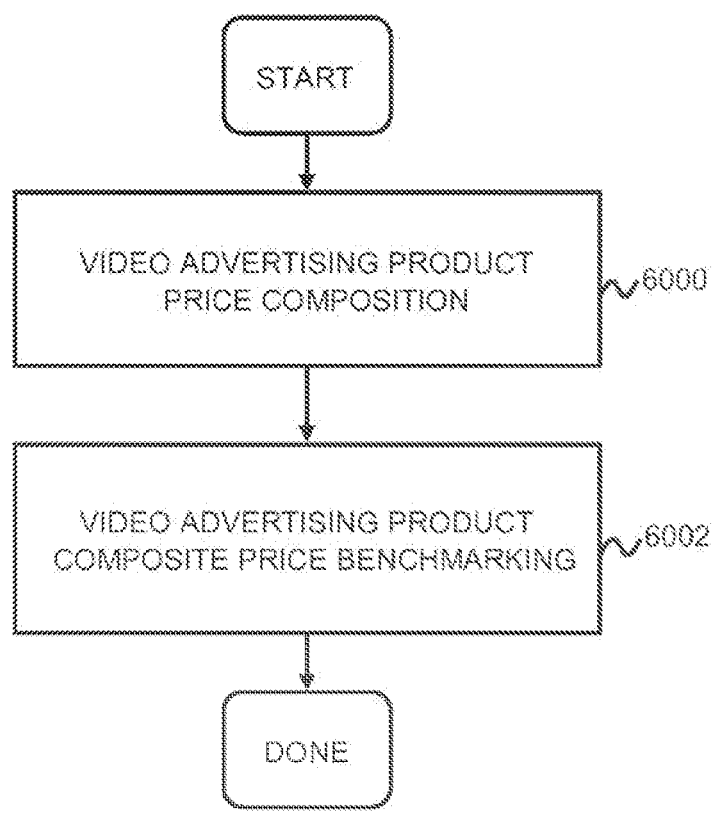

FIG. 60 illustrates a method for using a single video advertising product composite price as a video advertising product composite price benchmark. In this process, video attribute values which define a particular type of video advertising product are used to sample an advertising transaction data warehouse to extract advertising transaction records associated with a type of advertising product over a period of time, with that data used to determine an advertising composite price, step 6000. This establishes a video advertising product composite price within the identified sample transaction time frame. The video advertising product composite price may then be published to the marketplace on a timely and consistent basis with the publication syndicated, thereby establishing the video advertising product composite price as a video advertising composite price benchmark for subsequent transactions and operations, step 6002.

Figure 61:
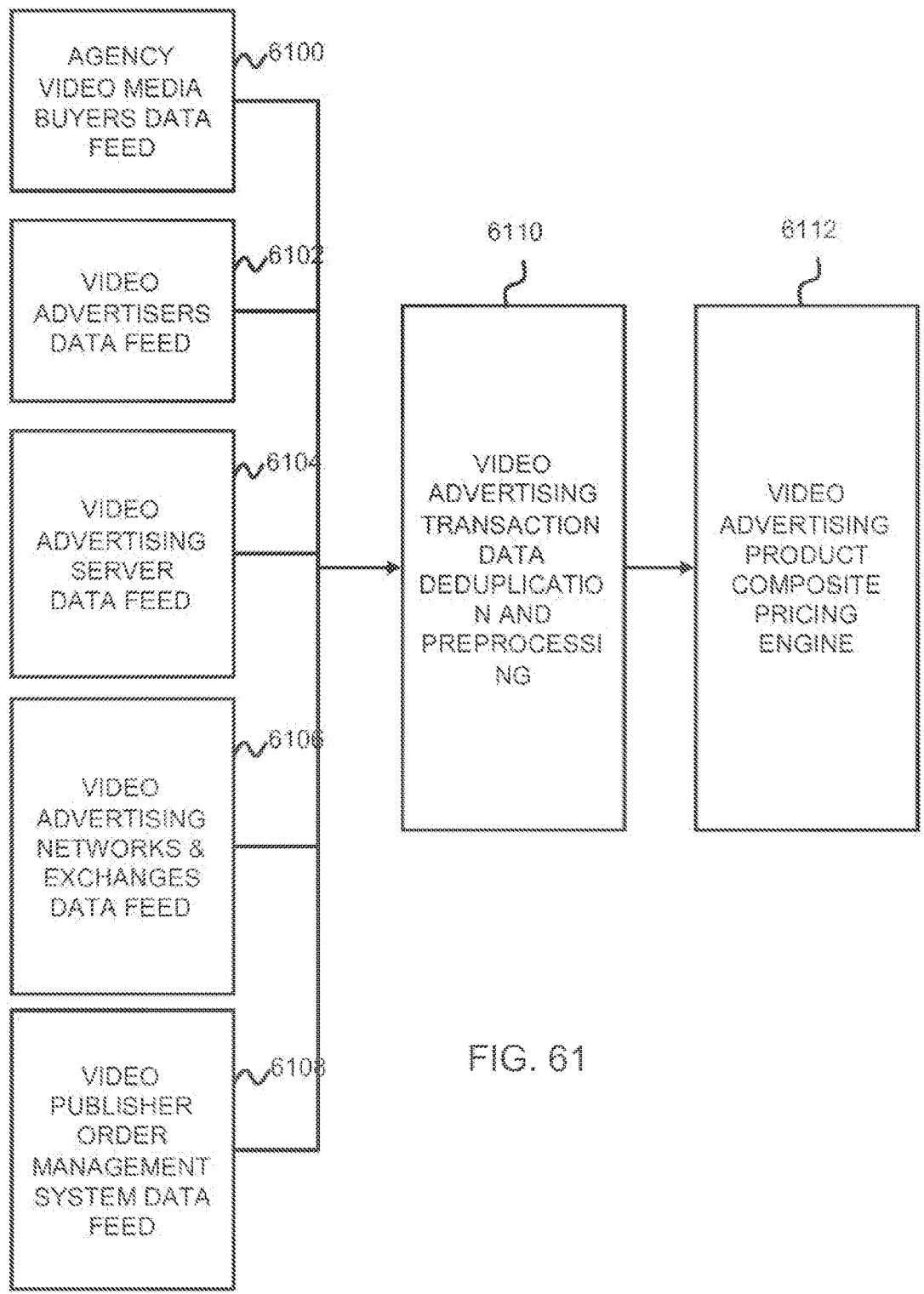

FIG. 61 illustrates a system network for identifying a set of video advertising transactions to be extracted, transformed and used to define a video advertising product composite price. Raw video advertising transaction data may be obtained from a variety of sources including, for example, agency video advertising buyer data feeds 6100, video advertiser data feeds 6102, video advertising server data feeds 6104, video advertising networks and exchange data feeds 6106, and video publisher order management system data feeds 6108. The raw video advertising transaction data may be pre-processed to remove duplicates and otherwise transform attribute values into attribute tier values, step 6110, with the resulting data provided to a video advertising product composite pricing engine 6112. The video advertising product composite price engine may include a volume-weighted composite price for sampled video advertising products of the identified attribute values conducted within an identify transaction time frame.

Figure 62:
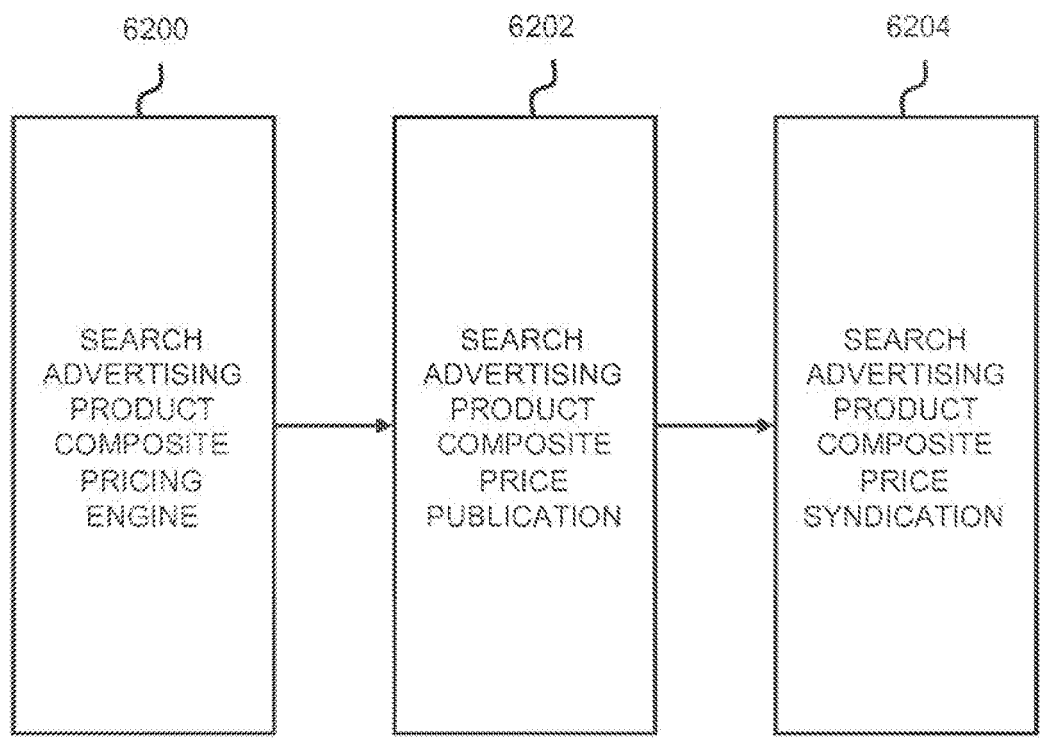

As illustrated in FIG. 62, the output from the video advertising product composite pricing engine, step 6200, may be published as a video advertising product composite price publication, step 6202, and syndicated as a video advertising product composite price syndication, step 6204. The publication and syndication of the video advertising product composite price may be accomplished via a variety of publication and communication mechanisms. The video advertising product composite price may also be published in syndicated via closed, open and public networks as well as communications among market participants. Additionally, the video advertising product composite price may be archived using any known archival methods and storage devices.

Figure 63:
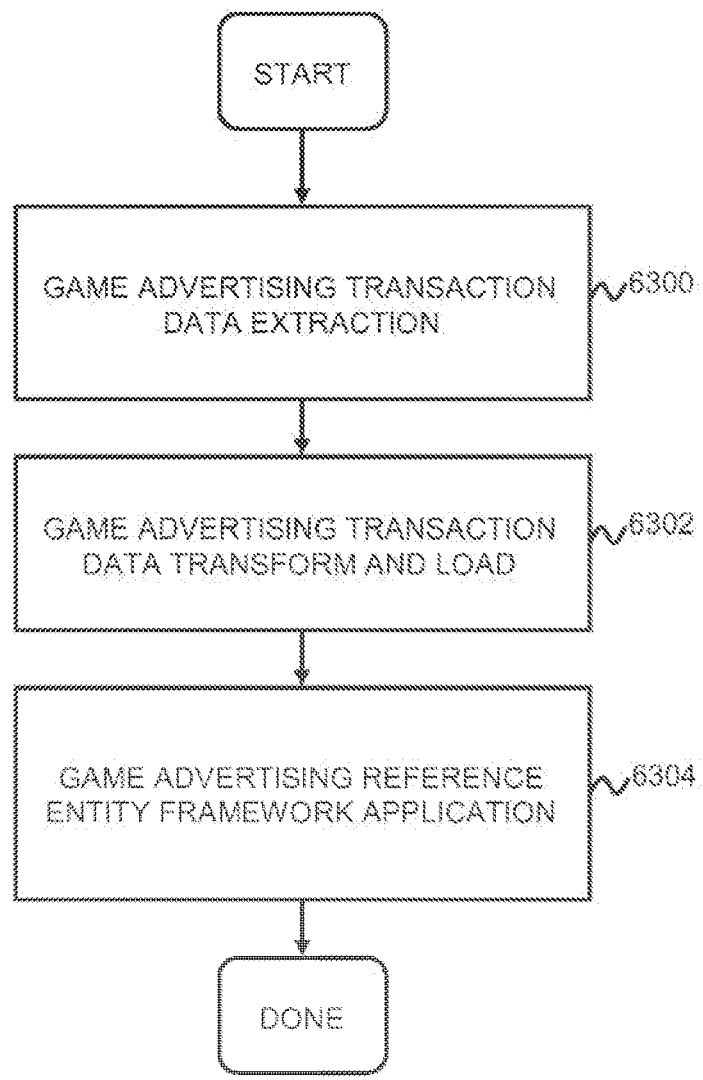
FIGS. 63-70 are process flow diagrams of methods for establishing a game advertising benchmark, reference entity and composite price syndication.

FIG. 63 illustrates steps of a method for establishing a game advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 6300. As part of this process, the transaction records and the database can be indexed and organized according to an attribute taxonomy to enable selected data records to be sampled and analyzed. To establish an advertising reference entity for advertising transactions matching the game attribute value, a subset of advertising transaction records are selected within the database for processing, step 6302. The identified targeted attribute values may include single attributes or combinations of attributes associated with game advertising transactions. The sampled advertising transaction records are then aggregated to establish a game advertising reference entity value, step 6304.

Figure 64:
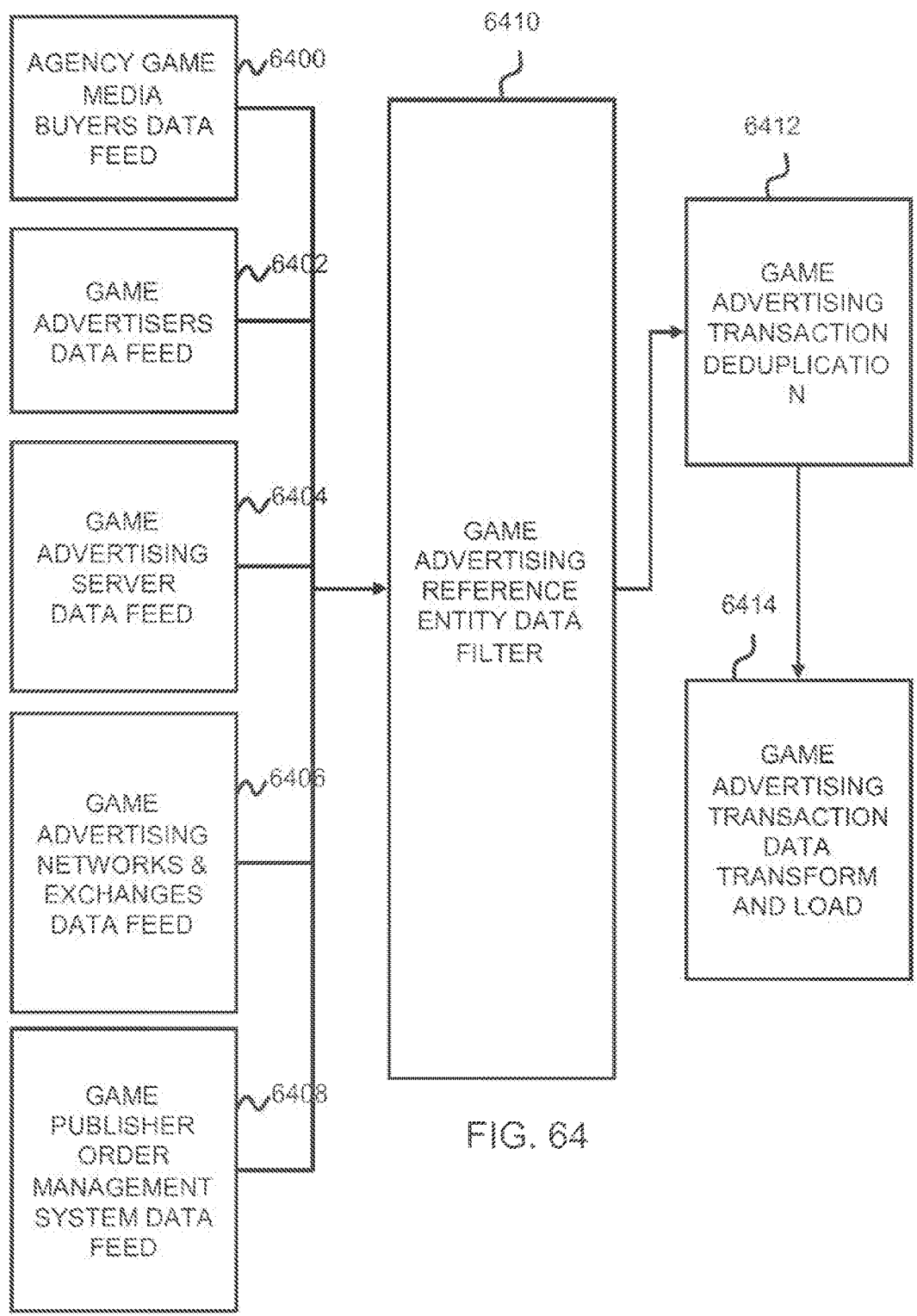

In this embodiment, advertising transaction records may be selected for an advertising transaction database by specifying "game" (or a corresponding attribute ID value) as the selection value for the advertising medium attribute. Alternatively, the advertising transactions that are captured in step 6300 may be limited to transactions purchasing advertising in games and gaming media, as illustrated in FIG. 64. For example, the data sources used to collect advertising transactions may be limited to agency electronics delayed media buyers data feeds 6400, game advertisers data feeds 6402, game advertising server data feeds 6404, game advertising networks and exchanges data feeds 6406, and game publisher order management system data feeds 6408. Additionally, the advertising transaction data feeds may be filtered by a game advertising reference entity data filter, step 6410. As mentioned above, the game advertising transaction data received from the various data feeds may be preprocessed to remove duplicate transaction records, step 6412. The preprocessed game advertising transaction data may then be processed to transform attribute information into attribute tier values and data records stored in a database, step 6414.

In selecting game advertising transactions, advertising transaction records may be selected based upon game publisher classification having a game advertising value. Examples of game advertising attribute values include a casual game type, a core enthusiast game type, a networked game type, a static game type, a downloadable game type, a multi-player game type, a massively multiplayer game type, an advergame type, a strategy game type, a first-person shooter game type, a fantasy role-playing game type, a multi-location massively multi-player game type, a location-based assassin game type, an assassin game type, a sports hero game type, a music hero game type, an explorer hero game type, a war hero game type, a criminal game type, a criminal pursuit game type, a publisher-owned content type, a user-generated content type, a film clip content type, a trailer content type, a short film content type, a film content type, a television show content type, an animation content type, and an instructional content type.

Figure 65:
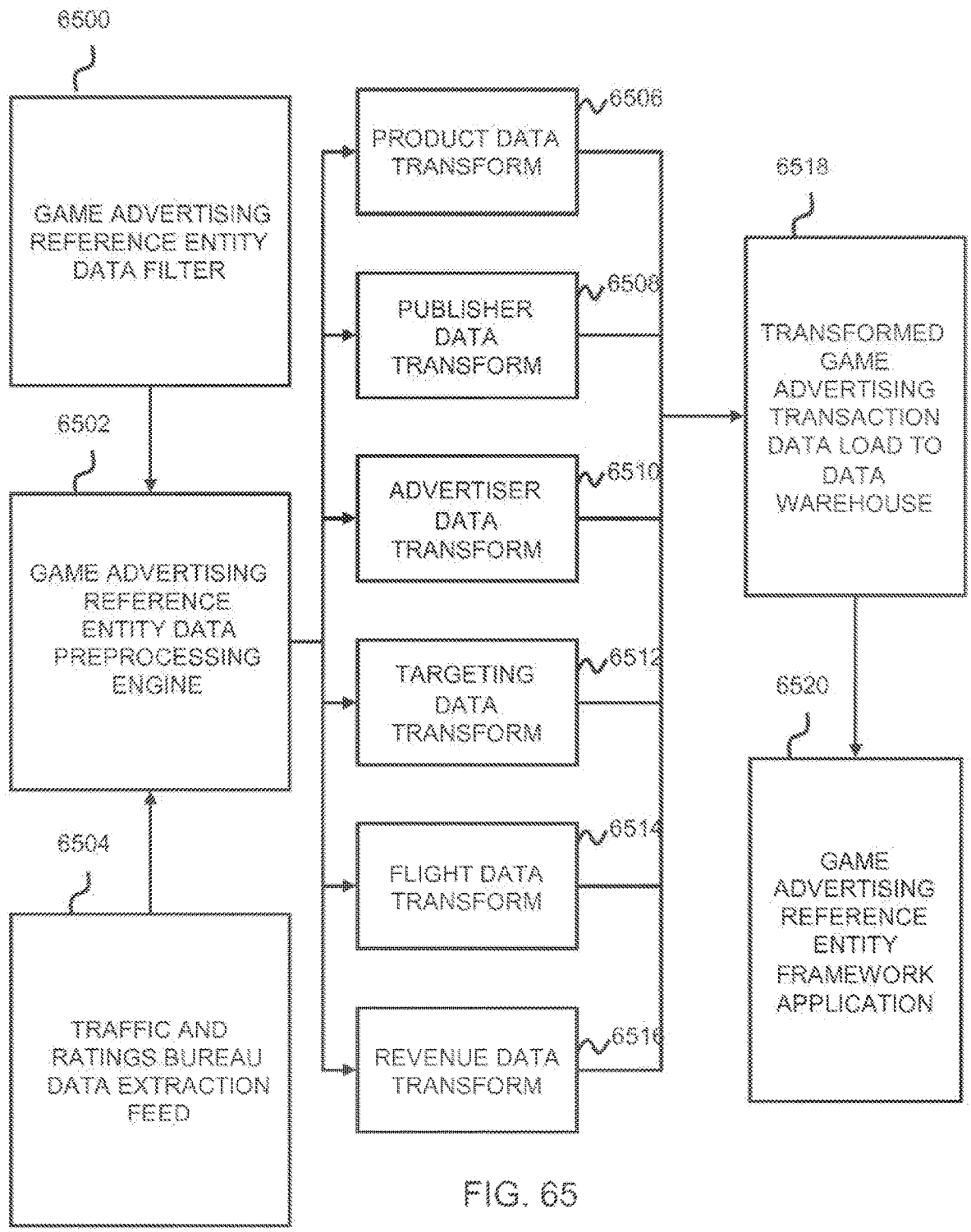

FIG. 65 illustrates in more detail steps involved in organizing game advertising transaction records according to a taxonomy of game advertising attributes. Advertising transaction data selected via a game advertising reference entity data filter, step 6510, may be preprocessed as described above, step 6502. Information regarding purchase and usage of the game listed in game advertising transactions may be obtained from ratings bureau databases (e.g., Quantcast.com and Nielsen), websites and other such data feeds, step 6504. This data may be combined to transform the information from advertising transactions into attribute values and attribute tier values as described above with reference to FIG. 3A, 3B. For example, a product data may be transformed into a product attribute tier value, step 6506, publisher data information may be transformed into publisher tier attribute values, step 6508, advertiser information may be transformed into advertiser tier attribute values, step 6510, targeting package information may be transformed into one or more targeting attribute tier values, step 6512, flight information may be transformed into advertising product flight attribute values, and revenue information may be transformed into one or more revenue attribute tier values, step 6516. The transformed game advertising transaction attribute values may then be stored in a database or data warehouse, step 6518. The data stored in a database may then be used to determine the game advertising reference entity value, step 6520.

Figure 66:
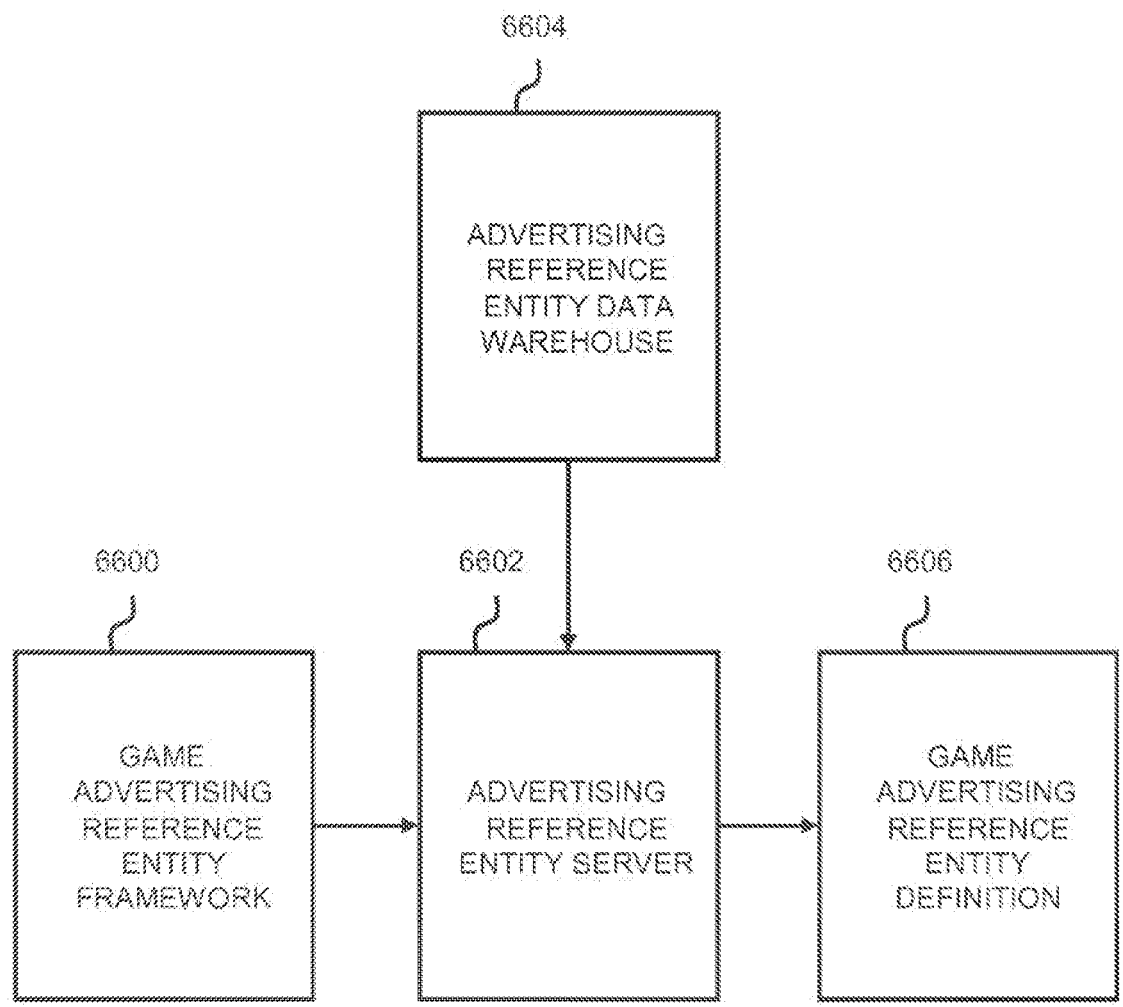

In an embodiment illustrated in FIG. 66, a game advertising reference entity framework 6602 may be applied as an automated filter to the eligible pool of archived game advertising transactions stored in a data warehouse 6600. In this process, an advertising reference entity server 6604 may use the game advertising reference entity framework 6602 as a filter or search framework for drawing archived game advertising transactions from the data warehouse 6600. The advertising reference entity server 6604 may then use the sampled transaction data in order to synthesize a game advertising reference entity 6606. The process of synthesizing the game reference entity may involve calculating the indexed reference entity value of the transactions sampled on the basis of the defined attribute values contained in the game reference entity framework 6602. For example, the indexed value may include a gross transaction size, a gross revenue index, a net revenue index, and an effective unit revenue index.

Figure 67:
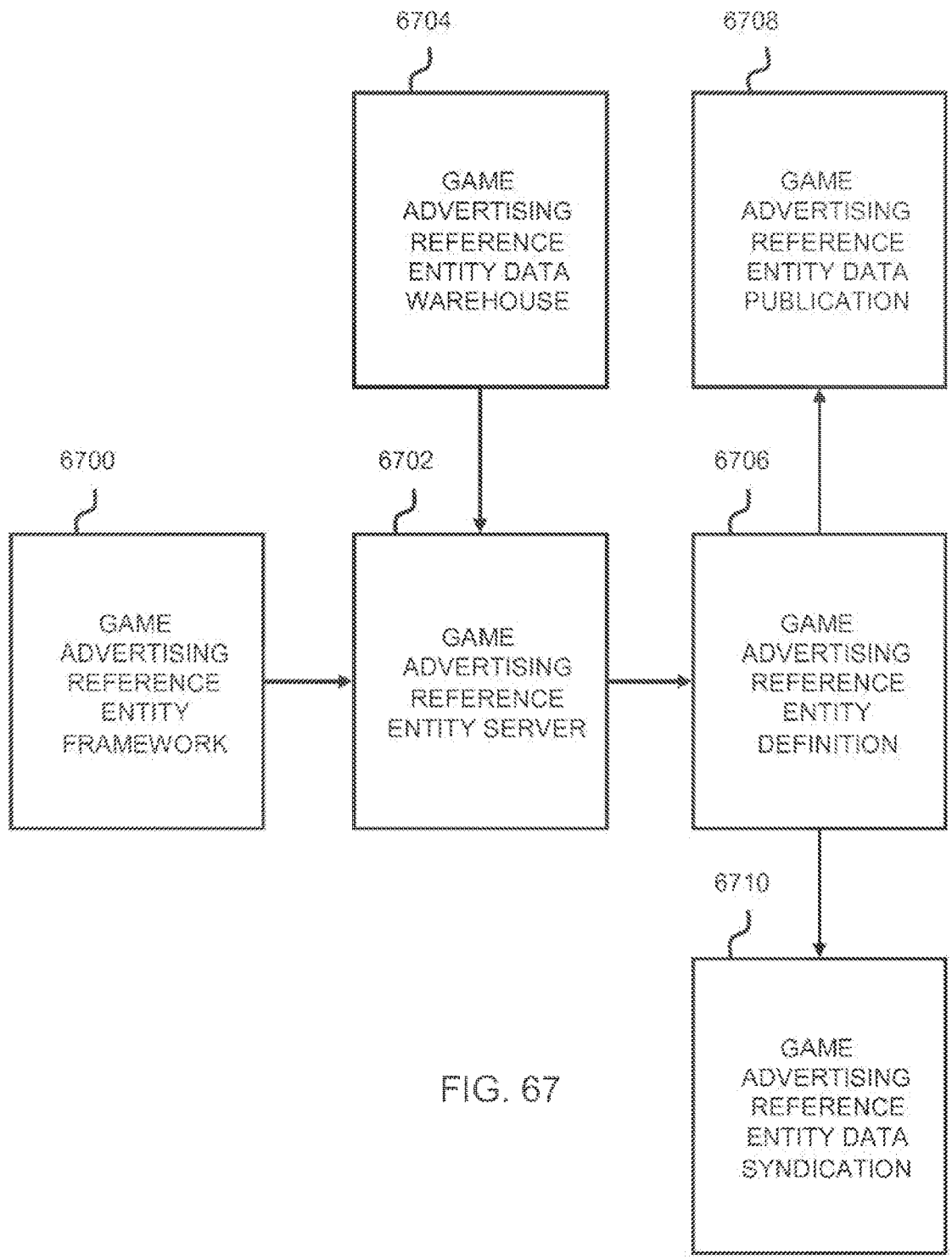

FIG. 67 illustrates a method in which a game advertising reference entity is used as a game advertising market benchmark. In this embodiment, a game advertising reference entity framework 6700 is used by a game advertising reference entity server 6702 to selectively sample electronic advertising transaction records stored within a data warehouse 6704. The game advertising reference entity server 6702 uses the sampled transaction data to define a game advertising reference entity 6706. This reference entity is then published as a game advertising reference entity data publication 6708. The reference entity definition may also be used to generate a game advertising reference entity data syndication 6710. In this embodiment, the value of the game advertising reference entity may be defined following a consistently defined and executed advertising reference entity definition process with the results published and syndicated.

Figure 68:
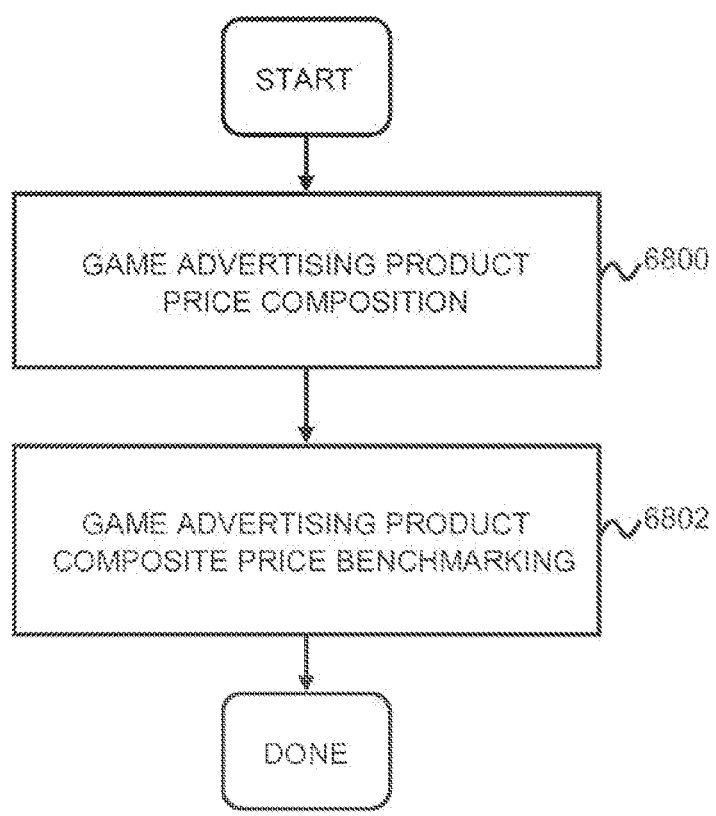

FIG. 68 illustrates a method for using a single game advertising product composite price as a game advertising product composite price benchmark. In this process, game attribute values which define a particular type of game advertising product are used to sample an advertising transaction data warehouse to extract advertising transaction records associated with a type of advertising product over a period of time, with that data used to determine an advertising composite price, step 6800. This establishes a game advertising product composite price within the identified sample transaction time frame. The game advertising product composite price may then be published to the marketplace on a timely and consistent basis with the publication syndicated, thereby establishing the game advertising product composite price as a game advertising composite price benchmark for subsequent transactions and operations, step 6802.

Figure 69:
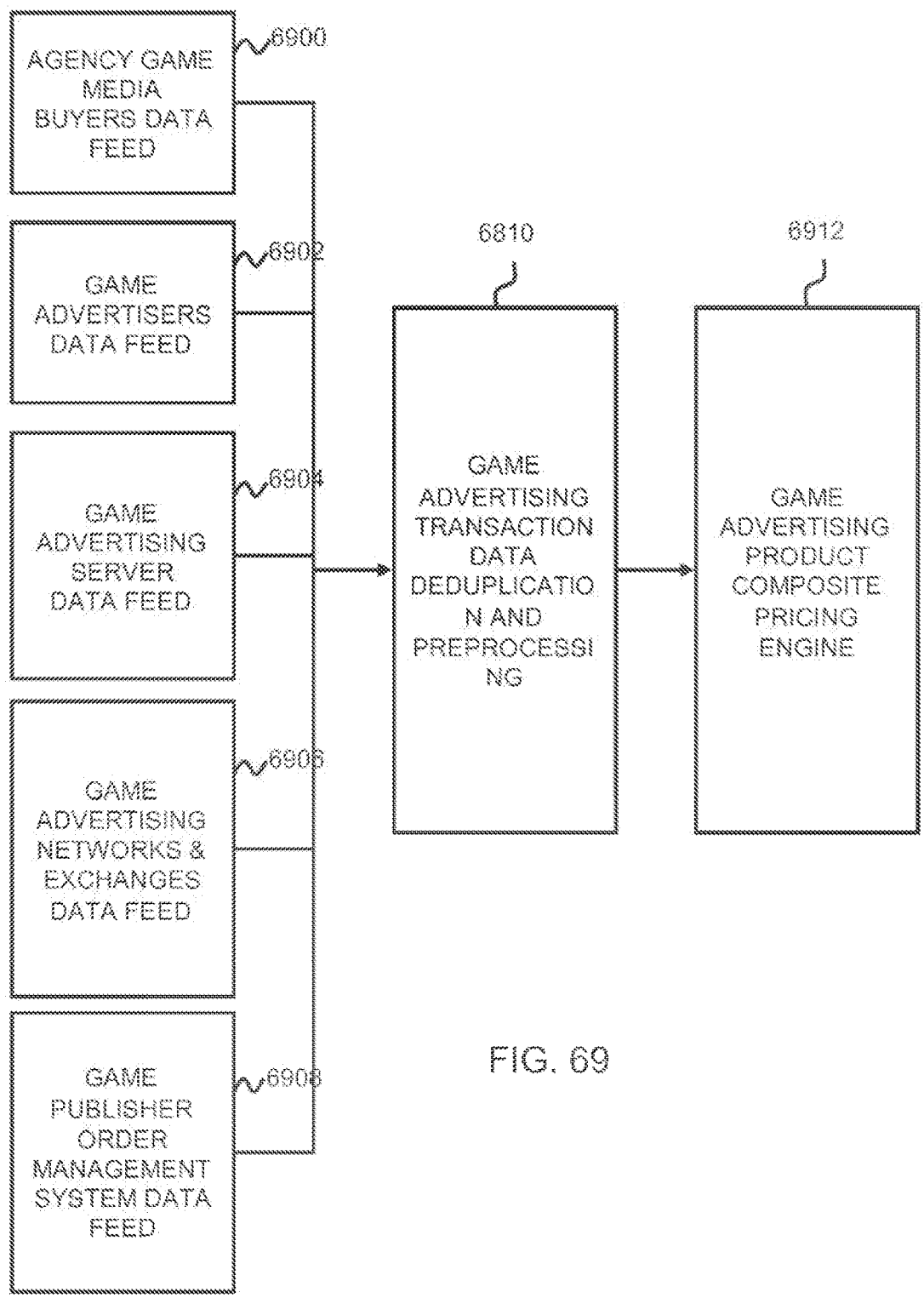

FIG. 69 illustrates a system network for identifying a set of game advertising transactions to be extracted, transformed and used to define a game advertising product composite price. Raw game advertising transaction data may be obtained from a variety of sources including, for example, agency game advertising buyer data feeds 6900, game advertiser data feeds 6902, game advertising server data feeds 6904, game advertising networks and exchange data feeds 6906, and game publisher order management system data feeds 6908. The raw game advertising transaction data may be pre-processed to remove duplicates and otherwise transform attribute values into attribute tier values, step 6910, with the resulting data provided to a game advertising product composite pricing engine 6912. The game advertising product composite price engine may include a volume-weighted composite price for sampled game advertising products of the identified attribute values conducted within an identify transaction time frame.

Figure 70:
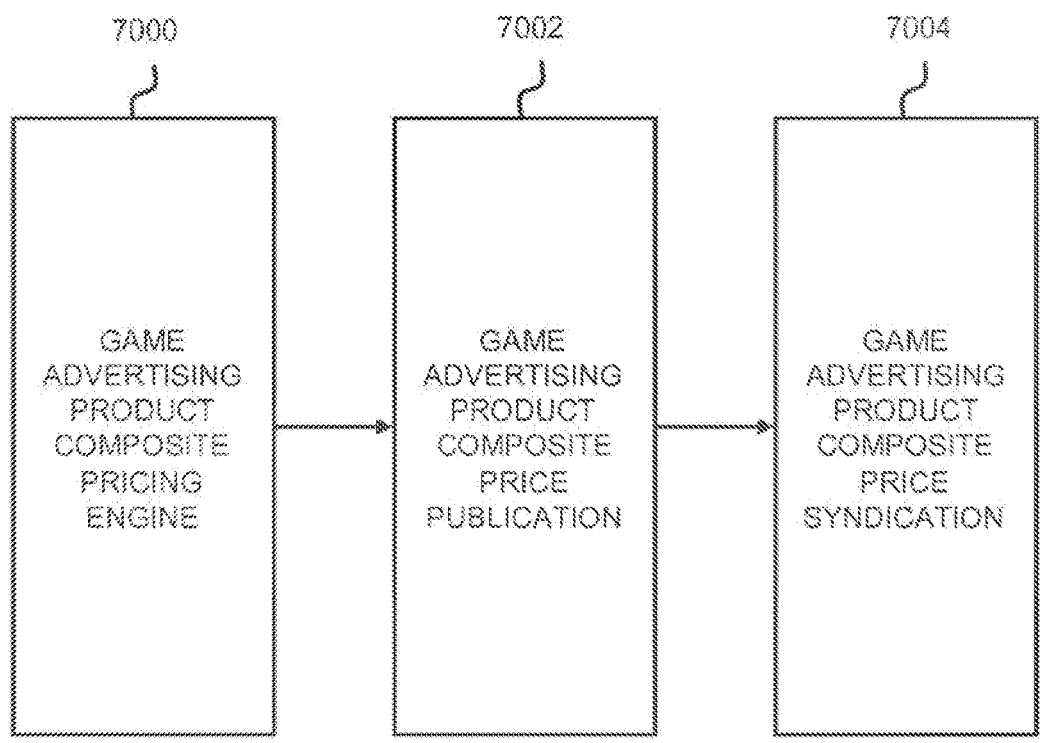

As illustrated in FIG. 70, the output from the game advertising product composite pricing engine, step 7000, may be published as a game advertising product composite price publication, step 7002, and syndicated as a game advertising product composite price syndication, step 7004. The publication and syndication of the game advertising product composite price may be accomplished via a variety of publication and communication mechanisms. The game advertising product composite price may also be published in syndicated via closed, open and public networks as well as communications among market participants. Additionally, the game advertising product composite price may be archived using any known archival methods and storage devices.

Figure 71:
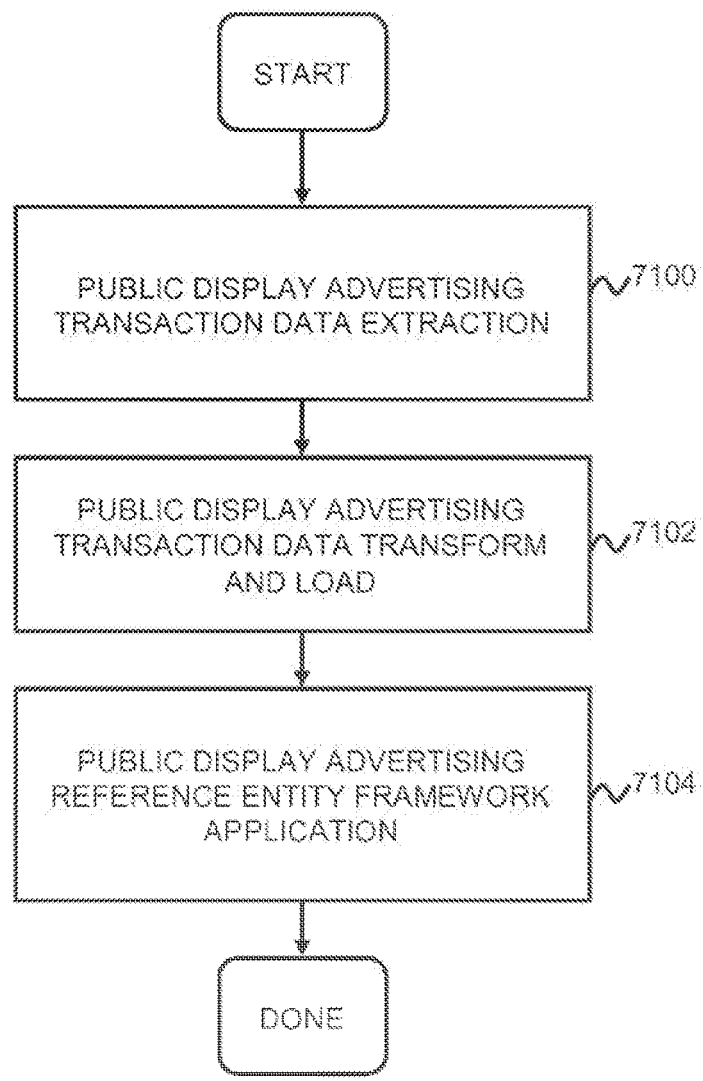
FIGS. 71-78 are process flow diagrams of methods for establishing a public display advertising benchmark, reference entity and composite price syndication.

FIG. 71 illustrates steps of a method for establishing a public display advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 7100. As part of this process, the transaction records and the database can be indexed and organized according to an attribute taxonomy to enable selected data records to be sampled and analyzed. To establish an advertising reference entity for advertising transactions matching the public display attribute value, a subset of advertising transaction records are selected within the database for processing, step 7102. The identified targeted attribute values may include single attributes or combinations of attributes associated with public display advertising transactions. The sampled advertising transaction records are then aggregated to establish a public display advertising reference entity value, step 7204.

Figure 72:
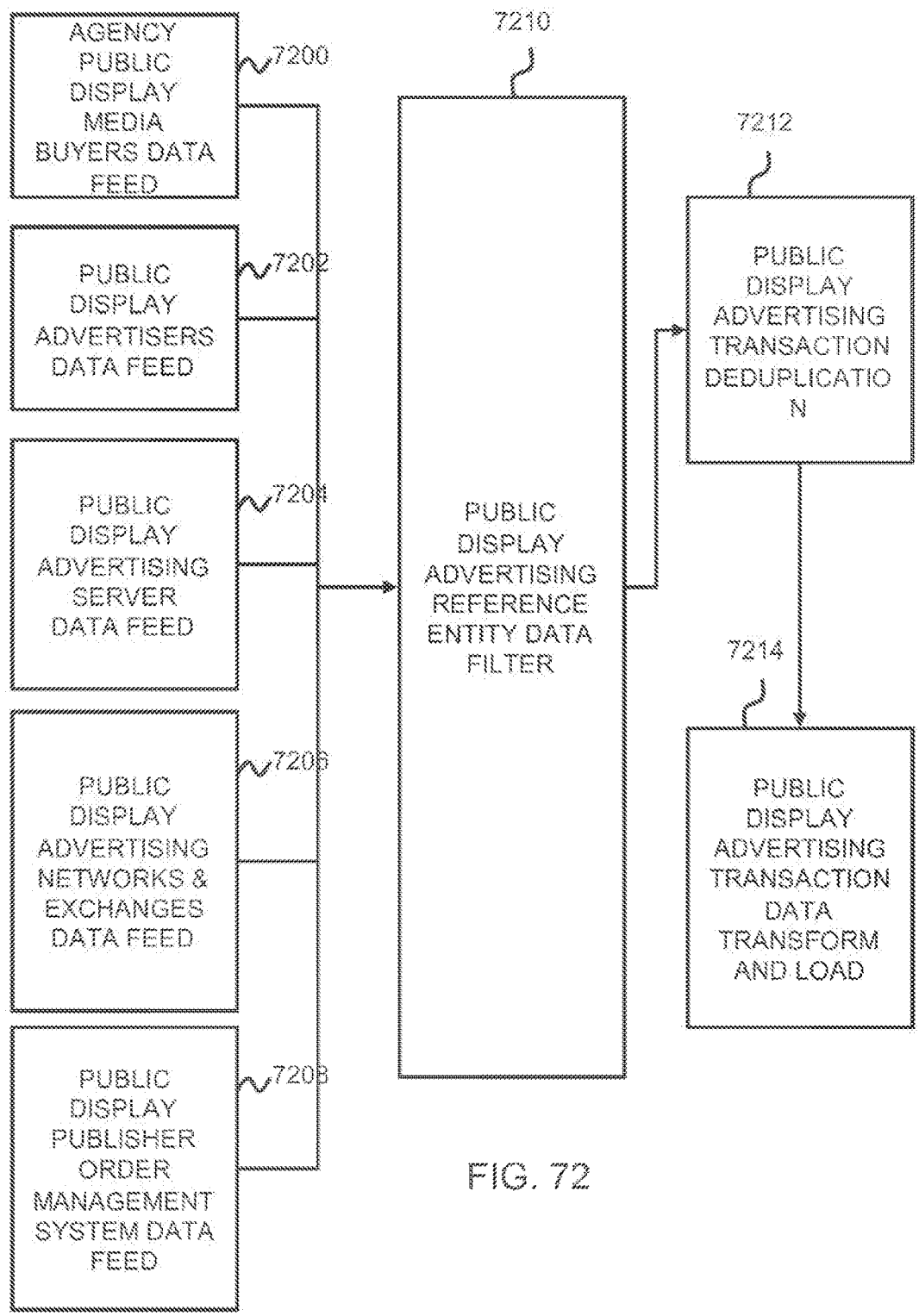

In this embodiment, advertising transaction records may be selected for an advertising transaction database by specifying "public display" (or a corresponding attribute ID value) as the selection value for the advertising medium attribute. Alternatively, the advertising transactions that are captured in step 7100 may be limited to transactions purchasing advertising in public display media, as illustrated in FIG. 72. For example, the data sources used to collect advertising transactions may be limited to agency electronics delayed media buyers data feeds 7200, public display advertisers data feeds 7202, public display advertising server data feeds 7204, public display advertising networks and exchanges data feeds 7206, and public display publisher order management system data feeds 7208. Additionally, the advertising transaction data feeds may be filtered by a public display advertising reference entity data filter, step 7210. As mentioned above, the public display advertising transaction data received from the various data feeds may be preprocessed to remove duplicate transaction records, step 7212. The preprocessed public display advertising transaction data may then be processed to transform attribute information into attribute tier values and data records stored in a database, step 7214.

Figure 73:
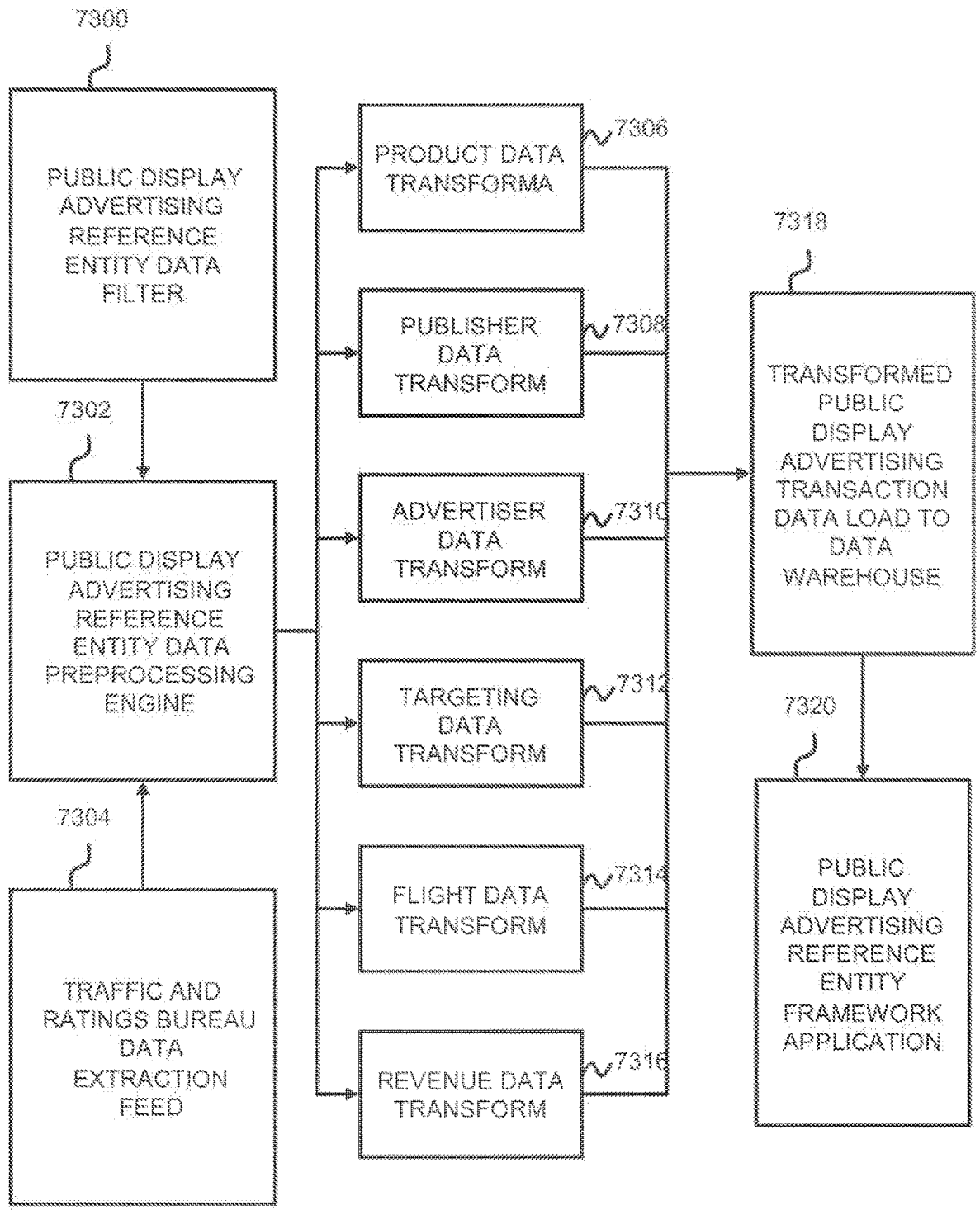

FIG. 73 illustrates in more detail steps involved in organizing public display advertising transaction records according to a taxonomy of public display advertising attributes. Advertising transaction data selected via a public display advertising reference entity data filter, step 7310, may be preprocessed as described above, step 7302. Information regarding consumer viewings of public displays listed in public display advertising transactions may be obtained from ratings bureau databases (e.g., Quantcast.com and Nielsen), websites and other such data feeds, step 7304. This data may be combined to transform the information from advertising transactions into attribute values and attribute tier values as described above with reference to FIG. 3A, 3B. For example, a product data may be transformed into a product attribute tier value, step 7306, publisher data information may be transformed into publisher tier attribute values, step 7308, advertiser information may be transformed into advertiser tier attribute values, step 7310, targeting package information may be transformed into one or more targeting attribute tier values, step 7312, flight information may be transformed into advertising product flight attribute values, and revenue information may be transformed into one or more revenue attribute tier values, step 7316. The transformed public display advertising transaction attribute values may then be stored in a database or data warehouse, step 7318. The data stored in a database may then be used to determine the public display advertising reference entity value, step 7320.

Figure 74:
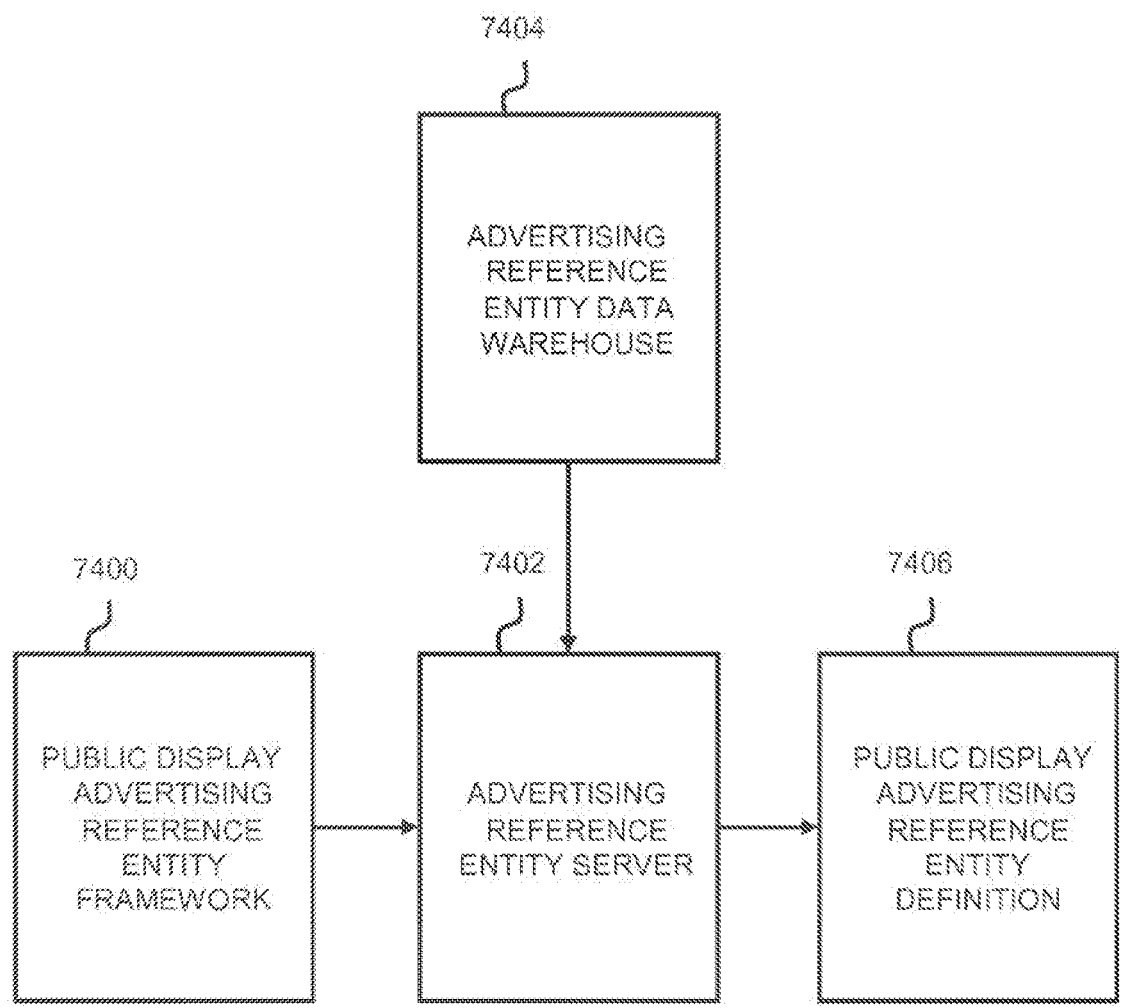

In an embodiment illustrated in FIG. 74, a public display advertising reference entity framework 7402 may be applied as an automated filter to the eligible pool of archived public display advertising transactions stored in a data warehouse 3400. In this process, an advertising reference entity server 7404 may use the public display advertising reference entity framework 7402 as a filter or search framework for drawing archived public display advertising transactions from the data warehouse 7400. The advertising reference entity server 7404 may then use the sampled transaction data in order to synthesize a public display advertising reference entity 7406. The process of synthesizing the public display reference entity may involve calculating the indexed reference entity value of the transactions sampled on the basis of the defined attribute values contained in the public display reference entity framework 7402. For example, the indexed value may include a gross transaction size, a gross revenue index, a net revenue index, and an effective unit revenue index.

Figure 75:
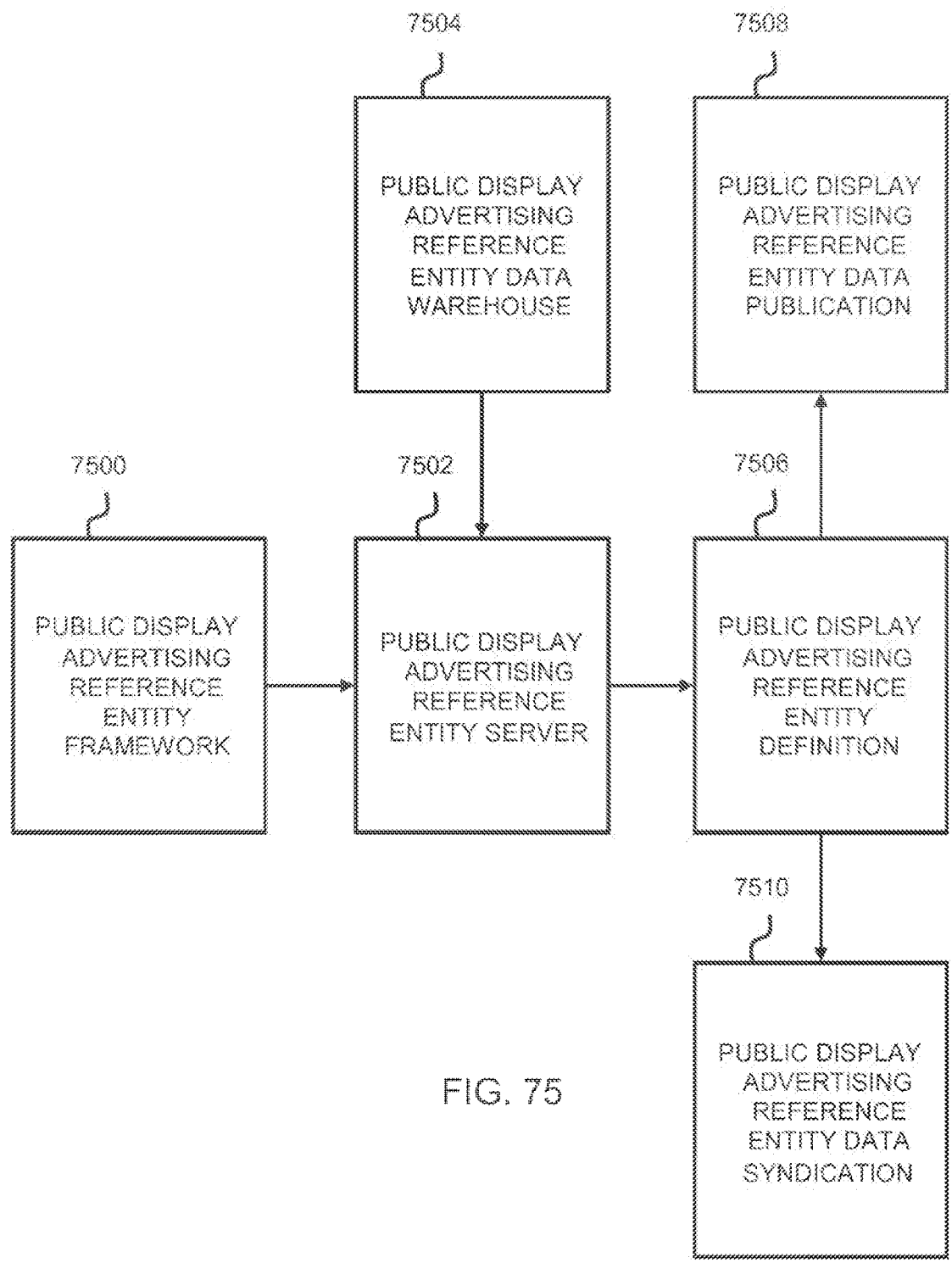

FIG. 75 illustrates a method in which a public display advertising reference entity is used as a public display advertising market benchmark. In this embodiment, a public display advertising reference entity framework 7500 is used by a public display advertising reference entity server 7502 to selectively sample electronic advertising transaction records stored within a data warehouse 7504. The public display advertising reference entity server 7502 uses the sampled transaction data to define a public display advertising reference entity 7506. This reference entity is then published as a public display advertising reference entity data publication 7508. The reference entity definition may also be used to generate a public display advertising reference entity data syndication 7510. In this embodiment, the value of the public display advertising reference entity may be defined following a consistently defined and executed advertising reference entity definition process with the results published and syndicated.

Figure 76:
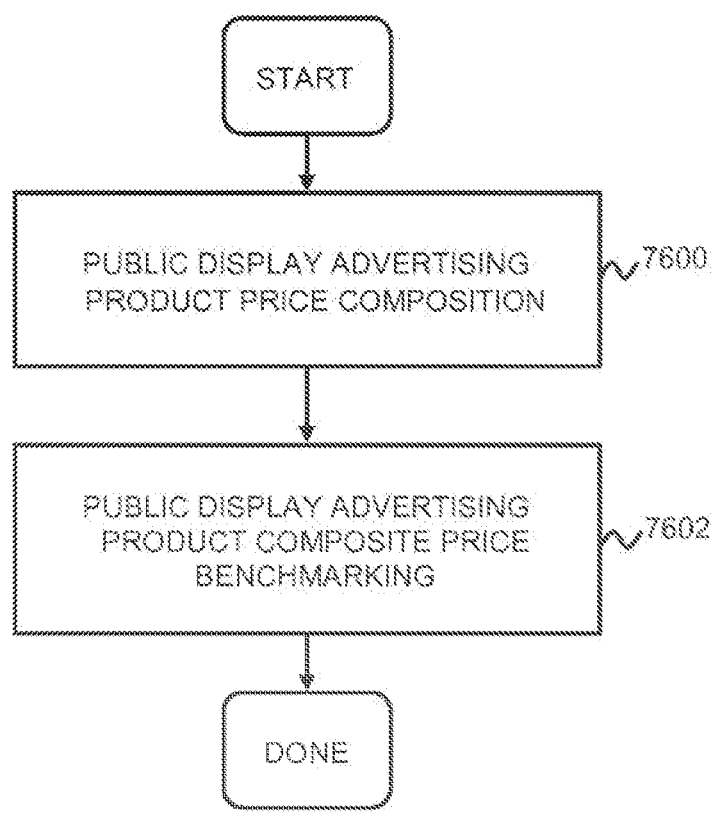

FIG. 76 illustrates a method for using a single public display advertising product composite price as a public display advertising product composite price benchmark. In this process, public display attribute values which define a particular type of public display advertising product are used to sample an advertising transaction data warehouse to extract advertising transaction records associated with a type of advertising product over a period of time, with that data used to determine an advertising composite price, step 7600. This establishes a public display advertising product composite price within the identified sample transaction time frame. The public display advertising product composite price may then be published to the marketplace on a timely and consistent basis with the publication syndicated, thereby establishing the public display advertising product composite price as a public display advertising composite price benchmark for subsequent transactions and operations, step 7602.

Figure 77:
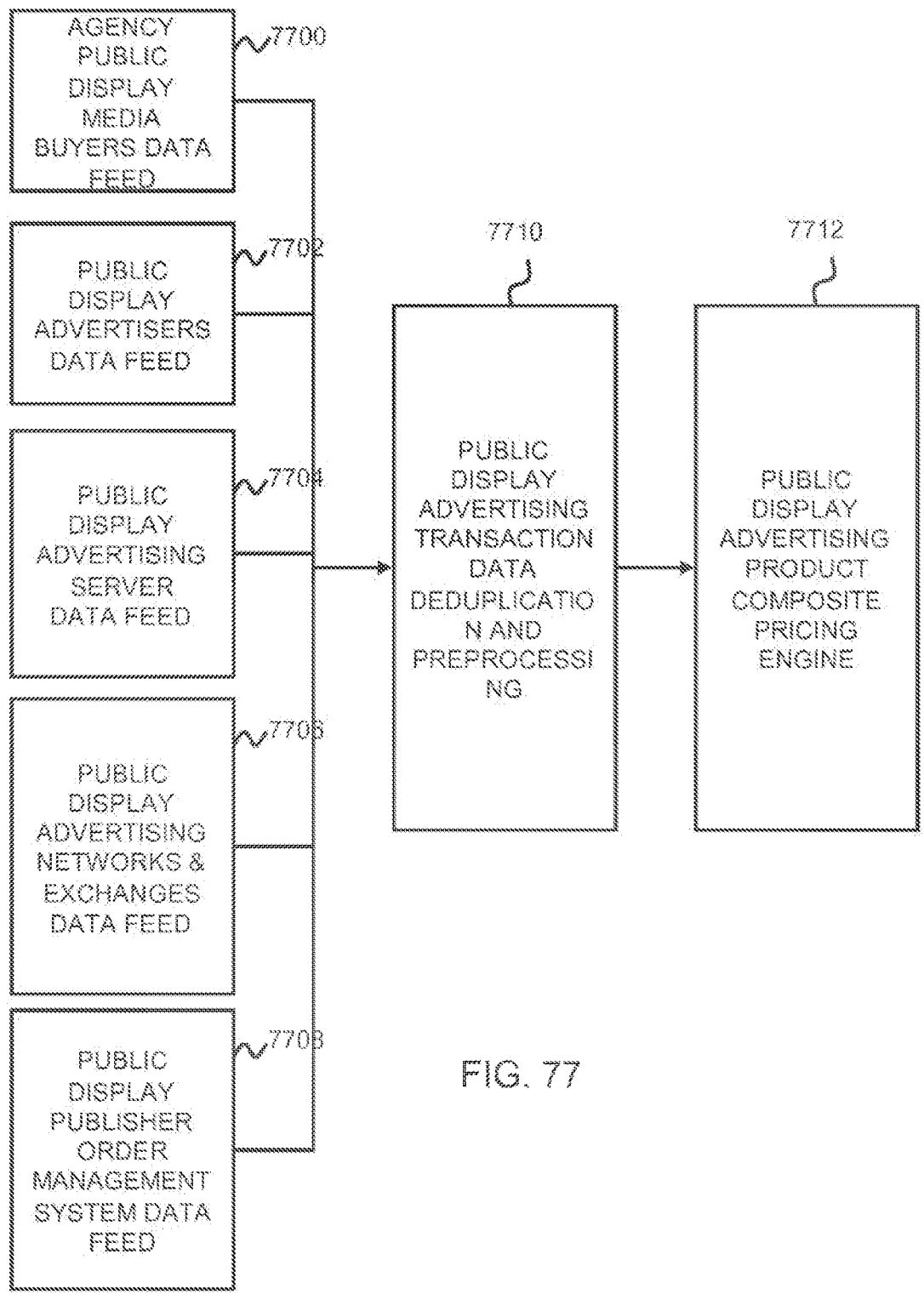

FIG. 77 illustrates a system network for identifying a set of advertising transactions to be extracted, transformed and used to define a public display advertising product composite price. Raw public display advertising transaction data may be obtained from a variety of sources including, for example, agency public display advertising buyer data feeds 7700, public display advertiser data feeds 7702, public display advertising server data feeds 7704, public display advertising networks and exchange data feeds 7706, and public display publisher order management system data feeds 7708. The raw public display advertising transaction data may be pre-processed to remove duplicates and otherwise transform attribute values into attribute tier values, step 7710, with the resulting data provided to a public display advertising product composite pricing engine 7712. The public display advertising product composite price engine may include a volume-weighted composite price for sampled public display advertising products of the identified attribute values conducted within an identify transaction time frame.

Figure 78:
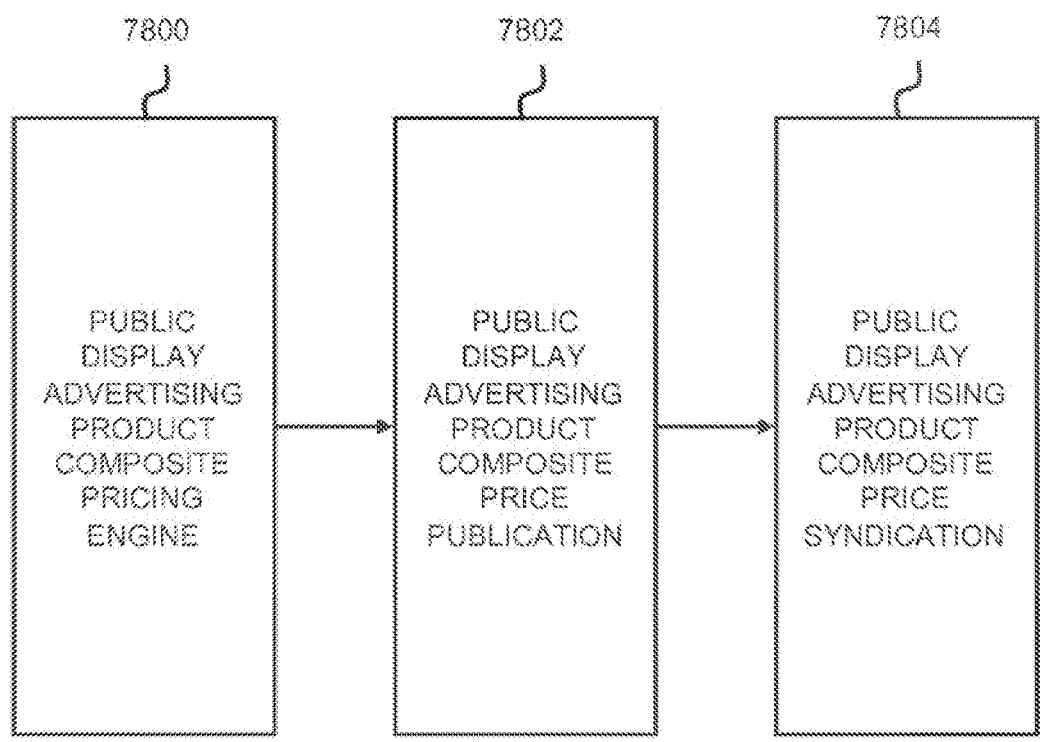

As illustrated in FIG. 78, the output from the public display advertising product composite pricing engine, step 7800, may be published as a public display advertising product composite price publication, step 7802, and syndicated as a public display advertising product composite price syndication, step 7804. The publication and syndication of the public display advertising product composite price may be accomplished via a variety of publication and communication mechanisms. The public display advertising product composite price may also be published in syndicated via closed, open and public networks as well as communications among market participants. Additionally, the public display advertising product composite price may be archived using any known archival methods and storage devices.

Figure 79:
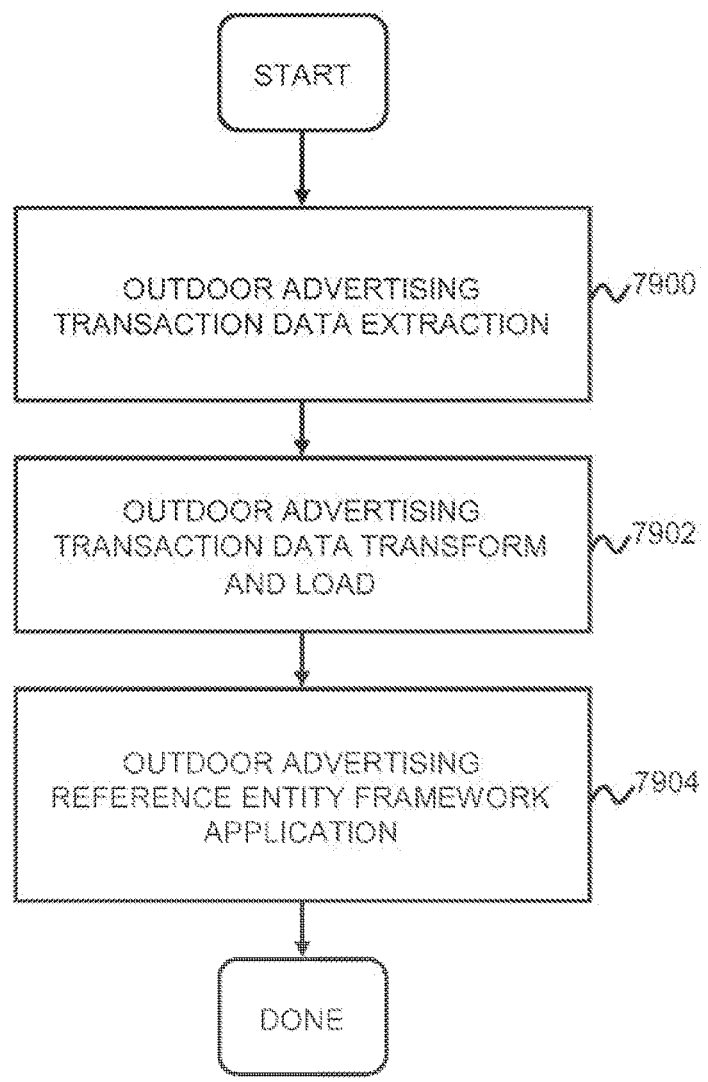
FIGS. 79-86 are process flow diagrams of methods for establishing a outdoor advertising benchmark, reference entity and composite price syndication.

FIG. 79 illustrates steps of a method for establishing an outdoor advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 7900. As part of this process, the transaction records and the database can be indexed and organized according to an attribute taxonomy to enable selected data records to be sampled and analyzed. To establish an advertising reference entity for advertising transactions matching the outdoor attribute value, a subset of advertising transaction records are selected within the database for processing, step 7902. The identified targeted attribute values may include single attributes or combinations of attributes associated with outdoor advertising transactions. The sampled advertising transaction records are then aggregated to establish an outdoor advertising reference entity value, step 7904.

Figure 80:
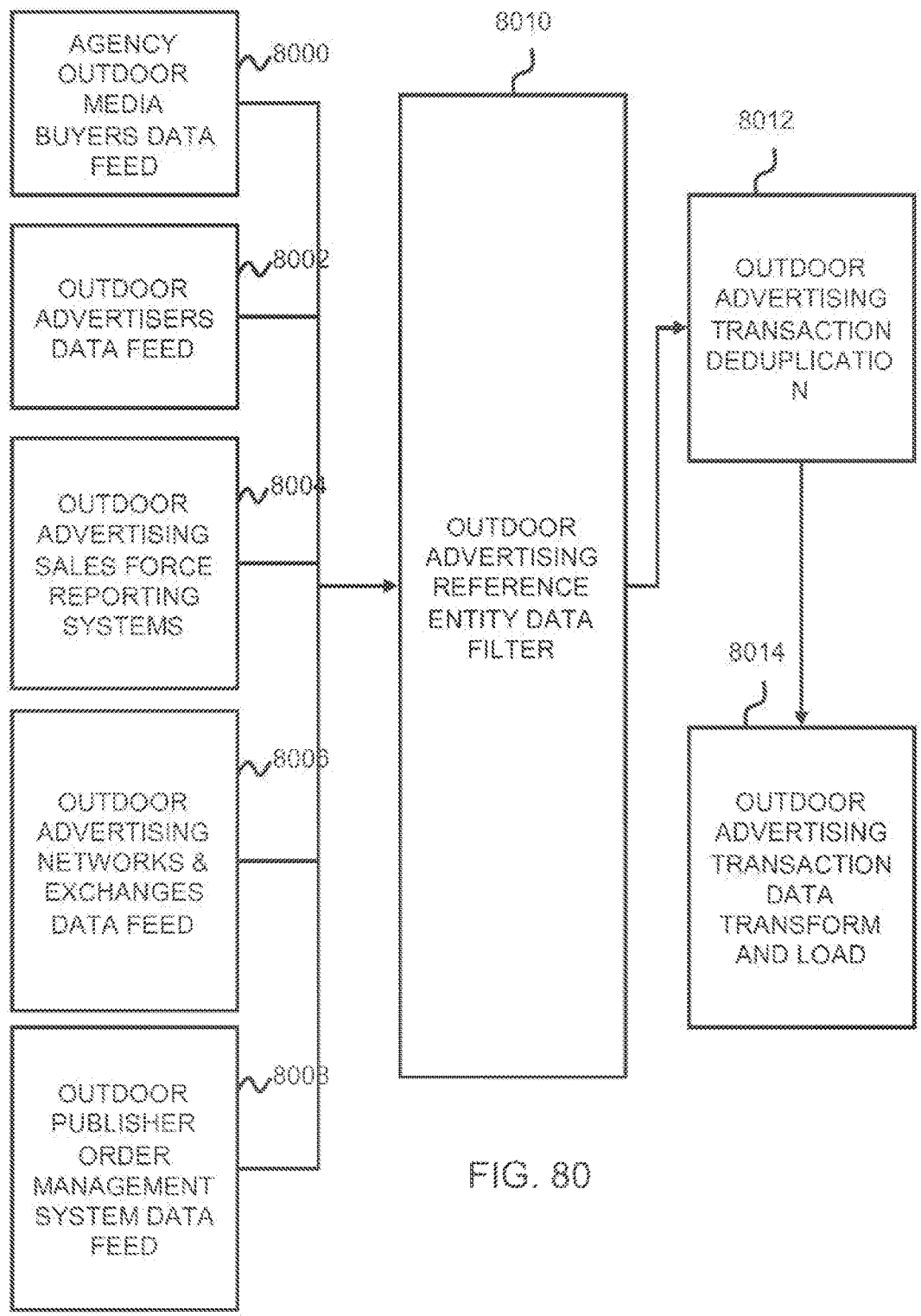

In this embodiment, advertising transaction records may be selected for an advertising transaction database by specifying "outdoor" (or a corresponding attribute ID value) as the selection value for the advertising medium attribute. Alternatively, the advertising transactions that are captured in step 7900 may be limited to transactions purchasing outdoor advertising, as illustrated in FIG. 80. For example, the data sources used to collect advertising transactions may be limited to agency electronics delayed media buyers data feeds 8000, outdoor advertisers data feeds 8002, outdoor advertising server data feeds 8004, outdoor advertising networks and exchanges data feeds 8006, and outdoor publisher order management system data feeds 8008. Additionally, the advertising transaction data feeds may be filtered by an outdoor advertising reference entity data filter, step 8010. As mentioned above, the outdoor advertising transaction data received from the various data feeds may be preprocessed to remove duplicate transaction records, step 8012. The preprocessed outdoor advertising transaction data may then be processed to transform attribute information into attribute tier values and data records stored in a database, step 8014.

Figure 81:
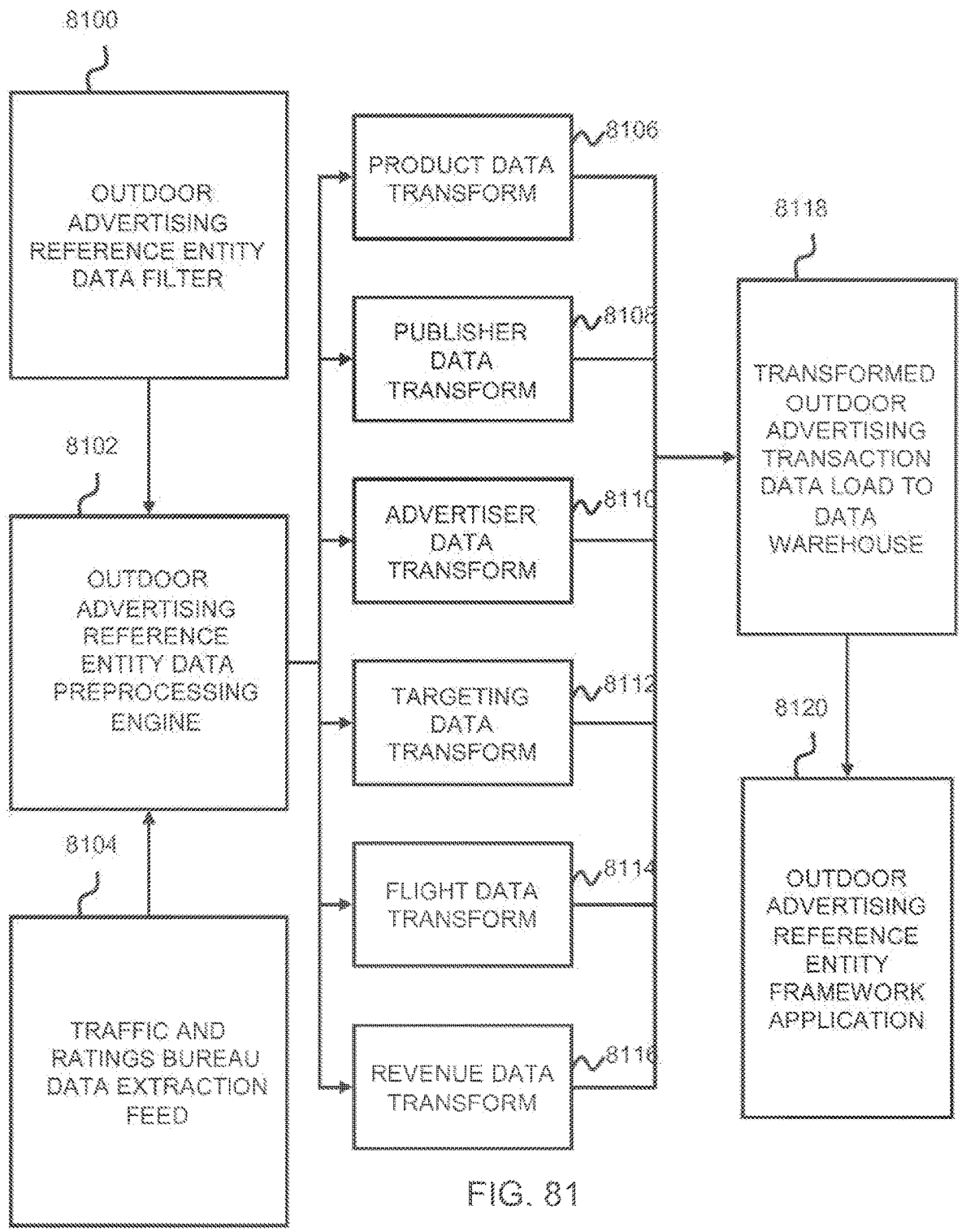

FIG. 81 illustrates in more detail steps involved in organizing outdoor advertising transaction records according to a taxonomy of outdoor advertising attributes. Advertising transaction data selected via an outdoor advertising reference entity data filter, step 8110, may be preprocessed as described above, step 8102. Information regarding consumer exposure to outdoor displays listed in outdoor advertising transactions may be obtained from ratings bureau databases (e.g., Quantcast.com and Nielsen), websites and other such data feeds, step 8104. This data may be combined to transform the information from advertising transactions into attribute values and attribute tier values as described above with reference to FIG. 3A, 3B. For example, a product data may be transformed into a product attribute tier value, step 8106, publisher data information may be transformed into publisher tier attribute values, step 8108, advertiser information may be transformed into advertiser tier attribute values, step 8110, targeting package information may be transformed into one or more targeting attribute tier values, step 8112, flight information may be transformed into advertising product flight attribute values, and revenue information may be transformed into one or more revenue attribute tier values, step 8116. The transformed outdoor advertising transaction attribute values may then be stored in a database or data warehouse, step 8118. The data stored in a database may then be used to determine the outdoor advertising reference entity value, step 8120.

Figure 82:
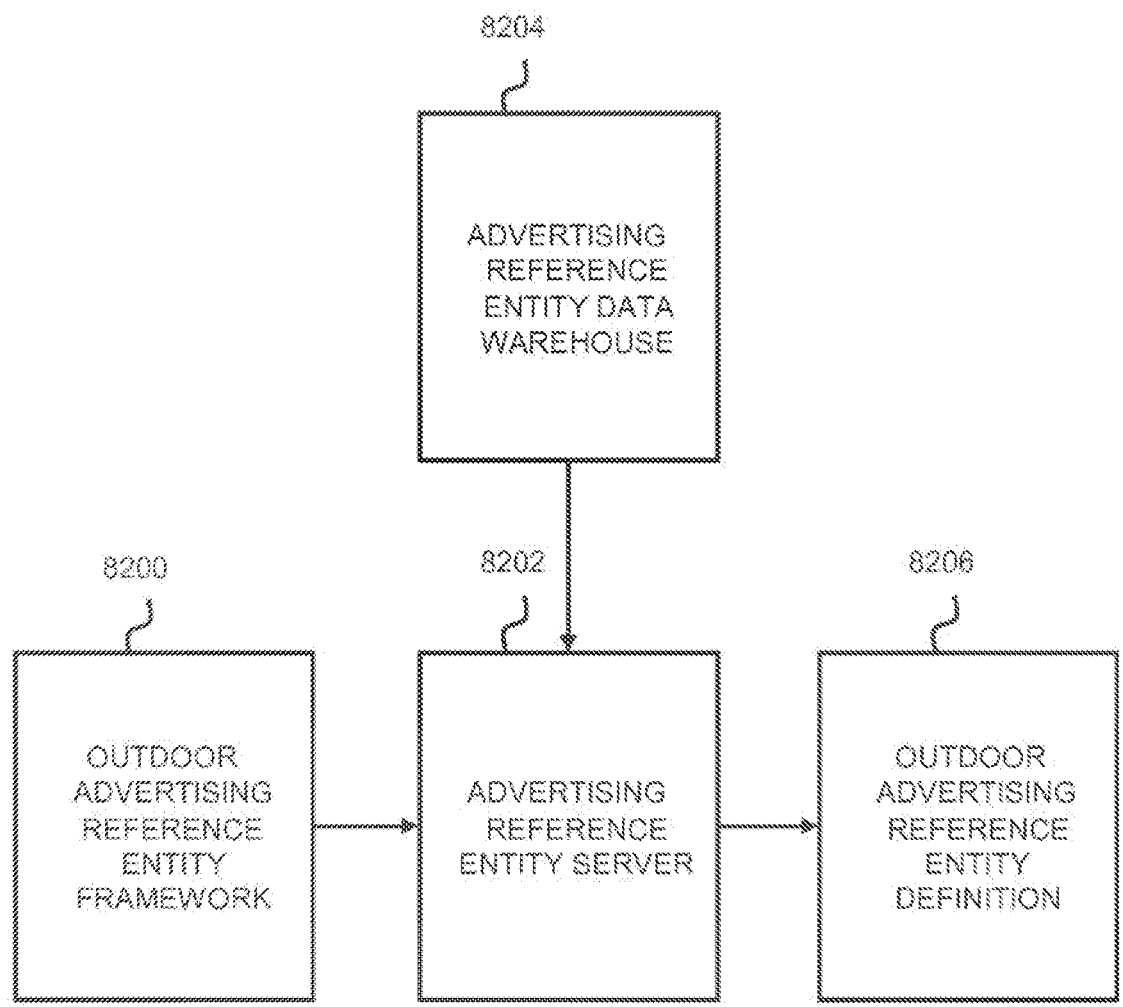

In an embodiment illustrated in FIG. 82, an outdoor advertising reference entity framework 3402 may be applied as an automated filter to the eligible pool of archived outdoor advertising transactions stored in a data warehouse 8200. In this process, an advertising reference entity server 8204 may use the outdoor advertising reference entity framework 8202 as a filter or search framework for drawing archived outdoor advertising transactions from the data warehouse 8200. Outdoor advertising may be identified or filtered based upon display attributes including for example a billboard attribute, a taxi display attribute, a building attribute, a location attribute, an on-taxi display attribute, a bus-side display attribute, a transportation vehicle display attribute, a video board attribute, an LED board attribute, an on-building display attribute, a wall display attribute, a transportation location display attribute, a bench display attribute, a road-side display attribute, a sign attribute, and the like. The advertising reference entity server 8204 may then use the sampled transaction data in order to synthesize an outdoor advertising reference entity 8206. The process of synthesizing the outdoor reference entity may involve calculating the indexed reference entity value of the transactions sampled on the basis of the defined attribute values contained in the outdoor reference entity framework 8202. For example, the indexed value may include a gross transaction size, a gross revenue index, a net revenue index, and an effective unit revenue index.

Figure 83:
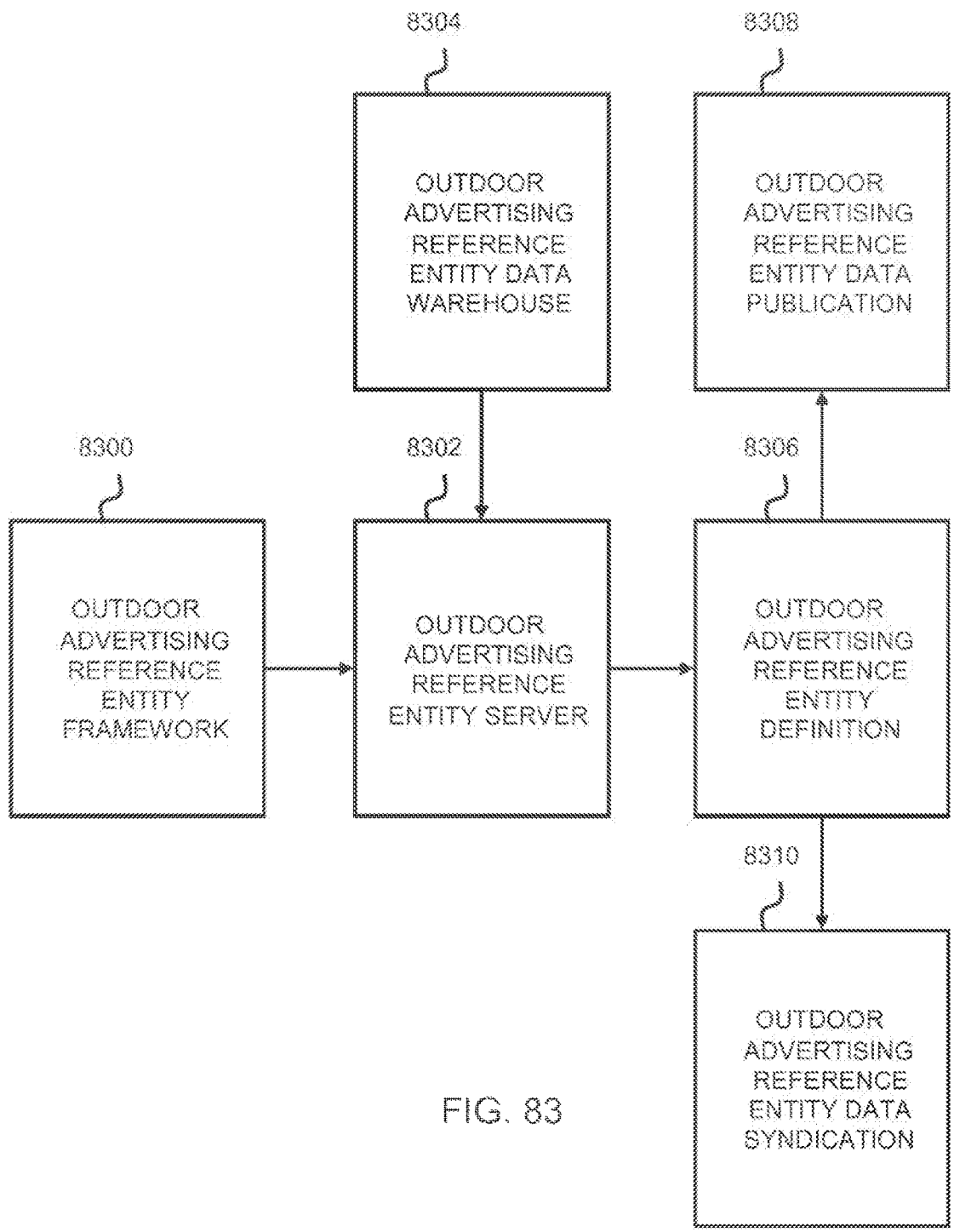

FIG. 83 illustrates a method in which an outdoor advertising reference entity is used as an outdoor advertising market benchmark. In this embodiment, an outdoor advertising reference entity framework 8300 is used by an outdoor advertising reference entity server 8302 to selectively sample electronic advertising transaction records stored within a data warehouse 8304. The outdoor advertising reference entity server 8302 uses the sampled transaction data to define an outdoor advertising reference entity 8306. This reference entity is then published as an outdoor advertising reference entity data publication 8308. The reference entity definition may also be used to generate an outdoor advertising reference entity data syndication 8310. In this embodiment, the value of the outdoor advertising reference entity may be defined following a consistently defined and executed advertising reference entity definition process with the results published and syndicated.

Figure 84:
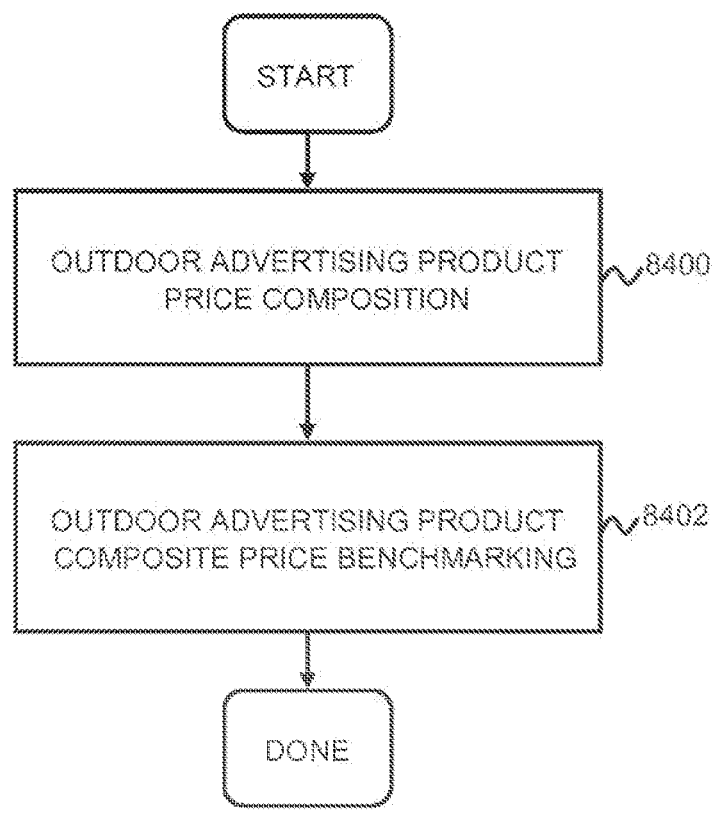

FIG. 84 illustrates a method for using a single outdoor advertising product composite price as an outdoor advertising product composite price benchmark. In this process, outdoor attribute values which define a particular type of outdoor advertising product are used to sample an advertising transaction data warehouse to extract advertising transaction records associated with a type of advertising product over a period of time, with that data used to determine an advertising composite price, step 8400. This establishes an outdoor advertising product composite price within the identified sample transaction time frame. The outdoor advertising product composite price may then be published to the marketplace on a timely and consistent basis with the publication syndicated, thereby establishing the outdoor advertising product composite price as an outdoor advertising composite price benchmark for subsequent transactions and operations, step 8402.

Figure 85:
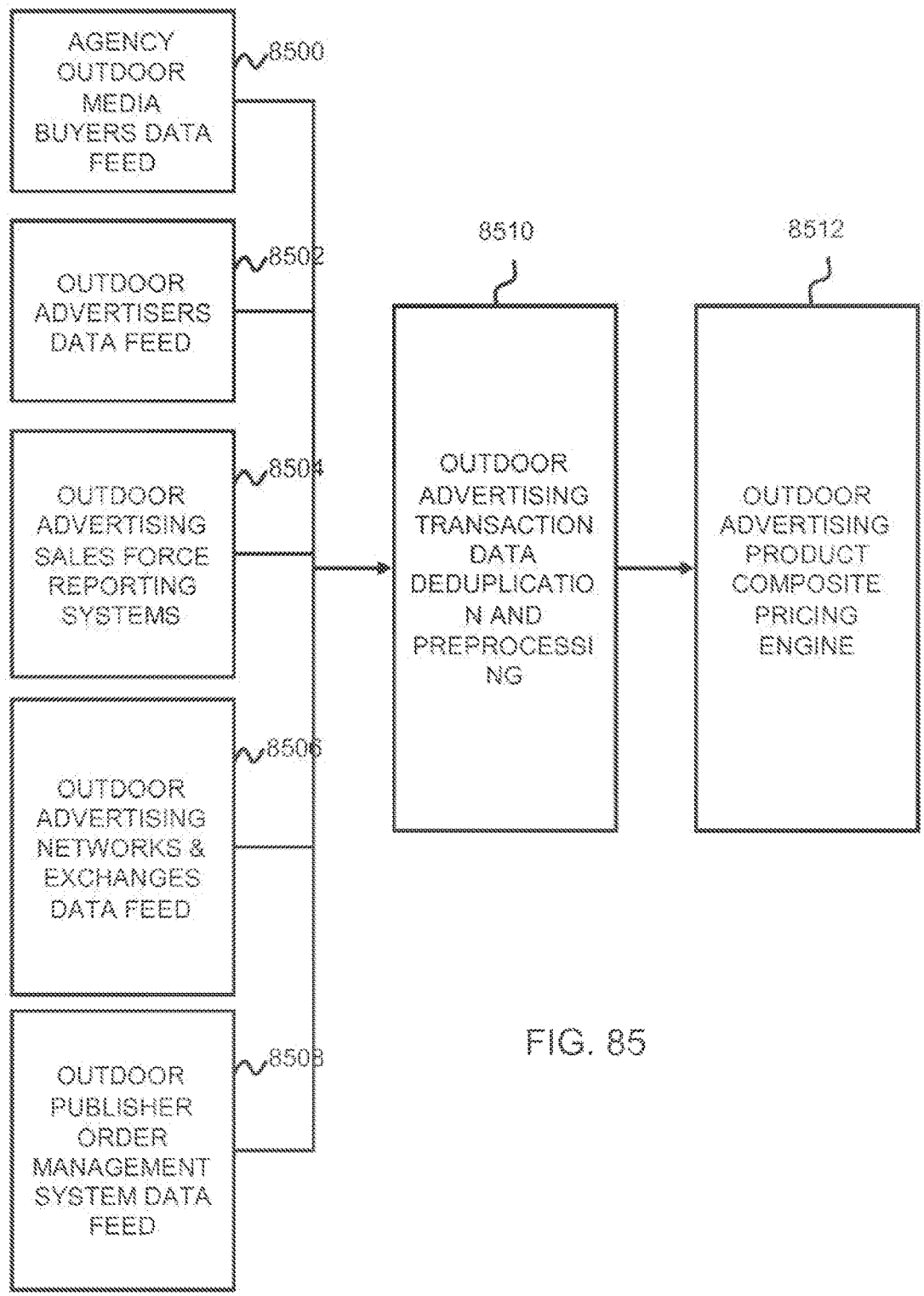

FIG. 85 illustrates a system network for identifying a set of outdoor advertising transactions to be extracted, transformed and used to define an outdoor advertising product composite price. Raw outdoor advertising transaction data may be obtained from a variety of sources including, for example, agency outdoor advertising buyer data feeds 8500, outdoor advertiser data feeds 8502, outdoor advertising server data feeds 8504, outdoor advertising networks and exchange data feeds 8506, and outdoor publisher order management system data feeds 3708. The raw outdoor advertising transaction data may be pre-processed to remove duplicates and otherwise transform attribute values into attribute tier values, step 8510, with the resulting data provided to an outdoor advertising product composite pricing engine 8512. The outdoor advertising product composite price engine may include a volume-weighted composite price for sampled outdoor advertising products of the identified attribute values conducted within an identify transaction time frame.

Figure 86:
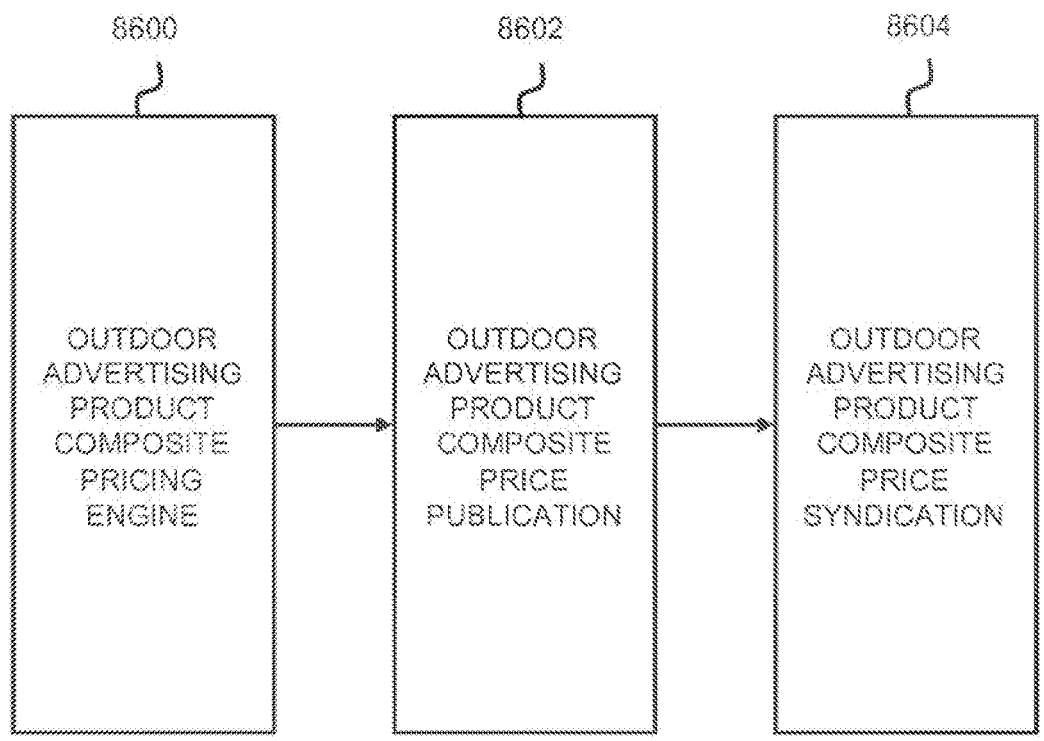

As illustrated in FIG. 86, the output from the outdoor advertising product composite pricing engine, step 8600, may be published as an outdoor advertising product composite price publication, step 8602, and syndicated as an outdoor advertising product composite price syndication, step 8604. The publication and syndication of the outdoor advertising product composite price may be accomplished via a variety of publication and communication mechanisms. The outdoor advertising product composite price may also be published in syndicated via closed, open and public networks as well as communications among market participants. Additionally, the outdoor advertising product composite price may be archived using any known archival methods and storage devices.

Figure 87:
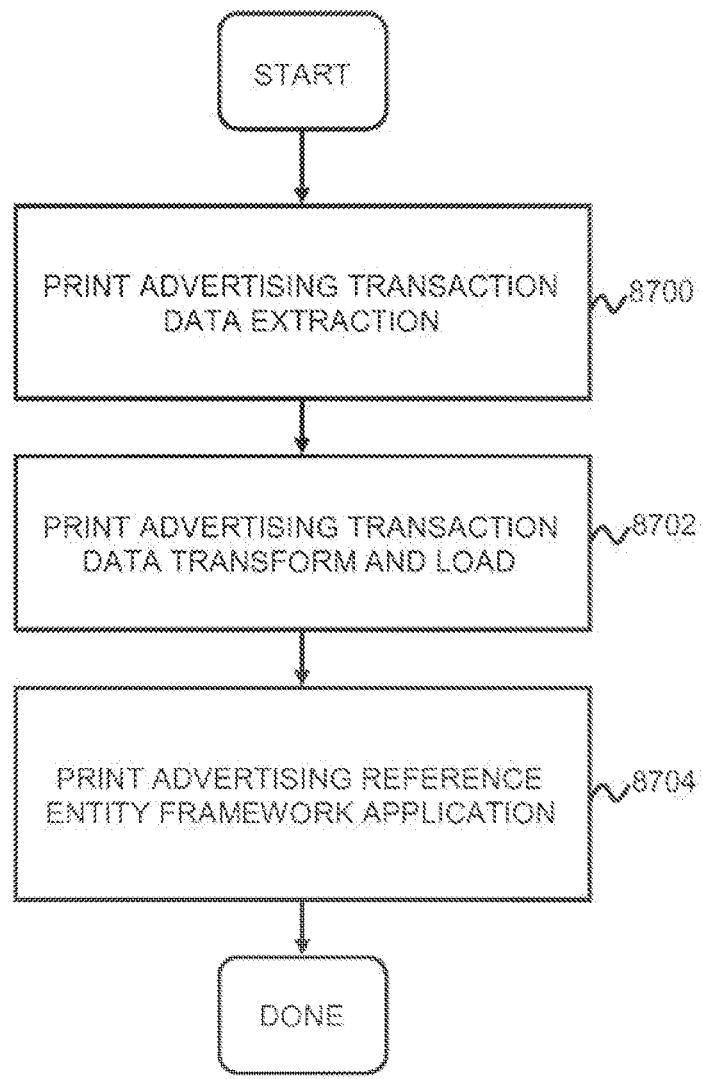
FIGS. 87-94 are process flow diagrams of methods for establishing a print advertising benchmark, reference entity and composite price syndication.

FIG. 87 illustrates steps of a method for establishing a print advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 8700. As part of this process, the transaction records and the database can be indexed and organized according to an attribute taxonomy to enable selected data records to be sampled and analyzed. To establish an advertising reference entity for advertising transactions matching the print attribute value, a subset of advertising transaction records are selected within the database for processing, step 8702. The identified targeted attribute values may include single attributes or combinations of attributes associated with print advertising transactions. The sampled advertising transaction records are then aggregated to establish a print advertising reference entity value, step 8704.

Figure 88:
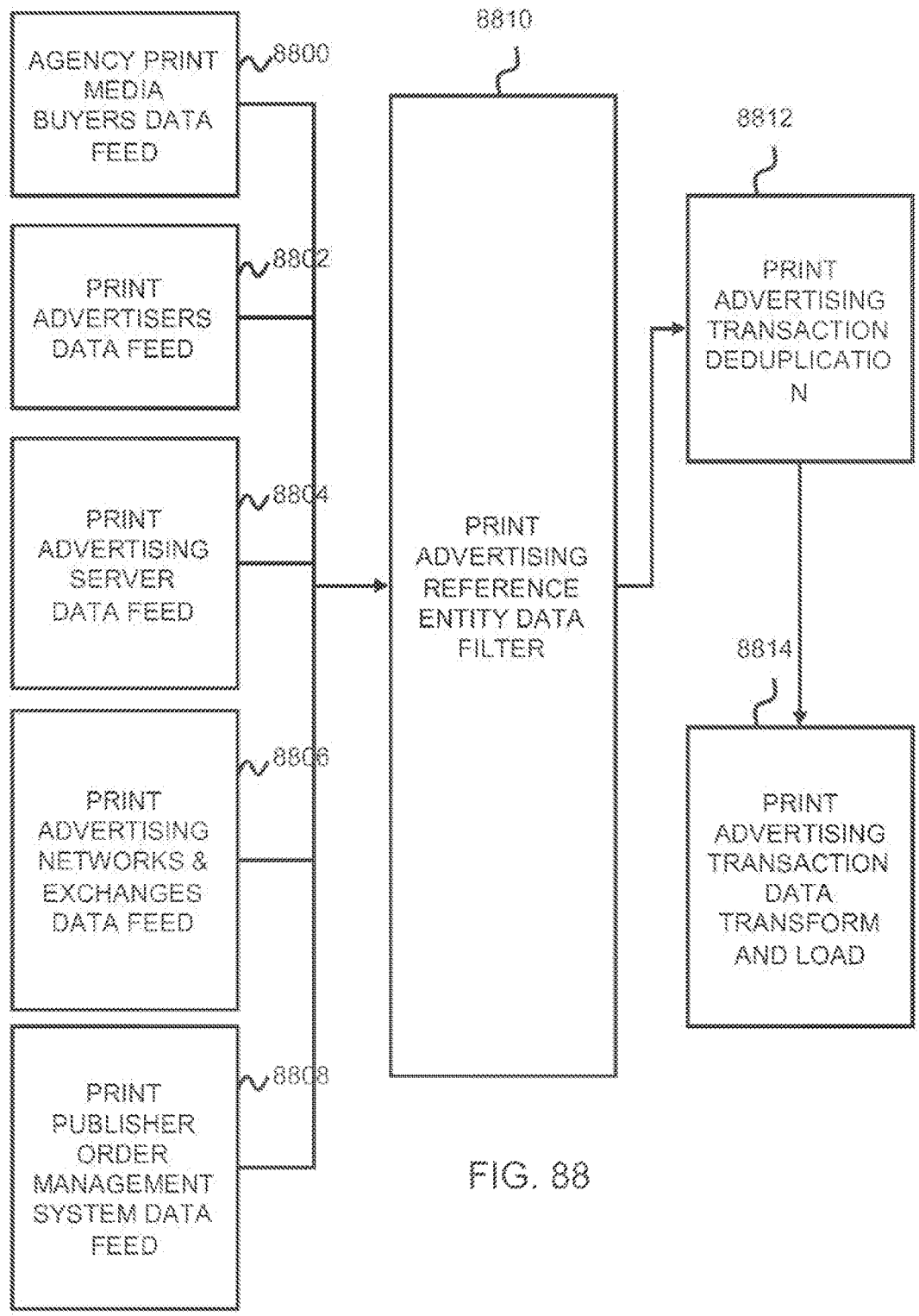

In this embodiment, advertising transaction records may be selected for an advertising transaction database by specifying "print" (or a corresponding attribute ID value) as the selection value for the advertising medium attribute. Alternatively, the advertising transactions that are captured in step 8700 may be limited to transactions purchasing advertising and in printed media, as illustrated in FIG. 88. For example, the data sources used to collect advertising transactions may be limited to agency electronics delayed media buyers data feeds 8800, print advertisers data feeds 8802, print advertising server data feeds 8804, print advertising networks and exchanges data feeds 8806, and print publisher order management system data feeds 8808. Additionally, the advertising transaction data feeds may be filtered by a print advertising reference entity data filter, step 8810. As mentioned above, the print advertising transaction data received from the various data feeds may be preprocessed to remove duplicate transaction records, step 8812. The preprocessed print advertising transaction data may then be processed to transform attribute information into attribute tier values and data records stored in a database, step 8814.

Figure 89:
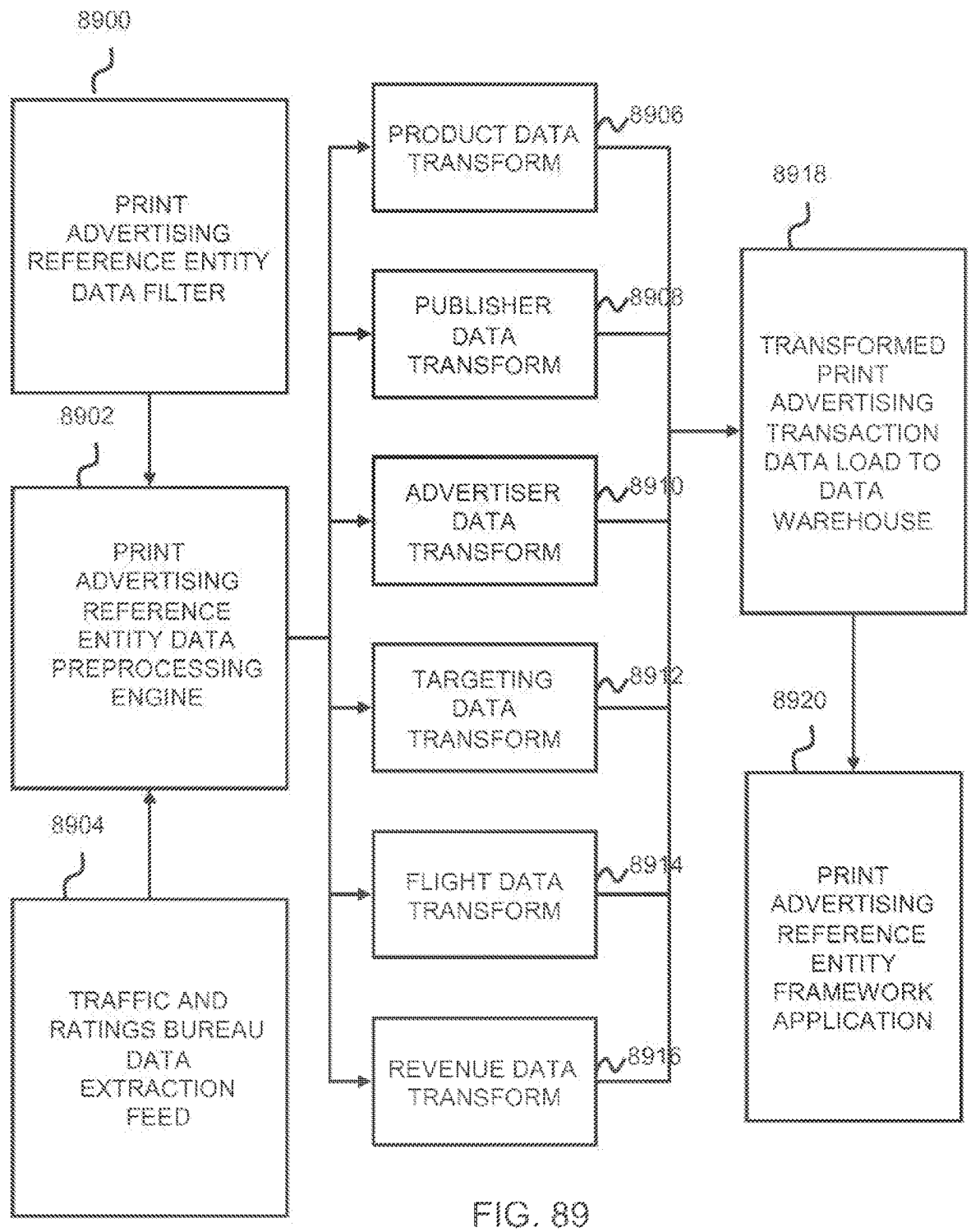

FIG. 89 illustrates in more detail steps involved in organizing print advertising transaction records according to a taxonomy of print advertising attributes. Advertising transaction data selected via a print advertising reference entity data filter, step 8910, may be preprocessed as described above, step 8902. Information regarding readership of print publications listed in print advertising transactions may be obtained from ratings bureau databases (e.g., Quantcast.com and Nielsen), websites and other such data feeds, step 8904. This data may be combined to transform the information from advertising transactions into attribute values and attribute tier values as described above with reference to FIG. 3A, 3B. For example, a product data may be transformed into a product attribute tier value, step 8906, publisher data information may be transformed into publisher tier attribute values, step 8908, advertiser information may be transformed into advertiser tier attribute values, step 8910, targeting package information may be transformed into one or more targeting attribute tier values, step 8912, flight information may be transformed into advertising product flight attribute values, and revenue information may be transformed into one or more revenue attribute tier values, step 8916. The transformed print advertising transaction attribute values may then be stored in a database or data warehouse, step 8918. The data stored in a database may then be used to determine the print advertising reference entity value, step 8920.

Figure 90:
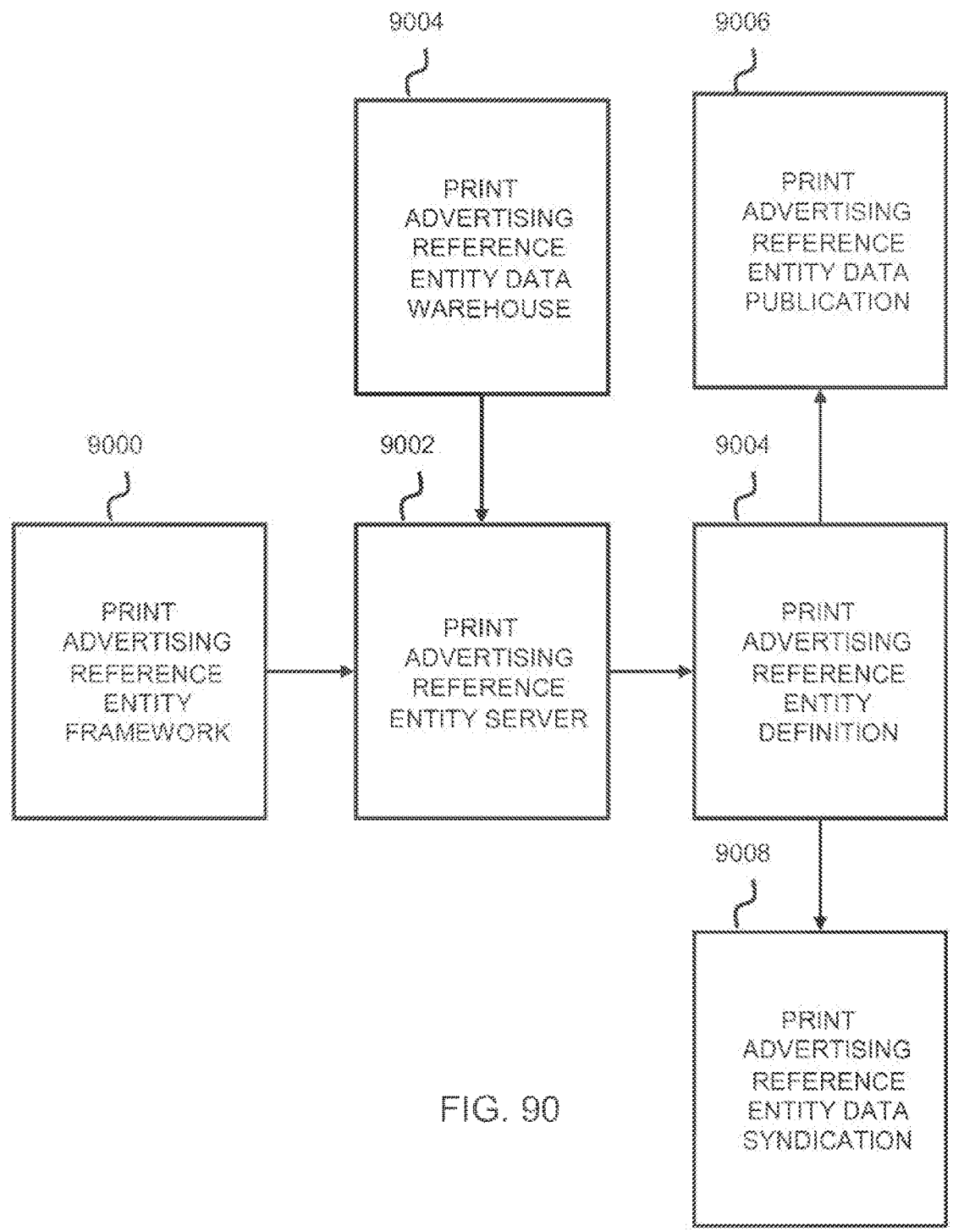

In an embodiment illustrated in FIG. 90, a print advertising reference entity framework 9002 may be applied as an automated filter to the eligible pool of archived print advertising transactions stored in a data warehouse 9000. In this process, an advertising reference entity server 9004 may use the print advertising reference entity framework 9002 as a filter or search framework for drawing archived print advertising transactions from the data warehouse 9000. The advertising reference entity server 9004 may then use the sampled transaction data in order to synthesize a print advertising reference entity 9006. The process of synthesizing the print reference entity may involve calculating the indexed reference entity value of the transactions sampled on the basis of the defined attribute values contained in the print reference entity framework 9002. For example, the indexed value may include a gross transaction size, a gross revenue index, a net revenue index, and an effective unit revenue index.

Figure 91:
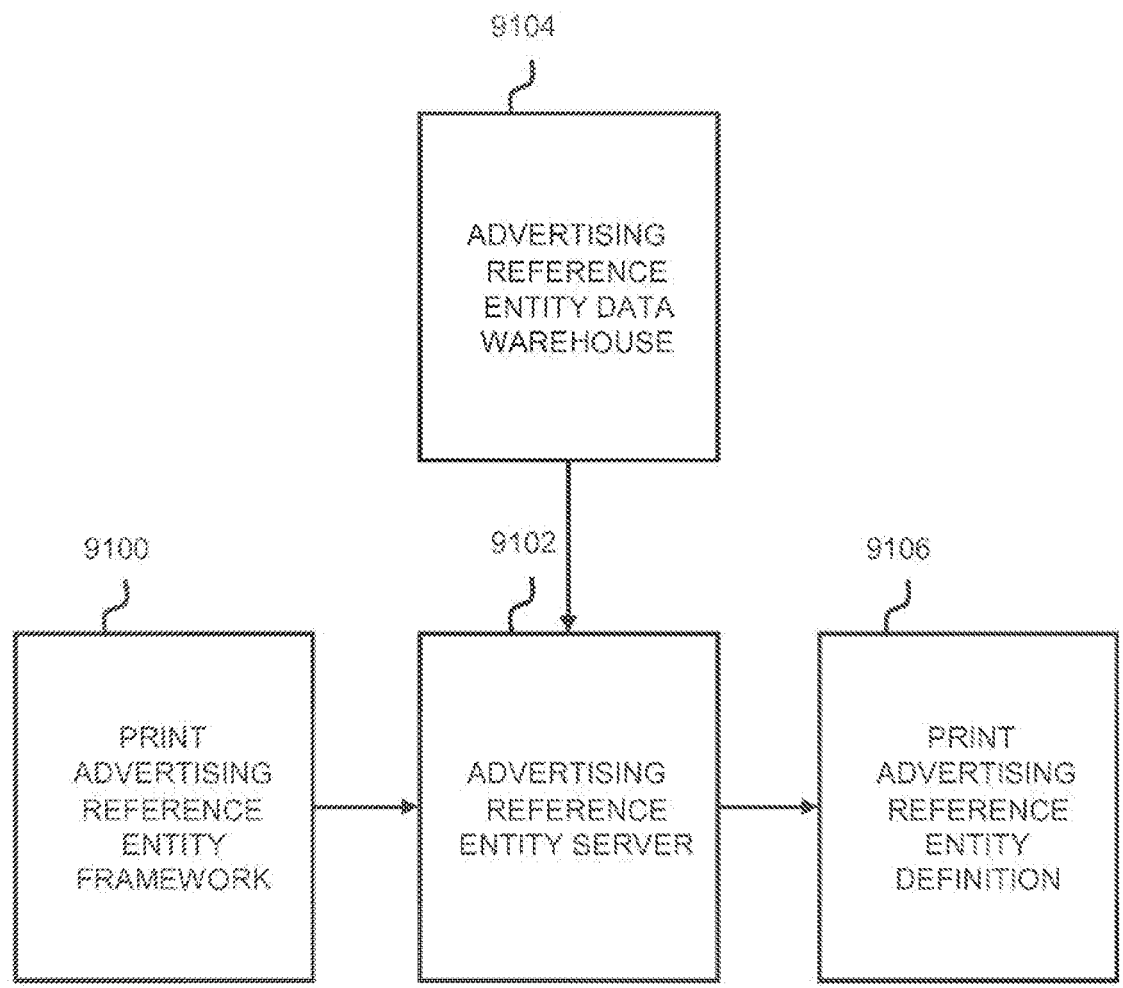

FIG. 91 illustrates a method in which a print advertising reference entity is used as a print advertising market benchmark. In this embodiment, a print advertising reference entity framework 9100 is used by a print advertising reference entity server 9102 to selectively sample electronic advertising transaction records stored within a data warehouse 9104. The print advertising reference entity server 9102 uses the sampled transaction data to define a print advertising reference entity 9106. This reference entity is then published as a print advertising reference entity data publication 9108. The reference entity definition may also be used to generate a print advertising reference entity data syndication 9110. In this embodiment, the value of the print advertising reference entity may be defined following a consistently defined and executed advertising reference entity definition process with the results published and syndicated.

Figure 92:
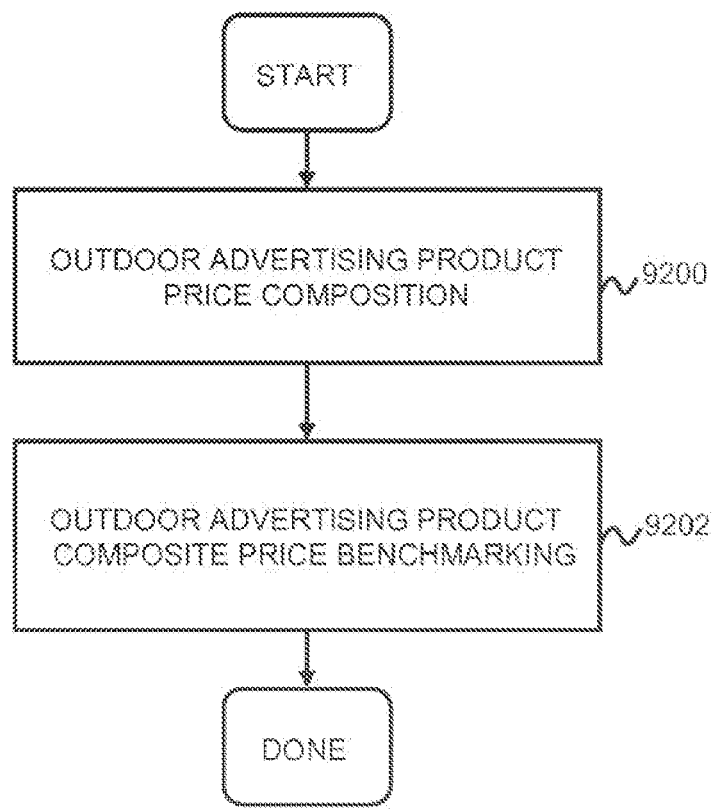

FIG. 92 illustrates a method for using a single print advertising product composite price as a print advertising product composite price benchmark. In this process, print attribute values which define a particular type of print advertising product are used to sample an advertising transaction data warehouse to extract advertising transaction records associated with a type of advertising product over a period of time, with that data used to determine an advertising composite price, step 9200. This establishes a print advertising product composite price within the identified sample transaction time frame. The print advertising product composite price may then be published to the marketplace on a timely and consistent basis with the publication syndicated, thereby establishing the print advertising product composite price as a print advertising composite price benchmark for subsequent transactions and operations, step 9202.

Figure 93:
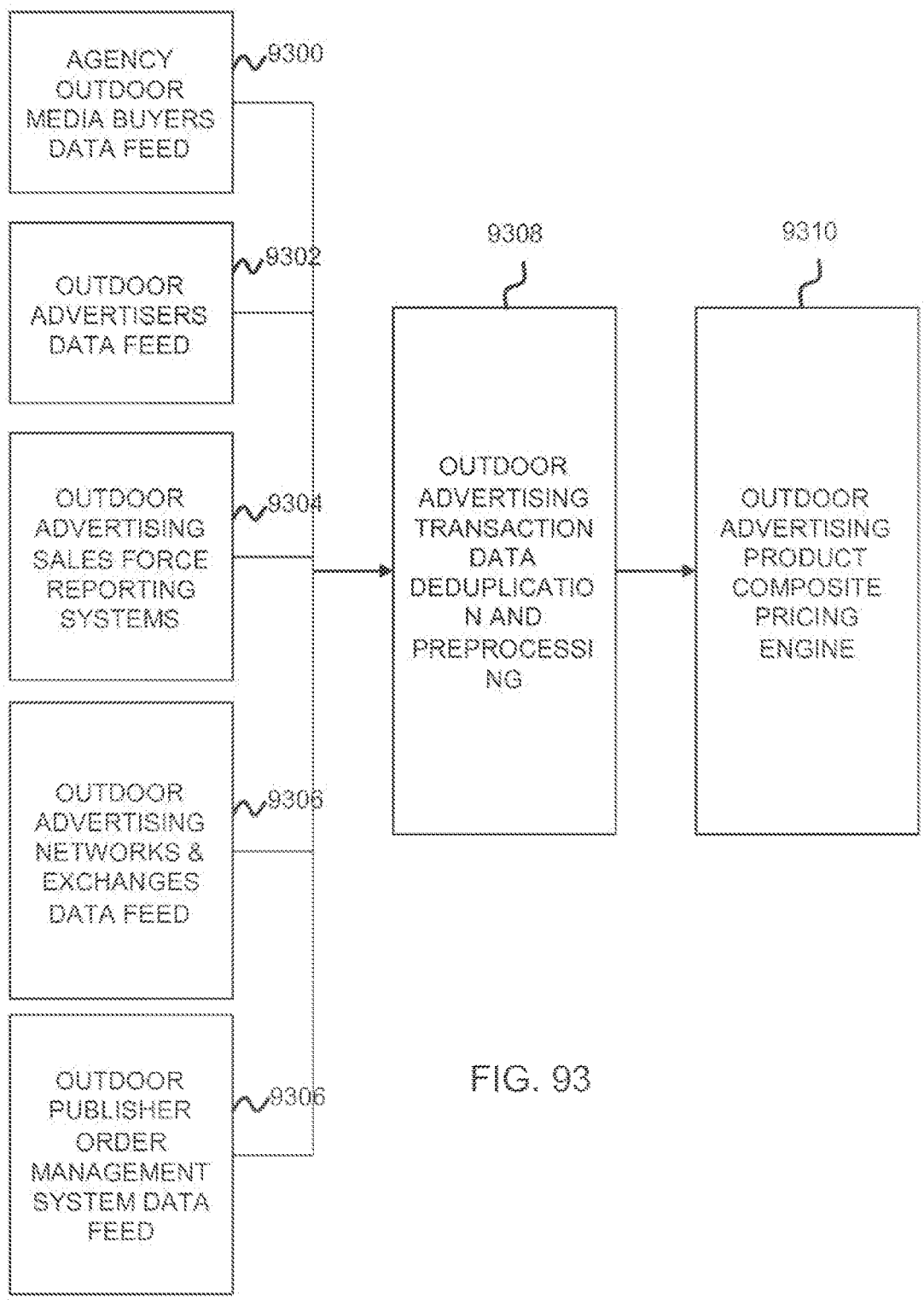

FIG. 93 illustrates a system network for identifying a set of advertising transactions to be extracted, transformed and used to define a print advertising product composite price. Raw print advertising transaction data may be obtained from a variety of sources including, for example, agency print advertising buyer data feeds 9300, print advertiser data feeds 9302, print advertising server data feeds 9304, print advertising networks and exchange data feeds 9306, and print publisher order management system data feeds 9308. The raw print advertising transaction data may be pre-processed to remove duplicates and otherwise transform attribute values into attribute tier values, step 9310, with the resulting data provided to a print advertising product composite pricing engine 9312. The print advertising product composite price engine may include a volume-weighted composite price for sampled print advertising products of the identified attribute values conducted within an identify transaction time frame.

Figure 94:
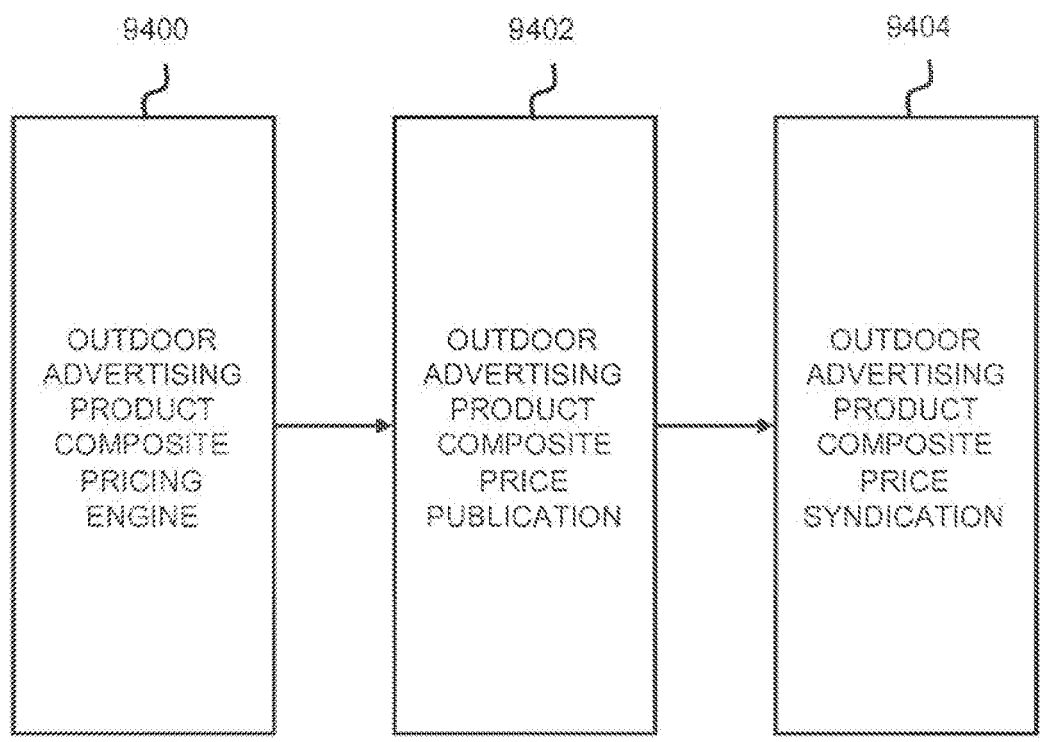

As illustrated in FIG. 94, the output from the print advertising product composite pricing engine, step 9400, may be published as a print advertising product composite price publication, step 9402, and syndicated as a public display advertising product composite price syndication, step 9404. The publication and syndication of the print advertising product composite price may be accomplished via a variety of publication and communication mechanisms. The print advertising product composite price may also be published in syndicated via closed, open and public networks as well as communications among market participants. Additionally, the print advertising product composite price may be archived using any known archival methods and storage devices.

Figure 95:
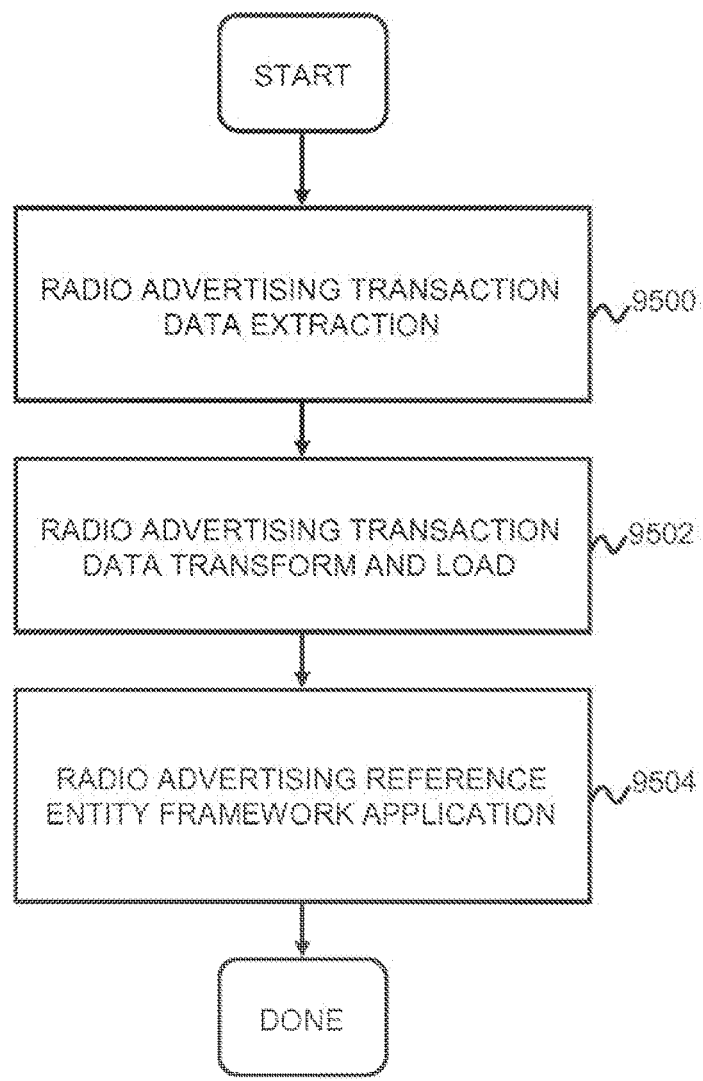
FIGS. 95-102 are process flow diagrams of methods for establishing a radio advertising benchmark, reference entity and composite price syndication.

FIG. 95 illustrates steps of a method for establishing a radio advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 9500. As part of this process, the transaction records and the database can be indexed and organized according to an attribute taxonomy to enable selected data records to be sampled and analyzed. To establish an advertising reference entity for advertising transactions matching the radio attribute value, a subset of advertising transaction records are selected within the database for processing, step 9502. The identified targeted attribute values may include single attributes or combinations of attributes associated with radio advertising transactions. The sampled advertising transaction records are then aggregated to establish a radio advertising reference entity value, step 9504.

Figure 96:
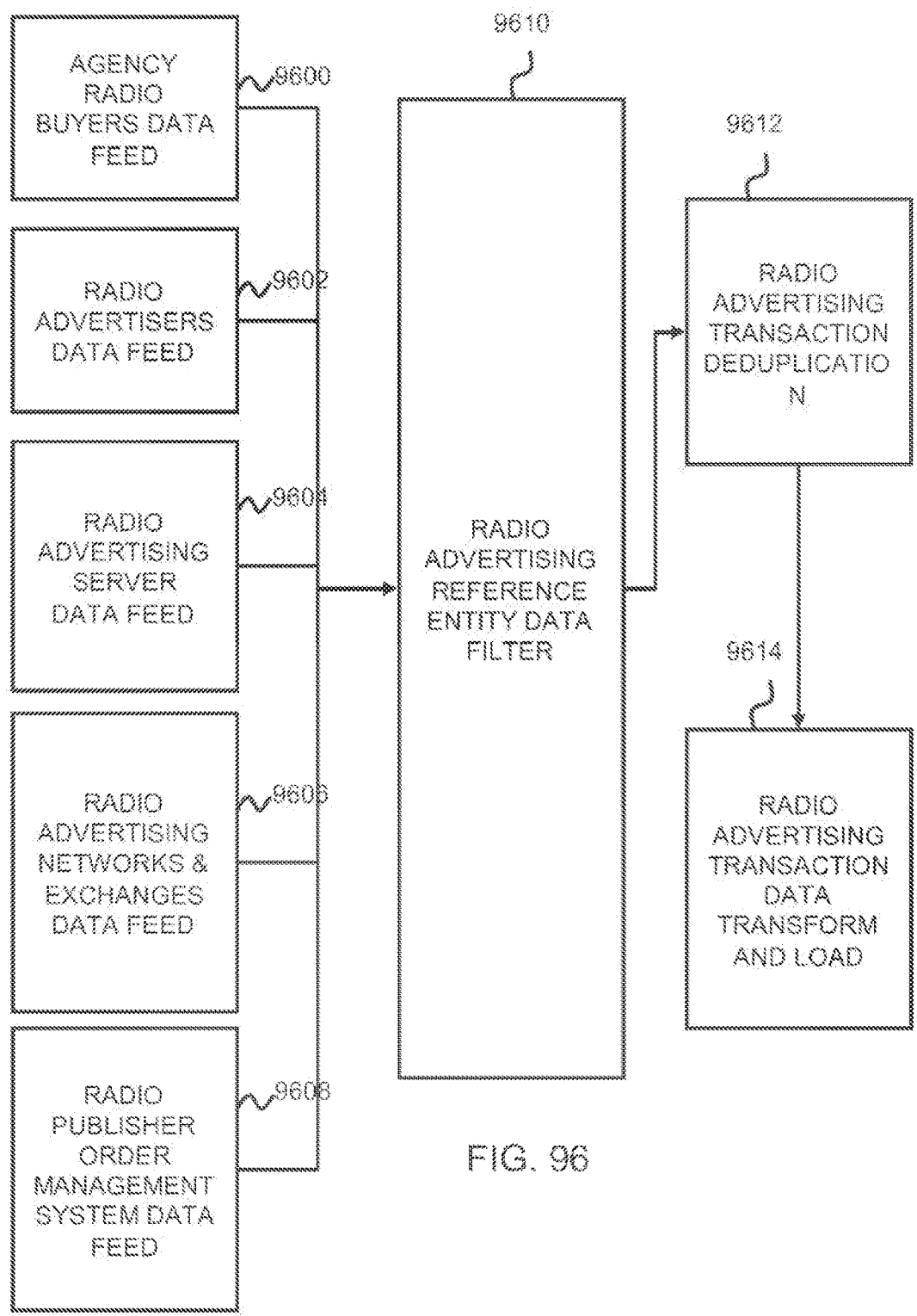

In this embodiment, advertising transaction records may be selected for an advertising transaction database by specifying "radio" (or a corresponding attribute ID value) as the selection value for the advertising medium attribute. Alternatively, the advertising transactions that are captured in step 9500 may be limited to transactions purchasing radio advertising, as illustrated in FIG. 96. For example, the data sources used to collect advertising transactions may be limited to agency electronics delayed media buyers data feeds 9600, radio advertisers data feeds 9602, radio advertising server data feeds 9604, radio advertising networks and exchanges data feeds 9606, and radio publisher order management system data feeds 9608. Additionally, the advertising transaction data feeds may be filtered by a radio advertising reference entity data filter, step 9610. As mentioned above, the radio advertising transaction data received from the various data feeds may be preprocessed to remove duplicate transaction records, step 9612. The preprocessed radio advertising transaction data may then be processed to transform attribute information into attribute tier values and data records stored in a database, step 9614.

Figure 97:
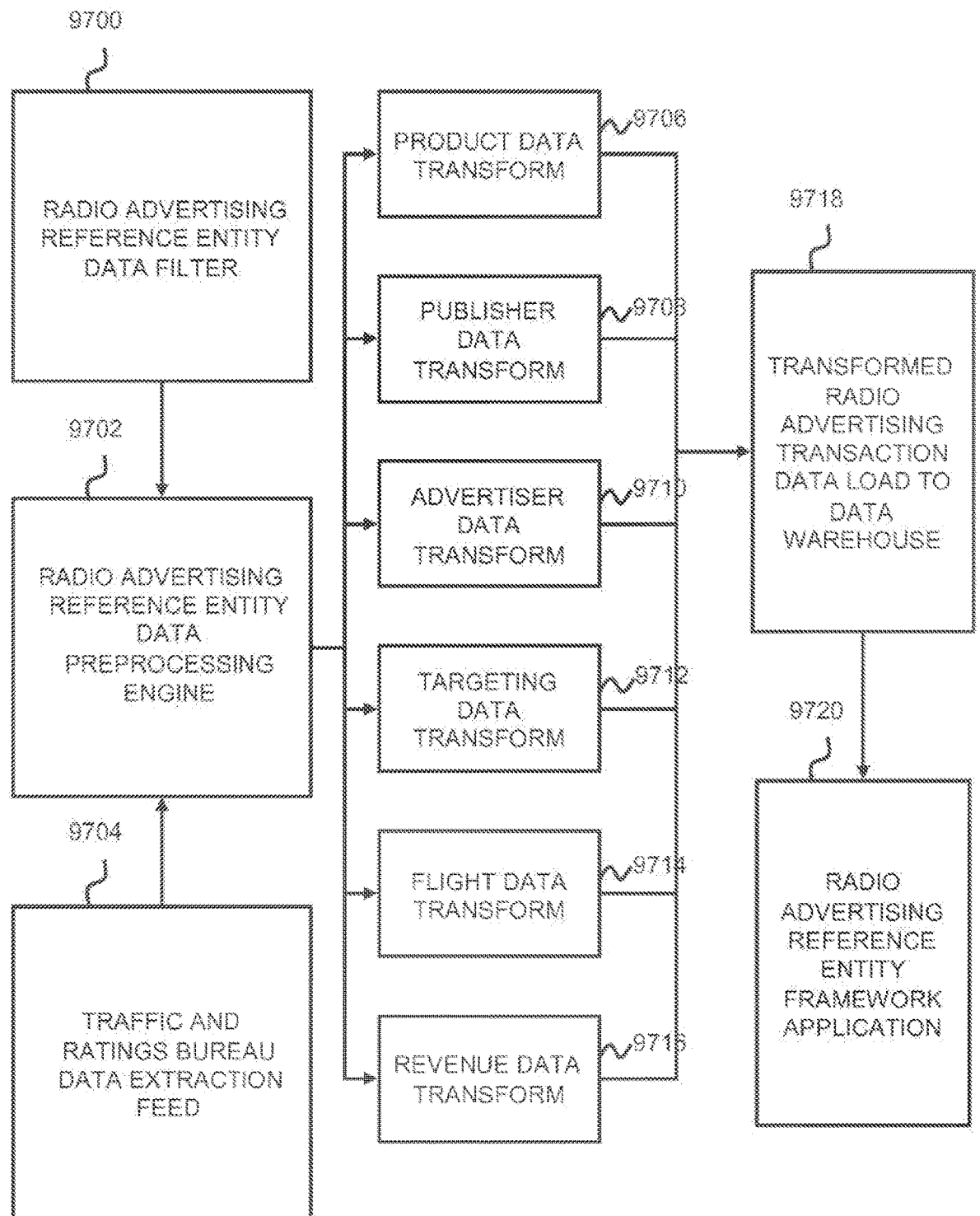

FIG. 97 illustrates in more detail steps involved in organizing radio advertising transaction records according to a taxonomy of radio advertising attributes. Advertising transaction data selected via a radio advertising reference entity data filter, step 9710, may be preprocessed as described above, step 9702. Information regarding the audience of radio stations listed in radio advertising transactions may be obtained from ratings bureau databases (e.g., Quantcast.com and Nielsen), websites and other such data feeds, step 9704. This data may be combined to transform the information from advertising transactions into attribute values and attribute tier values as described above with reference to FIG. 3A, 3B. For example, a product data may be transformed into a product attribute tier value, step 9706, publisher data information may be transformed into publisher tier attribute values, step 9708, advertiser information may be transformed into advertiser tier attribute values, step 9710, targeting package information may be transformed into one or more targeting attribute tier values, step 9712, flight information may be transformed into advertising product flight attribute values, and revenue information may be transformed into one or more revenue attribute tier values, step 9716. The transformed radio advertising transaction attribute values may then be stored in a database or data warehouse, step 9718. The data stored in a database may then be used to determine the radio advertising reference entity value, step 9720.

Figure 98:
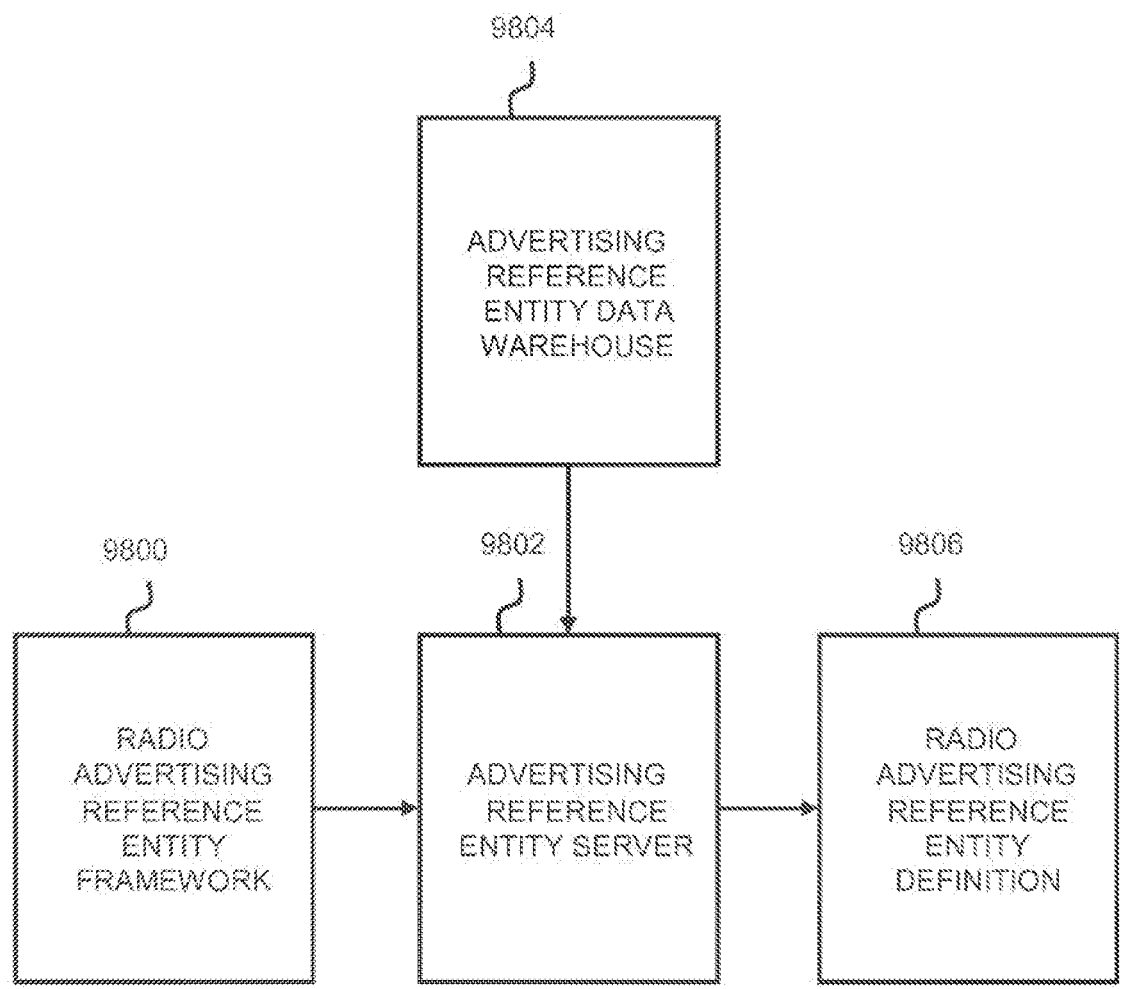

In an embodiment illustrated in FIG. 98, a radio advertising reference entity framework 9802 may be applied as an automated filter to the eligible pool of archived radio advertising transactions stored in a data warehouse 9800. In this process, an advertising reference entity server 9804 may use the radio advertising reference entity framework 9802 as a filter or search framework for drawing archived radio advertising transactions from the data warehouse 9800. The advertising reference entity server 9804 may then use the sampled transaction data in order to synthesize a radio advertising reference entity 9806. The process of synthesizing the radio reference entity may involve calculating the indexed reference entity value of the transactions sampled on the basis of the defined attribute values contained in the radio reference entity framework 9802. For example, the indexed value may include a gross transaction size, a gross revenue index, a net revenue index, and an effective unit revenue index.

Figure 99:
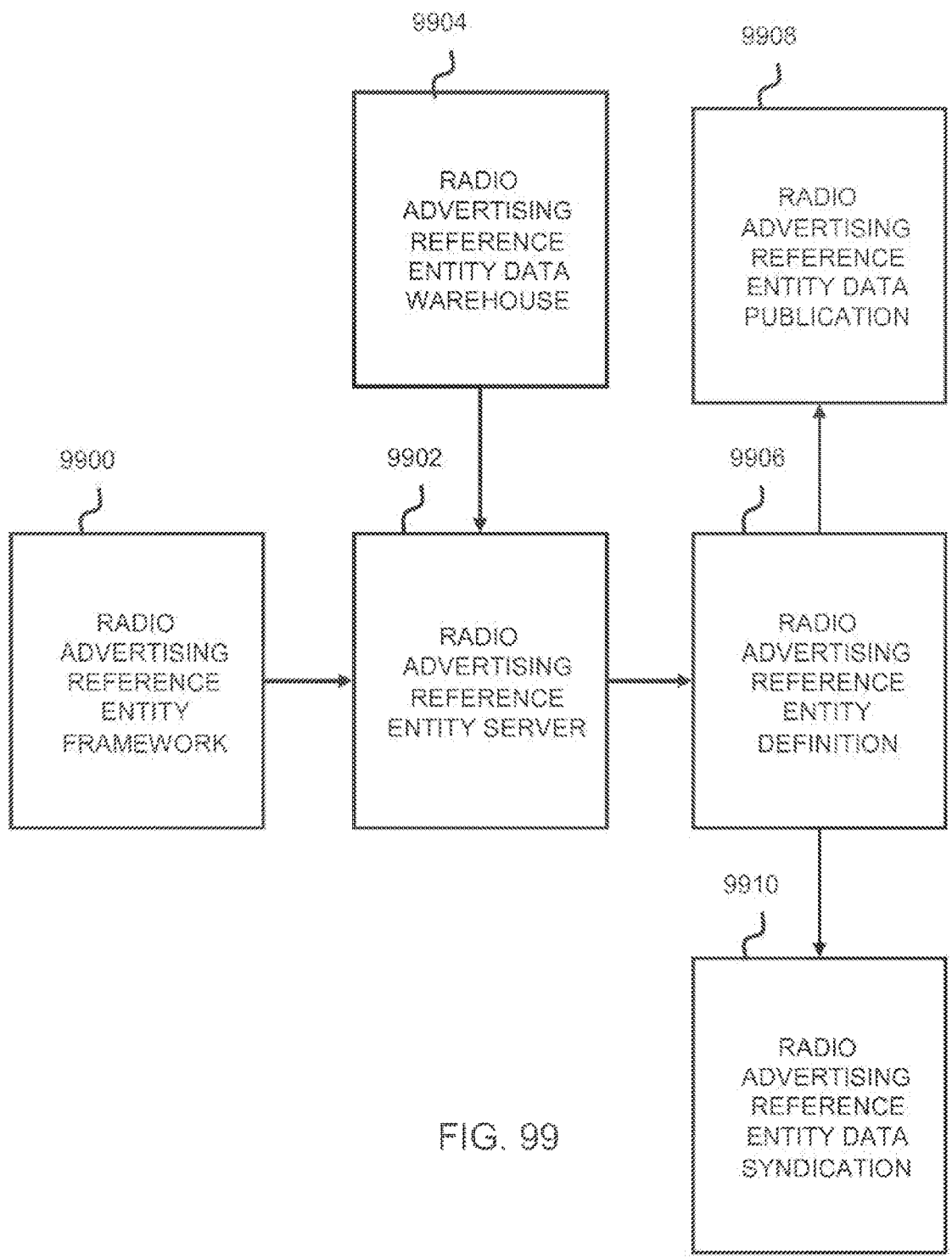

FIG. 99 illustrates a method in which a radio advertising reference entity is used as a radio advertising market benchmark. In this embodiment, a radio advertising reference entity framework 9900 is used by a radio advertising reference entity server 9902 to selectively sample electronic advertising transaction records stored within a data warehouse 9904. The radio advertising reference entity server 9902 uses the sampled transaction data to define a radio advertising reference entity 9906. This reference entity is then published as a radio advertising reference entity data publication 9908. The reference entity definition may also be used to generate a radio advertising reference entity data syndication 9910. In this embodiment, the value of the radio advertising reference entity may be defined following a consistently defined and executed advertising reference entity definition process with the results published and syndicated.

Figure 100:
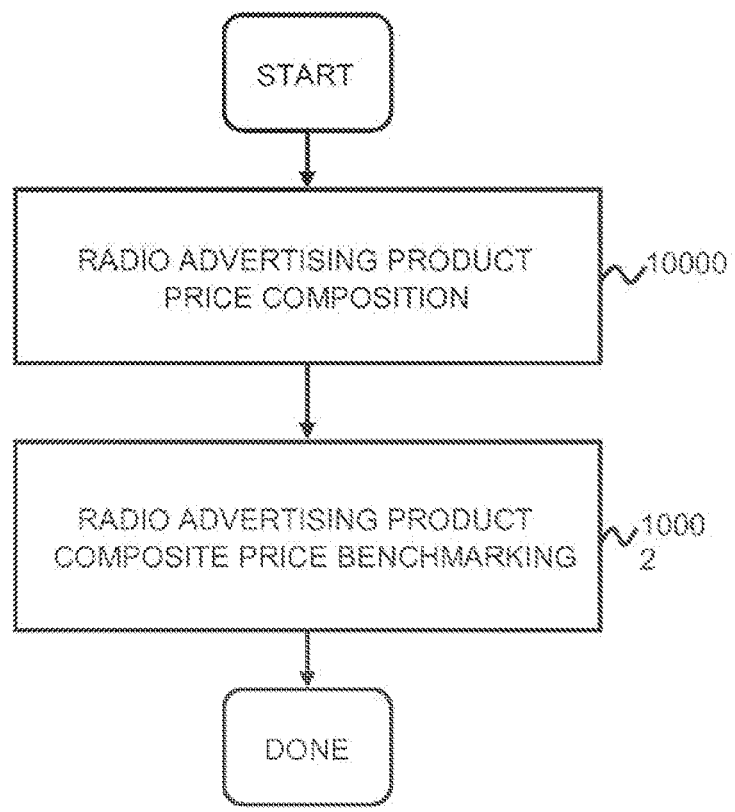

FIG. 100 illustrates a method for using a single radio advertising product composite price as a radio advertising product composite price benchmark. In this process, radio attribute values which define a particular type of radio advertising product are used to sample an advertising transaction data warehouse to extract advertising transaction records associated with a type of advertising product over a period of time, with that data used to determine an advertising composite price, step 10000. This establishes a radio advertising product composite price within the identified sample transaction time frame. The radio advertising product composite price may then be published to the marketplace on a timely and consistent basis with the publication syndicated, thereby establishing the radio advertising product composite price as a radio advertising composite price benchmark for subsequent transactions and operations, step 10002.

Figure 101:
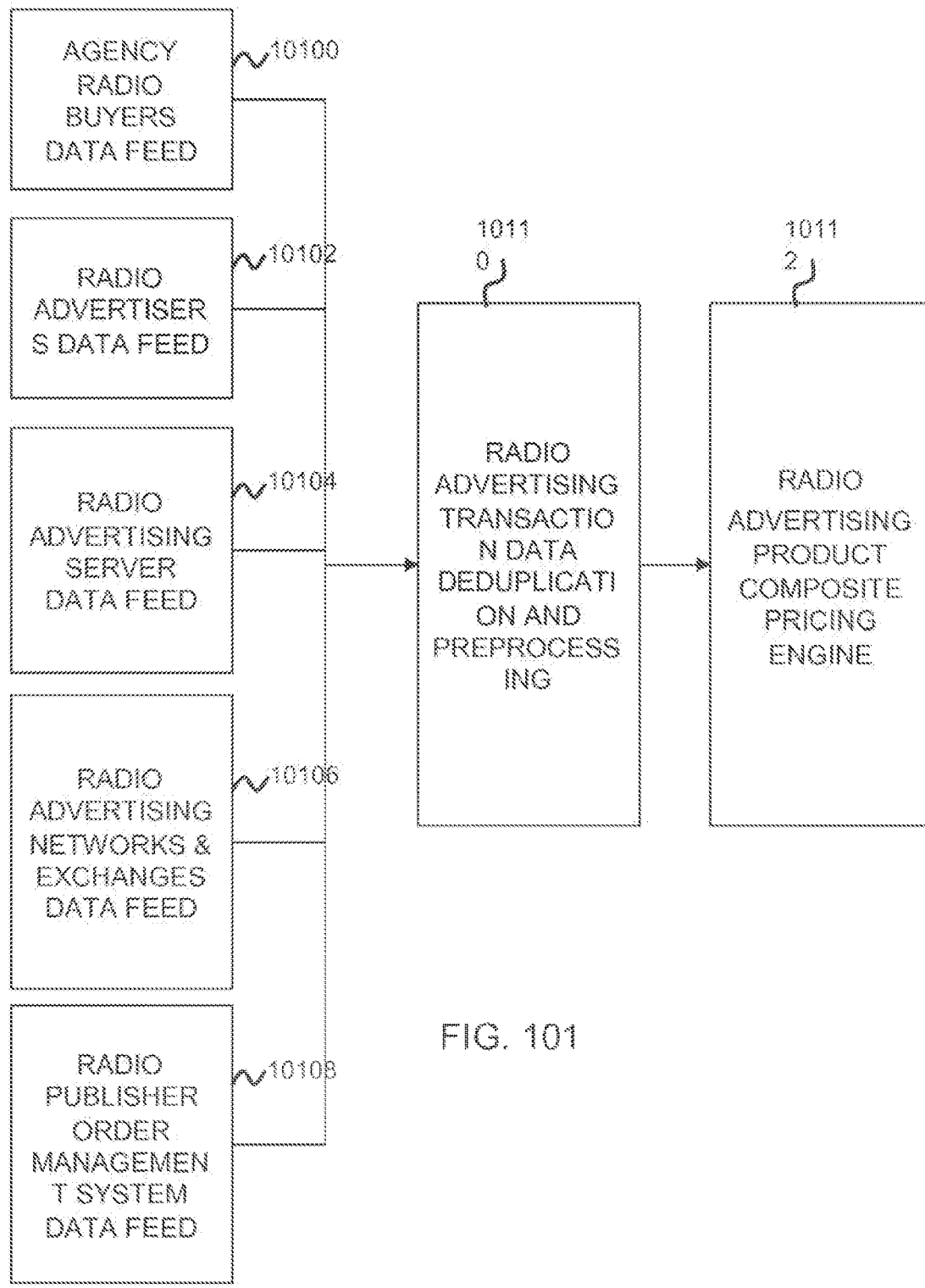

FIG. 101 illustrates a system network for identifying a set of advertising transactions to be extracted, transformed and used to define a radio advertising product composite price. Raw radio advertising transaction data may be obtained from a variety of sources including, for example, agency radio advertising buyer data feeds 10000, radio advertiser data feeds 10102, radio advertising server data feeds 10104, radio advertising networks and exchange data feeds 10106, and radio publisher order management system data feeds 10108. The raw radio advertising transaction data may be pre-processed to remove duplicates and otherwise transform attribute values into attribute tier values, step 10110, with the resulting data provided to a radio advertising product composite pricing engine 10112. The radio advertising product composite price engine may include a volume-weighted composite price for sampled radio advertising products of the identified attribute values conducted within an identify transaction time frame.

Figure 102:
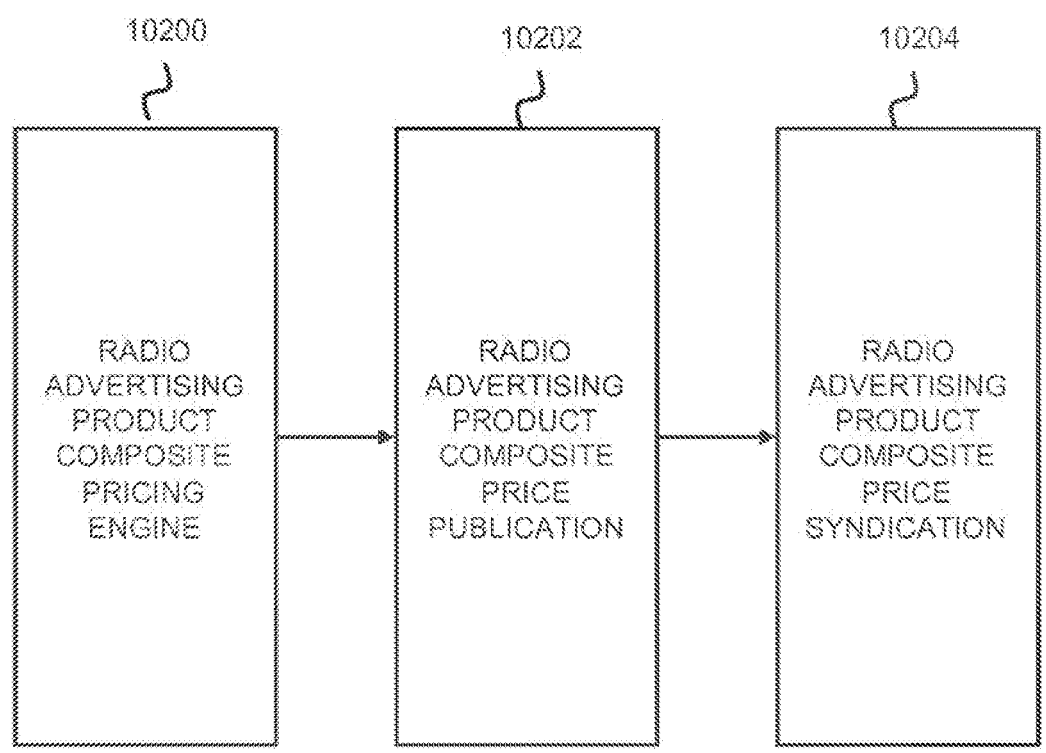

As illustrated in FIG. 102, the output from the radio advertising product composite pricing engine, step 10200, may be published as a radio advertising product composite price publication, step 10202, and syndicated as a radio advertising product composite price syndication, step 10204. The publication and syndication of the radio advertising product composite price may be accomplished via a variety of publication and communication mechanisms. The radio advertising product composite price may also be published in syndicated via closed, open and public networks as well as communications among market participants. Additionally, the radio advertising product composite price may be archived using any known archival methods and storage devices.

Figure 103:
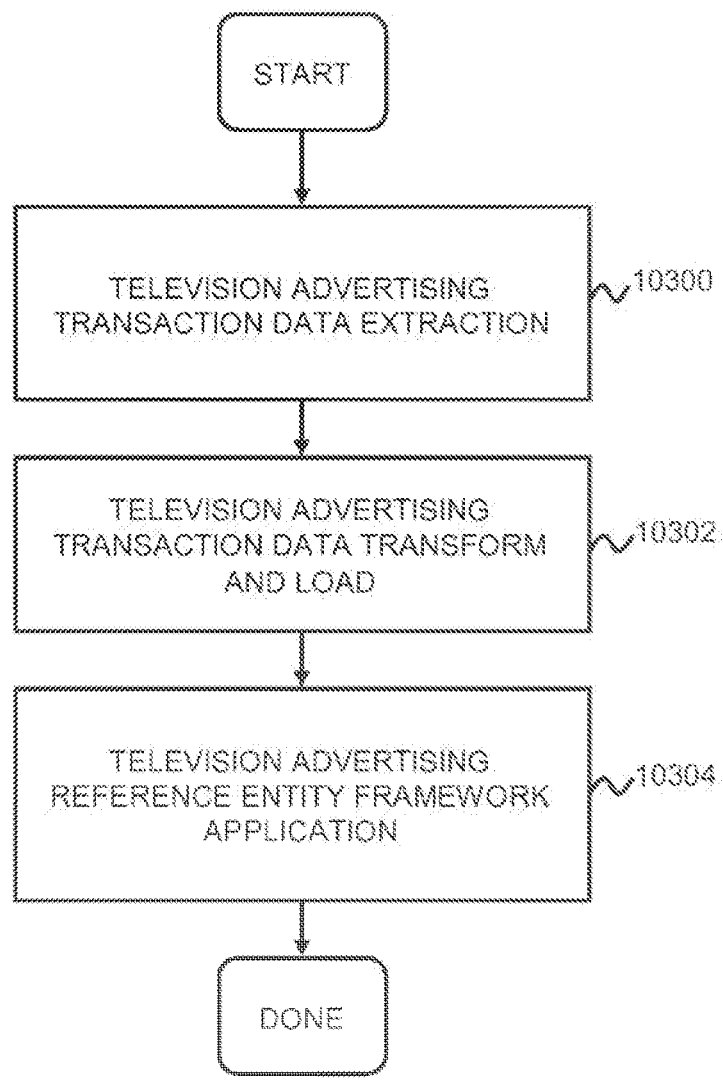
FIGS. 103-110 are process flow diagrams of methods for establishing a television advertising benchmark, reference entity and composite price syndication.

FIG. 103 illustrates steps of a method for establishing a television advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 10300. As part of this process, the transaction records and the database can be indexed and organized according to an attribute taxonomy to enable selected data records to be sampled and analyzed. To establish an advertising reference entity for advertising transactions matching the television attribute value, a subset of advertising transaction records are selected within the database for processing, step 10302. The identified targeted attribute values may include single attributes or combinations of attributes associated with television advertising transactions. The sampled advertising transaction records are then aggregated to establish a television advertising reference entity value, step 10304.

Figure 104:
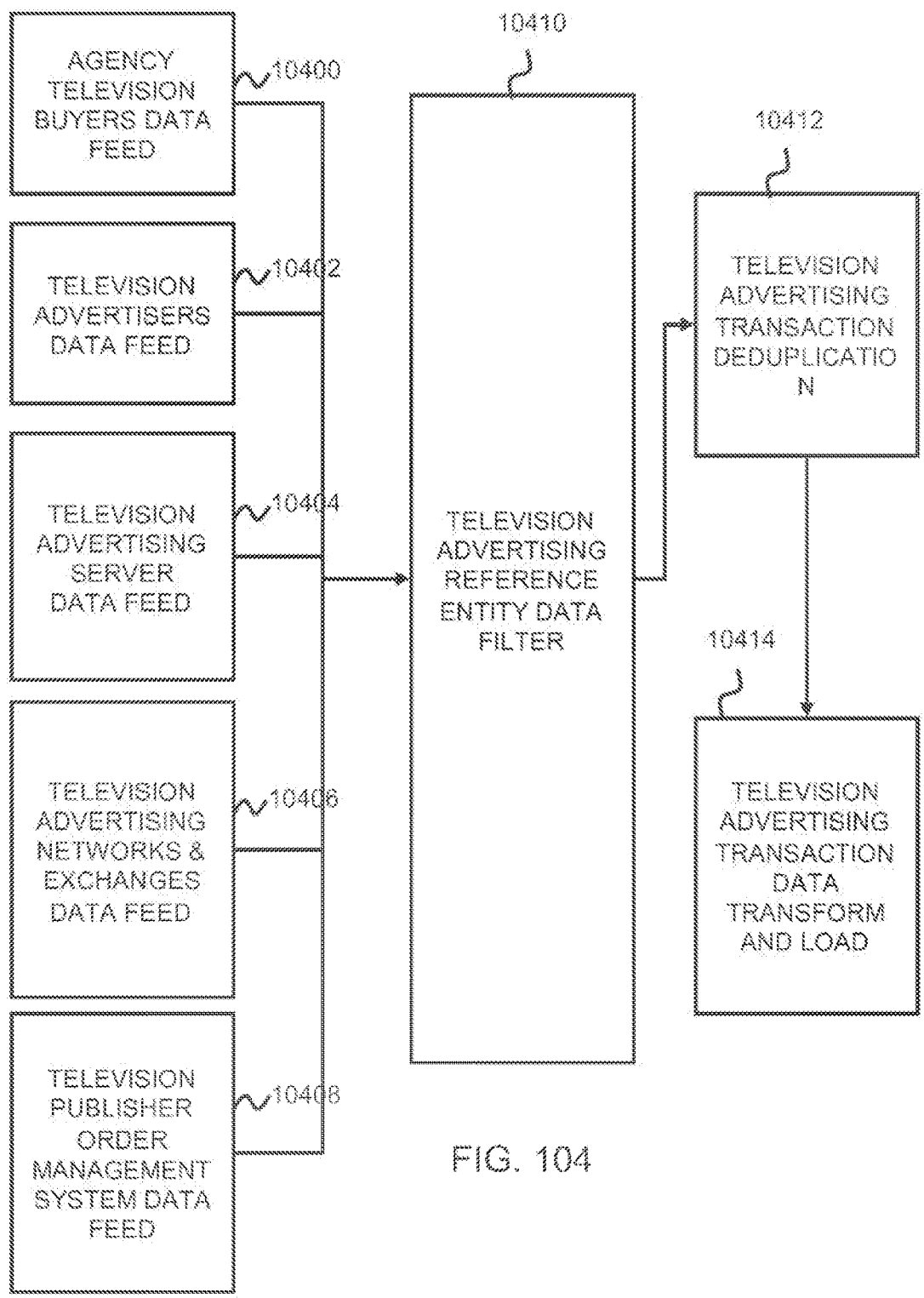

In this embodiment, advertising transaction records may be selected for an advertising transaction database by specifying "television" (or a corresponding attribute ID value) as the selection value for the advertising medium attribute. Alternatively, the advertising transactions that are captured in step 10300 may be limited to transactions purchasing television advertising, as illustrated in FIG. 104. For example, the data sources used to collect advertising transactions may be limited to agency electronics delayed media buyers data feeds 10400, television advertisers data feeds 10402, television advertising server data feeds 10404, television advertising networks and exchanges data feeds 10406, and television publisher order management system data feeds 10408. Additionally, the advertising transaction data feeds may be filtered by a television advertising reference entity data filter, step 10410. As mentioned above, the television advertising transaction data received from the various data feeds may be preprocessed to remove duplicate transaction records, step 10412. The preprocessed television advertising transaction data may then be processed to transform attribute information into attribute tier values and data records stored in a database, step 10414.

Figure 105:
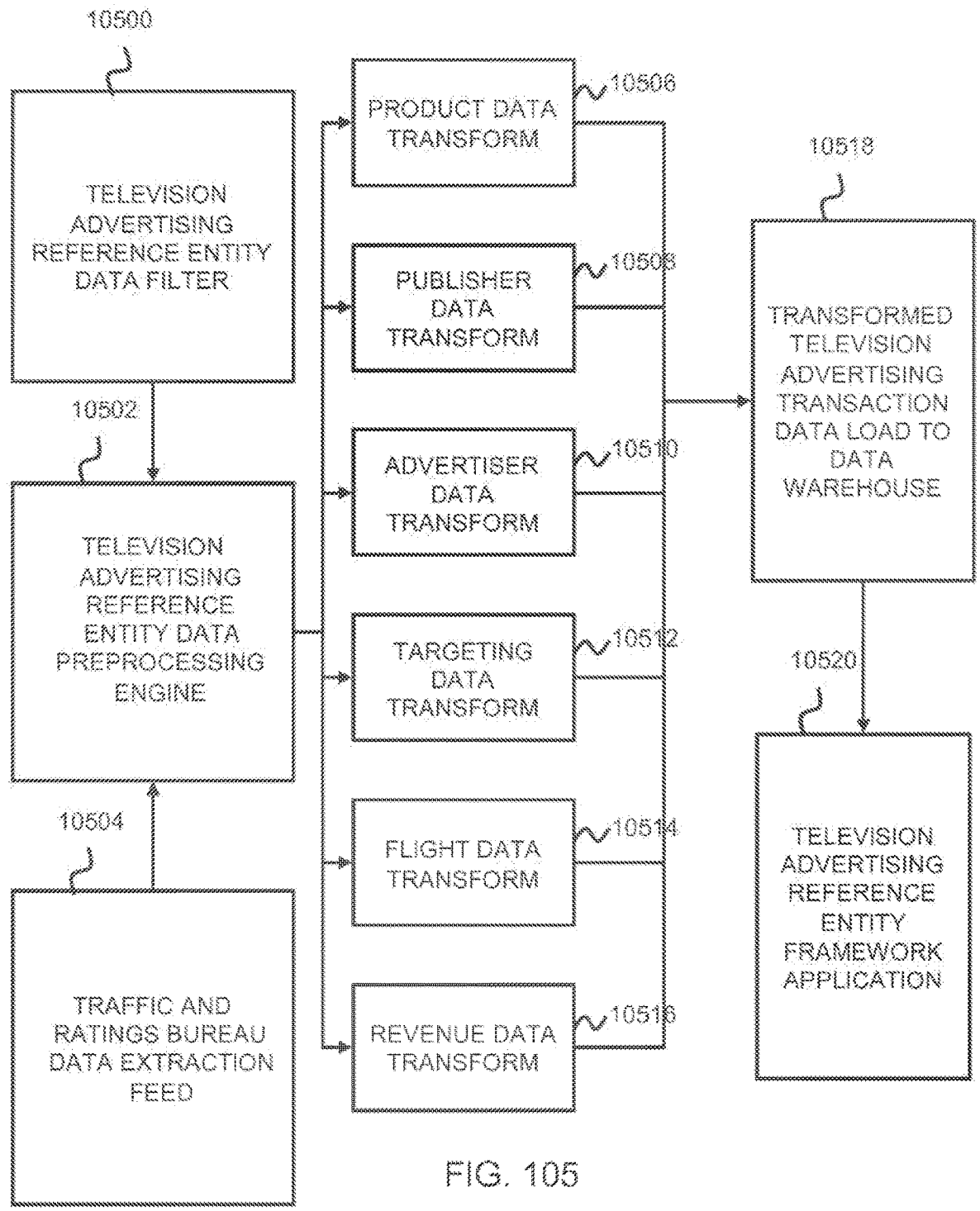

FIG. 105 illustrates in more detail steps involved in organizing television advertising transaction records according to a taxonomy of television advertising attributes. Advertising transaction data selected via a television advertising reference entity data filter, step 10510, may be preprocessed as described above, step 10502. Information regarding viewership of television networks and programs listed in television advertising transactions may be obtained from ratings bureau databases (e.g., Quantcast.com and Nielsen), websites and other such data feeds, step 10504. This data may be combined to transform the information from advertising transactions into attribute values and attribute tier values as described above with reference to FIG. 3A, 3B. For example, a product data may be transformed into a product attribute tier value, step 10506, publisher data information may be transformed into publisher tier attribute values, step 10508, advertiser information may be transformed into advertiser tier attribute values, step 10510, targeting package information may be transformed into one or more targeting attribute tier values, step 10512, flight information may be transformed into advertising product flight attribute values, and revenue information may be transformed into one or more revenue attribute tier values, step 10516. The transformed television advertising transaction attribute values may then be stored in a database or data warehouse, step 10518. The data stored in a database may then be used to determine the television advertising reference entity value, step 10520.

Figure 106:
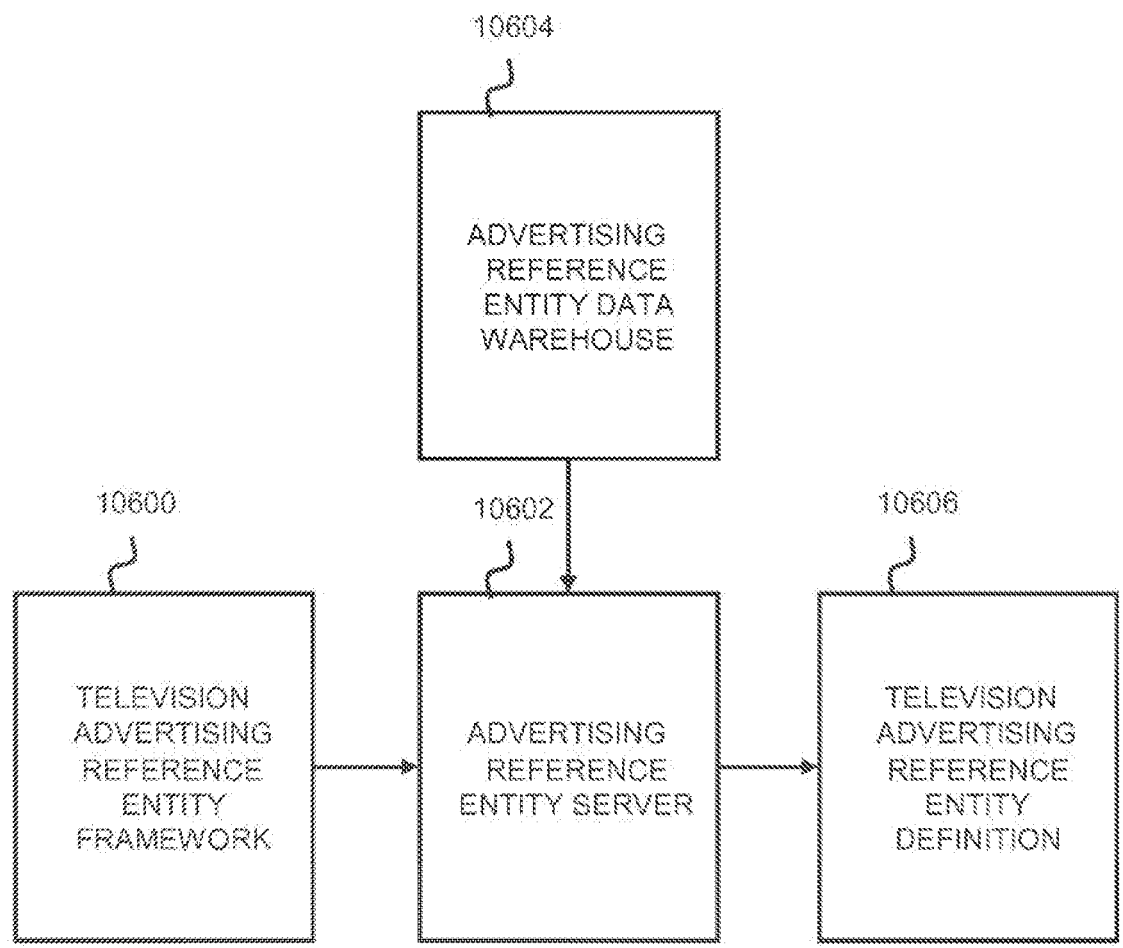

In an embodiment illustrated in FIG. 106, a television advertising reference entity framework 10602 may be applied as an automated filter to the eligible pool of archived television advertising transactions stored in a data warehouse 10600. In this process, an advertising reference entity server 10604 may use the television advertising reference entity framework 10602 as a filter or search framework for drawing archived television advertising transactions from the data warehouse 10600. The advertising reference entity server 10604 may then use the sampled transaction data in order to synthesize a television advertising reference entity 10606. The process of synthesizing the television reference entity may involve calculating the indexed reference entity value of the transactions sampled on the basis of the defined attribute values contained in the television reference entity framework 10602. For example, the indexed value may include a gross transaction size, a gross revenue index, a net revenue index, and an effective unit revenue index.

Figure 107:
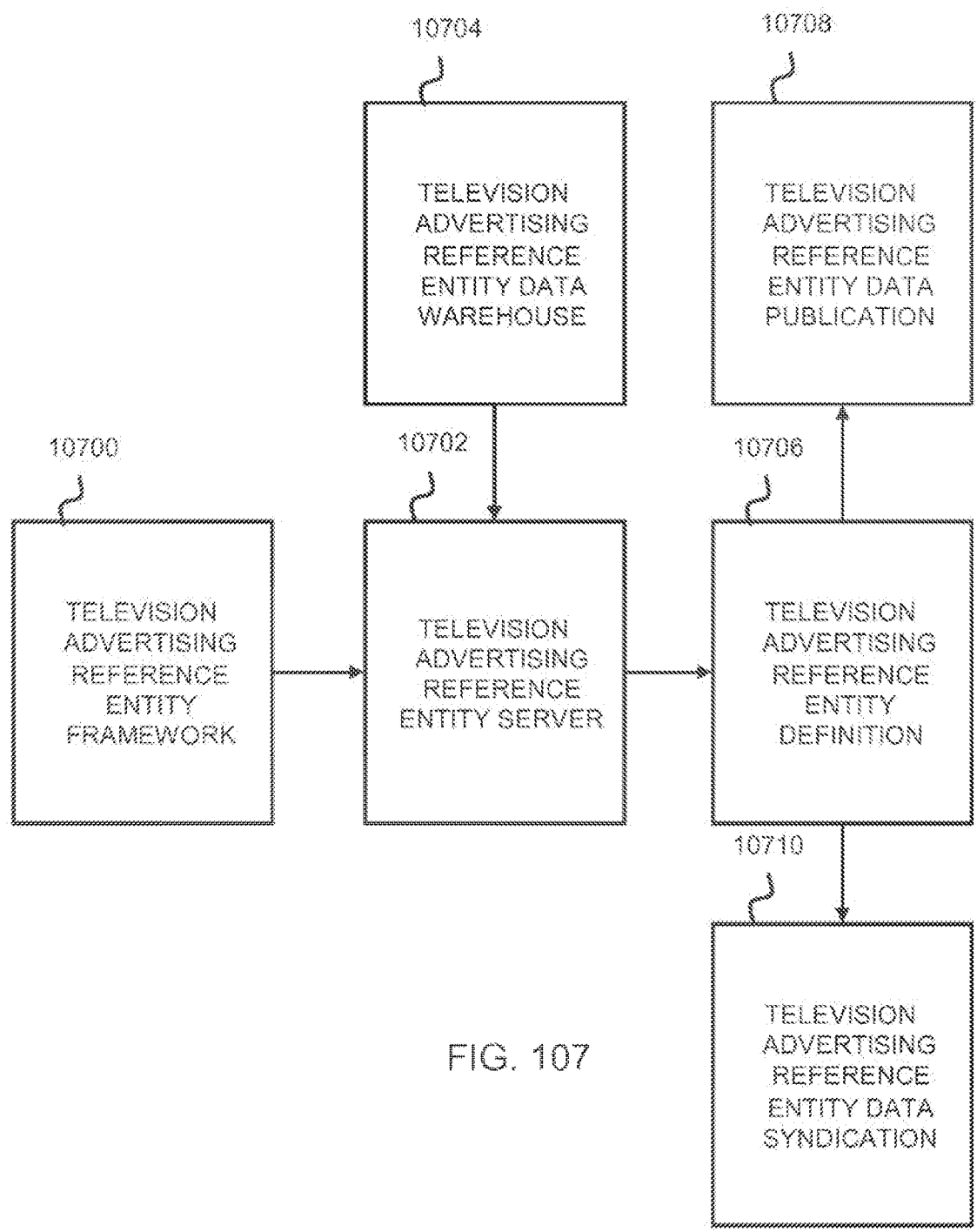

FIG. 107 illustrates a method in which a television advertising reference entity is used as a television advertising market benchmark. In this embodiment, a television advertising reference entity framework 10700 is used by a television advertising reference entity server 10702 to selectively sample electronic advertising transaction records stored within a data warehouse 10704. The television advertising reference entity server 10702 uses the sampled transaction data to define a television advertising reference entity 10706. This reference entity is then published as a television advertising reference entity data publication 10708. The reference entity definition may also be used to generate a television advertising reference entity data syndication 10710. In this embodiment, the value of the television advertising reference entity may be defined following a consistently defined and executed advertising reference entity definition process with the results published and syndicated.

Figure 108:
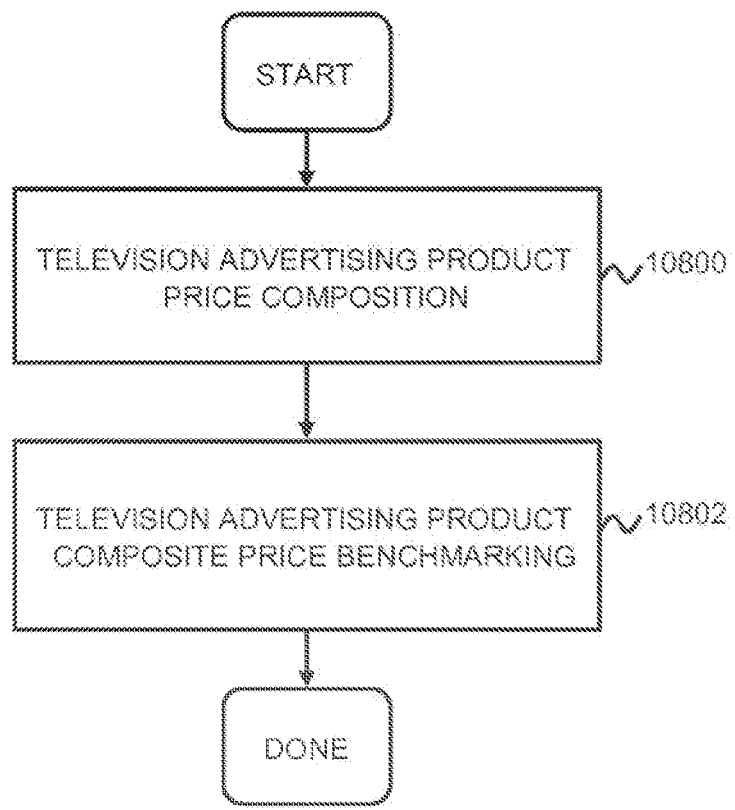

FIG. 108 illustrates a method for using a single television advertising product composite price as a television advertising product composite price benchmark. In this process, television attribute values which define a particular type of television advertising product are used to sample an advertising transaction data warehouse to extract advertising transaction records associated with a type of advertising product over a period of time, with that data used to determine an advertising composite price, step 10800. This establishes a television advertising product composite price within the identified sample transaction time frame. The television advertising product composite price may then be published to the marketplace on a timely and consistent basis with the publication syndicated, thereby establishing the television advertising product composite price as a television advertising composite price benchmark for subsequent transactions and operations, step 10802.

Figure 109:
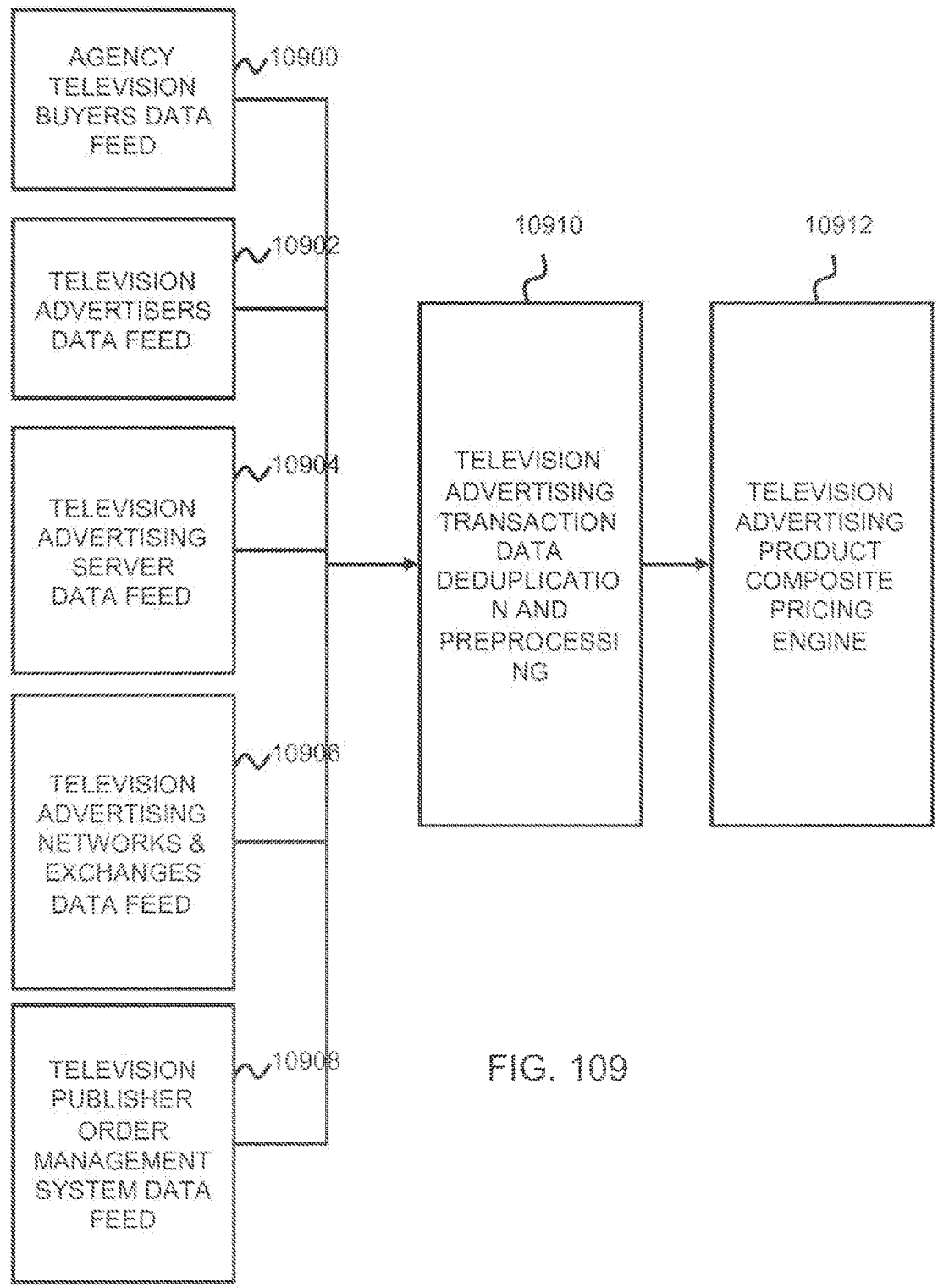

FIG. 109 illustrates a system network for identifying a set of advertising transactions to be extracted, transformed and used to define a television advertising product composite price. Raw television advertising transaction data may be obtained from a variety of sources including, for example, agency television advertising buyer data feeds 10900, television advertiser data feeds 10902, television advertising server data feeds 10904, television advertising networks and exchange data feeds 10906, and television publisher order management system data feeds 10908. The raw television advertising transaction data may be pre-processed to remove duplicates and otherwise transform attribute values into attribute tier values, step 10910, with the resulting data provided to a television advertising product composite pricing engine 10912. The television advertising product composite price engine may include a volume-weighted composite price for sampled television advertising products of the identified attribute values conducted within an identify transaction time frame.

Figure 110:
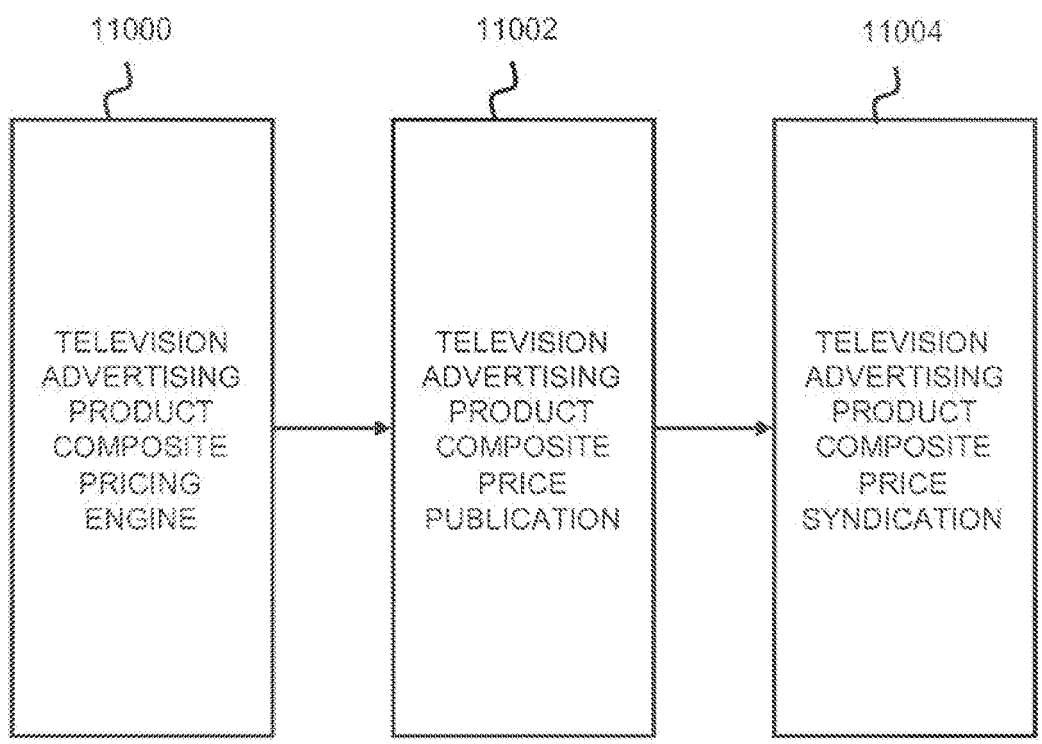

As illustrated in FIG. 110, the output from the television advertising product composite pricing engine, step 11000, may be published as a television advertising product composite price publication, step 11002, and syndicated as a television advertising product composite price syndication, step 11004. The publication and syndication of the television advertising product composite price may be accomplished via a variety of publication and communication mechanisms. The television advertising product composite price may also be published in syndicated via closed, open and public networks as well as communications among market participants. Additionally, the television advertising product composite price may be archived using any known archival methods and storage devices.

Figure 111:
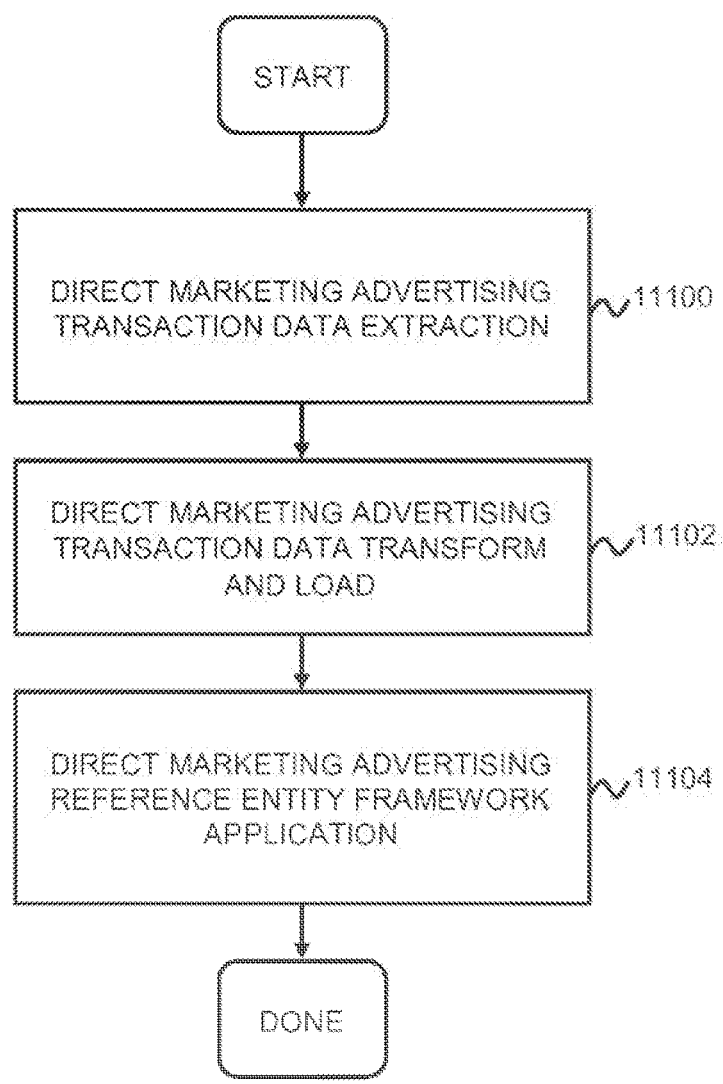
FIGS. 111-118 are process flow diagrams of methods for establishing a direct marketing advertising benchmark, reference entity and composite price syndication.

FIG. 111 illustrates steps of a method for establishing a direct marketing advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 11100. As part of this process, the transaction records and the database can be indexed and organized according to an attribute taxonomy to enable selected data records to be sampled and analyzed. To establish an advertising reference entity for advertising transactions matching the direct marketing attribute value, a subset of advertising transaction records are selected within the database for processing, step 11102. The identified targeted attribute values may include single attributes or combinations of attributes associated with direct marketing advertising transactions. The sampled advertising transaction records are then aggregated to establish a direct marketing advertising reference entity value, step 11104.

Figure 112:
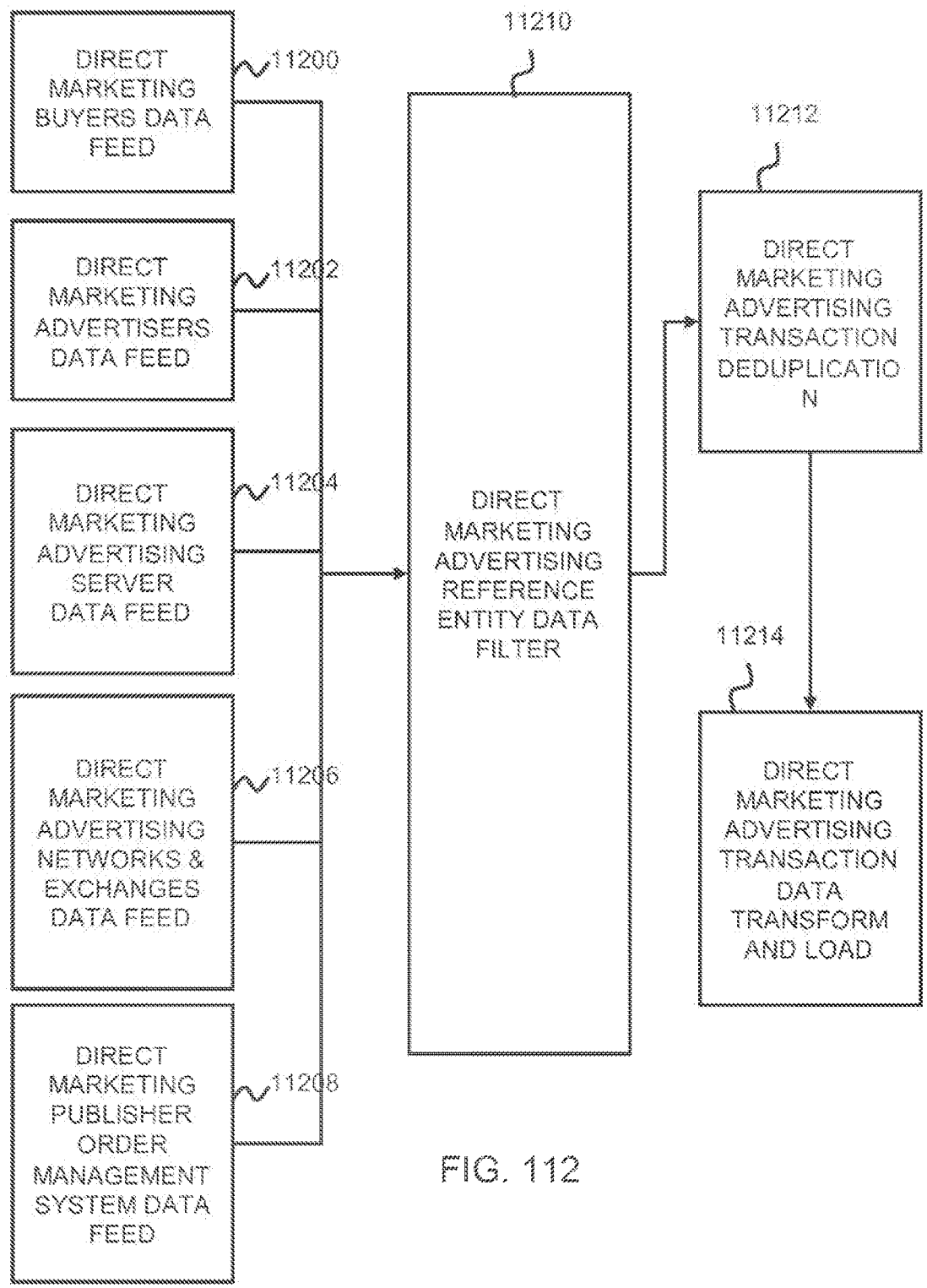

In this embodiment, advertising transaction records may be selected for an advertising transaction database by specifying "direct marketing" (or a corresponding attribute ID value) as the selection value for the advertising medium attribute. Alternatively, the advertising transactions that are captured in step 11100 may be limited to transactions purchasing direct marketing advertising services, as illustrated in FIG. 112. For example, the data sources used to collect advertising transactions may be limited to agency electronics delayed media buyers data feeds 11200, direct marketing advertisers data feeds 11202, direct marketing advertising server data feeds 11204, direct marketing advertising networks and exchanges data feeds 11206, and direct marketing publisher order management system data feeds 11208. Additionally, the advertising transaction data feeds may be filtered by a direct marketing advertising reference entity data filter, step 11210. As mentioned above, the direct marketing advertising transaction data received from the various data feeds may be preprocessed to remove duplicate transaction records, step 11212. The preprocessed direct marketing advertising transaction data may then be processed to transform attribute information into attribute tier values and data records stored in a database, step 11214.

Figure 113:
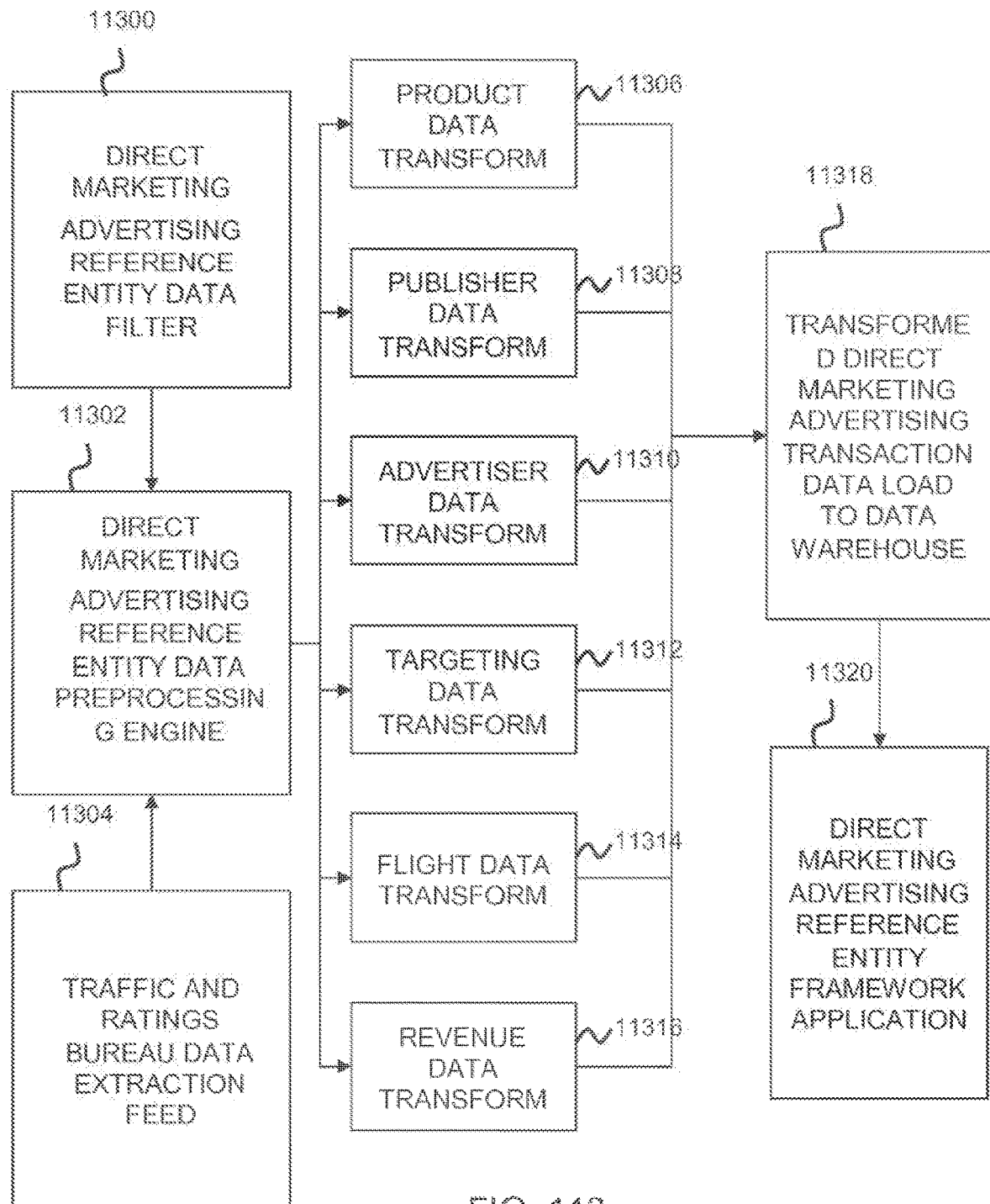

FIG. 113 illustrates in more detail steps involved in organizing direct marketing advertising transaction records according to a taxonomy of direct marketing advertising attributes. Advertising transaction data selected via a direct marketing advertising reference entity data filter, step 11310, may be preprocessed as described above, step 11302. Information regarding effectiveness of direct marketing entities listed in direct marketing advertising transactions may be obtained from ratings bureau databases (e.g., Quantcast.com and Nielsen), websites and other such data feeds, step 11304. This data may be combined to transform the information from advertising transactions into attribute values and attribute tier values as described above with reference to FIG. 3A, 3B. For example, a product data may be transformed into a product attribute tier value, step 11306, publisher data information may be transformed into publisher tier attribute values, step 11308, advertiser information may be transformed into advertiser tier attribute values, step 11310, targeting package information may be transformed into one or more targeting attribute tier values, step 11312, flight information may be transformed into advertising product flight attribute values, and revenue information may be transformed into one or more revenue attribute tier values, step 11316. The transformed direct marketing advertising transaction attribute values may then be stored in a database or data warehouse, step 11318. The data stored in a database may then be used to determine the direct marketing advertising reference entity value, step 11320.

Figure 114:
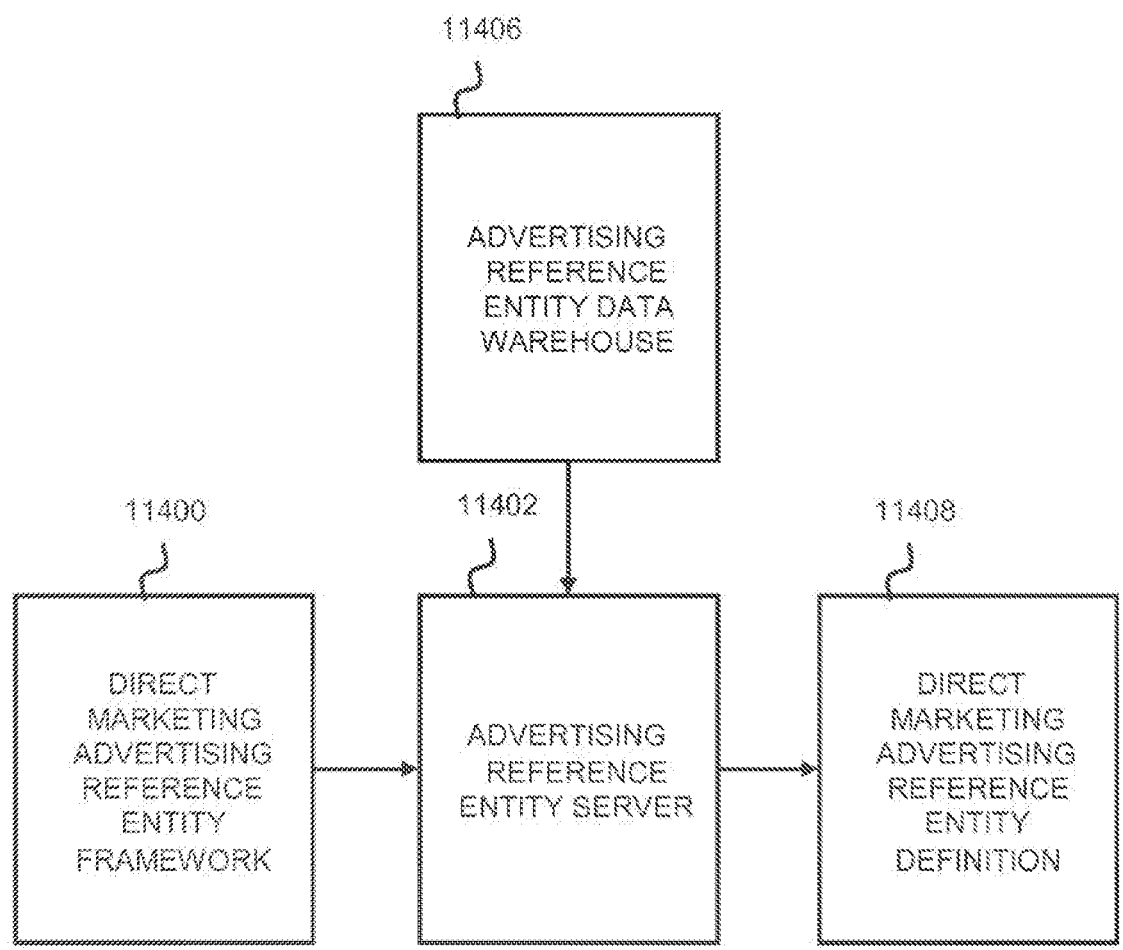

In an embodiment illustrated in FIG. 114, a direct marketing advertising reference entity framework 11402 may be applied as an automated filter to the eligible pool of archived direct marketing advertising transactions stored in a data warehouse 11400. In this process, an advertising reference entity server 11404 may use the direct marketing advertising reference entity framework 11402 as a filter or search framework for drawing archived direct marketing advertising transactions from the data warehouse 11400. The advertising reference entity server 11404 may then use the sampled transaction data in order to synthesize a direct marketing advertising reference entity 11406. The process of synthesizing the direct marketing reference entity may involve calculating the indexed reference entity value of the transactions sampled on the basis of the defined attribute values contained in the direct marketing reference entity framework 11402. For example, the indexed value may include a gross transaction size, a gross revenue index, a net revenue index, and an effective unit revenue index.

Figure 115:
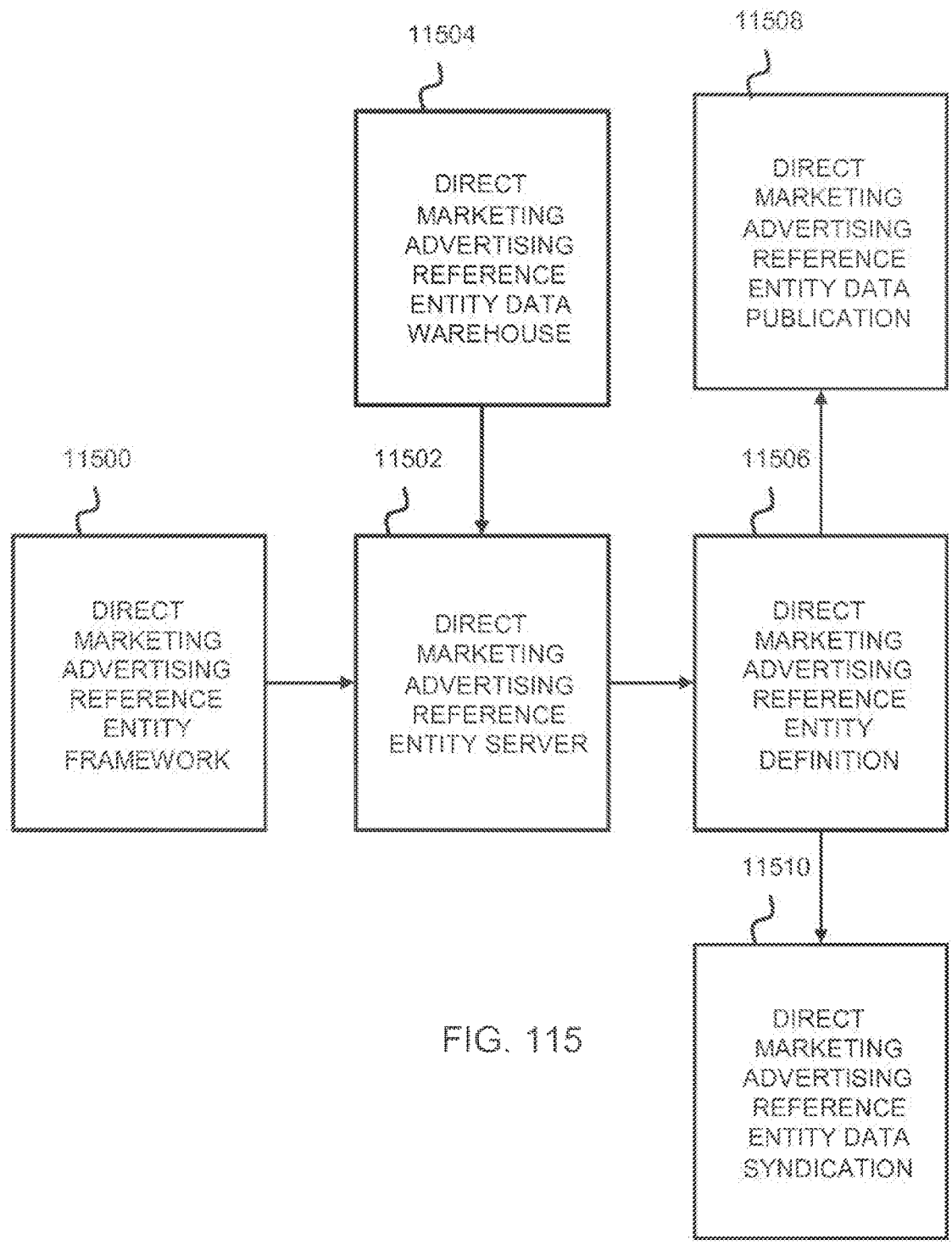

FIG. 115 illustrates a method in which a direct marketing advertising reference entity is used as a direct marketing advertising market benchmark. In this embodiment, a direct marketing advertising reference entity framework 11500 is used by a direct marketing advertising reference entity server 11502 to selectively sample electronic advertising transaction records stored within a data warehouse 11504. The direct marketing advertising reference entity server 11502 uses the sampled transaction data to define a direct marketing advertising reference entity 11506. This reference entity is then published as a direct marketing advertising reference entity data publication 11508. The reference entity definition may also be used to generate a direct marketing advertising reference entity data syndication 11510. In this embodiment, the value of the direct marketing advertising reference entity may be defined following a consistently defined and executed advertising reference entity definition process with the results published and syndicated.

Figure 116:
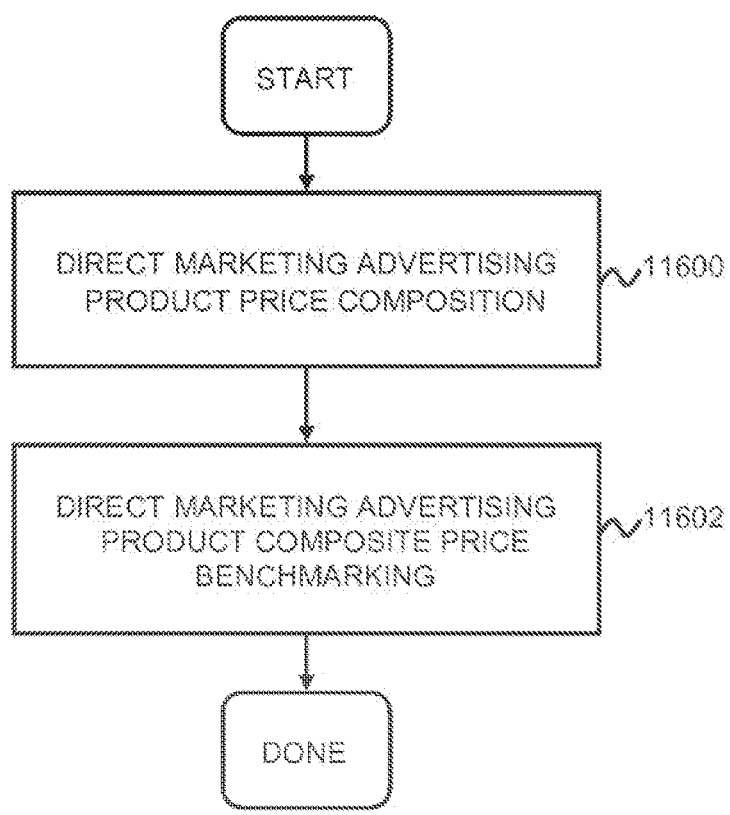

FIG. 116 illustrates a method for using a single direct marketing advertising product composite price as a direct marketing advertising product composite price benchmark. In this process, direct marketing attribute values which define a particular type of direct marketing advertising product are used to sample an advertising transaction data warehouse to extract advertising transaction records associated with a type of advertising product over a period of time, with that data used to determine an advertising composite price, step 11600. This establishes a direct marketing advertising product composite price within the identified sample transaction time frame. The direct marketing advertising product composite price may then be published to the marketplace on a timely and consistent basis with the publication syndicated, thereby establishing the direct marketing advertising product composite price as a direct marketing advertising composite price benchmark for subsequent transactions and operations, step 11602.

Figure 117:
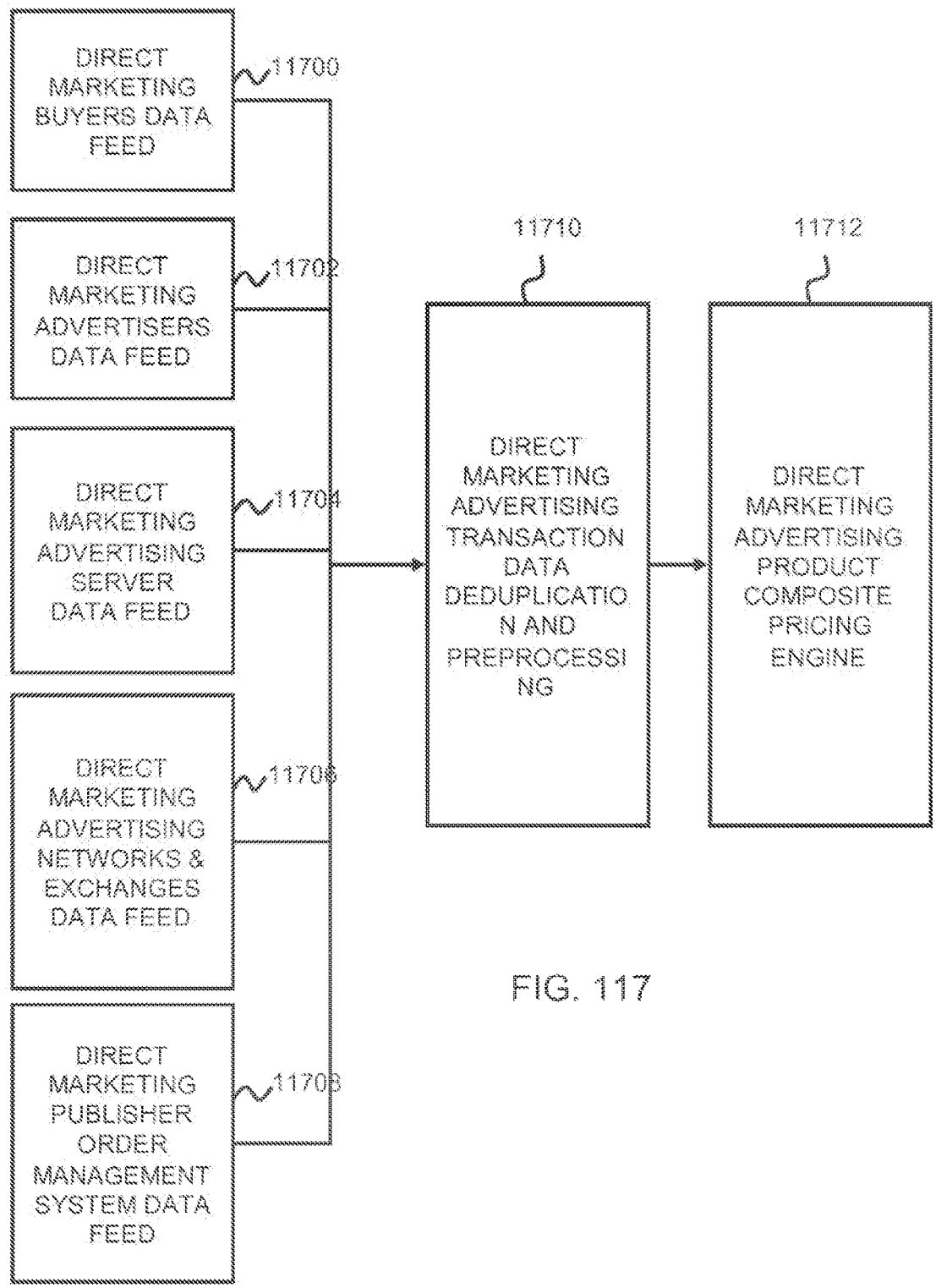

FIG. 117 illustrates a system network for identifying a set of advertising transactions to be extracted, transformed and used to define a direct marketing advertising product composite price. Raw direct marketing advertising transaction data may be obtained from a variety of sources including, for example, agency direct marketing advertising buyer data feeds 11700, direct marketing advertiser data feeds 11702, direct marketing advertising server data feeds 11704, direct marketing advertising networks and exchange data feeds 11706, and direct marketing publisher order management system data feeds 11708. The raw direct marketing advertising transaction data may be pre-processed to remove duplicates and otherwise transform attribute values into attribute tier values, step 11710, with the resulting data provided to a direct marketing advertising product composite pricing engine 11712. The direct marketing advertising product composite price engine may include a volume-weighted composite price for sampled direct marketing advertising products of the identified attribute values conducted within an identify transaction time frame.

Figure 118:
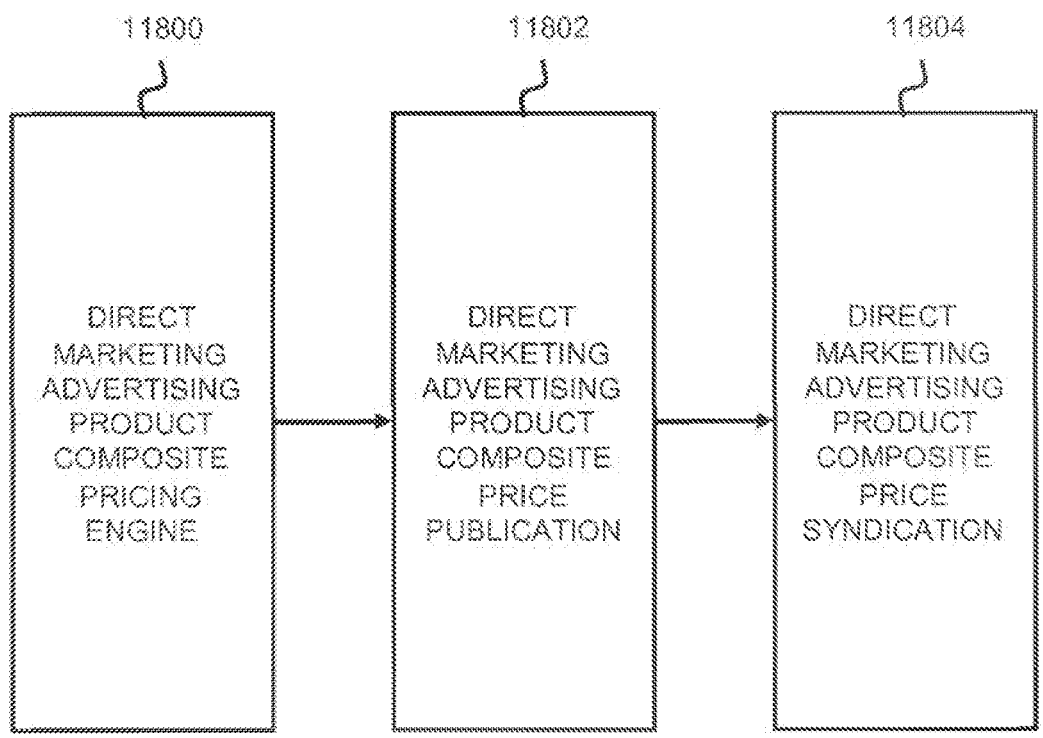

As illustrated in FIG. 118, the output from the direct marketing advertising product composite pricing engine, step 11800, may be published as a direct marketing advertising product composite price publication, step 11802, and syndicated as a direct marketing advertising product composite price syndication, step 11804. The publication and syndication of the direct marketing advertising product composite price may be accomplished via a variety of publication and communication mechanisms. The direct marketing advertising product composite price may also be published in syndicated via closed, open and public networks as well as communications among market participants. Additionally, the direct marketing advertising product composite price may be archived using any known archival methods and storage devices.

Figure 119:
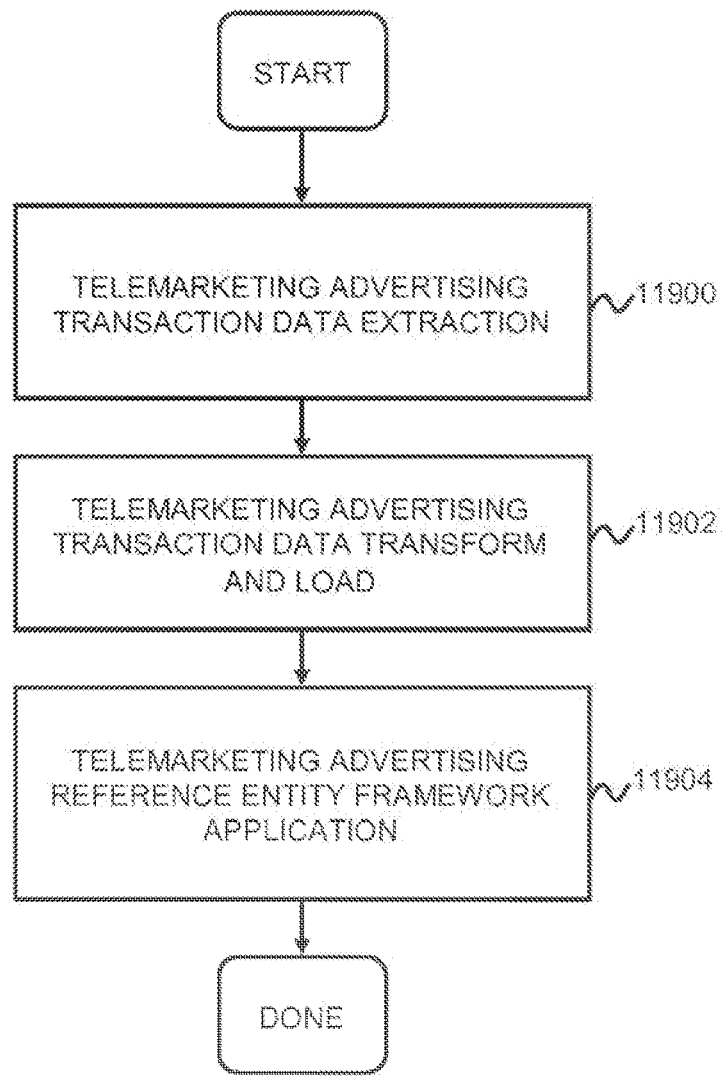
FIGS. 119-126 are process flow diagrams of methods for establishing a telemarketing advertising benchmark, reference entity and composite price syndication.

FIG. 119 illustrates steps of a method for establishing a telemarketing advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 11900. As part of this process, the transaction records and the database can be indexed and organized according to an attribute taxonomy to enable selected data records to be sampled and analyzed. To establish an advertising reference entity for advertising transactions matching the telemarketing attribute value, a subset of advertising transaction records are selected within the database for processing, step 11902. The identified targeted attribute values may include single attributes or combinations of attributes associated with telemarketing advertising transactions. The sampled advertising transaction records are then aggregated to establish a telemarketing advertising reference entity value, step 11904.

Figure 120:
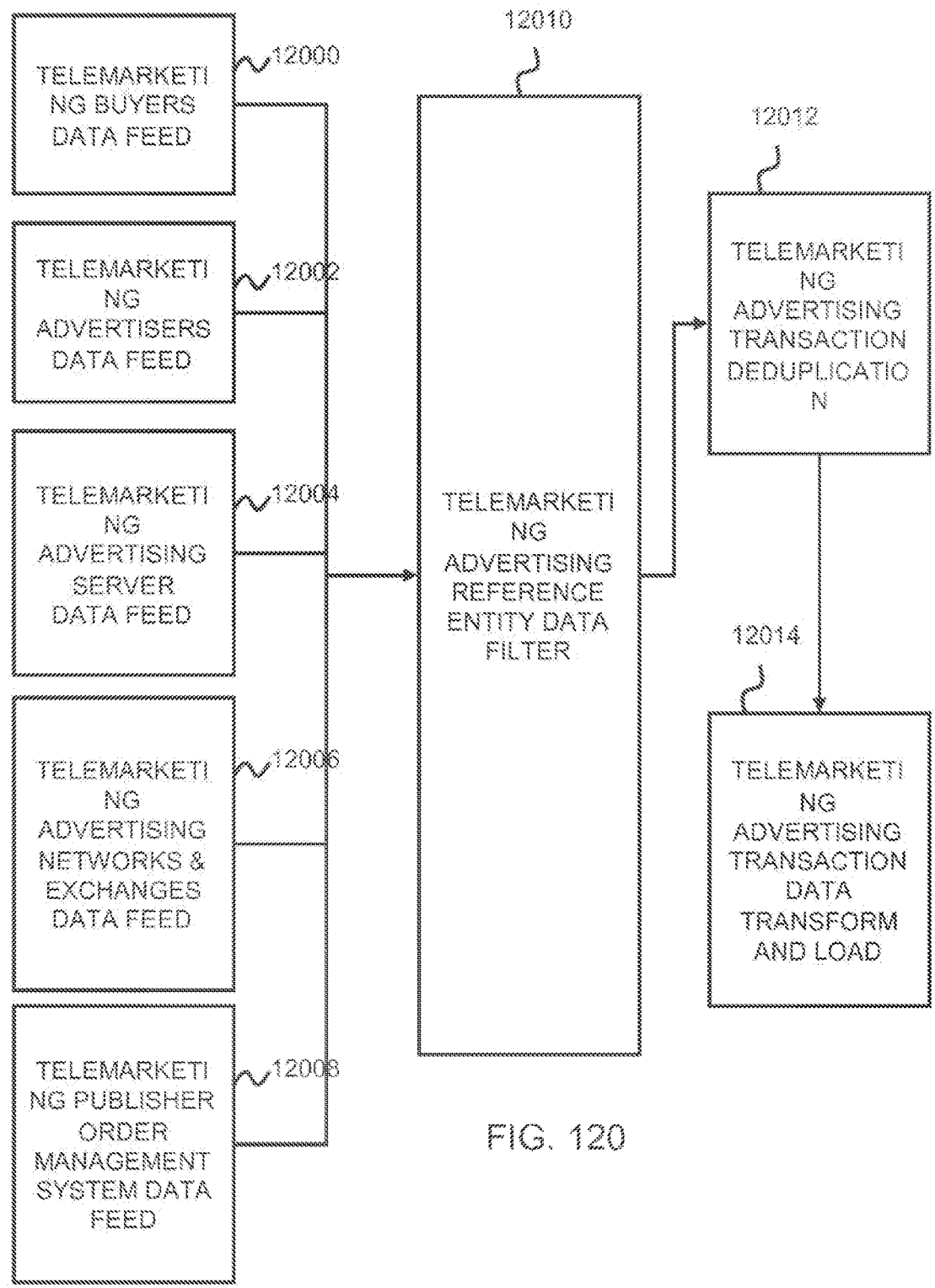

In this embodiment, advertising transaction records may be selected for an advertising transaction database by specifying "telemarketing" (or a corresponding attribute ID value) as the selection value for the advertising medium attribute. Alternatively, the advertising transactions that are captured in step 11900 may be limited to transactions purchasing telemarketing advertising and telemarketing services, as illustrated in FIG. 120. For example, the data sources used to collect advertising transactions may be limited to agency electronics delayed media buyers data feeds 12000, telemarketing advertisers data feeds 12002, telemarketing advertising server data feeds 12004, telemarketing advertising networks and exchanges data feeds 12006, and telemarketing publisher order management system data feeds 12808. Additionally, the advertising transaction data feeds may be filtered by a telemarketing advertising reference entity data filter, step 12010. As mentioned above, the telemarketing advertising transaction data received from the various data feeds may be preprocessed to remove duplicate transaction records, step 12012. The preprocessed telemarketing advertising transaction data may then be processed to transform attribute information into attribute tier values and data records stored in a database, step 12014.

Figure 121:
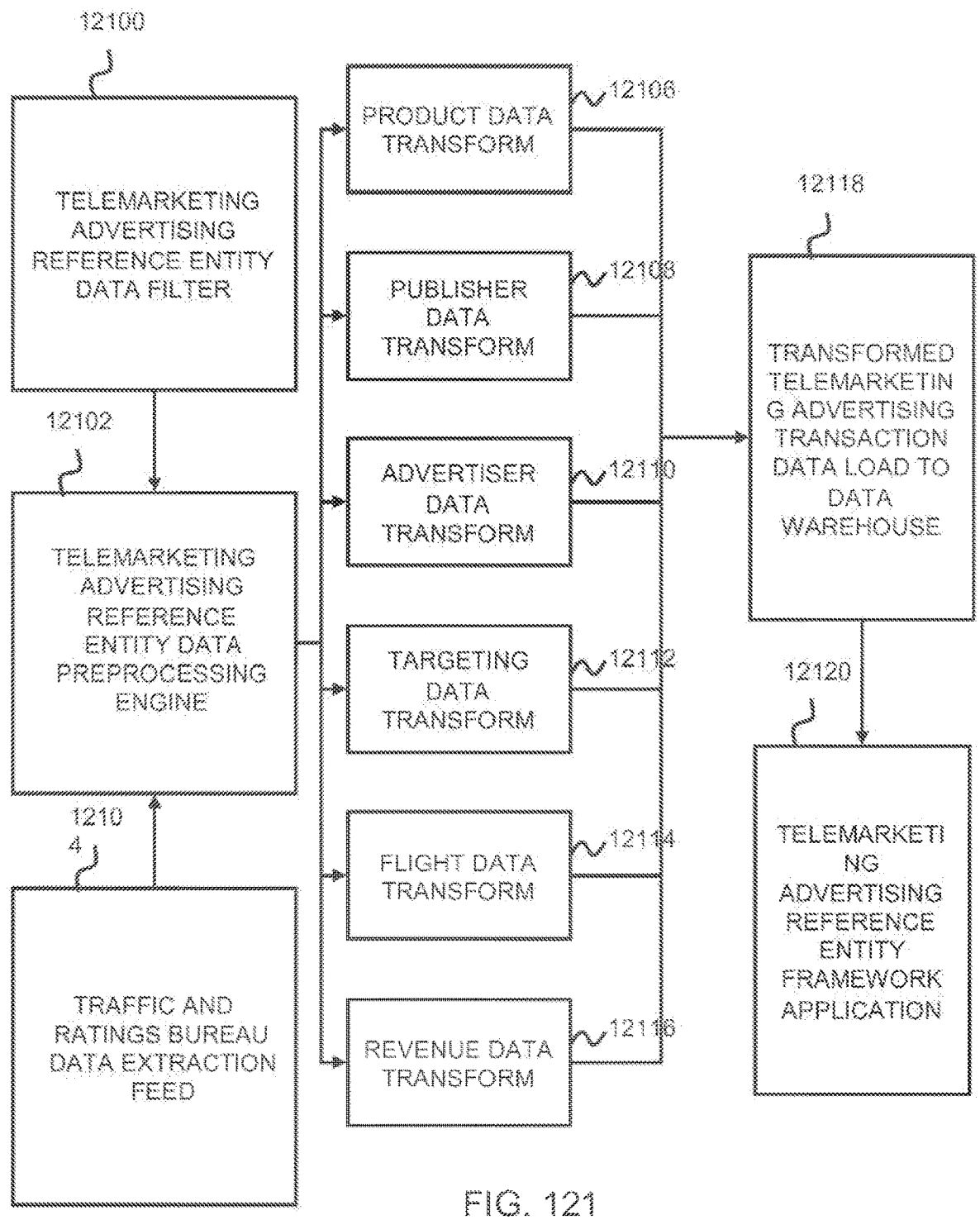

FIG. 121 illustrates in more detail steps involved in organizing telemarketing advertising transaction records according to a taxonomy of telemarketing advertising attributes. Advertising transaction data selected via a telemarketing advertising reference entity data filter, step 12110, may be preprocessed as described above, step 12102. Information regarding the effectiveness of telemarketing entities listed in telemarketing advertising transactions may be obtained from ratings bureau databases (e.g., Quantcast.com and Nielsen), websites and other such data feeds, step 12104. This data may be combined to transform the information from advertising transactions into attribute values and attribute tier values as described above with reference to FIG. 3A, 3B. For example, a product data may be transformed into a product attribute tier value, step 12106, publisher data information may be transformed into publisher tier attribute values, step 12108, advertiser information may be transformed into advertiser tier attribute values, step 12110, targeting package information may be transformed into one or more targeting attribute tier values, step 12112, flight information may be transformed into advertising product flight attribute values, and revenue information may be transformed into one or more revenue attribute tier values, step 12116. The transformed telemarketing advertising transaction attribute values may then be stored in a database or data warehouse, step 12118. The data stored in a database may then be used to determine the telemarketing advertising reference entity value, step 12120.

Figure 122:
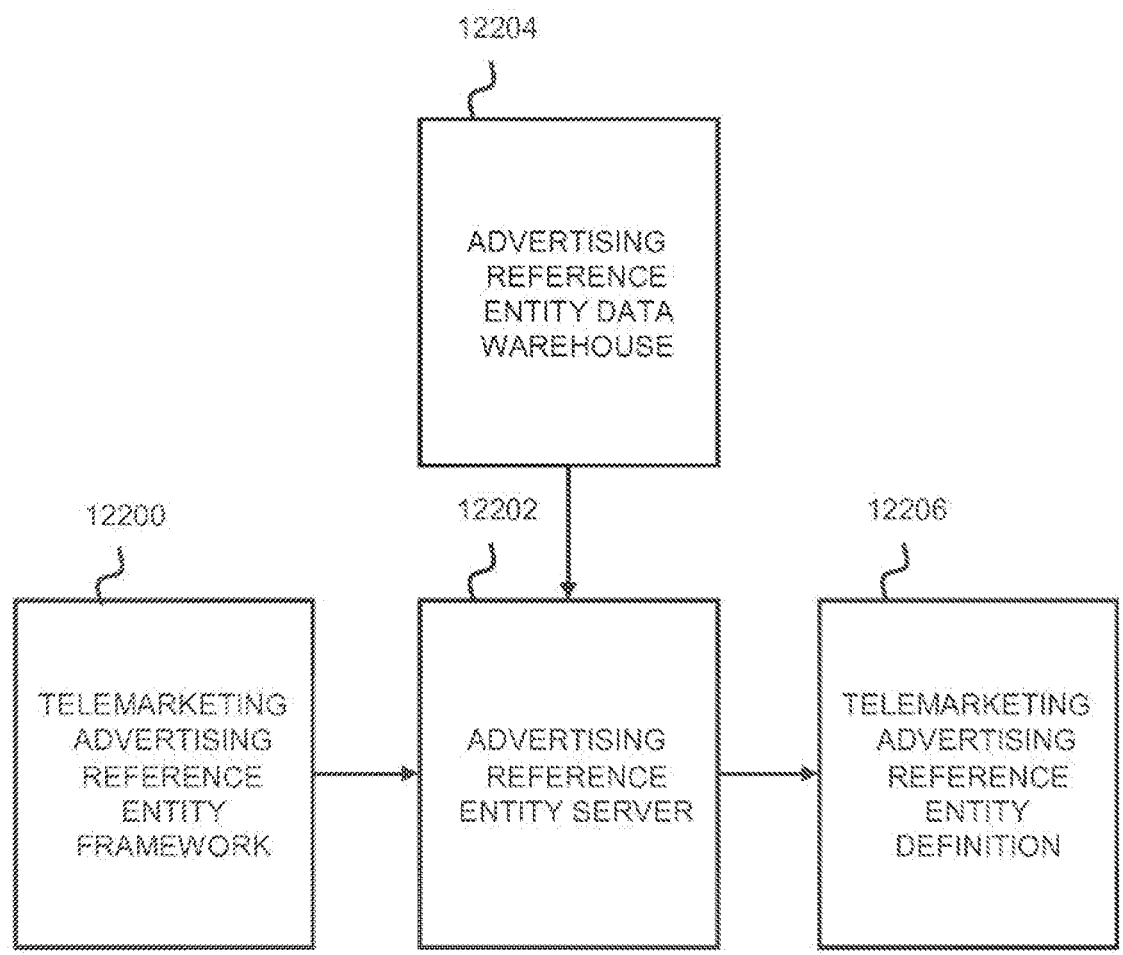

In an embodiment illustrated in FIG. 122, a telemarketing advertising reference entity framework 12202 may be applied as an automated filter to the eligible pool of archived telemarketing advertising transactions stored in a data warehouse 12200. In this process, an advertising reference entity server 12204 may use the telemarketing advertising reference entity framework 12202 as a filter or search framework for drawing archived telemarketing advertising transactions from the data warehouse 12200. The advertising reference entity server 13004 may then use the sampled transaction data in order to synthesize a telemarketing advertising reference entity 12206. The process of synthesizing the telemarketing reference entity may involve calculating the indexed reference entity value of the transactions sampled on the basis of the defined attribute values contained in the telemarketing reference entity framework 12202. For example, the indexed value may include a gross transaction size, a gross revenue index, a net revenue index, and an effective unit revenue index.

Figure 123:
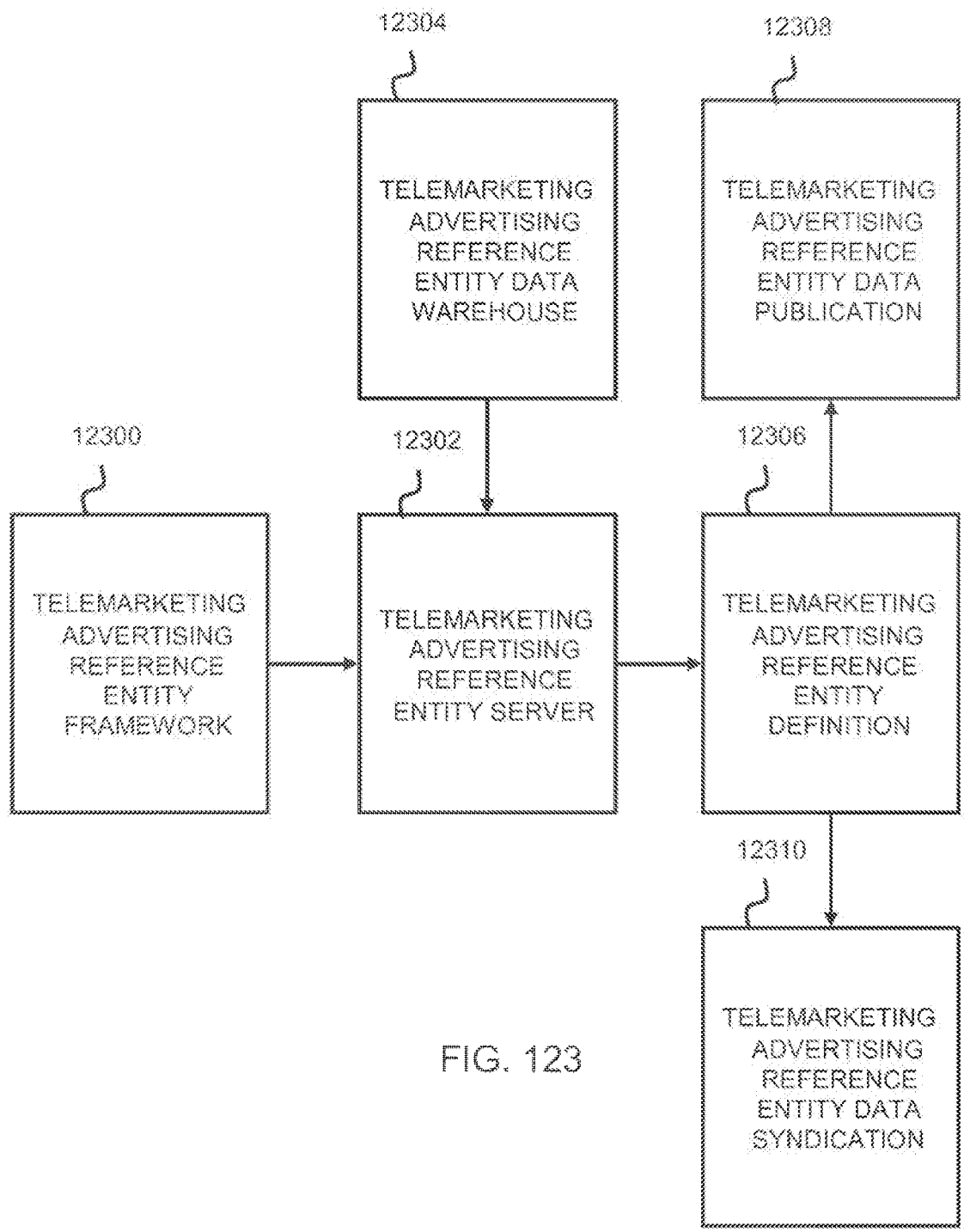

FIG. 123 illustrates a method in which a telemarketing advertising reference entity is used as a telemarketing advertising market benchmark. In this embodiment, a telemarketing advertising reference entity framework 12300 is used by a telemarketing advertising reference entity server 12302 to selectively sample electronic advertising transaction records stored within a data warehouse 12304. The telemarketing advertising reference entity server 12302 uses the sampled transaction data to define a telemarketing advertising reference entity 12306. This reference entity is then published as a telemarketing advertising reference entity data publication 12308. The reference entity definition may also be used to generate a telemarketing advertising reference entity data syndication 12310. In this embodiment, the value of the telemarketing advertising reference entity may be defined following a consistently defined and executed advertising reference entity definition process with the results published and syndicated.

Figure 124:
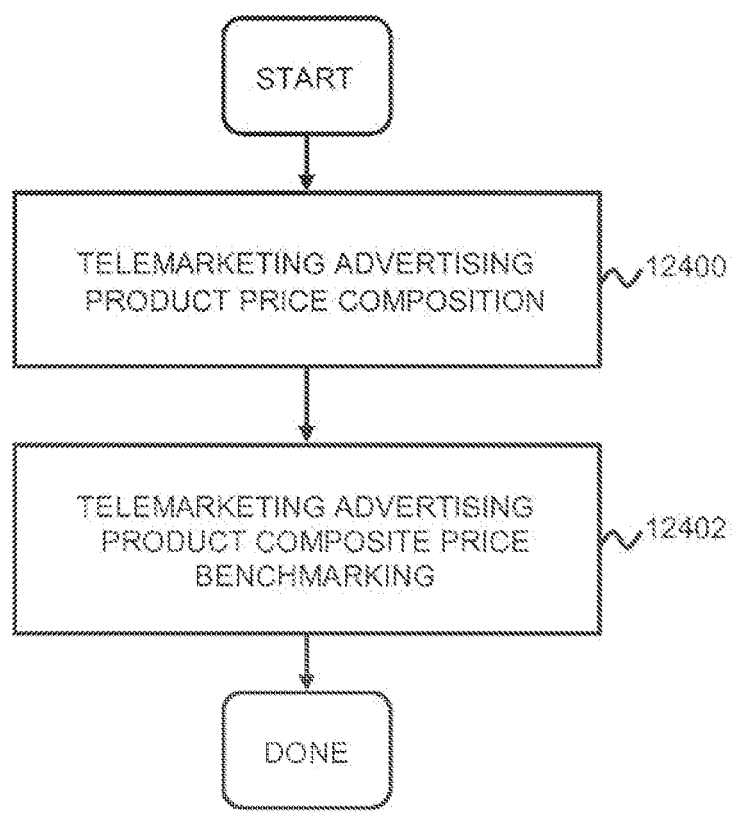

FIG. 124 illustrates a method for using a single telemarketing advertising product composite price as a telemarketing advertising product composite price benchmark. In this process, telemarketing attribute values which define a particular type of telemarketing advertising product are used to sample an advertising transaction data warehouse to extract advertising transaction records associated with a type of advertising product over a period of time, with that data used to determine an advertising composite price, step 12400. This establishes a telemarketing advertising product composite price within the identified sample transaction time frame. The telemarketing advertising product composite price may then be published to the marketplace on a timely and consistent basis with the publication syndicated, thereby establishing the telemarketing advertising product composite price as a telemarketing advertising composite price benchmark for subsequent transactions and operations, step 12402.

Figure 125:
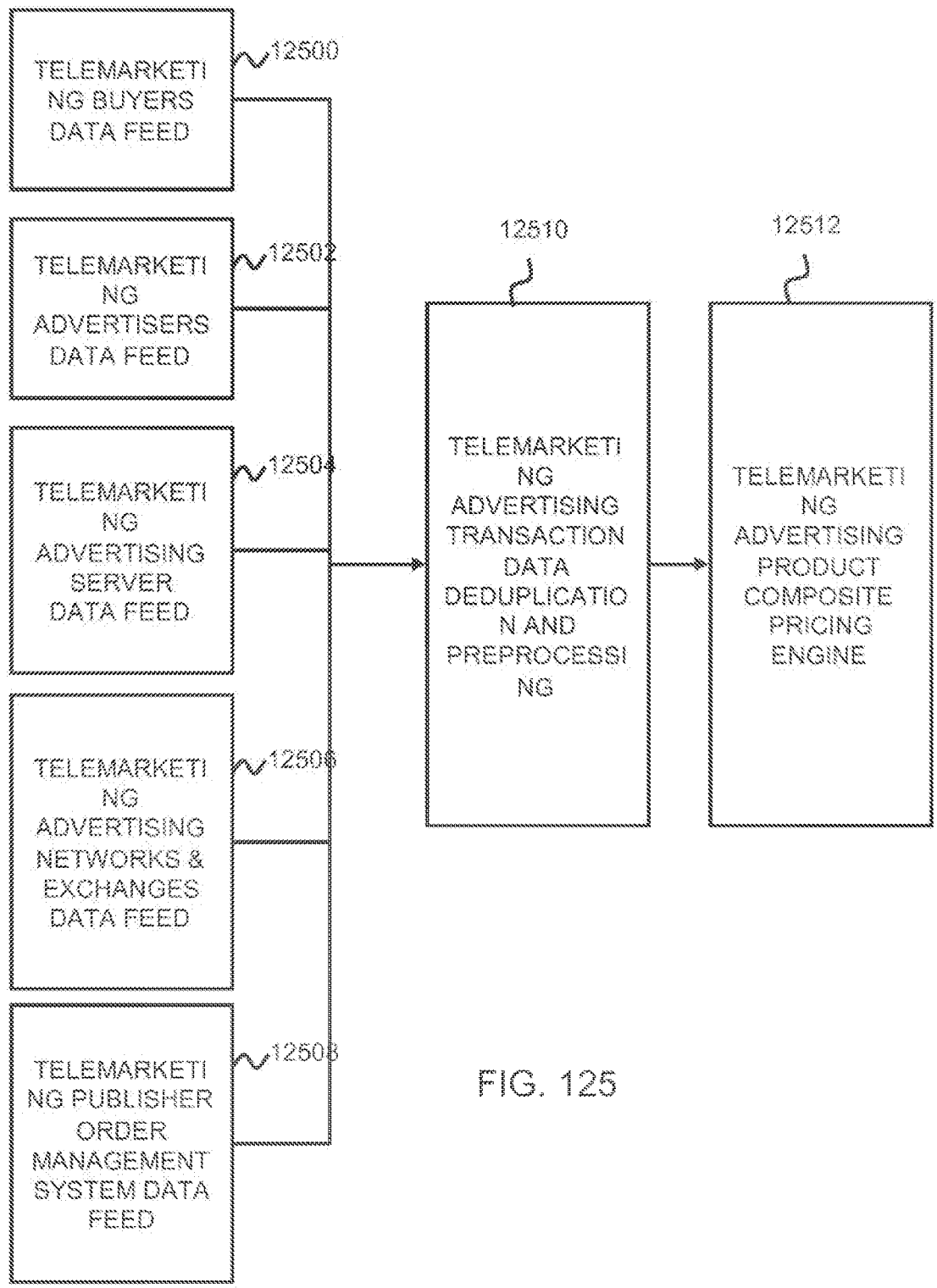

FIG. 125 illustrates a system network for identifying a set of advertising transactions to be extracted, transformed and used to define a telemarketing advertising product composite price. Raw telemarketing advertising transaction data may be obtained from a variety of sources including, for example, agency telemarketing advertising buyer data feeds 12500, telemarketing advertiser data feeds 12502, telemarketing advertising server data feeds 12504, telemarketing advertising networks and exchange data feeds 12506, and telemarketing publisher order management system data feeds 12508. The raw telemarketing advertising transaction data may be pre-processed to remove duplicates and otherwise transform attribute values into attribute tier values, step 12510, with the resulting data provided to a telemarketing advertising product composite pricing engine 12512. The telemarketing advertising product composite price engine may include a volume-weighted composite price for sampled telemarketing advertising products of the identified attribute values conducted within an identify transaction time frame.

Figure 126:
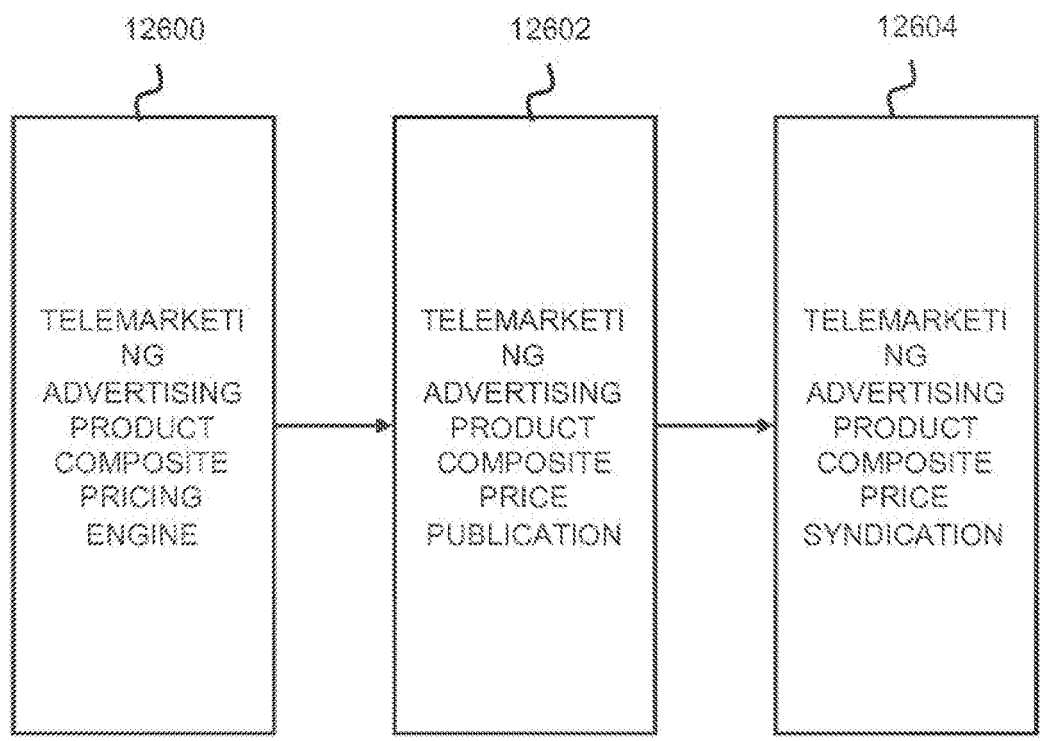

As illustrated in FIG. 126, the output from the telemarketing advertising product composite pricing engine, step 12600, may be published as a telemarketing advertising product composite price publication, step 12602, and syndicated as a telemarketing advertising product composite price syndication, step 12604. The publication and syndication of the telemarketing advertising product composite price may be accomplished via a variety of publication and communication mechanisms. The telemarketing advertising product composite price may also be published in syndicated via closed, open and public networks as well as communications among market participants. Additionally, the telemarketing advertising product composite price may be archived using any known archival methods and storage devices.

Figure 127:
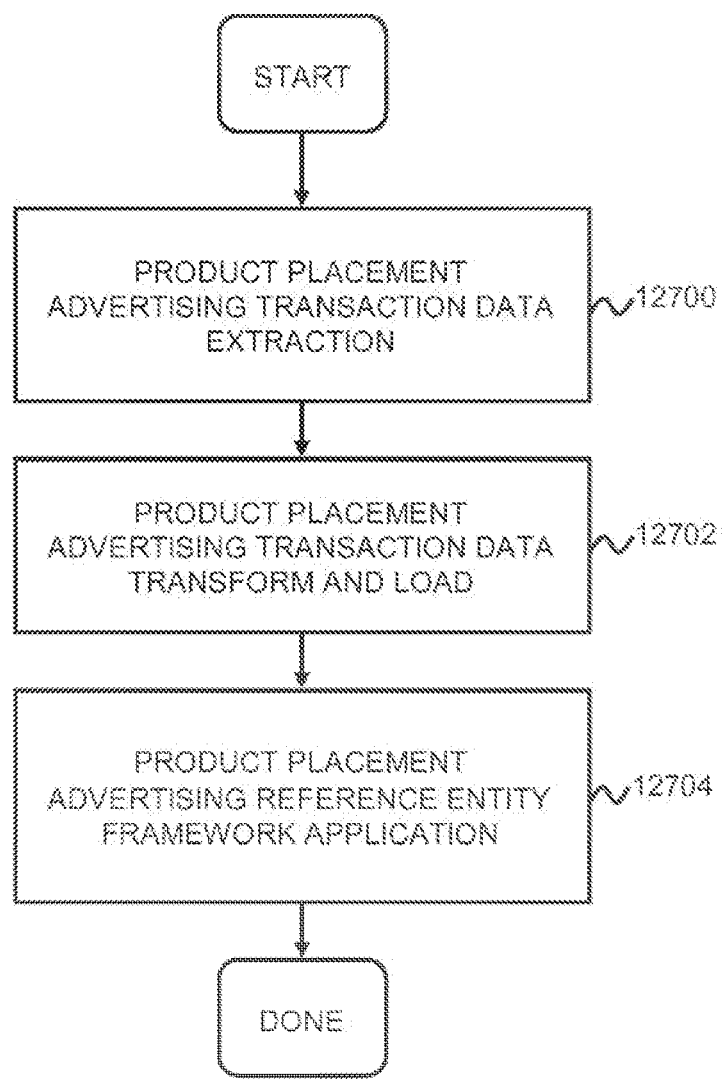
FIGS. 127-134 are process flow diagrams of methods for establishing a product placement advertising benchmark, reference entity and composite price syndication.

FIG. 127 illustrates steps of a method for establishing a product placement advertising reference entity by aggregating selected transactions. As described above with reference to FIGS. 2-5, a plurality of advertising transactions are captured from any of a variety of data sources and data transmission mechanisms, the transaction attribute values are identified, selected transaction values are transformed to attribute tier values, and the resulting advertising transaction records are stored in a database, step 12700. As part of this process, the transaction records and the database can be indexed and organized according to an attribute taxonomy to enable selected data records to be sampled and analyzed. To establish an advertising reference entity for advertising transactions matching the product placement attribute value, a subset of advertising transaction records are selected within the database for processing, step 12702. The identified targeted attribute values may include single attributes or combinations of attributes associated with product placement advertising transactions. The sampled advertising transaction records are then aggregated to establish a product placement advertising reference entity value, step 12704.

Figure 128:
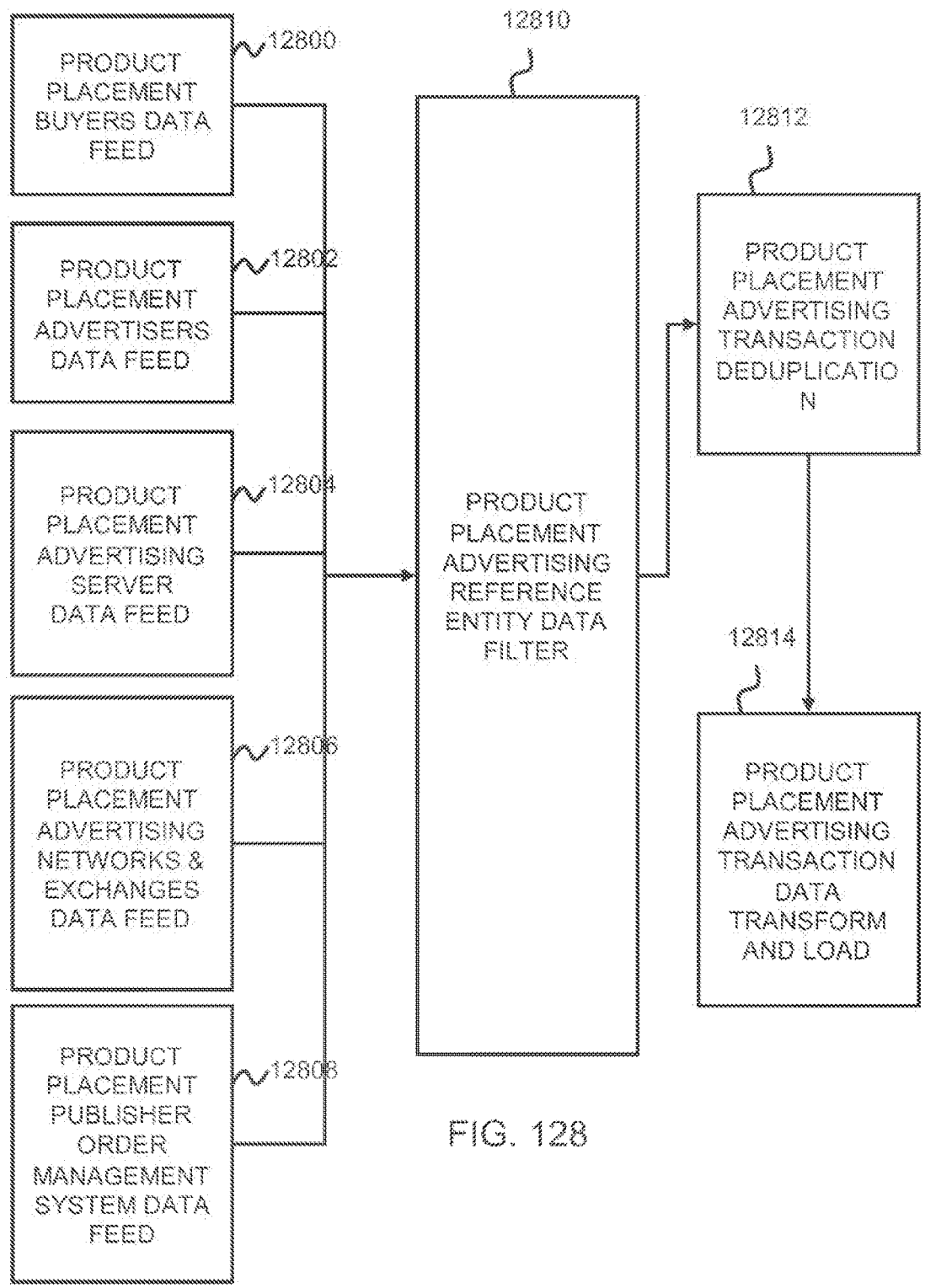

In this embodiment, advertising transaction records may be selected for an advertising transaction database by specifying "product placement" (or a corresponding attribute ID value) as the selection value for the advertising medium attribute. Alternatively, the advertising transactions that are captured in step 12700 may be limited to transactions purchasing product placement advertising, as illustrated in FIG. 128. For example, the data sources used to collect advertising transactions may be limited to agency electronics delayed media buyers data feeds 12800, product placement advertisers data feeds 12802, product placement advertising server data feeds 12804, product placement advertising networks and exchanges data feeds 12806, and product placement publisher order management system data feeds 12808. Additionally, the advertising transaction data feeds may be filtered by a product placement advertising reference entity data filter, step 12810. As mentioned above, the product placement advertising transaction data received from the various data feeds may be preprocessed to remove duplicate transaction records, step 12812. The preprocessed product placement advertising transaction data may then be processed to transform attribute information into attribute tier values and data records stored in a database, step 12814.

Figure 129:
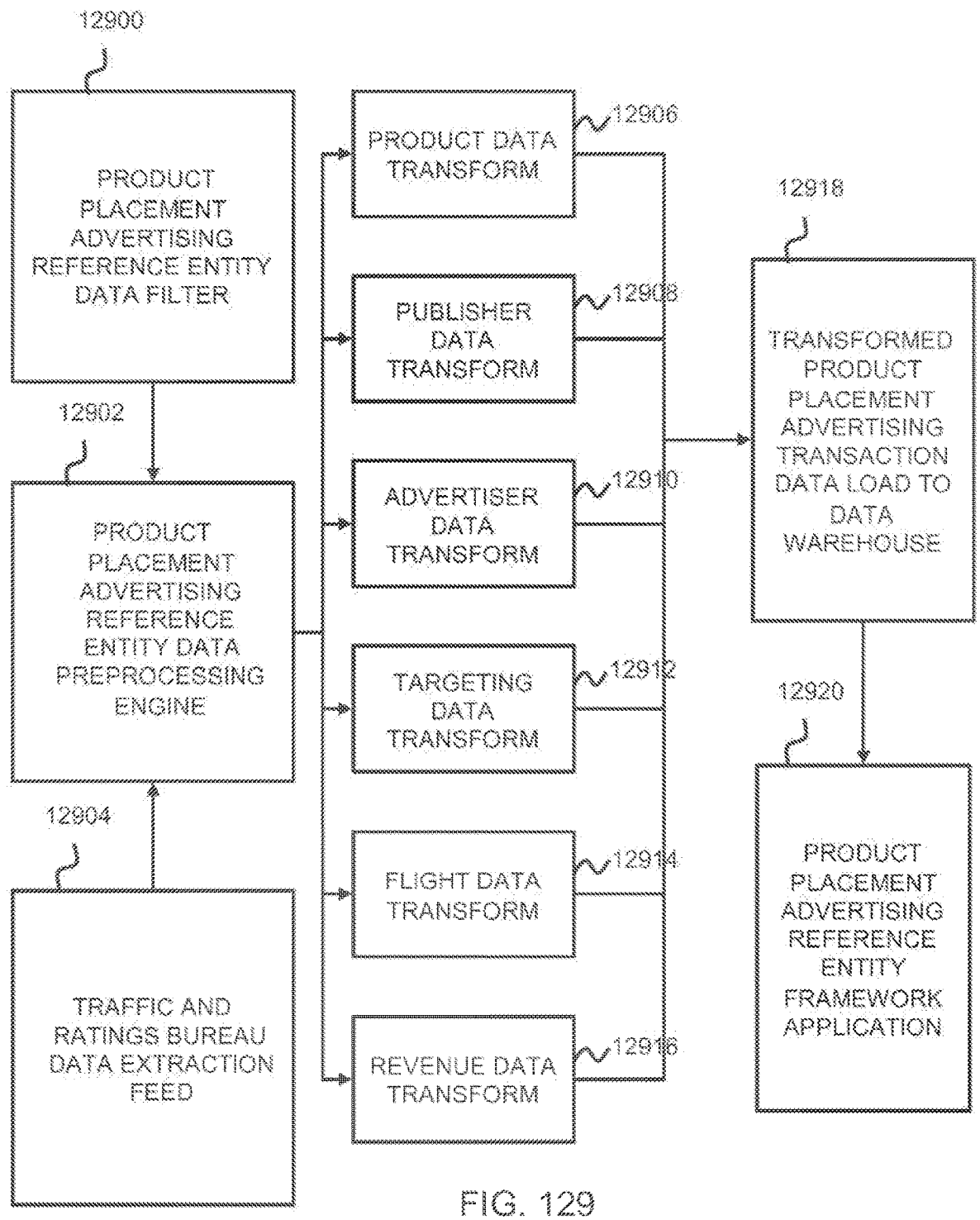

FIG. 129 illustrates in more detail steps involved in organizing product placement advertising transaction records according to a taxonomy of product placement advertising attributes. Advertising transaction data selected via a product placement advertising reference entity data filter, step 12910, may be preprocessed as described above, step 12902. Information regarding the effectiveness of product placements listed in product placement advertising transactions may be obtained from ratings bureau databases (e.g., Quantcast.com and Nielsen), websites and other such data feeds, step 12904. This data may be combined to transform the information from advertising transactions into attribute values and attribute tier values as described above with reference to FIG. 3A, 3B. For example, a product data may be transformed into a product attribute tier value, step 12906, publisher data information may be transformed into publisher tier attribute values, step 12908, advertiser information may be transformed into advertiser tier attribute values, step 12910, targeting package information may be transformed into one or more targeting attribute tier values, step 12912, flight information may be transformed into advertising product flight attribute values, and revenue information may be transformed into one or more revenue attribute tier values, step 12916. The transformed product placement advertising transaction attribute values may then be stored in a database or data warehouse, step 12918. The data stored in a database may then be used to determine the product placement advertising reference entity value, step 12920.

Figure 130:
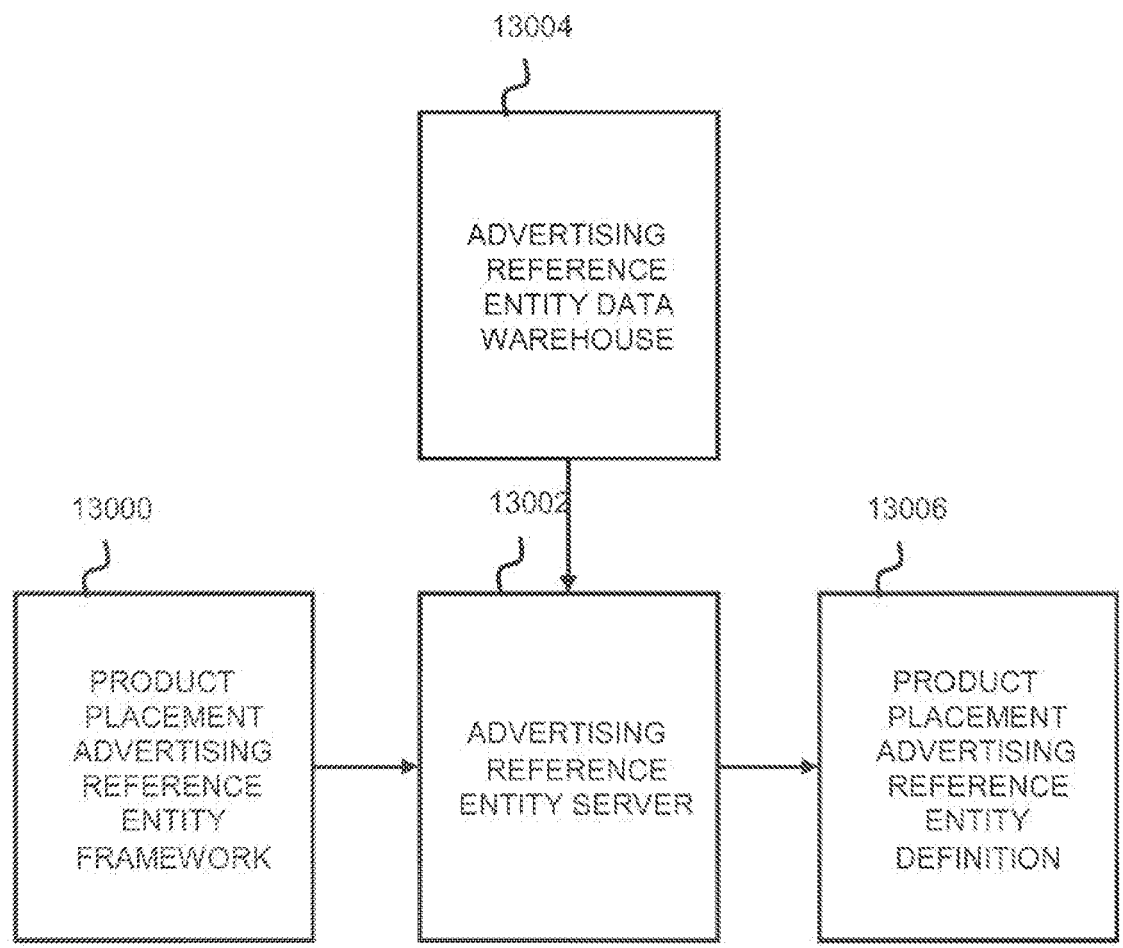

In an embodiment illustrated in FIG. 130, a product placement advertising reference entity framework 13002 may be applied as an automated filter to the eligible pool of archived product placement advertising transactions stored in a data warehouse 13000. In this process, an advertising reference entity server 13004 may use the product placement advertising reference entity framework 13002 as a filter or search framework for drawing archived product placement advertising transactions from the data warehouse 13000. The advertising reference entity server 13004 may then use the sampled transaction data in order to synthesize a product placement advertising reference entity 13006. The process of synthesizing the product placement reference entity may involve calculating the indexed reference entity value of the transactions sampled on the basis of the defined attribute values contained in the product placement reference entity framework 13002. For example, the indexed value may include a gross transaction size, a gross revenue index, a net revenue index, and an effective unit revenue index.

Figure 131:
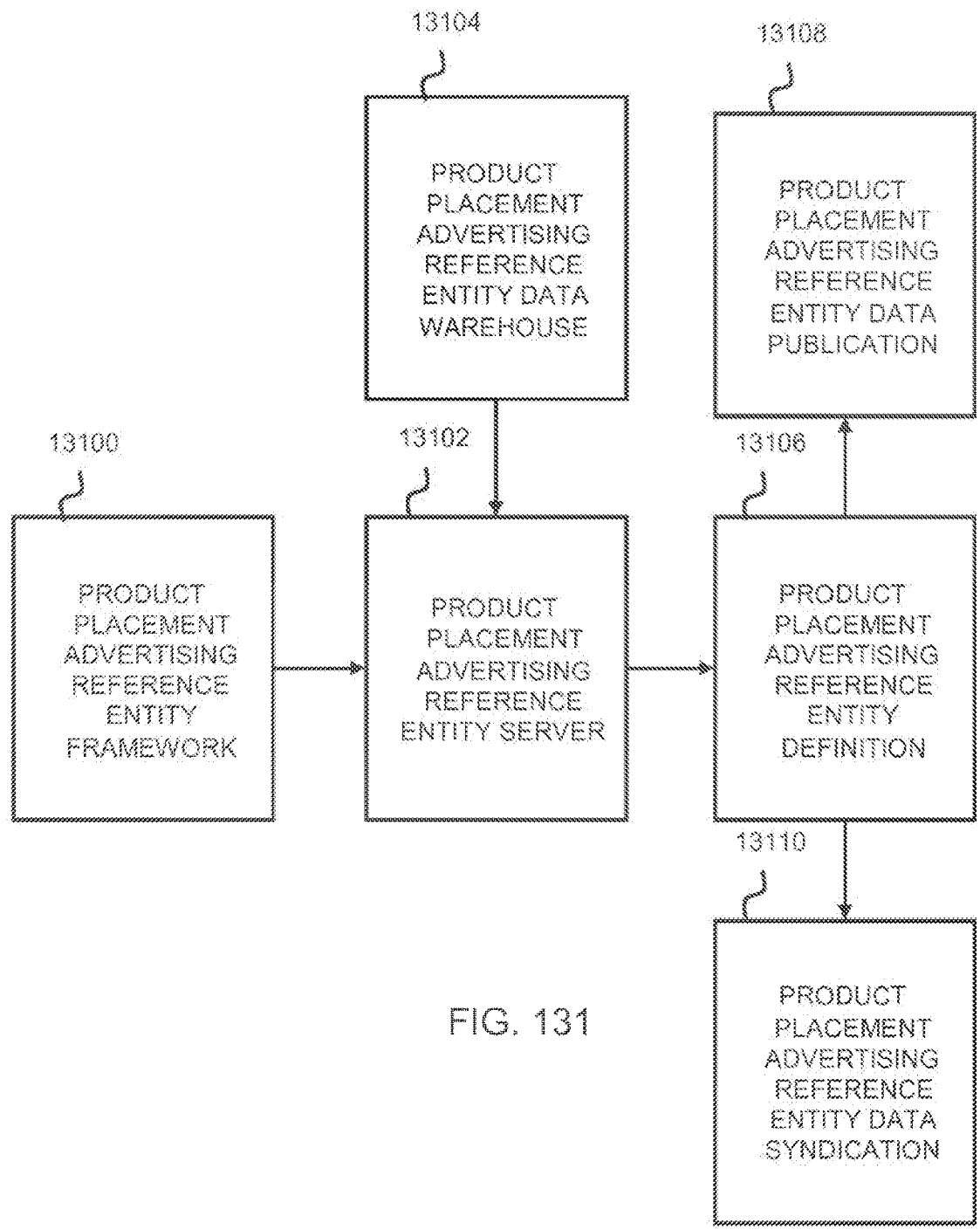

FIG. 131 illustrates a method in which a product placement advertising reference entity is used as a product placement advertising market benchmark. In this embodiment, a product placement advertising reference entity framework 13100 is used by a product placement advertising reference entity server 13102 to selectively sample electronic advertising transaction records stored within a data warehouse 13104. The product placement advertising reference entity server 13102 uses the sampled transaction data to define a product placement advertising reference entity 13106. This reference entity is then published as a product placement advertising reference entity data publication 13108. The reference entity definition may also be used to generate a product placement advertising reference entity data syndication 13110. In this embodiment, the value of the product placement advertising reference entity may be defined following a consistently defined and executed advertising reference entity definition process with the results published and syndicated.

Figure 132:
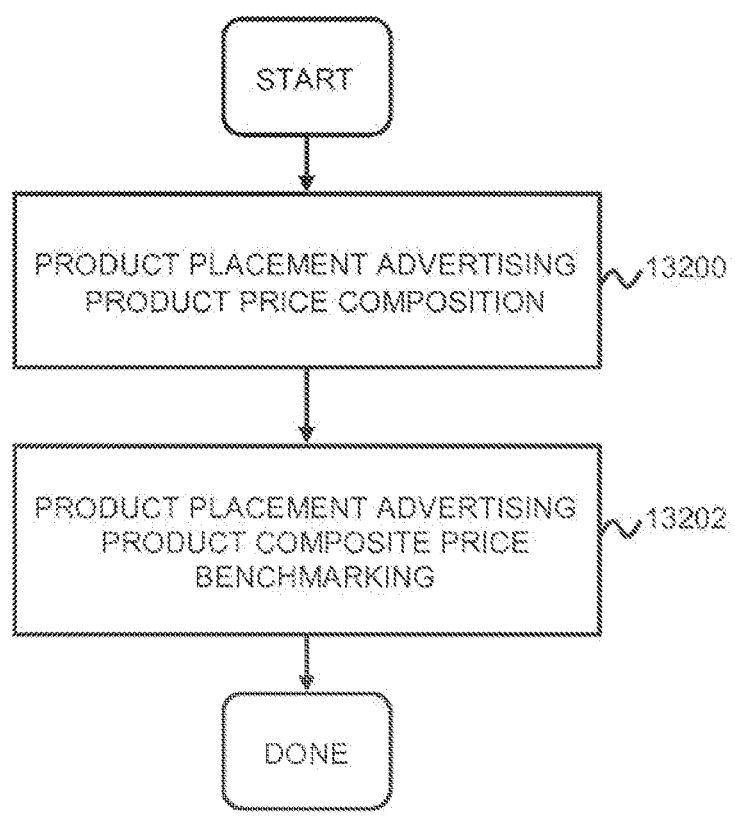

FIG. 132 illustrates a method for using a single product placement advertising product composite price as a product placement advertising product composite price benchmark. In this process, product placement attribute values which define a particular type of product placement advertising product are used to sample an advertising transaction data warehouse to extract advertising transaction records associated with a type of advertising product over a period of time, with that data used to determine an advertising composite price, step 13200. This establishes a product placement advertising product composite price within the identified sample transaction time frame. The product placement advertising product composite price may then be published to the marketplace on a timely and consistent basis with the publication syndicated, thereby establishing the product placement advertising product composite price as a product placement advertising composite price benchmark for subsequent transactions and operations, step 13202.

Figure 133:
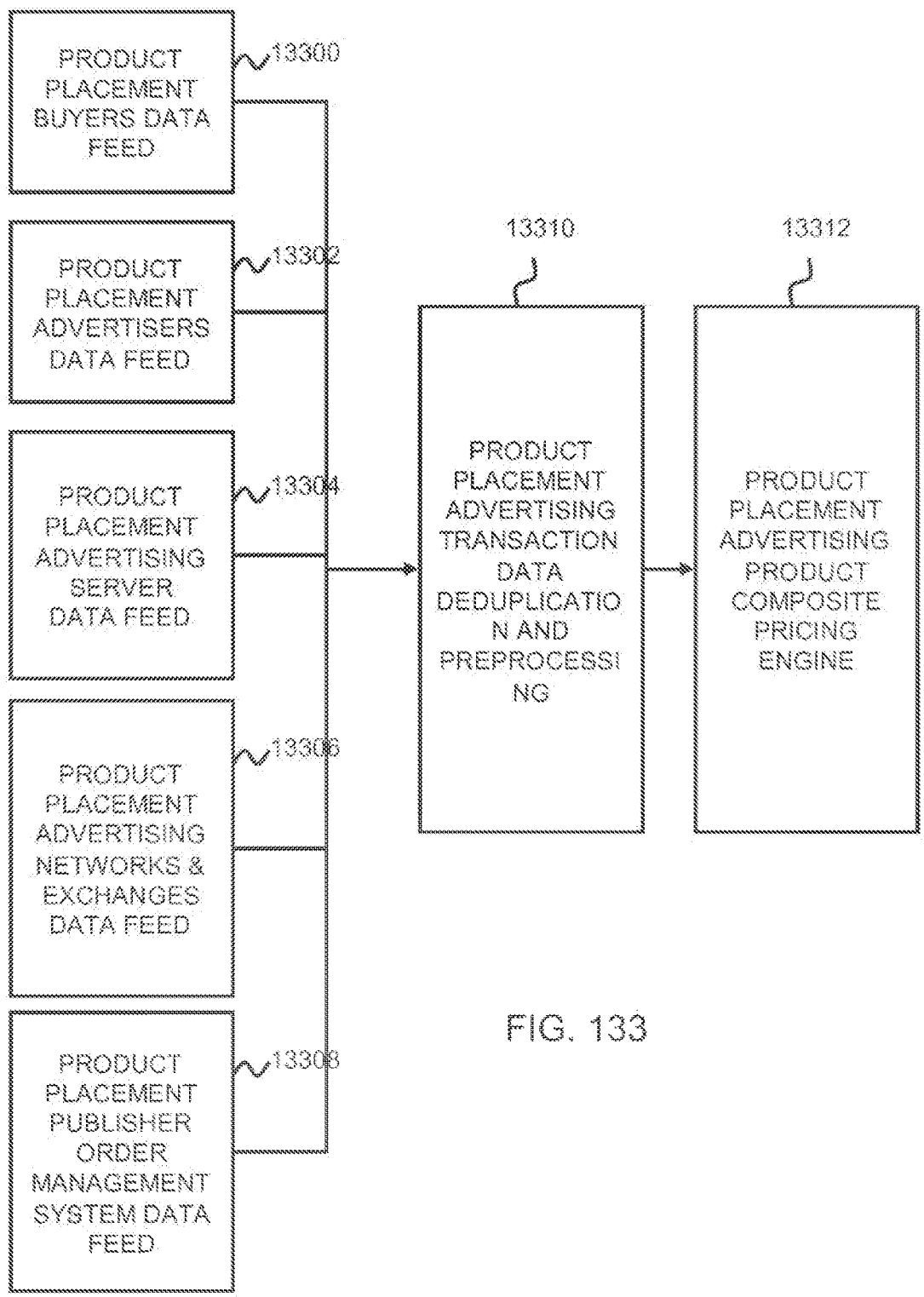

FIG. 133 illustrates a system network for identifying a set of advertising transactions to be extracted, transformed and used to define a product placement advertising product composite price. Raw produce placement advertising transaction data may be obtained from a variety of sources including, for example, agency product placement advertising buyer data feeds 13300, product placement advertiser data feeds 13302, product placement advertising server data feeds 13304, product placement advertising networks and exchange data feeds 13306, and product placement publisher order management system data feeds 13308. The raw product placement advertising transaction data may be preprocessed to remove duplicates and otherwise transform attribute values into attribute tier values, step 13310, with the resulting data provided to a product placement advertising product composite pricing engine 13312. The product placement advertising product composite price engine may include a volume-weighted composite price for sampled product placement advertising products of the identified attribute values conducted within an identify transaction time frame. In particular pricing attribute used in determining a product composite price may include price per viewer, price per spot, price per episode, price per session, price per estimated viewer, price per duration, price per action, and the like.

Figure 134:
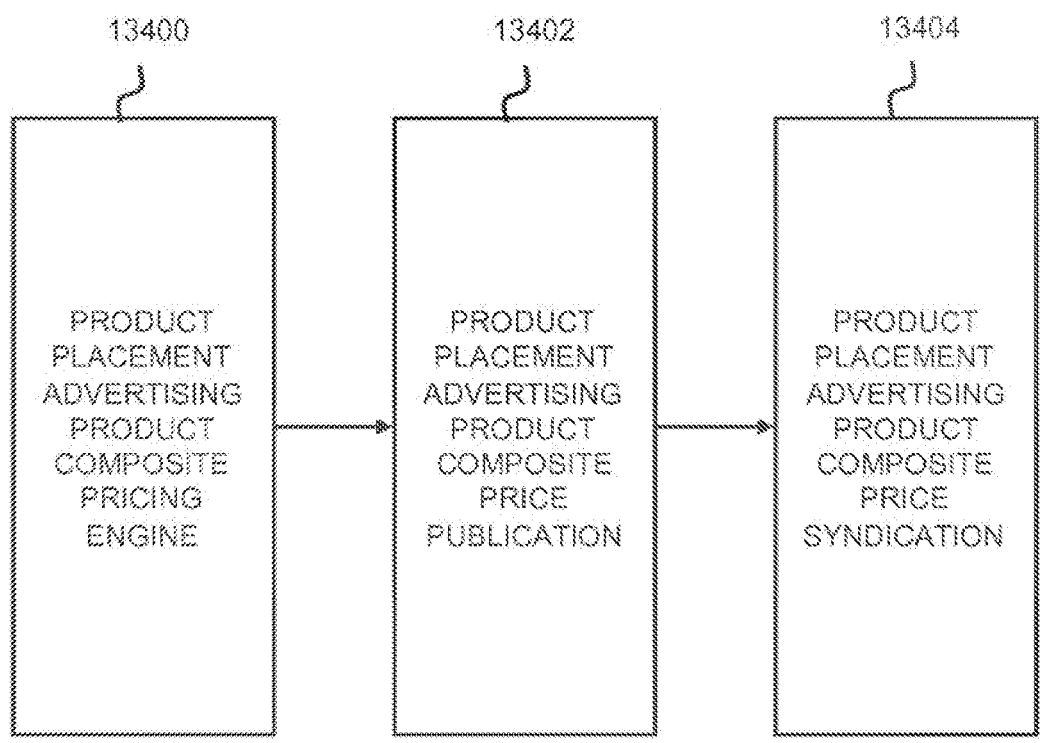

As illustrated in FIG. 134, the output from the product placement advertising product composite pricing engine, step 13400, may be published as a product placement advertising product composite price publication, step 13402, and syndicated as a product placement advertising product composite price syndication, step 13404. The publication and syndication of the product placement advertising product composite price may be accomplished via a variety of publication and communication mechanisms. The product placement advertising product composite price may also be published in syndicated via closed, open and public networks as well as communications among market participants. Additionally, the product placement advertising product composite price may be archived using any known archival methods and storage devices.

Figure 135:
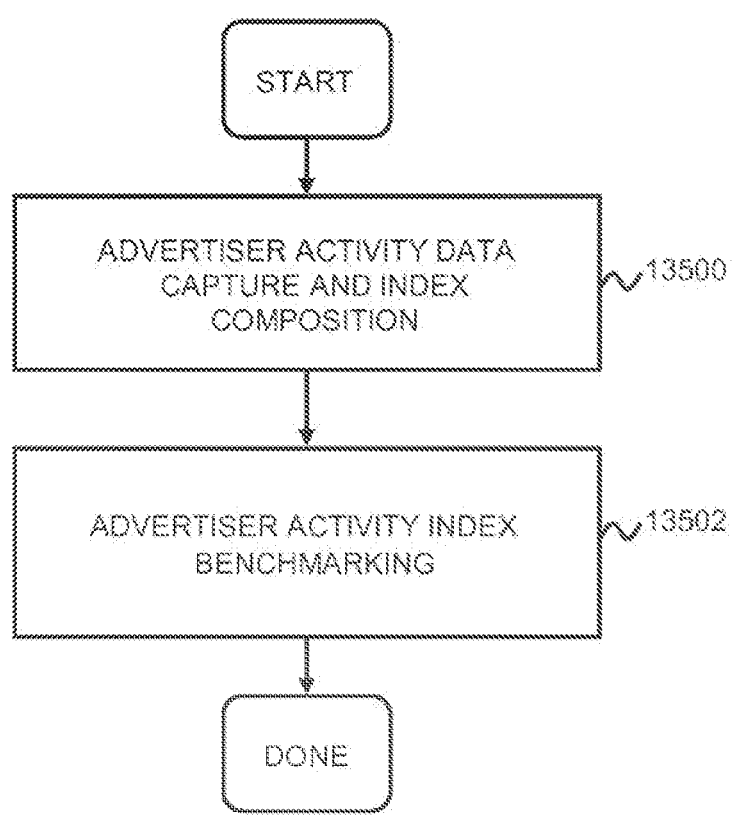
FIGS. 135-137 are process flow diagrams of methods for establishing an advertiser activity index and benchmark.

FIG. 135 illustrates steps of a method for surveying parties to advertising transactions to establish advertising market activity benchmarks. In this process market participants in an advertising market may be surveyed with a predefined set of questions intended to solicit information about activity levels in the advertising market, with the survey answers transformed into at least one activity level score or index, step 13500. The activity level score or index can then be used to establish an activity level benchmark for the selected type of advertising activity, step 13502. The activity levels surveyed may be marketing activity levels, inquiry activity levels, hiring activity levels, account visit activity levels, and proposal activity levels. The selected advertising markets may be any of the different markets defined in the topology. The parties survey may be any of the parties involved in an advertising market.

The survey questions asked of market participants may include any of spending by product, spending by platform, spending by media, spending by revenue model type, selling by product, selling by platform, selling by media, selling by revenue model type, viewing by product, viewing by platform, viewing by media, viewing by revenue model type, allocation across products, allocation across platforms, allocation across media, migration among products, migration among platforms, migration among media, revenue by product, revenue by platform, revenue by media, relative strength by product, relative strength by platform, relative strength by media, relative strength by revenue model type, inquiry by product, inquire by platform, inquiry by media, inquiry by revenue model type, requests for pricing by product, requests for pricing by platform, requests for pricing by media, and requests for pricing by revenue model type.

Figure 136:
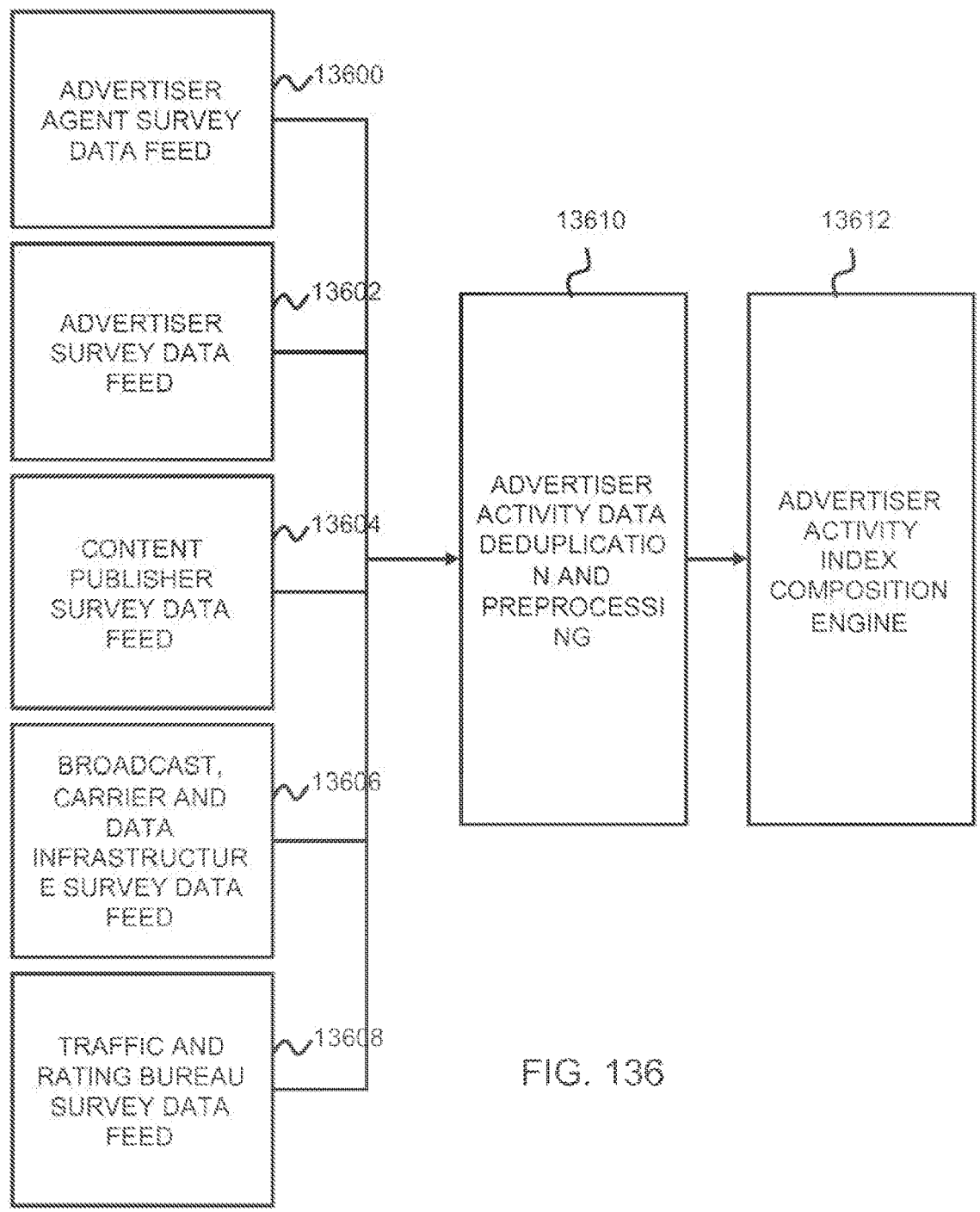

FIG. 136 illustrates more details regarding how market participants can be surveyed and the results processed. Market participants can be surveyed with responses received through a variety of data feeds 13600-13608. Specifically, survey responses may be received from advertiser agent survey data feeds 13600, advertiser survey data feeds 13602, content publisher survey data feeds 13604, broadcast, carrier and data infrastructure survey data feeds 13606, and traffic and rating bureau survey data feeds 13608. Survey responses may be preprocessed and de-duplicated, step 13610, and the results processed by an advertiser activity index composition engine 13612 where the survey response data is aggregated and taxonomized, and indexed values for individual and combined activity level survey responses are calculated and composed. The survey responses may be received by any known transmission method and channel.

Figure 137:
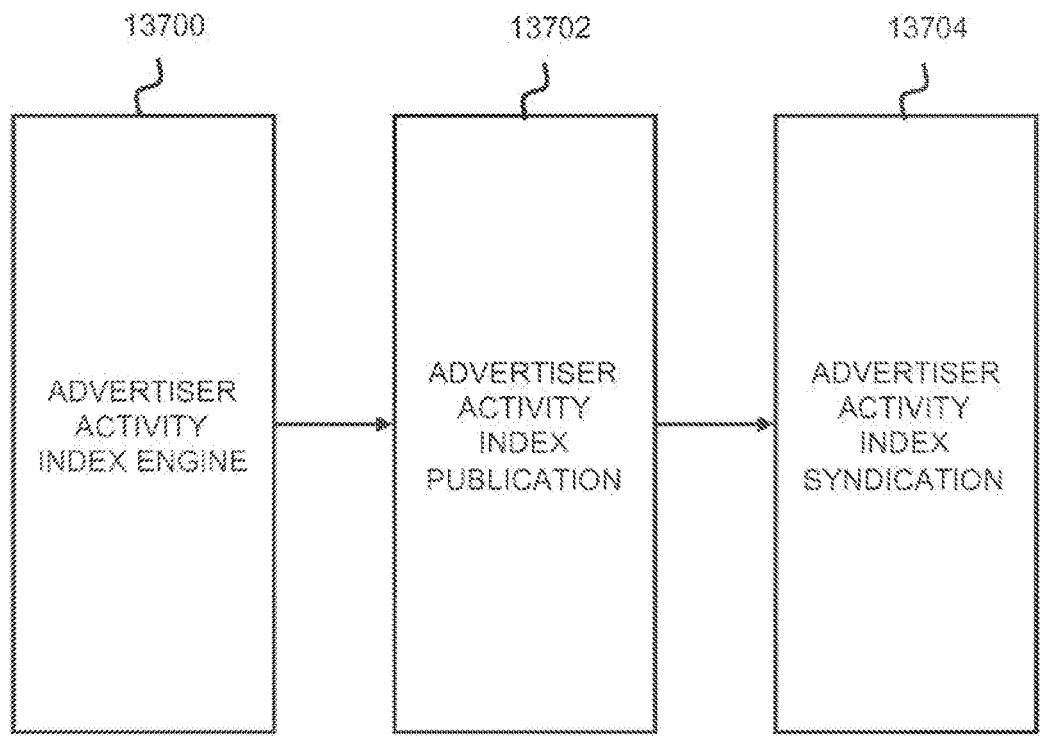

FIG. 137 illustrates a method for establishing an advertising activity index as an advertising market benchmark. Indexed advertising activity level values are generated from an advertising activity index engine, step 13700, and the results are published as an advertising activity index, step 13702. The indexed activity level values may be syndicated, step 13704. Further, the indexed advertising activity level values may be archived. Through public dissemination and permanent access to historic data, advertising activity index level values are established as viable and tradable advertising spot, current and recent market activity level benchmarks for subsequent transactions, operations, and the like. The advertising index value may be published, syndicated and disseminated using any known publishing and communication mechanism.

Figure 138:
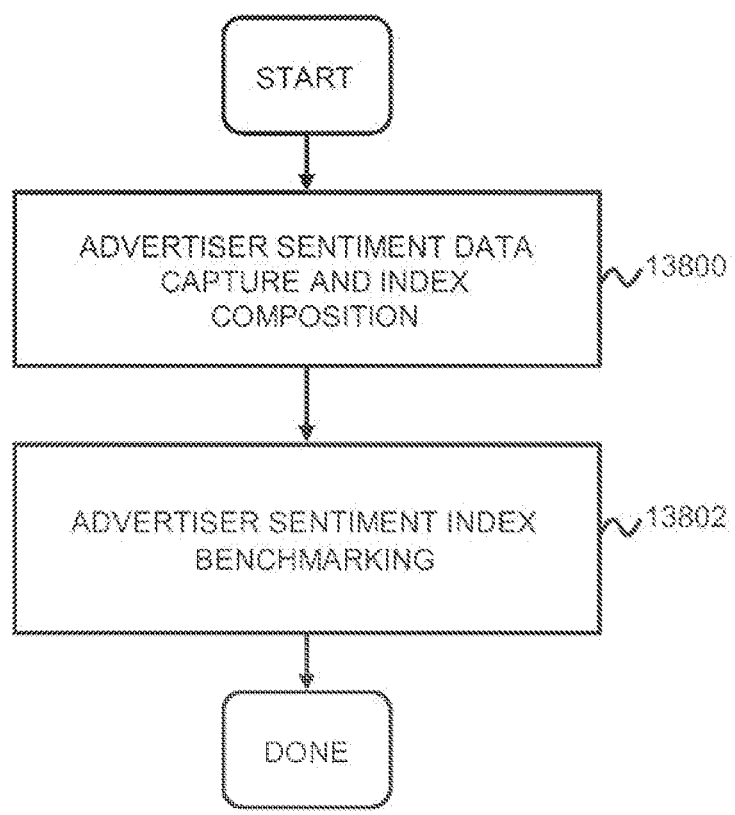
FIGS. 138-140 are process flow diagrams of methods for establishing an advertiser sentiment index and sentiment benchmark.

FIG. 138 illustrates steps of a method for surveying parties to advertising transactions to establish advertising sentiment benchmarks. In this process market participants in an advertising market may be surveyed with a predefined set of questions intended to solicit information about future or proposed activity levels in the advertising markets for some future time period, estimates regarding pricing and activity levels in the advertising markets for some future time period, anticipated shifts or migration in advertising market pricing, revenue generation or overall activity levels for some future time period, with the survey answers transformed into at least one future activity level or sentiment score, step 138500. The future activity level or sentiment score can be indexed and used to establish a future activity level benchmark for a type of advertising activity, step 13802. The future activity levels surveyed may be purchasing activity levels, selling activity levels, viewing activity levels, marketing activity levels, inquiry activity levels, hiring activity levels, account visit activity levels, proposal activity levels, and migration levels. The selected advertising markets may be any of the different markets defined in the topology. The parties survey may be any of the parties involved in an advertising market.

The survey questions asked of market participants may include any of expected spending by product, expected spending by platform, expected spending by media, expected spending by revenue model type, expected selling by product, expected selling by platform, expected selling by media, expected selling by revenue model type, viewing by product, expected viewing by platform, expected viewing by media, expected viewing by revenue model type, expected allocation across products, expected allocation across platforms, expected allocation across media, expected migration among products, expected migration among platforms, expected migration among media, expected revenue by product, expected revenue by platform, expected revenue by media, expected relative strength by product, expected relative strength by platform, expected relative strength by media, expected relative strength by revenue model type, expected inquiry by product, expected inquire by platform, expected inquiry by media, expected inquiry by revenue model type, expected request for pricing by product, expected request for pricing by platform, expected request for pricing by media, expected request for pricing by revenue model type, expected disruptions in spending, expected migration in spending, expected reallocation in spending, perceived value of products, perceived value of platforms, perceived value of media, perceived value of sales channel, perceived preference among advertising media, perceived effectiveness of a type of media, perceived ad spend migration, perceived or derived value from ad spend, and spend allocation forecasts.

Figure 139:
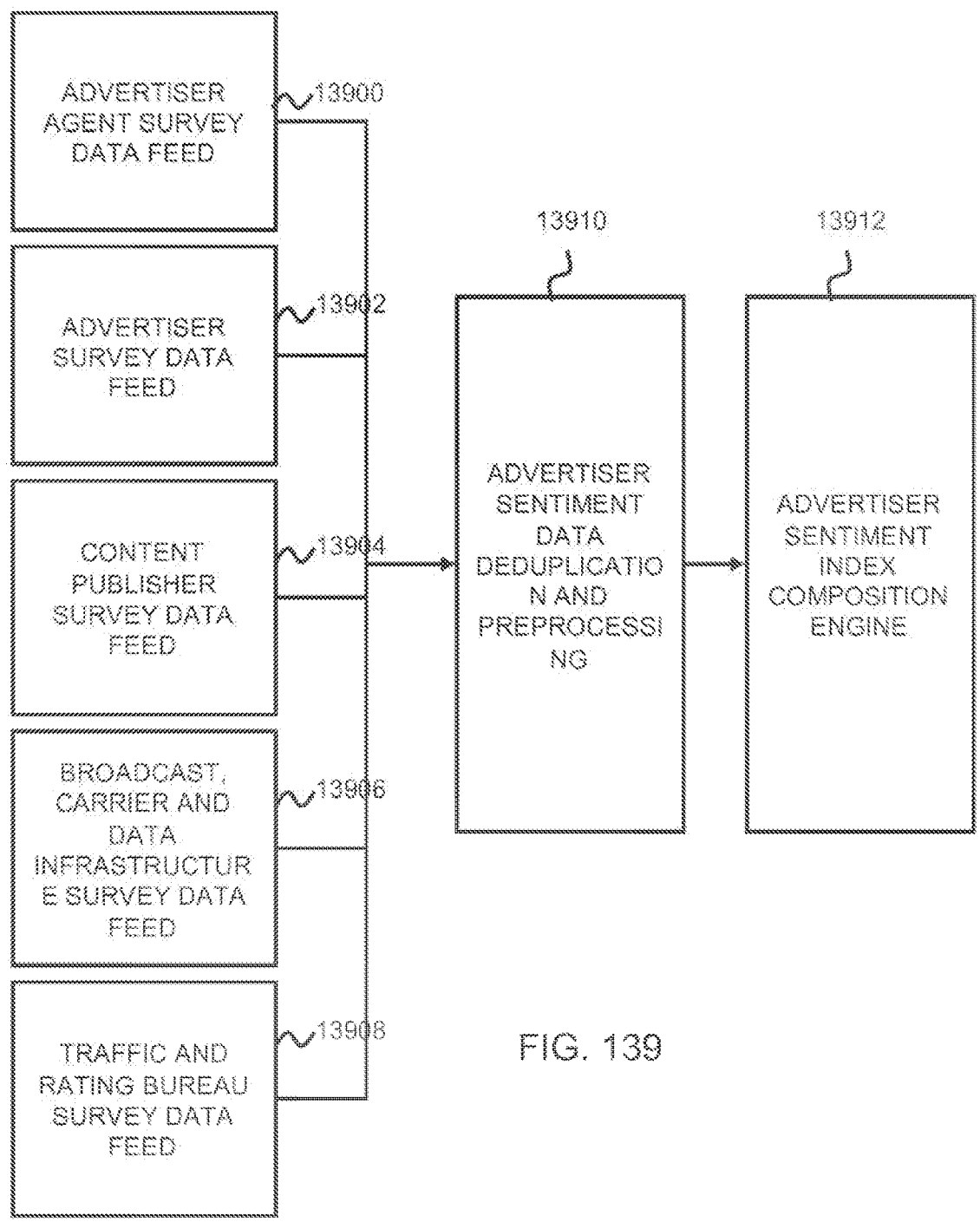

FIG. 139 illustrates more details regarding how market participants can be surveyed and the results processed. Market participants can be surveyed with responses received through a variety of data feeds 13900-13908. Specifically, survey responses may be received from advertiser agent survey data feeds 13900, advertiser survey data feeds 13902, content publisher survey data feeds 13904, broadcast, carrier and data infrastructure survey data feeds 13906, and traffic and rating bureau survey data feeds 13908. Advertiser sentiment survey responses may be preprocessed and de-duplicated, step 13910, and the results processed by an advertiser sentiment index composition engine 13912 where the survey response data is aggregated and taxonomized, and indexed values for individual and combined activity level survey responses are calculated and composed. The survey responses may be received by any known transmission method and channel.

Figure 140:
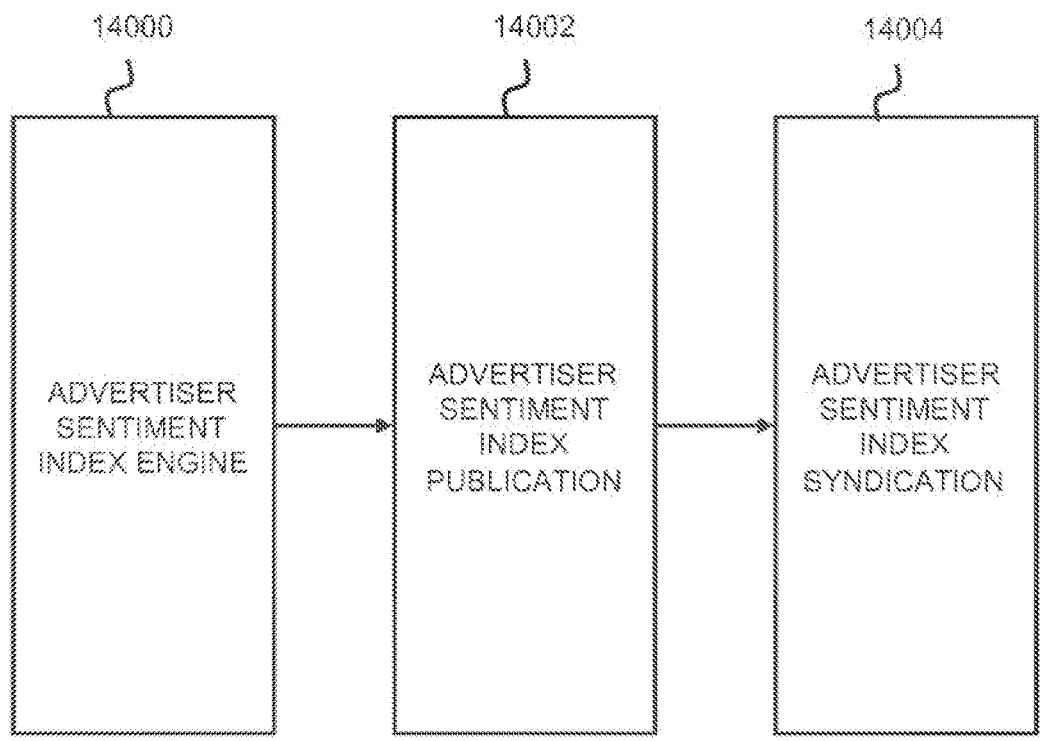

FIG. 140 illustrates a method for establishing an advertising sentiment index as an advertising market benchmark.

Indexed advertising sentiment level values are generated from an advertising sentiment index engine, step 14000, that are published as an advertising sentiment index, step 14002. The indexed sentiment level values may further be syndicated, step 14004. Further, the indexed advertising sentiment level values may be archived. Through public dissemination and permanent access to historic data, advertiser sentiment index level values are established as viable and tradable forward-looking advertising market activity level benchmarks for subsequent transactions, operations, and the like. The advertising sentiment index value may be published, syndicated and disseminated using any known publishing and communication mechanism.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Figure 141:
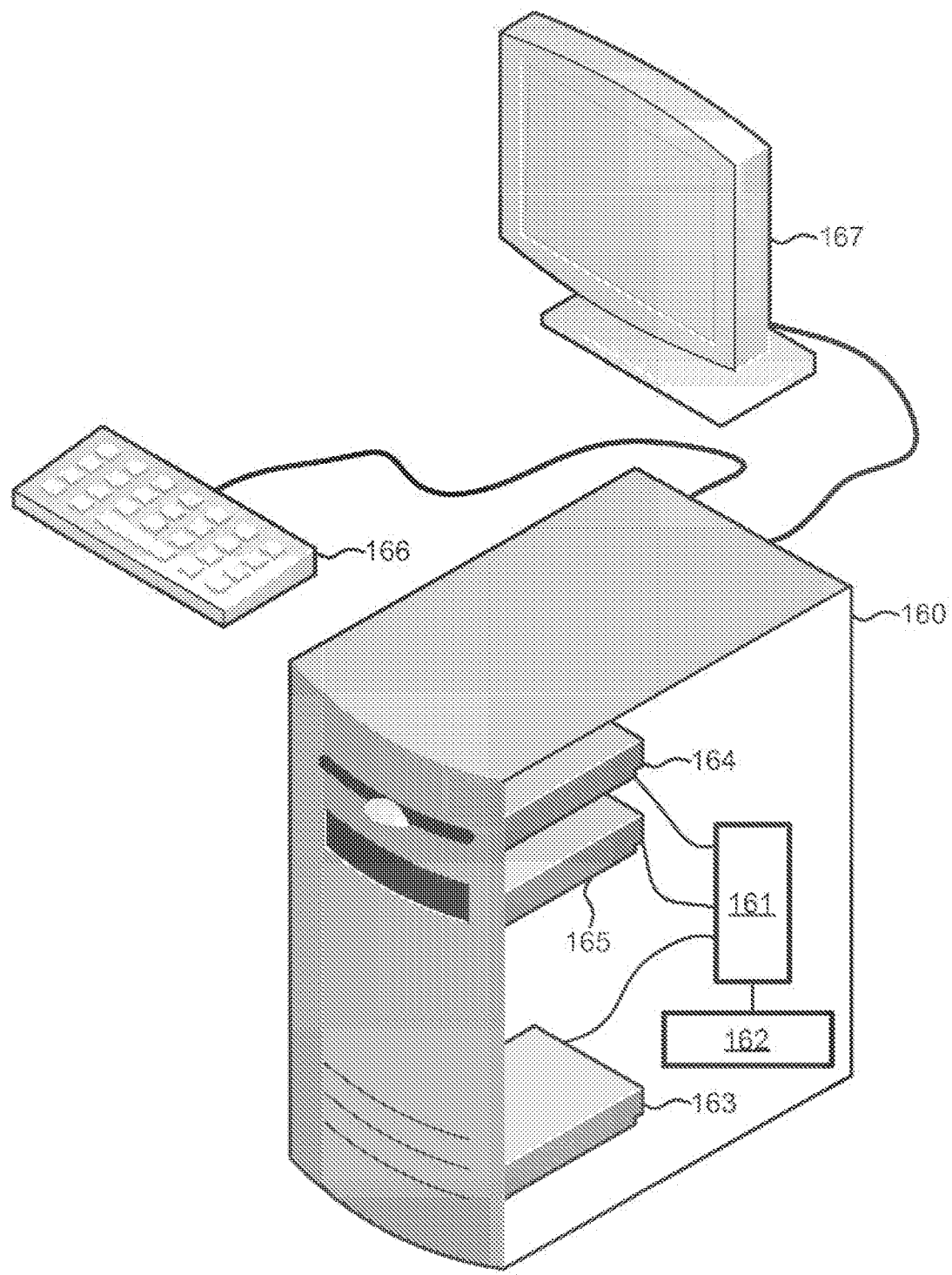
FIG. 141 is a component block diagram of a computer suitable for implementing the various embodiments.

As a specific example, the embodiments described above may be implemented on any of a variety of computing devices, such as a computer 160 illustrated in FIG. 141. Such a computer 160 typically includes a processor 161 coupled to volatile memory 162 and a large capacity non-volatile memory, such as a disk drive 163. The computer 13 may also include a floppy disc drive 164 and a compact disc (CD) drive 165 coupled to the processor 161. Typically the computer will also include a pointing device such as a mouse 167, a user input device such as a keyboard 168 and a display 166. The computer device 13 may also include a number of connector ports coupled to the processor 161 for establishing data connections or receiving external memory devices, such as a USB or FireWire® connector sockets or other network connection circuits 166 for coupling the processor 161 to a network. In a notebook configuration, the computer housing includes the pointing device 167, keyboard 168 and the display 169 as is well known in the computer arts.

The various embodiments may be implemented by a computer processor 161 executing software instructions configured to implement one or more of the described methods. Such software instructions may be stored in memory 162, 163 as separate applications, or as compiled software implementing an embodiment method. Reference database may be stored within internal memory 162, in hard disc memory 164, on tangible storage medium or on servers accessible via a network (not shown). Further, the software instructions and databases may be stored on any form of tangible processor-readable memory, including: a random access memory 162, hard disc memory 163, a floppy disc (readable in a floppy disc drive 164), a compact disc (readable in a CD drive 165), electrically erasable/programmable read only memory (EEPROM), read only memory (such as FLASH memory), and/or a memory module (not shown) plugged into the computer 160, such as an external memory chip or a USB-connectable external memory (e.g., a "flash drive") plugged into a USB network port 166.

The order in which the steps of a method described above and shown in the figures is for example purposes only as the order of some steps may be changed from that described herein without departing from the spirit and scope of the present invention and the claims.

The steps of a method or algorithm described in connection with the embodiments disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or mobile device. In the alternative, the processor and the storage medium may reside as discrete components in a user terminal or mobile device. Additionally, in some aspects, the steps and/or actions of a method or algorithm may reside as one or any combination or set of codes and/or instructions on a machine readable medium and/or computer readable medium, which may be incorporated into a computer program product. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable or processor-readable media and computer program product.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

APPENDIX A (Broker)

Quick Start

Run:
io.druid.cli.Main server broker
With the following JVM configuration:
-server
-Xmx256m
-Duser.timezone=UTC
-Dfile.encoding=UTF-8
druid.host=localhost
druid.service=broker
druid.port=8080
druid.zk.service.host=localhost JVM Configuration
The broker module can use several of the default modules described with respect to
"Configuration" and can have one or more of the following set of configurations as well:

| Property | Description | Default |
| --- | --- | --- |
| druid.broker.cache.type | Choices: local, memcache. The type of cache to use for queries. | local |
| | Local Cache | |
| druid.broker.cache.sizeinBytes | Maximum size of the cache. If this is zero, cache is disabled. | 0 |
| druidhroker.cache.initialSize | The initial size of the cache in bytes. | 500000 |
| druid.broker.cache.logEvictionCount | If this is non-zero, there will be an eviction of entries. | 0 |
| | Memcache | |
| druid.broker.cache.expiration | Memcache expiration time. | 2592000 (30 days) |
| druid.broker.cache.timeout | Maximum time in milliseconds to wait for a response from Memcache. | 500 |
| druid.broker.cache.hosts | Memcache hosts. | none |
| druid.broker.cache.maxObjectSize | Maximum object size in bytes for a Memcache object. | 52428800 (50 MB) |
| druid.broker.cache.memcachedPrefix | Key prefix for all keys in Memcache. | druid |

Running io.druid.cli.Main server broker

APPENDIX B

(Coordinator)

Quick Start

Run:
io.druid.cli.Main server coordinator
With the following JVM configuration:
-server
-Xmx256m
-Duser.timezone=UTC
-Dfile.encoding=UTF-8
druid.host=localhost
druid.service=coordinator
druid.port=8082
druid.zk.service.host=localhost
druid.db.connector.connectURI=jdbc\:mysql\://localhost\:3306/druid
druid.db.connector.user=druid
druid.db.connector.password=diurd
druid.coordinator.startDelay=PT60s

JVM Configuration

The "Coordinator" module can use several of the default modules described with respect to "Configuration" and can have the following set of configurations as well:

| Property | Description | Default |
| --- | --- | --- |
| druid.coordinator.period | The run period for the coordinator. The coordinator's operates by maintaining the current state of the world in memory and periodically looking at the set of segments available and segments being served to make decisions about whether any changes need to be made to the data topology. This property sets the delay between each of these runs. | PT60S |
| druid.coordinator.period.indexingPeriod | How often to send indexing tasks to the indexing service. Only applies if merge or conversion is turned on. | PT1800S (30 mins) |
| druid.coordinator.startDelay | The operation of the Coordinator works on the assumption that it has an up-to-date view of the state of the world when it runs, the current ZK interaction code, however, is written in a way that doesn't allow the Coordinator to know for a fact that it's done loading the current state of the world. This delay is a hack to give it enough time to believe that it has all the data. | PT300S |
| druid.coordinator.merge.on | Boolean flag for whether or not the coordinator should try and merge small segments into a more optimal segment size. | PT300S |
| druid.coordinator.conversion.on | Boolean flag for converting old segment indexing versions to the latest segment indexing version. | false |
| druid.coordinator.load.timeout | The timeout duration for when the coordinator assigns a segment to a historical node. | 15 minutes |
| druid.manager.segment.pollDuration | The duration between polls the Coordinator does for updates to the set of active segments. Generally defines the amount of lag time it can take for the coordinator to notice new segments. | PT1M |
| druid.manager.rules.pollDuration | The duration between polls the Coordinator does for updates to the set of active rules. Generally defines the amount of lag time it can take for the coordinator to notice rules. | PT1M |
| druid.manager.rules.defaultTier | The default tier from which default rules will be loaded from. | _default |

Dynamic Configuration
The coordinator can have a dynamic configuration model to change certain behaviors on the fly. The coordinator a JSON spec object from the Druid.MySQL config table. One possible example of this object is detailed below:
A sample worker setup spec is shown below:

```
{
"millisToWaitBeforeDeleting": 900000,
"mergeBytesLimit": 100000000L,
"mergeSegmentsLimit" : 1000,
"maxSegmentsToMove": 5,
```

APPENDIX B-continued (Coordinator)

"replicantLifetime": 15,
"replicationThrottleLimit": 10,
"emitBalancingStats": false
}

Issuing a GET request at the same URL wall return the spec that is currently in place. A description of an example of the config setup spec is shown below.

| Property | Description | Default |
| --- | --- | --- |
| millisToWaitBeforeDeleting | How long does the coordinator need to be active before it can start deleting segments. | 90000 (15 mins) |
| mergeBytesLimit | The maximum number of bytes to merge (for segments). | 100000000L |
| mergeSegmentsLimit | The maximum number of segments that can be in a single merge task. | Integer.MAX_VALUE |
| maxSegmentsToMove | The maximum number of segments that can be moved at any given time. | 5 |
| replicantLifetime | The maximum number of coordinator runs for a segment to be replicated before we start alerting. | 15 |
| replicationThrottleLimit | The maximum number of segments that can be replicated at one time. | 10 |
| emitBalancingStats | Boolean flag for whether or not we should emit balancing stats. This is an expensive operation. | false |

What is claimed is:

1. A method comprising:
receiving, from a first computing device, an advertising offer;
accessing, via a computer network, a plurality of advertising transactions, wherein each of the advertising transactions is associated with a respective transaction standardized attribute and an advertising parameter;
selecting, from among the plurality of advertising transactions, advertising transactions associated with a predefined transaction standardized attribute;
dynamically computing, as the plurality of advertising transactions are accessed, a current advertising index value by aggregating the advertising parameters of the predefined advertising transactions, the aggregating being based on normalizing the advertising parameters of the predefined advertising transactions over a predefined time period; and
in response to identifying that the current advertising index is less preferable than a selling parameter of the advertising offer, causing display, on a user interface of a second computing device, of an interactive element for responding to the advertising offer.

2. The method of claim 1, wherein aggregating the advertising parameters comprises aggregating the advertising parameters by using volume-weighted averaging of advertising prices.

3. The method of claim 1, wherein aggregating the advertising parameters comprises dynamically averaging prices of the predefined advertising transactions.

4. The method of claim 1, wherein aggregating the advertising parameters comprises dynamically averaging prices of the predefined advertising transactions.

5. The method of claim 1, wherein aggregating the advertising parameters comprises calculating rolling average prices of the predefined advertising transactions.

6. The method of claim 1, wherein aggregating the advertising parameters comprises obtaining data for the plurality of advertising transactions for one or more types of media.

7. The method of claim 6, wherein the one or more types of media comprise internet-enabled online medium, electronic game, mobile, search, print, newspaper, magazine, broadcast, television, radio, satellite-based, and outdoor advertising.

8. The method of claim 1, wherein aggregating the advertising parameters comprises aggregating predefined attributes of the plurality of advertising transactions to provide a common market index of advertising transactions.

9. The method of claim 1, wherein aggregating the advertising parameters comprises one or more of characterizing, summarizing, and indexing the plurality of advertising transactions.

10. The method of claim 1, wherein the advertising offer comprises one or more of an electronic display, mobile advertising, search advertising, video advertising, and game advertising.

11. A system comprising:
a processor; and
a memory storing instructions that, when executed by the processor, configure the processor to:
receive, from a first computing device, an advertising offer;
access, via a computer network, a plurality of advertising transactions, wherein each of the advertising transactions is associated with a respective transaction standardized attribute and an advertising parameter;
select, from among the plurality of advertising transactions, advertising transactions associated with a predefined transaction standardized attribute;
dynamically compute, as advertising transactions are accessed, a current advertising index value by aggregating the advertising parameters of the predefined advertising transactions, the aggregating based on normalizing the advertising parameters of the predefined advertising transactions over a predefined time period; and
in response to identifying that the current advertising index is less preferable than a selling parameter of the advertising offer, cause display, on a user interface of a second computing device, of an interactive element for responding to the advertising offer.

12. The system of claim 11, wherein aggregating the advertising parameters comprises aggregating the advertising parameters by using volume-weighted averaging of advertising prices.

13. The system of claim 11, wherein aggregating the advertising parameters comprises dynamically averaging prices of the predefined advertising transactions.

14. The system of claim 11, wherein aggregating the advertising parameters comprises dynamically averaging prices of the predefined advertising transactions.

15. The system of claim 11, wherein aggregating the advertising parameters comprises calculating rolling average prices of the predefined advertising transactions.

16. The system of claim 11, wherein aggregating the advertising parameters comprises obtaining data for the plurality of advertising transactions for one or more types of media.

17. The system of claim 16, wherein the one or more types of media comprise internet-enabled online medium, electronic game, mobile, search, print, newspaper, magazine, broadcast, television, radio, satellite-based, and outdoor advertising.

18. The system of claim 11, wherein aggregating the advertising parameters comprises aggregating predefined attributes of the plurality of advertising transactions to provide a common market index of advertising transactions.

19. The system of claim 11, wherein aggregating the advertising parameters comprises one or more of characterizing, summarizing, and indexing the plurality of advertising transactions.

20. A non-transitory computer-readable storage medium, the computer-readable storage medium including instructions that when executed by a computer, cause the computer to: receive, from a first computing device, an advertising offer;

access, via a computer network, a plurality of advertising transactions, wherein each of the advertising transactions is associated with a respective transaction standardized attribute and an advertising parameter;

select, from among the plurality of advertising transactions, advertising transactions associated with a predefined transaction standardized attribute;

dynamically compute, as advertising transactions are accessed, a current advertising index value by aggregating the advertising parameters of the predefined advertising transactions, the aggregating based on normalizing the advertising parameters of the predefined advertising transactions over a predefined time period; and in response to identifying that the current advertising index is less preferable than a selling parameter of the advertising offer, cause display, on a user interface of a second computing device, of an interactive element for responding to the advertising offer.

* * * * *

UNITED STATES PATENT AND TRADEMARK OFFICE
CERTIFICATE OF CORRECTION

PATENT NO. : 11,676,174 B2  
APPLICATION NO. : 17/248163  
DATED : June 13, 2023  
INVENTOR(S) : David Soloff Page 1 of 1

It is certified that error appears in the above-identified patent and that said Letters Patent is hereby corrected as shown below:

On the Title Page

In Column 1, under "Related U.S. Application Data", Line 1, delete "(60)" and insert --(63)-- therefor In the Claims In Column 96, Line 8, in Claim 20, after "to:", insert a linebreak Signed and Sealed this  
Twenty-fourth Day of September, 2024

Katherine Kelly Vidal  
*Director of the United States Patent and Trademark Office*